US011863236B2

(12) United States Patent
Murakami et al.

(10) Patent No.: US 11,863,236 B2
(45) Date of Patent: Jan. 2, 2024

(54) TRANSMISSION METHOD, RECEPTION METHOD, TRANSMISSION DEVICE, AND RECEPTION DEVICE

(71) Applicant: Panasonic Intellectual Property Corporation of America, Torrance, CA (US)

(72) Inventors: Yutaka Murakami, Kanagawa (JP); Nobuhiko Hashida, Osaka (JP); Ryutaro Monden, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 17/977,224

(22) Filed: Oct. 31, 2022

(65) Prior Publication Data

US 2023/0048618 A1   Feb. 16, 2023

Related U.S. Application Data

(63) Continuation of application No. 16/902,619, filed on Jun. 16, 2020, now Pat. No. 11,522,615, which is a
(Continued)

(30) Foreign Application Priority Data

Dec. 19, 2017 (JP) .................. 2017-242918

(51) Int. Cl.
*H04B 10/11* (2013.01)
*H04B 10/54* (2013.01)
(Continued)

(52) U.S. Cl.
CPC ......... *H04B 10/541* (2013.01); *H04B 10/116* (2013.01); *H04B 10/508* (2013.01);
(Continued)

(58) Field of Classification Search
CPC .. H04B 10/541; H04B 10/116; H04B 10/508; H04B 10/516; H04B 10/11; H04B 10/5161; H04B 10/66
(Continued)

(56) References Cited

U.S. PATENT DOCUMENTS 4,143,263 A * 3/1979 Eichweber ......... H04B 10/2587
                                                          342/6
4,436,376 A * 3/1984 Fergason .............. G02F 1/1393
                                                          349/1
(Continued)

FOREIGN PATENT DOCUMENTS

CN        104335649 A       2/2015
EP        2 940 900         11/2015
(Continued)

OTHER PUBLICATIONS

International Search Report (ISR) dated Mar. 5, 2019 in International (PCT) Application No. PCT/JP2018/046029.
(Continued)

*Primary Examiner* — Dibson J Sanchez
(74) *Attorney, Agent, or Firm* — Wenderoth, Lind & Ponack, L.L.P.

(57) ABSTRACT

A transmission method includes: in a first period, causing a light source to emit light having a first luminance; and in a second period, causing the light source to transmit an optical signal by causing the light source to alternately emit light having a second luminance and light having a third luminance lower than the second luminance.

5 Claims, 98 Drawing Sheets

Related U.S. Application Data continuation of application No. PCT/JP2018/046029, filed on Dec. 14, 2018.

(51) Int. Cl.
| | | |
|---|---|---|
| *H04B 10/116* | (2013.01) | |
| *H04B 10/508* | (2013.01) | |
| *H04B 10/516* | (2013.01) | |

(52) U.S. Cl.
CPC ............ *H04B 10/11* (2013.01); *H04B 10/516* (2013.01); *H04B 10/5161* (2013.01)

(58) Field of Classification Search
USPC .................................. 398/118–131, 182–201
See application file for complete search history.

(56) References Cited

U.S. PATENT DOCUMENTS

| | | | | |
|---|---|---|---|---|
| 4,983,021 | A * | 1/1991 | Fergason | G02F 1/1313 349/1 |
| 5,539,565 | A * | 7/1996 | Waddoups | G01S 17/74 342/45 |
| 6,154,299 | A * | 11/2000 | Gilbreath | H04B 10/2587 398/1 |
| 6,493,123 | B1 * | 12/2002 | Mansell | H04B 10/2587 342/45 |
| 8,330,379 | B2 | 12/2012 | Schenk | |
| 8,330,388 | B2 | 12/2012 | Kuo | |
| 8,699,887 | B1 | 4/2014 | Rothenberg | |
| 8,805,202 | B2 * | 8/2014 | Suzuki | H04B 10/116 398/171 |
| 9,237,620 | B1 | 1/2016 | Knapp | |
| 9,564,969 | B2 | 2/2017 | Kido | |
| 9,735,877 | B2 | 8/2017 | Jung | |
| 10,128,946 | B2 | 11/2018 | Lee | |
| 11,150,855 | B2 * | 10/2021 | Monsees | F16M 13/02 |
| 2006/0044652 | A1 | 3/2006 | Yamamoto | |
| 2006/0071613 | A1 | 4/2006 | Lovato | |
| 2007/0092264 | A1 | 4/2007 | Suzuki | |
| 2007/0273948 | A1 * | 11/2007 | Roes | G02B 26/02 359/529 |
| 2007/0297805 | A1 * | 12/2007 | Rabinovich | H04B 10/2587 398/151 |
| 2008/0203946 | A1 | 8/2008 | Ito | |
| 2008/0258641 | A1 | 10/2008 | Nakagawa | |
| 2008/0265114 | A1 * | 10/2008 | Moscovitch | G06F 1/16 248/176.3 |
| 2009/0129781 | A1 | 5/2009 | Irie | |
| 2010/0096447 | A1 | 4/2010 | Kwon | |
| 2010/0302268 | A1 | 12/2010 | Jun | |
| 2011/0064416 | A1 | 3/2011 | Rajagopal | |
| 2011/0216049 | A1 | 9/2011 | Jun | |
| 2011/0222849 | A1 | 9/2011 | Han | |
| 2012/0128367 | A1 | 5/2012 | Yamada | |
| 2013/0015784 | A1 | 1/2013 | Kamada | |
| 2014/0225513 | A1 | 8/2014 | Park | |
| 2014/0301737 | A1 | 10/2014 | Guo | |
| 2014/0321859 | A1 | 10/2014 | Guo | |
| 2014/0328599 | A1 | 11/2014 | Pederson | |
| 2015/0126223 | A1 | 5/2015 | Lee et al. | |
| 2015/0229392 | A1 | 8/2015 | Ikehara | |
| 2015/0234217 | A1 * | 8/2015 | Aoyama | G02F 1/133504 349/33 |
| 2015/0234218 | A1 * | 8/2015 | Aoyama | H04B 10/116 349/33 |
| 2015/0312989 | A1 | 10/2015 | Wee | |
| 2015/0372753 | A1 | 12/2015 | Jovicic | |
| 2016/0259192 | A1 * | 9/2016 | Aoyama | G02F 1/133524 |
| 2016/0286633 | A1 | 9/2016 | Juslen | |
| 2016/0293069 | A1 | 10/2016 | Kido | |
| 2016/0295654 | A1 | 10/2016 | Kido | |
| 2017/0094742 | A1 | 3/2017 | Nakamura | |
| 2017/0363895 | A1 * | 12/2017 | Aoyama | H04B 10/116 |
| 2018/0045992 | A1 * | 2/2018 | Chen | G02F 1/1337 |
| 2018/0248621 | A1 * | 8/2018 | Lenssen | H04B 10/5563 |
| 2018/0295691 | A1 | 10/2018 | Takeda | |
| 2019/0020413 | A1 | 1/2019 | Park | |
| 2019/0033079 | A1 | 1/2019 | Wang | |

FOREIGN PATENT DOCUMENTS

| | | |
|---|---|---|
| JP | 2008-154063 | 7/2008 |
| JP | 2008-283446 | 11/2008 |
| JP | 2009-176674 | 8/2009 |
| WO | 2016/150890 A1 | 9/2016 |
| WO | 2017/205020 A2 | 11/2017 |

OTHER PUBLICATIONS

Seigo Ito, et al., "Bayesian Based Location Estimation System Using Wireless LAN", Third IEEE Conference on Pervasive Computing and Communications Workshops, pp. 273-278, 2005.

Jyunichi Akita, "Advanced Image Sensor", The Journal of The Institute of Image Information and Television Engineers, vol. 66, No. 3, pp. 172-173, 2012, with partial translation (also cited in the specification).

Shigetoshi Sugawa, "High Speed Technology Trends in CMOS Image Sensors", The Journal of The Institute of Image Information and Television Engineers, vol. 66, No. 3, pp. 174-177, 2012, with partial translation (also cited in the specification).

Mikio Ihama, et al., "Proposal of New Organic CMOS Image Sensor for Reduction in Pixel Size", Fujifilm Research & Development, No. 55, pp. 14-17, 2010, with partial translation (also cited in the specification).

Extended European Search Report dated Jan. 20, 2021 in corresponding European Patent Application No. 18891479.0.

Office Action dated Jun. 2, 2022 in counterpart Indian patent application No. 202047025261, 7 pages.

OnlineMathLearning.com (Average Problems), May 2006, All Document. https://web.archive.org/web/20060509225903/https://www.onlinemathlearning.com/average-problems.html (Year: 2006).

Pulse Width Modulation with Analog Write, Mar. 2015, All Document. https://web.archive.org/web/20150318204114/https://robotic-controls.com/book/export/html/57/ (Year: 2015).

* cited by examiner

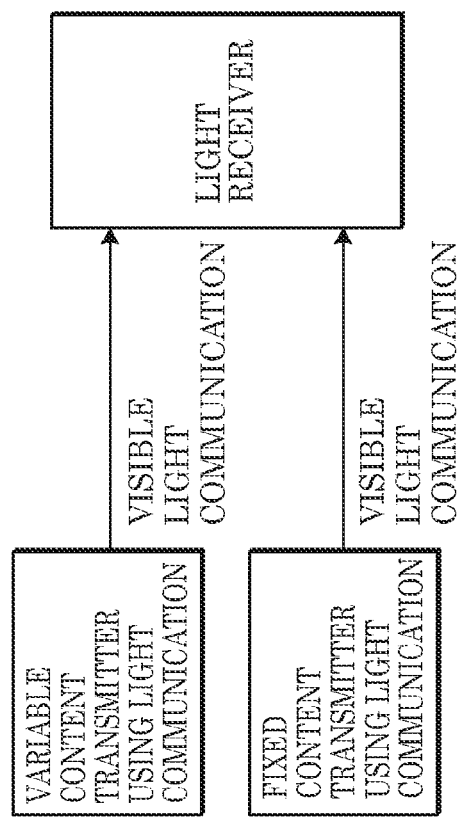

FIG. 71B

| FIRST LIQUID CRYSTAL REGION TRANSMISSION DEVICE 7101 | SECOND LIQUID CRYSTAL REGION TRANSMISSION DEVICE 7102 | THIRD LIQUID CRYSTAL REGION TRANSMISSION DEVICE 7103 |
|---|---|---|
| FOURTH LIQUID CRYSTAL REGION TRANSMISSION DEVICE 7104 | FIFTH LIQUID CRYSTAL REGION TRANSMISSION DEVICE 7105 | SIXTH LIQUID CRYSTAL REGION TRANSMISSION DEVICE 7106 |
| SEVENTH LIQUID CRYSTAL REGION TRANSMISSION DEVICE 7107 | EIGHTH LIQUID CRYSTAL REGION TRANSMISSION DEVICE 7108 | NINTH LIQUID CRYSTAL REGION TRANSMISSION DEVICE 7109 |

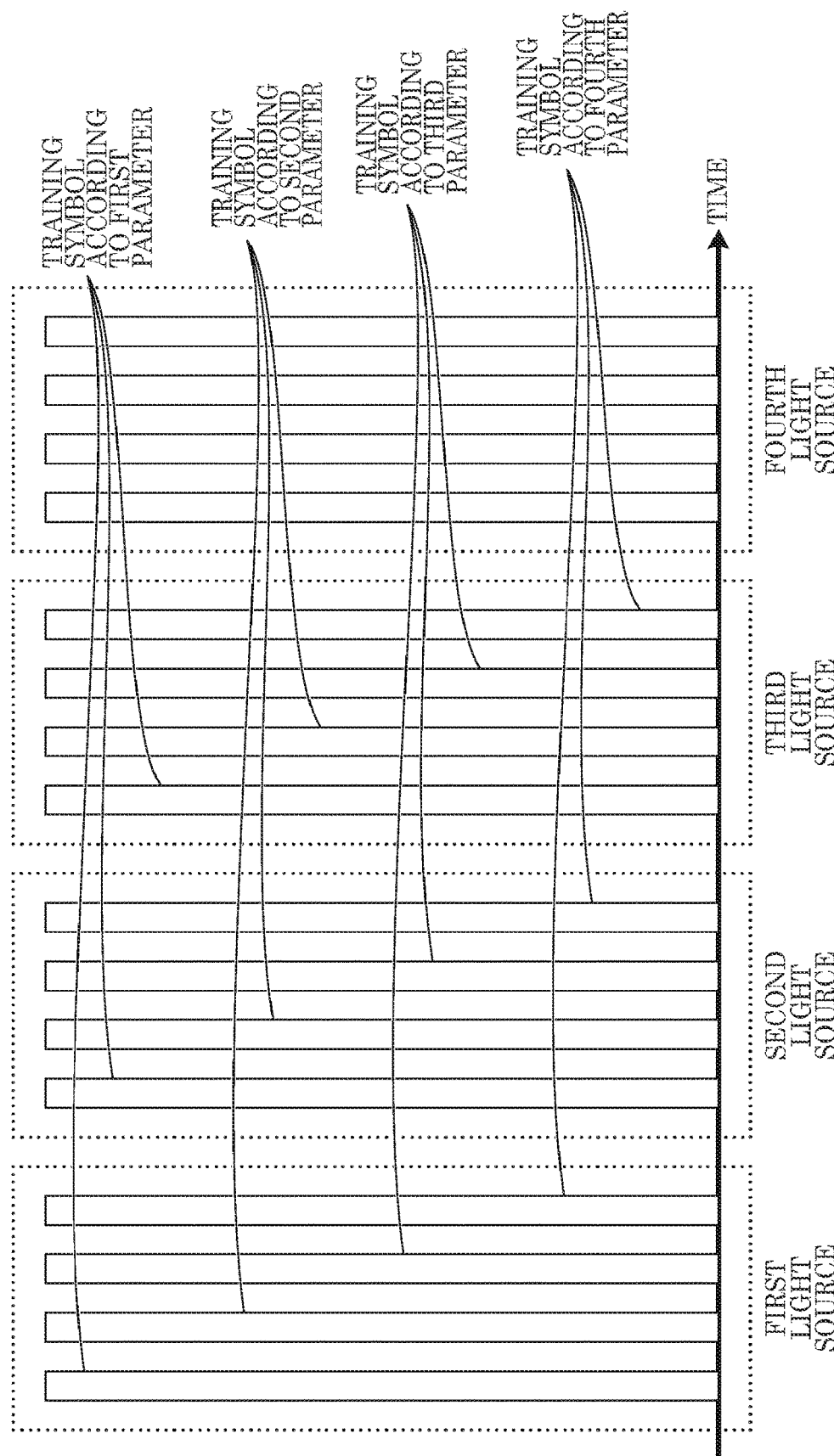

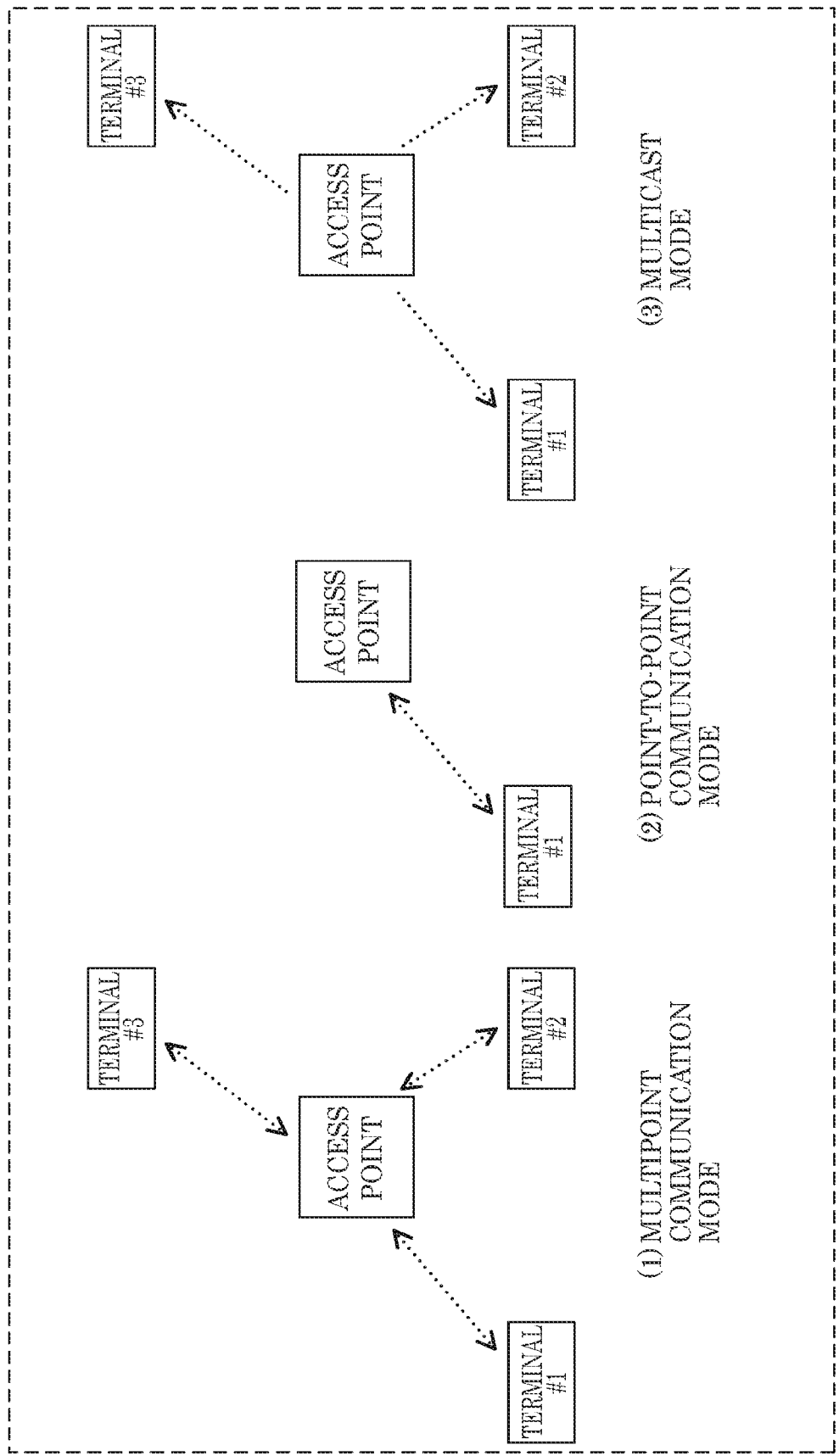

TRANSMISSION METHOD, RECEPTION METHOD, TRANSMISSION DEVICE, AND RECEPTION DEVICE

CROSS REFERENCE TO RELATED APPLICATIONS

This application is a U.S. continuation of U.S. application Ser. No. 16/902,619, filed Jun. 16, 2020, which is a U.S. continuation application of PCT International Patent Application Number PCT/JP2018/046029 filed on Dec. 14, 2018, claiming the benefit of priority of Japanese Patent Application Number 2017-242918 filed on Dec. 19, 2017, the entire contents of which are hereby incorporated by reference.

BACKGROUND

1. Technical Field

The present disclosure relates to a transmission method, a reception method, a transmission device, and a reception device.

2. Description of the Related Art

Terminals can use global positioning system (GPS) as a method for obtaining information on, for example, its own position, in order to use services that are based on the position of the terminal. With methods that use GPS, the terminals receive modulated signals transmitted from a satellite, and estimate location by performing positioning calculation. However, it is difficult for a terminal to estimate its own location when reception of the radio waves transmitted by the satellite is difficult (such as when the terminal is indoors).

For example, one method used by a terminal to estimate its own position in such a situation is disclosed in. Bayesian based location estimation system using wireless LAN, Third IEEE Conference on Pervasive Computing and Commun. Workshops, pp. 273-278, 2005. As disclosed in Bayesian based location estimation system using wireless LAN, Third IEEE Conference on Pervasive Computing and Commun. Workshops, pp. 273-278, 2005, there is a method by which the terminal uses radio waves transmitted from an access point (AP) of a wireless local area network (LAN) to estimate information such as its own location.

SUMMARY

However, for example, when the terminal does not have information on, for example, the service set identifier (SSID) of the access point that the terminal is to access, it is difficult for the terminal to appropriately determine which of the surrounding access points it is supposed to connect to. Accordingly, for example, when the terminal connects to an access point to obtain information such as information indicating the location of the terminal, there is a possibility that the terminal will connect to an access point whose SSID is insecure, leading to the possibility of a compromise of information.

In one aspect, the present disclosure facilitates the provision of, for example, a transmission method that can securely obtain, for example, information to be used to identify an access point that the terminal is to connect to.

A transmission method according to one aspect of the present disclosure includes: in a first period, causing a light source to emit light having a first luminance; and in a second period, causing the light source to transmit an optical signal by causing the light source to alternately emit light having a second luminance and light having a third luminance lower than the second luminance.

A reception method according to one aspect of the present disclosure includes: in a first period, receiving light having a first luminance from a light source; in a second period, receiving an optical signal transmitted from the light source, by alternately receiving light having a second luminance and light having a third luminance lower than the second luminance; and outputting analysis information by analyzing data based on the optical signal.

General or specific aspects of the above may be realized as a system, method, integrated circuit, computer program, storage medium, or any given combination thereof.

According to one aspect of the present disclosure, it is possible for a terminal to securely obtain information.

Additional benefits and advantages in one aspect of the present disclosure will become apparent from the Specification and Drawings. The benefits and/or advantages may be individually obtained by the various embodiments and features of the Specification and Drawings, which need not all be provided in order to obtain one or more of such benefits and/or advantages.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 5 illustrates a configuration example of a visible light communication system;

FIG. 94 illustrates an example of an access point transmitting "light source/light receiver selection and light source parameter training symbols"; and FIG. 95 illustrates three communication or transmission modes.

DETAILED DESCRIPTION OF THE EMBODIMENTS

Hereinafter, embodiments of the present disclosure will be described in detail with reference to the drawings.

[First Example of Modulation and Demodulation Scheme for Visible Light Communication]

In this embodiment, an optical communication method is used that transmits and receives modulated signals as optical signals.

First, a first example of visible light communication, which is one example of an optical communication method that can be applied to each of the embodiments of the present disclosure will be given.

<Line Scan Sampling>

Smartphones and digital cameras, for example, are equipped with an image sensor such as a CMOS (Complementary Metal Oxide Semiconductor) sensor. For example, the entire scene in a single image captured by the CMOS sensor is not captured at a single instant, but rather, for example, captured line by line using a rolling shutter method, whereby the sensor reads out the amount of light received line by line, as shown in "Advanced Image Sensor", The Journal of The Institute of Image Information and Television Engineers, vol. 66, no. 3, pp. 172-173, 2012 and "High. Speed Technology Trends in CMOS image Sensors". The Journal of The Institute of Image Information and Television Engineers, vol. 66, no. 3, pp. 174-177, 2012. Accordingly, taking the readout time into account, the starting and stopping of the reception of light is controlled so that there is a time shift from line to line. In other words, images captured by the CMOS sensor are constructed from a plurality of lines captured with a slight time lag between each line.

Figure 1:
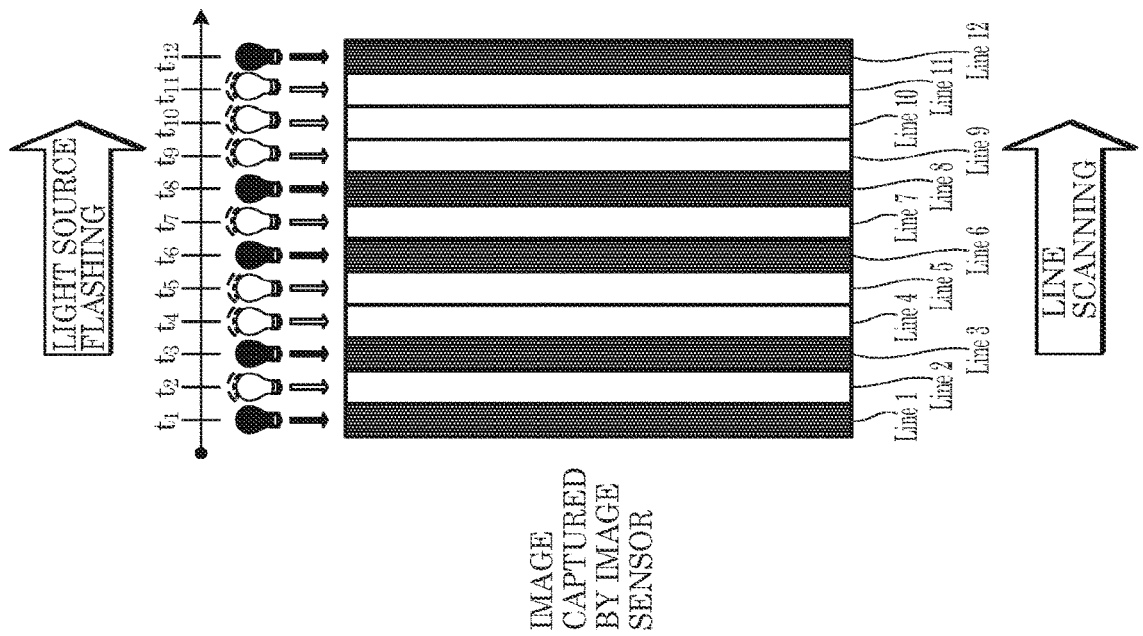
FIG. 1 is for describing line scan sampling principles.

In the first example of a visible light communication method, high-speed reception of visible light signals is achieved based on a method that focuses on the characteristics of the CMOS sensor. In other words, in the first example of a visible light communication method, by utilizing the slight difference in exposure time between lines, the luminance and color of the light source at a plurality of points in time can be measured line by line, from a single image (image captured by the image sensor, i.e., "captured image"), making it possible to capture a modulated signal faster than the frame rate of the image sensor, as illustrated in FIG. 1.

Hereinafter, this sampling technique is referred to as "line scan sampling", and one line of pixels that are exposed at the same time is referred to as an "exposure line".

Note that line scan sampling can be implemented using the rolling shutter scheme of a CMOS sensor, but even when the rolling shutter scheme is implemented using a sensor other than a CMOS sensor, such as a charge-coupled device (CCD) sensor or an organic CMOS sensor exemplified by "Proposal of New Organic CMOS Image Sensor for Reduction in Pixel Size", FUJIFILM RESEARCH & DEVELOPMENT, no. 55, pp. 14-17, 2010, the line scan sampling can be implemented in the same manner.

Figure 2:
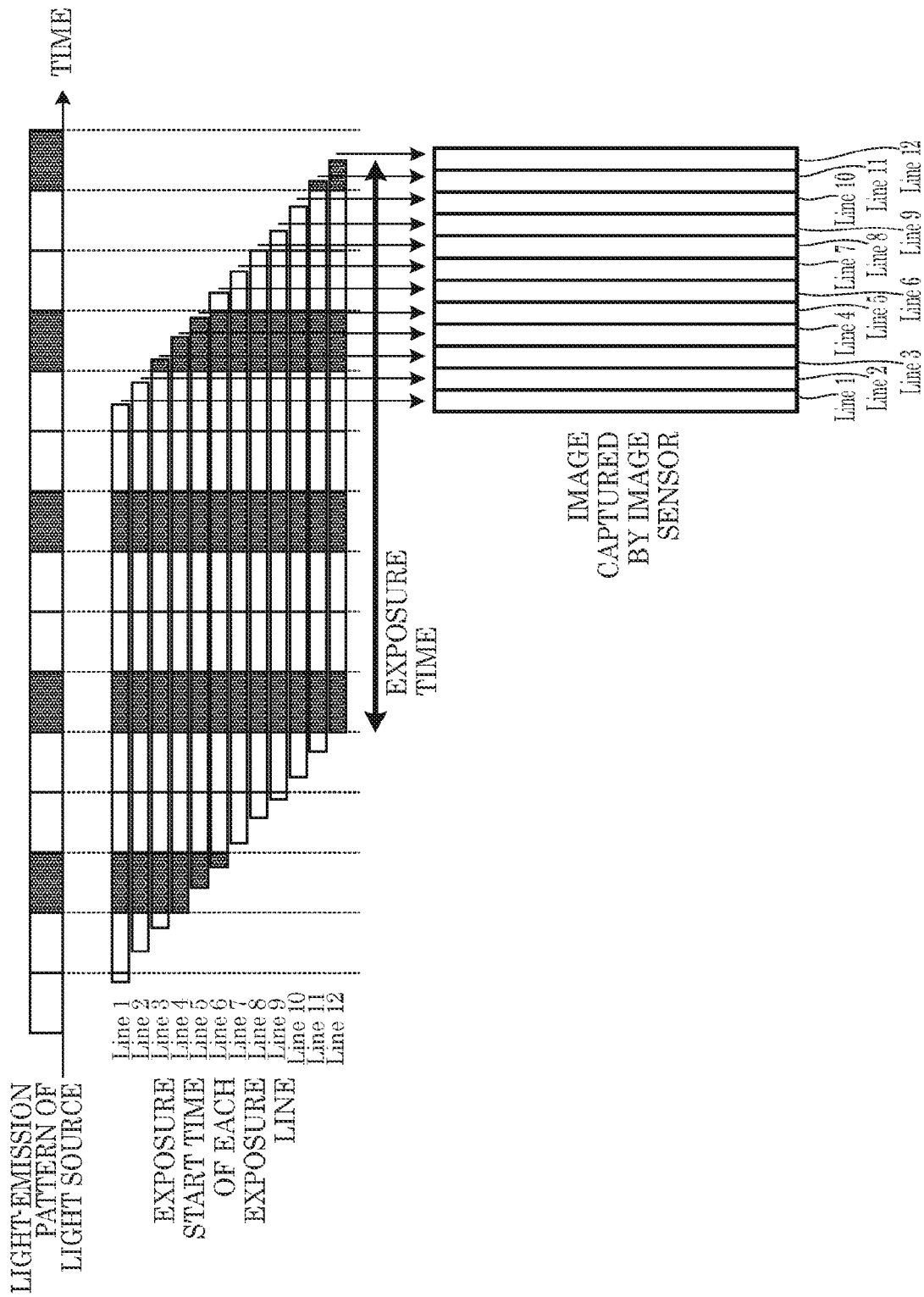
FIG. 2 illustrates one example of a captured image when exposure time is long.

However, when the photography setting for photographing an image using the camera function (the function for capturing a video or still image) is used, even if a rapidly flashing light source is captured, the flashing will not appear as a striped pattern extending along the exposure lines. This is because, with this setting, since the exposure time is sufficiently longer than the flash cycle, as illustrated in FIG. 2, the change in luminance resulting from the light source flashing (light-emission pattern) is uniform, whereby the variation in pixel values between exposure lines is small, resulting in a substantially uniform image.

Figure 3:
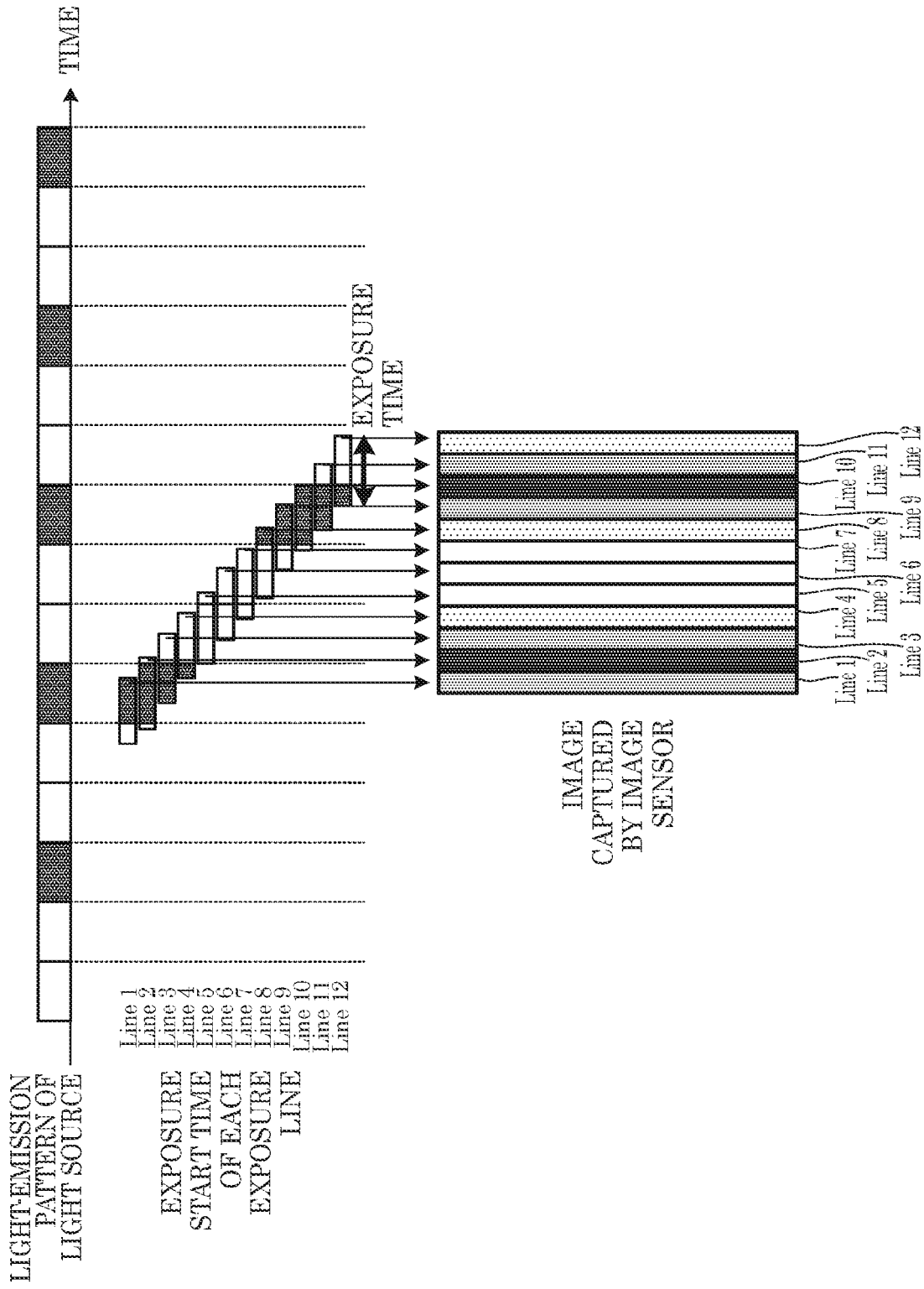
FIG. 3 illustrates one example of a captured image when exposure time is short.

In contrast, by setting the exposure time to the flash cycle of the light source as illustrated in FIG. 3, the state of the flashing of the light source (light-emission pattern) can be observed as a change in luminance between exposure lines. In FIG. 3, the length of the exposure period is set slightly longer than the length of the shortest period of a continuous light-emitting state, and the difference in start times of exposure periods between adjacent exposure lines is set longer than the shortest period of a continuous light-emitting state, but the exposure period setting in line scan sampling is not limited to this example. For example, the length of the exposure period may be set shorter than the shortest period of a continuous light-emitting state, and may be set to approximately double the length of the shortest period of a continuous light-emitting state. Moreover, in addition to a method in which the optical signal is expressed as, for example, a combination of square waves like illustrated in FIG. 4A, a method in which the optical signal continuously changes may be used as the optical communication method. In any case, with respect to the sampling rate required to receive and demodulate optical signals, a reception device that uses an optical communication method sets the difference between start times or end times between temporally neighboring exposure lines to be less than or equal to the sampling interval corresponding to the sampling rate. Moreover, the reception device having an optical communication method sets the length of the exposure period to be less than or equal to the length of the sampling interval. However, the reception device having an optical communication method may set the length of the exposure period to less than or equal to 1.5 times the sampling interval, and may set the exposure period to less than or equal to 2 times the sampling interval.

For example, exposure lines are designed so as to be parallel to the lengthwise direction of the image sensor. In such cases, in one example, assuming the frame rate is 30 fps (frames per second), at a resolution of 1920×1080, 32,400 or more samples are obtained each second, and at a resolution of 3840×2160, 64,800 or more samples are obtained each second.

<Line Scan Sampling Application Example>

Note that in the above description, line scan sampling in which a signal that indicates an amount of light received per line is read out is described, but the method of sampling optical signals using an image sensor such as a CMOS sensor is not limited to this line scan sampling example. A variety of methods that can obtain signals sampled at a sampling rate higher than the frame rate used in typical video capturing can be implemented as a sampling method used for optical signal reception. For example, a method of controlling the exposure time per pixel and reading out a signal or a method of controlling the exposure time per group of pixels arranged in a shape other than a line and reading out a signal may be used by utilizing the global shutter method disclosed in "Advanced Image Sensor". The Journal of The Institute of Image Information and Television Engineers, vol. 66, no. 3, pp. 172-173, 2012 or "High Speed Technology Trends in CMOS Image Sensors". The Journal of The Institute of Image Information and. Television Engineers, vol. 66, no. 3, pp. 174-177, 2012 that has a shutter function for each pixel. Moreover, a method may be used in which a signal is read out a plurality of times from the same pixel during a period corresponding to a single frame in the frame rate used in typical video capturing.

<Frame Sampling>

Furthermore, by employing the frame rate method that gives a shutter function to each pixel disclosed in "Advanced Image Sensor". The Journal of The Institute of Image Information and Television Engineers, vol. 66, no. 3, pp. 172-173, 2012 and "High Speed Technology Trends in CMOS Image Sensors". The Journal of The Institute of Image Information and Television Engineers, vol. 66, no. 3, pp. 174-177, 2012, it is possible to sample optical signals even in a method that speeds up the frame rate.

For example, the embodiments to be described hereinafter can be realized in any of the methods described above: "Line Scan Sampling", "Line Scan Sampling Application Example", and "Frame Sampling".

<Light Source and Modulation Scheme>

In visible light communication, for example, an LED (Light Emitting Diode) can be used as a transmitter. LEDs are commonly used as light sources in lamps or in display backlights, and are capable of rapidly flashing.

However, light sources that are used as visible light communication transmitters cannot be allowed to flash uncontrolled when performing visible light communication. If the changes in luminance made for visible light communication are recognizable to the human eye, the original functionality of a light source as a lamp will be lost. Accordingly, the transmission signal needs to be emitted at a desired brightness and needs to be imperceptible to the human eye.

Figure 4A:
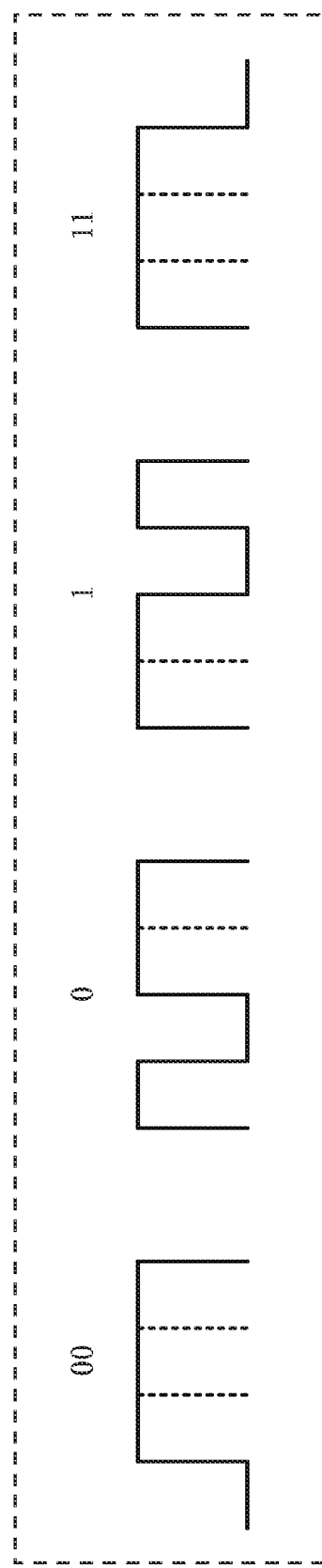
FIG. 4A is for describing 4 PPM.

One example of a modulation scheme that satisfies these conditions is 4 PPM (4-Pulse Position Modulation). As illustrated in FIG. 4A, 4 PPM is a scheme in which two bits are expressed by a group of four time slots each indicating either bright or dark light emitted by a light source. Moreover, as illustrated in FIG. 4A, in 4 PPM, three of the four slots are bright and one of the slots is dark. Accordingly, regardless of the content of the signal, the average brightness (average luminance) is ¾=75%.

Figure 4B:
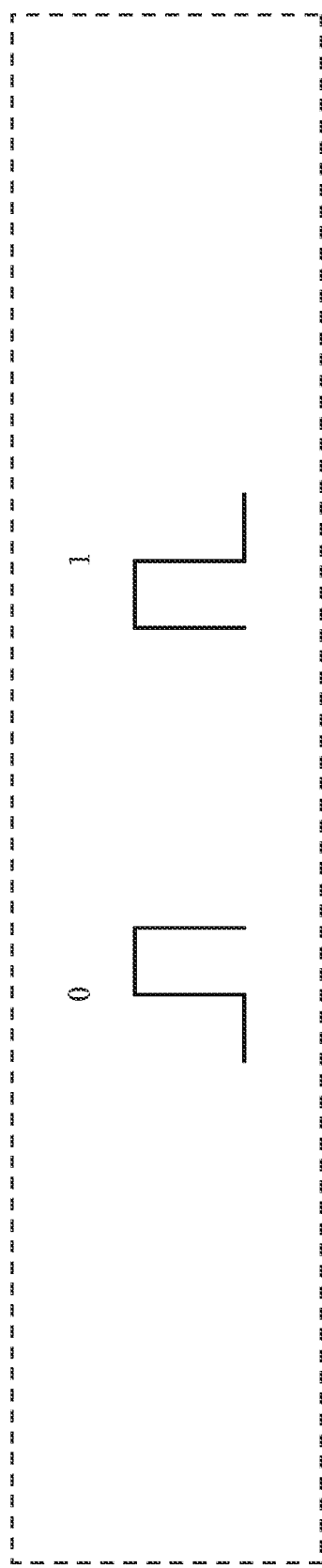
FIG. 4B is for describing Manchester encoding.

For comparison, one example of a similar scheme is Manchester encoding illustrated in FIG. 4B. In the Manchester coding scheme, one bit is expressed with two states, and the modulation efficiency is 50%, which is the same as 4 PPM, but among the two states, one is bright and one is dark, so the average luminance is ½=50%. In other words, 4 PPM is more suitable than Manchester encoding as a modulation scheme for visible light communication. However, since communication capability is not adversely affected by changes in luminance from visible light communication that are recognizable to the human eye, depending on the application, there may be no problem in using a method in which the changes in luminance are recognizable to the human eye. Accordingly, the transmitter (light source) may use, for example, an amplitude shift keying (ASK) method, a phase shift keying (PSK) method, or a pulse amplitude modulation (PAM) method to generate the modulated signal and pulse the light source to emit light.

<Example of Overall Configuration of Communication System>

As illustrated in FIG. 5, the communication system that performs visible light communication includes at least a transmitter that transmits (emits) optical signals and a receiver that receives optical signals. For example, there are two types of transmitters: a variable content transmitter using light communication that changes the transmission content depending on the image or content to be displayed; and a fixed content transmitter using light communication that continues transmitting fixed transmission content. However, even with a configuration including only either the variable content transmitter using light communication or the fixed content transmitter using light communication, a communication system that communicates via light can be realized.

The receiver can receive an optical signal from the transmitter, obtain, for example, relevant information associated with the optical signal, and provide it to the user.

This concludes the summary of the visible light communication method, but communication methods applicable to the light communication to be described in the following embodiments are not limited to this example. For example, the light emitter in the transmitter may transmit data using a plurality of light sources. Moreover, the light receiver in the reception device need not be an image sensor such as a CMOS sensor, and may employ a communication method that can use a device that is capable of converting an optical signal into an electrical signal, such as a photodiode. In such cases, since there is no need to perform sampling using the above-described line scan sampling, such a light receiver is applicable even to methods that require 32,400 or more samples per second. Moreover, depending on the application, for example, a wireless communication method that uses light in frequencies outside of the visible light range, such as infrared light or ultraviolet light, may be used.

Embodiment 1

Figure 6:
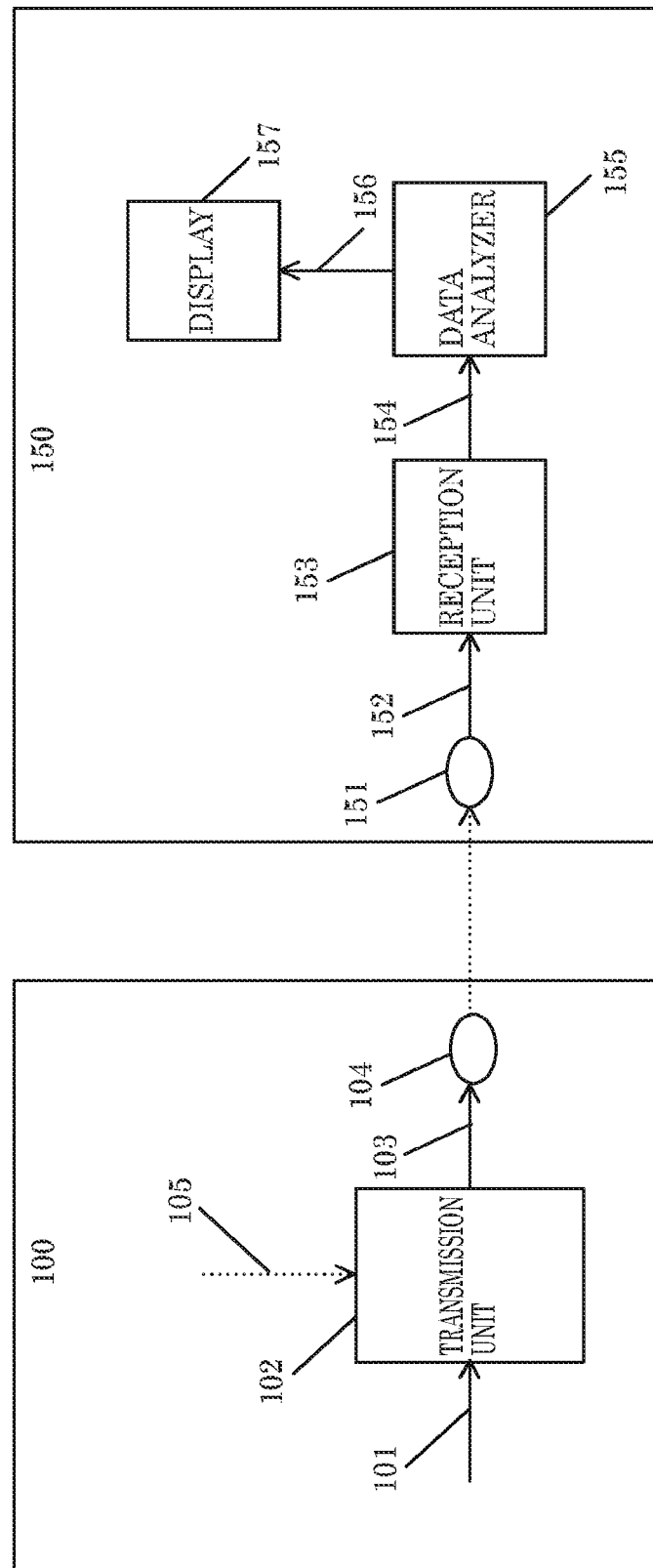
FIG. 6 illustrates a configuration example of a communication system according to Embodiment 1.

FIG. 6 illustrates one example of configurations of device 100 and terminal 150 according to this embodiment.

[Configuration of Device 100]

Device 100 (which corresponds to the visible light communication transmitter) includes a visible-light light source, lamp, or light (hereinafter also expressed by the all-encompassing term "light source") such as a light emitting diode (LED). Note that hereinafter, device 100 is also referred to as "first device".

In first device 100 in FIG. 6, transmission unit 102 receives an input of, for example, information 101 related to a location or position. Moreover, transmission unit 102 may receive an input of information 105 related to time. Moreover, transmission unit 102 may receive inputs of both information 101 related to a location or position and information 105 related to time.

Transmission unit 102 receives inputs of information 101 related to a location or position and/or information 105 related to time, generates modulated signal (for optical communication) 103 based on the input signal(s), and outputs modulated signal 103. Modulated signal 103 is then transmitted from light source 104, for example.

Next, examples of information 101 related to a location or position will be given.

Example 1

Information 101 related to a location or position may be information indicating the latitude and/or longitude of a location or position. For example, information 101 related to a location or position may be information indicating "45 degrees north latitude, 135 degrees east longitude".

Example 2

Information 101 related to a location or position may be information indicating an address. For example, information 101 related to a location or position may be information indicating "1-1-1 XYZ-machi, Chiyoda-ku, Tokyo-to".

Example 3

Information 101 related to a location or position may be information indicating a building or facility, for example.

For example, information 101 related to a location or position may be information indicating "Tokyo Tower".

Example 4

Information 101 related to a location or position may be information indicating a unique location or position of something at a building or facility, for example.

For example, assume there are five parking spaces for automobiles in a parking lot. Assume the first through fifth parking spaces are named A-1 through A-5, respectively. In this example, information 101 related to a location or position may be information indicating, for example, "A-3".

This example is not limited to only parking spaces in a parking lot. Information 101 related to a location or position may be, for example, information related to a section, a seat, a store, a facility, etc., at, for example, a concert facility, a stadium such as a baseball, soccer, or tennis stadium, an airplane, an airport lounge, a railway, a station, etc.

This concludes the examples of information 101 related to a location or position. Note that methods for configuring information 101 related to a location r position are not limited to the above examples.

[Configuration of Terminal 150]

Terminal 150 in FIG. 6 (which corresponds to the visible light communication receiver) receives modulated signal 103 transmitted from first device 100.

Light receiver (light reception device) 151 is, for example, an image sensor such as a complementary metal oxide semiconductor (CMOS) or organic CMOS image sensor. Light receiver 151 receives light including the modulated signal transmitted from first device 100, and outputs reception signal 152.

Note that reception signal 152 output from light receiver 151 may be a signal including an image or video obtained by an image sensor, and may be a signal output by an element that performs some other photo-electric conversion (converting light into an electric signal). In the following description, when a reception-side device is described as receiving a modulated signal without giving any further details on the processes performed by light receiver 151, this means that the reception-side device obtains a modulated signal for transmitting information, or a modulated signal of an image or video and a modulated signal for transmitting information, by photo-electric conversion (converting light into an electric signal) of light including the modulated signal by light receiver 151. However, the method described above used to receive the modulated signal by the reception-side device is merely one non-limiting example.

Reception unit 153 receives an input of reception signal 152, performs processing such as demodulation and error correction decoding on the modulated signal included in reception signal 152, and outputs reception data 154.

Data analyzer 155 receives an input of reception data 154, estimates, for example, the location or position of terminal 150 by analyzing reception data 154, and outputs information 156 including information on the location or position of at least terminal 150.

Display 157 receives an input of information 156, and displays information related to the location or position of terminal 150 based on information on the location or position of terminal 150 included in information 156.

[Frame Configuration]

Figure 7:
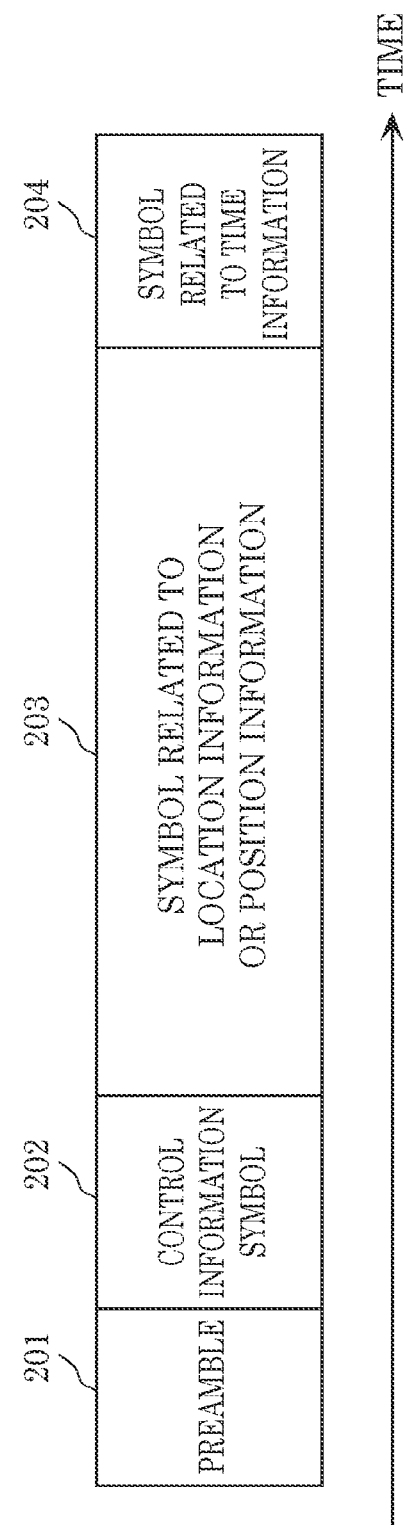
FIG. 7 illustrates a frame configuration example according to Embodiment 1.

FIG. 7 illustrates one example of a frame configuration of a modulated signal transmitted by first device 100.

In FIG. 7, time is represented on the horizontal axis. For example, first device 100 transmits preamble 201 and then transmits control information symbol 202, symbol 203 related to location information or position information, and symbol 204 related to time information.

Preamble 201 is a symbol for terminal 150 that receives the modulated signal transmitted by first device 100 to perform, for example, signal detection, time synchronization, and/or frame synchronization.

Control information symbol 202 is, for example, a symbol including data on, for example, the configuration method of the modulated signal, the error correction encoding scheme used, and/or the frame configuration method.

Symbol 203 related to location information or position information is a symbol including information 101 related to a location or position illustrated in FIG. 6.

Note that the frame may include symbols other than symbols 201, 202, and 203. For example, as illustrated in FIG. 7, the frame may include symbol 204 related to time information. Here, symbol 204 related to time information includes information 105 related to time at which first device 100 transmitted the modulated signal. Note that the configuration of the frame of the modulated signal transmitted by first device 100 is not limited to the example illustrated in FIG. 7, and the symbols included in the modulated signal are not limited to the configuration illustrated in FIG. 7. The frame may include symbols including other data and/or information.

Advantageous Effects

Next, advantageous effects upon first device 100 transmitting a modulated signal and terminal 150 receiving that modulated signal, as illustrated in FIG. 6 and FIG. 7, will be described.

Since first device 100 transmits the modulated signal via visible light, terminal 150 capable of receiving the modulated signal is not in a location significantly far from the location of first device 100. Accordingly, by terminal 150 obtaining the location or position information transmitted by first device 100, terminal 150 can achieve an advantageous effect whereby it is possible to easily (i.e., without having to perform complicated signal processing) obtain accurate position information.

Moreover, when first device 100 is disposed in a location where reception of satellite radio waves from a GPS satellite is difficult, it is possible to achieve an advantageous effect whereby it is possible for terminal 150 to securely obtain accurate position information even in locations in which reception of radio waves from a GPS satellite is difficult, by terminal 150 receiving the modulated signal transmitted by first device 100.

Embodiment 2

Figure 8:
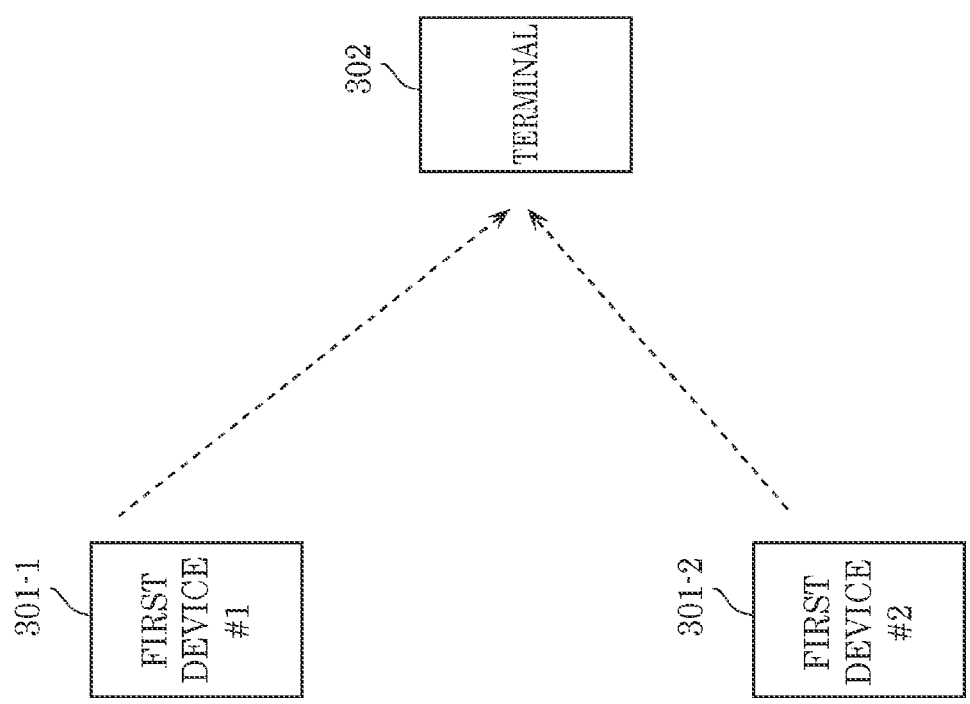
FIG. 8 illustrates the positional relationship between devices and a terminal according to Embodiment 2.

In this embodiment, a configuration in which a plurality of first devices 100 described in Embodiment 1 are provided will be described. In this embodiment, for example, as illustrated in FIG. 8, first device #1 301-1 having the same configuration as first device 100 illustrated in FIG. 6 transmits a modulated signal. Terminal 302 having the same configuration as terminal 150 illustrated in FIG. 6 receives the modulated signal transmitted by first device #1 301-1, and, for example, obtains information related to the location or position of first device #1 301-1 and information related to time pertaining to first device #1 301-1.

Similarly, first device #2 301-2 having the same configuration as first device 100 illustrated in FIG. 6 transmits a modulated signal. Terminal 302 receives the modulated signal transmitted by first device #2 301-2, and, for example, obtains information related to the location or position of first device #2 301-2 and information related to time pertaining to first device #2 301-2.

Terminal 302 can calculate the distance between first device #1 301-1 and first device #2 301-2 illustrated in FIG. 8 based on the information related to the location or position of first device #1 301-1 and the information related to the location or position of first device #2 301-2. Moreover, terminal 302 can calculate the distance between terminal 302 and first device #1 301-1 based on the information related to time pertaining to first device #1 301-1 and, for example, the time at which terminal 302 received the modulated signal transmitted by first device #1 301-1. Similarly, terminal 302 can calculate the distance between terminal 302 and first device #2 301-2 based on the information related to time pertaining to first device #2 301-2 and, for example, the time at which terminal 302 received the modulated signal transmitted by first device #2 301-2.

Moreover, terminal 302 knows the position of first device #1 301-1 based on the information related to the location or position of first device #1 301-1. Terminal 302 knows the position of first device #2 301-2 based on the information related to the location or position of first device #2 301-2.

Moreover, terminal 302 knows the geometry of the triangle formed by first device #1 301-1, first device #2 301-2, and terminal 302 from the distance between first device #1 301-1 and first device #2 301-2, the distance between first device #1 301-1 and terminal 302, and the distance between first device #2 301-2 and terminal 302.

Accordingly, terminal 302 can accurately calculate and obtain the position of terminal 302 from the position of first device #1 301-1, the position of first device #2 301-2, and the geometry of the triangle formed by first device #1 301-1, first device #2 301-2, and terminal 302.

However, the geodetic measurement method used by terminal 302 to obtain the location or position information is not limited to the method described above; any geodetic measurement, method may be used. Examples of geodetic measurement methods include triangulation, traverse calculation, trilateration, leveling, etc.

As described above, in this embodiment, terminal 302 can obtain the above-described information from a plurality of devices 301 including light sources that transmit location information, and as a result, it is possible to achieve an advantageous effect whereby the terminal 302 accurately estimate the position of terminal 302.

Moreover, in this embodiment, when device 301 including a light source that transmits location information is disposed in a location where reception of satellite radio waves from a GPS satellite is difficult, as described in Embodiment 1, it is possible to achieve an advantageous effect whereby it is possible for terminal 302 to securely obtain accurate position information even in locations in which reception of radio waves from a GPS satellite is difficult, by terminal 302 receiving the modulated signal transmitted by device 301.

Note that in the above example, terminal 302 receives modulated signals transmitted by two devices 301, but an embodiment in which terminal 302 receives modulated signals transmitted by more than two devices 301 can be implemented in the same manner. Note that the more devices 301 there are, the more accurately terminal 302 can calculate the position information, so from this viewpoint, more devices 301 are more beneficial.

Embodiment 3

Figure 9:
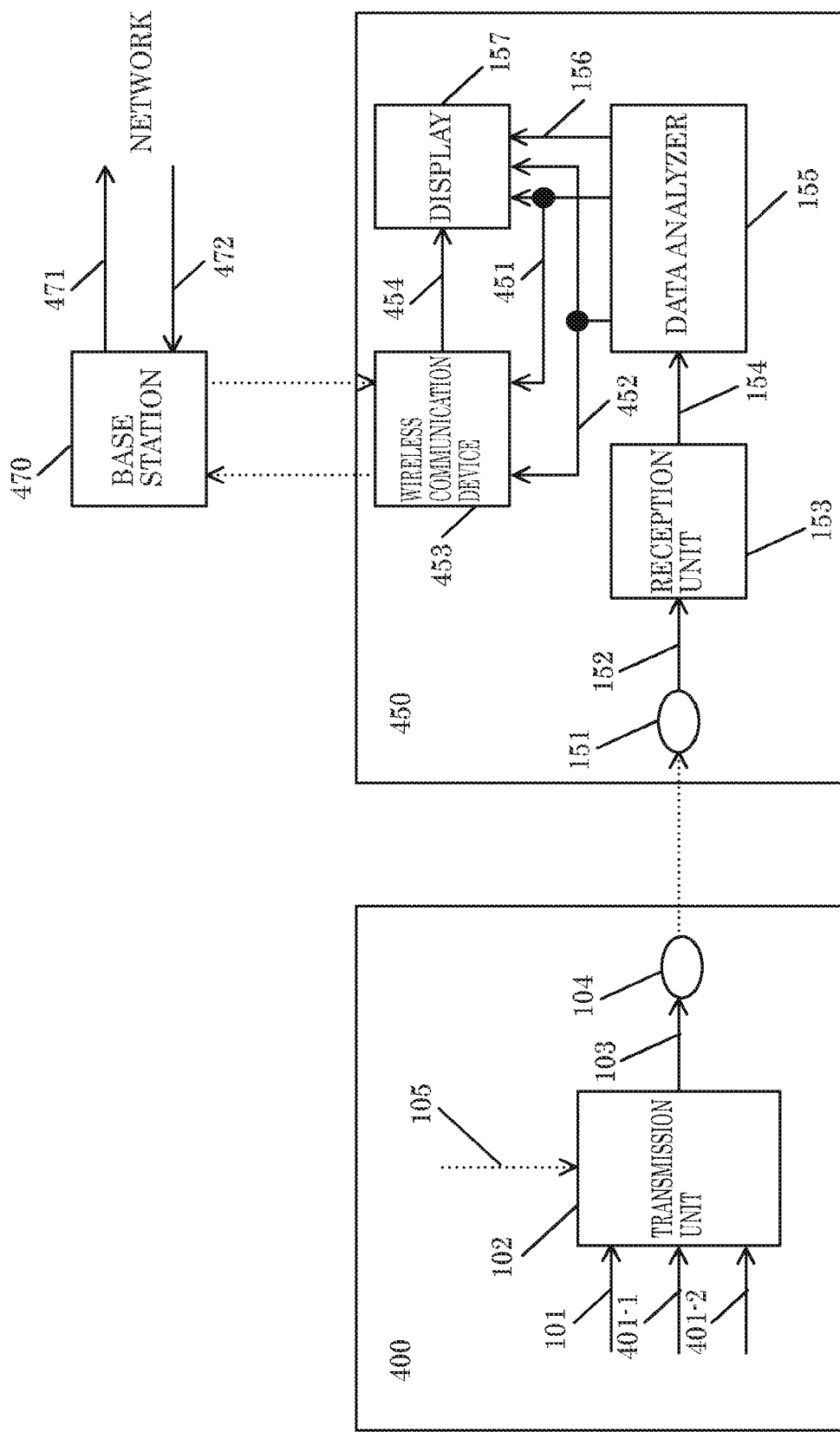
FIG. 9 illustrates a configuration example of a communication system according to Embodiment 3.

FIG. 9 illustrates one example of a configuration of device 400, terminal 450, and base station 470 (or access point (AP)) that communicates with terminal 450 according to this embodiment.

Device 400 includes, for example, an LED visible light source, lamp, light source, and/or light. Note that hereinafter, device 400 is also referred to as "first device".

Note that in first device 400 illustrated in FIG. 9, configurations that operate the same as first device 100 illustrated in FIG. 6 share like reference signs. Moreover, in terminal 450 illustrated in FIG. 9, configurations that operate the same as terminal 150 illustrated in FIG. 6 share like reference signs.

In first device 400 in FIG. 9, transmission unit 102 receives inputs of, for example, information 101 related to a location or position, information 401-1 related to the service set identifier (SSID) of base station 470, and information 401-2 related to an access destination. Moreover, transmission unit 102 may receive an input of information 105 related to time.

Transmission unit 102 receives inputs of information 101 related to a location or position, information 401-1 related to an SSID, and information 401-2 related to an access destination, and/or information 105 related to time, generates modulated signal (for optical communication) 103 based on the input signal(s), and outputs modulated signal 103. Modulated signal 103 is then transmitted from light source 104, for example.

Note that since an example of information 101 related to a location or position has already been given in Embodiment 1, repeated description will be omitted.

Next, information 401-1 related to an SSID and information 401-2 related to an access destination will be described.

First, information 401-1 related to an SSID will be described.

Information 401-1 related to an SSID is information indicating the SSID of base station 470) illustrated in FIG. 9. When processing is performed for determining whether or not the SSID notified via the optical signal is the SSID of a secure base station, first device 400 can provide access to base station 470, which is a secure access destination for terminal 450. With this, terminal 450 illustrated in FIG. 9 can securely obtain accurate position information from base station 470.

On the other hand, first device 400 can restrict the terminals that access base station 470 to terminals in a space in which it is possible to receive optical signals transmitted (emitted) by first device 400.

Note that when terminal 450 receives an optical signal transmitted via a predetermined scheme, it may be determined that the notified SSID is the SSID of a secure base station. Moreover, terminal 450 may also perform processing for determining whether the notified SSID is secure or not. For example, first device 400 may transmit a predetermined identifier in an optical signal, and terminal 450 may determine whether the notified SSID is the SSID of a secure base station or not based on the received identifier. Moreover, the processing for determining whether the base station is secure or not may be omitted by terminal 450, and instead, the user may select a first device 400 that is highly secure utilizing the characteristics of the visible light, and the SSID of the highly secure base station may be obtained by terminal 450 receiving the optical signal from first device 400.

Note that although the only base station that is illustrated in FIG. 9 is base station 470, even when one or more base stations (or APs) other than base station 470 are also present, terminal 450 can access base station 470 using the SSID obtained from first device 400 and obtain information.

Next, information 401-2 related to an access destination will be described.

Information 401-2 related to an access destination is information related to an access destination for obtaining information after terminal 450 accesses base station 470. Note that an example of operations according to this embodiment will be described in greater detail later.

This concludes the description of information 401-1 related to an SSID and information 401-2 related to an access destination.

Terminal 450 receives modulated signal 103 transmitted from first device 400.

Light receiver 151 is, for example, an image sensor such as a CMOS or organic CMOS image sensor. Light receiver 151 receives light including the modulated signal transmitted from first device 400, and outputs reception signal 152.

Reception unit 153 receives an input of reception signal 152 received via light receiver 151, performs processing such as demodulation and error correction decoding on the modulated signal included in reception signal 152, and outputs reception data 154.

Data analyzer 155 receives an input of reception data 154, and estimates, for example, the location or position of terminal 450 based on reception data 154. Data analyzer 155 then outputs information 156 including the location or position information of at least terminal 450, information 451 related to an SSID, and information 452 related to an access destination.

Display 157 receives inputs of information 156 including the location or position information of terminal 450, information 451 related to an SSID, and information 452 related to an access destination, and, for example, displays the location and/or position of terminal 450, the SSID of the communication partner to be accessed by wireless communication device 453 included in terminal 450, and/or the access destination (hereinafter, this display will be referred to as the "first display").

For example, after the first display, wireless communication device 453 receives inputs of information 451 related to an SSID and information 452 related to an access destination. Wireless communication device 453 then connects to a partner to communicate with based on the information 451 related to an SSID, by using, for example, radio waves. Note that in the example illustrated in FIG. 9, wireless communication device 453 connects to base station 470.

Then, based on information 452 related to an access destination, wireless communication device 453 generates modulated signal from data including the information related to the access destination, and transmits the generated modulated signal to base station 470 by sing, for example, radio waves.

Base station 470, which is the communication partner of terminal 450 in FIG. 9, receives the modulated signal transmitted by wireless communication device 453 included in terminal 450.

Base station 470 then performs processing such as demodulation and error correction decoding on the received modulated signal, and outputs reception data 471 including information on the access destination transmitted from terminal 450. Based on this information on the access destination, base station 470 accesses a desired access destination over a network and, for example, obtains desired information 472 from the access destination. Base station 470 then receives an input of desired information 472, generates a modulated signal based on desired information 472, and transmits, to terminal 450 (wireless communication device 453), the generated modulated signal using, for example, radio waves.

Wireless communication device 453 in terminal 450 receives the modulated signal transmitted from base station 470, performs processing such as demodulation and error correction decoding, and obtains desired information 472.

For example, assume the desired information 472 is information related to a section, a seat, a store, a facility, etc., on/at, for example, a map, a map or floor guide for a building, a map or floor guide for a facility, a map or floor guide for a parking lot, a concert facility, a stadium, an airplane, an airport lounge, a railway, a station, etc.

Display 157 receives inputs of information 454 including desired information 472, information 156 including the location or position information of at least terminal 450, and information 451 related to an SSID, and after first display, based on desired information 472 and information 156 including the location or position information of at least terminal 450, displays the position of terminal 450 mapped on information on a map, floor guide, or facility, information on seating information, information on stores.

Figure 10:
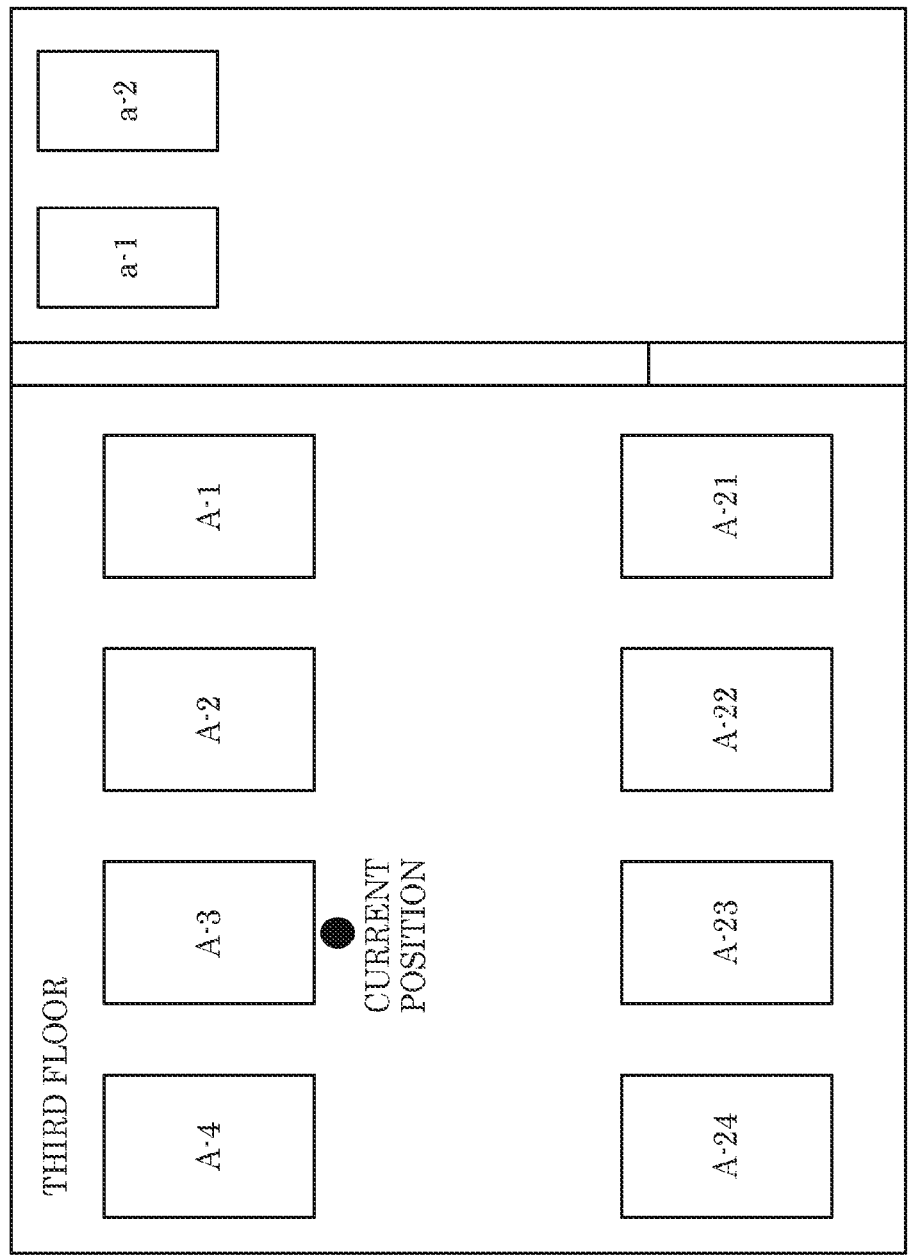
FIG. 10 illustrates a display example displayed by a display according to Embodiment 3.

FIG. 10 is an example of a detailed display by display 157.

The display in FIG. 10 indicates that this is the third floor of a building. Each of A-1, A-2, A-3, A-4, A-21, A-22, A-23, and A-24 indicates a position of a parking space for an automobile. a-1 and a-2 indicate positions of elevators. The information on this map including the positions of the parking spaces and the elevators is one example of desired information 454 (472).

As illustrated in FIG. 10, display 157 displays the current position of terminal 450 mapped on the map. Note that the current position is information obtained from information 156 including the location or position information of at least terminal 450.

Figure 11:
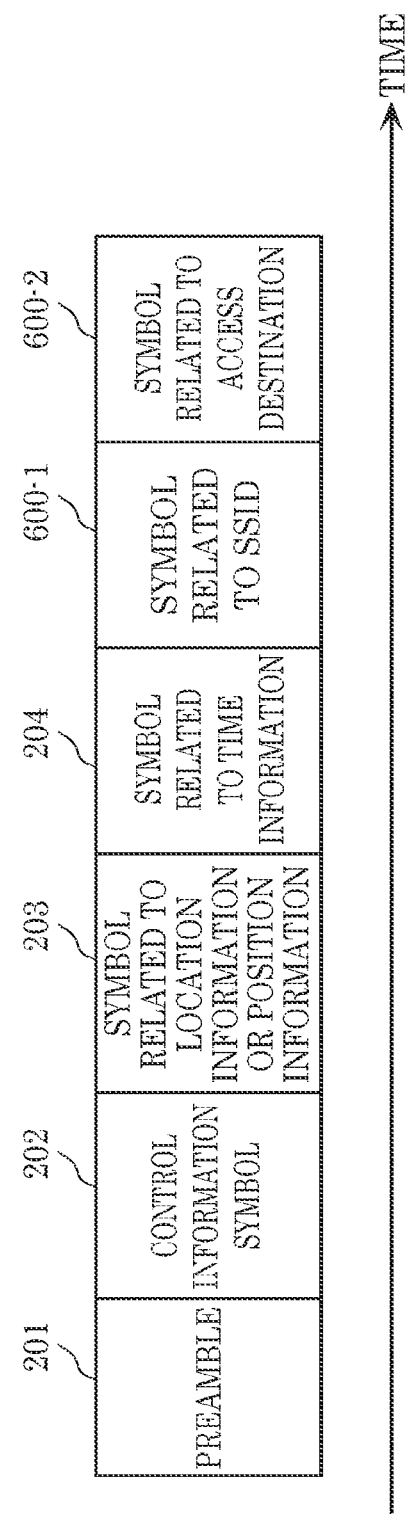
FIG. 11 illustrates a frame configuration example of a modulated signal transmitted by a first device according to Embodiment 3.

FIG. 11 illustrates one example of a frame configuration of a modulated signal transmitted by first device 400 illustrated in FIG. 9. In FIG. 11, time is represented on the horizontal axis. Moreover, in FIG. 11, symbols that transmit the same information as in FIG. 7 share like reference signs, and repeated description thereof is omitted.

First device 400 transmits symbol 600-1 related to an SSID and symbol 600-2 related to an access destination, in addition to preamble 201, control information symbol 202, symbol 203 related to location information or position information, and symbol 204 related to time information.

Symbol 600-1 related to an SSID is a symbol for transmitting information 401-1 related to an SSID in FIG. 9, and symbol 600-2 related to an access destination is a symbol for transmitting information 401-2 related to an access destination in FIG. 9. Note that the frame in FIG. 11 may include symbols other than those shown in FIG. 11. Moreover, the configuration of the frame, including the order in which the symbols are transmitted, is not limited to the configuration illustrated in FIG. 11.

Figure 12:
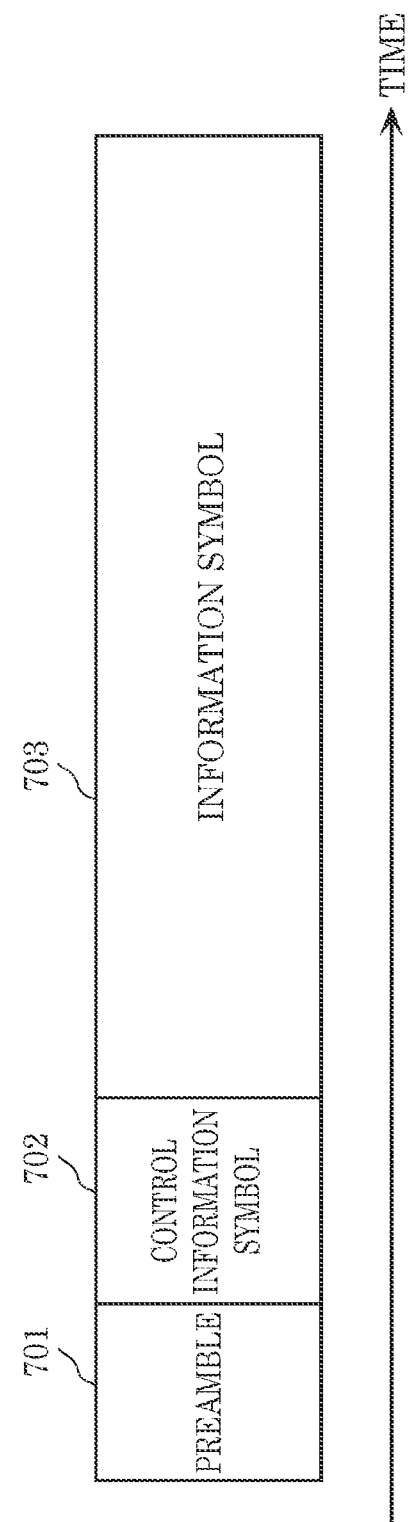
FIG. 12 illustrates a frame configuration example of a modulated signal transmitted by a base station according to Embodiment 3.

FIG. 12 illustrates one example of a frame configuration of a modulated signal transmitted by base station 470 illustrated in FIG. 9. In FIG. 12, time is represented on the horizontal axis.

As illustrated in FIG. 12, base station 470 transmits, for example, preamble 701, and thereafter transmits control information symbol 702 and information symbol 703.

Preamble 701 is a symbol for terminal 450 that receives the modulated signal transmitted by base station 470 to perform, for example, signal detection, time synchronization, frame synchronization, frequency synchronization, and/or frequency offset estimation, etc.

Control information symbol 702 is, for example, a symbol including, for example, information related to the error correction encoding method and/or modulation scheme used in the generation of the modulated signal, and information related to the frame configuration. Based on information on control information symbol 702, wireless communication device 453 in terminal 450 implements, for example, demodulation of the modulated signal.

Information symbol 703 is a symbol for transmitting information. Note that in this embodiment, information symbol 703 is a symbol for transmitting the above-described desired information 472.

Note that base station 470 in FIG. 9 may transmit a frame including symbols other than those shown in FIG. 12. For example, base station 470 may transmit a frame including a pilot symbol (reference symbol) between information symbols 703. Moreover, the configuration of the frame, including the order in which the symbols are transmitted, is not limited to the configuration illustrated in FIG. 12. Moreover, in FIG. 12, a plurality of symbols may be arranged along the frequency axis. In other words, in FIG. 12, symbols may be present on a plurality of frequencies (a plurality of carriers).

Moreover, for example, a modulated signal that has the frame configuration illustrated in FIG. 11 and is transmitted by first device 400 at a regular timing, e.g., repeatedly transmitted is conceivable. With this, a plurality of terminals 450 can implement the above-described operations.

Figure 13:
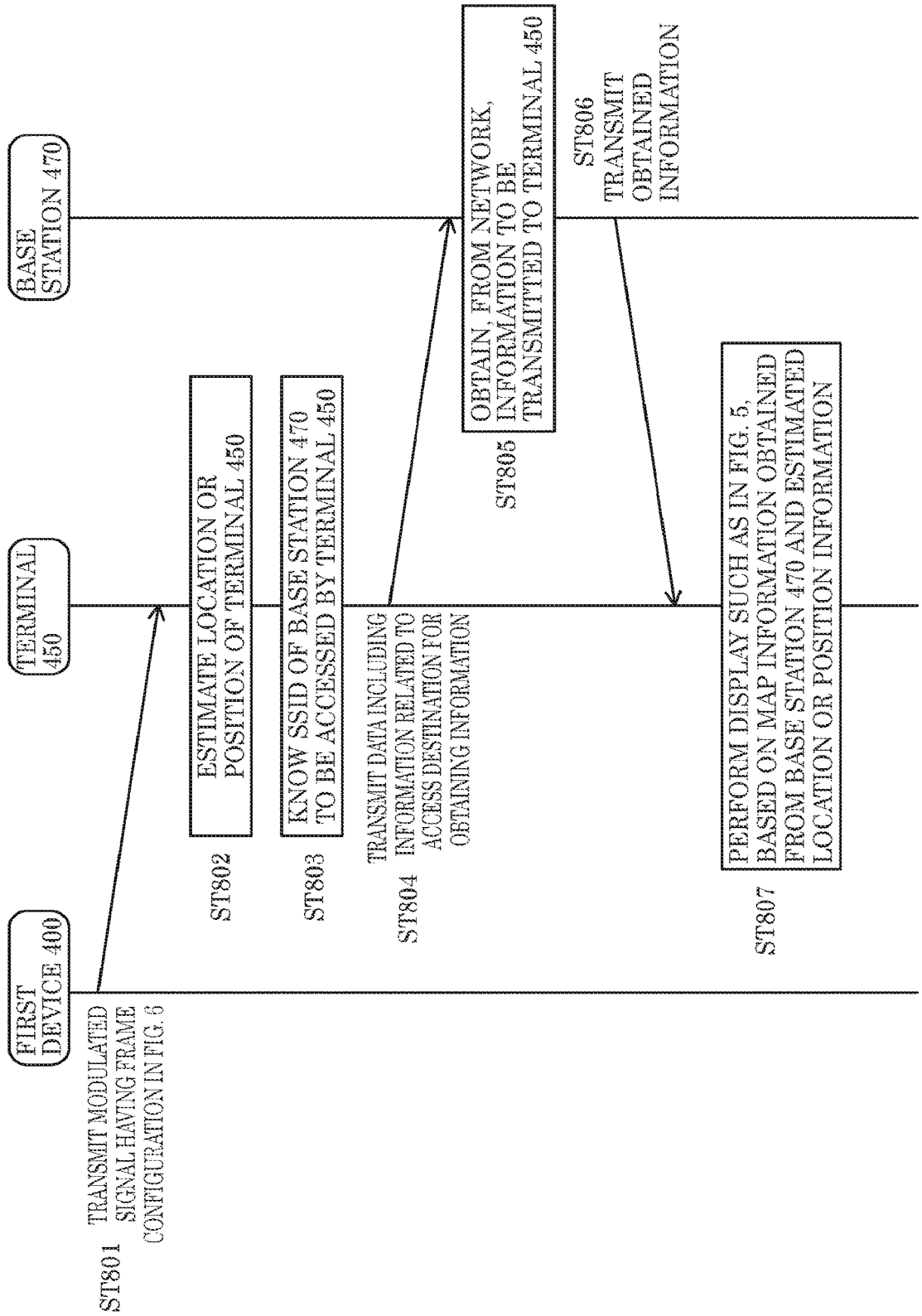
FIG. 13 is a flow chart illustrating an example of processes performed in the communication system according to Embodiment 3.

FIG. 13 is a flow chart illustrating one example of processes implemented by first device 400, terminal 450, and base station 470 illustrated in FIG. 9 and described above.

First, first device 400 transmits a modulated signal having the frame configuration illustrated in FIG. 11 (ST801).

Terminal 450 receives the modulated signal transmitted by first device 400 and estimates the location or position of terminal 450 (ST802).

Terminal 450 also knows the SS ID of base station 470 to be accessed by terminal 450 by receiving the modulated signal transmitted by first device 400 (ST803).

Terminal 450 transmits, to base station 470, a modulated signal including data including information 452 related to an access destination for obtaining information such as map information, using radio waves (ST804).

Base station 470 receives the modulated signal transmitted by terminal 450, obtains information on an access destination, accesses a desired access destination via a network, and obtains desired information such as map information (information to be transmitted to terminal 450) (ST805).

Base station 470 then transmits, to terminal 450, a modulated signal including the obtained desired information such as the map information, by using radio waves (ST806).

Terminal 450 receives the modulated signal transmitted by base station 470 and obtains information such as map information. Terminal 450 displays a display like that in FIG. 10, based on the information such as map information and the information on the location or position of terminal 450 that is previously obtained.

Next, an example of operations performed when a plurality of first devices 400 and base station 470 are provided in the location illustrated in FIG. 10.

Figure 14:
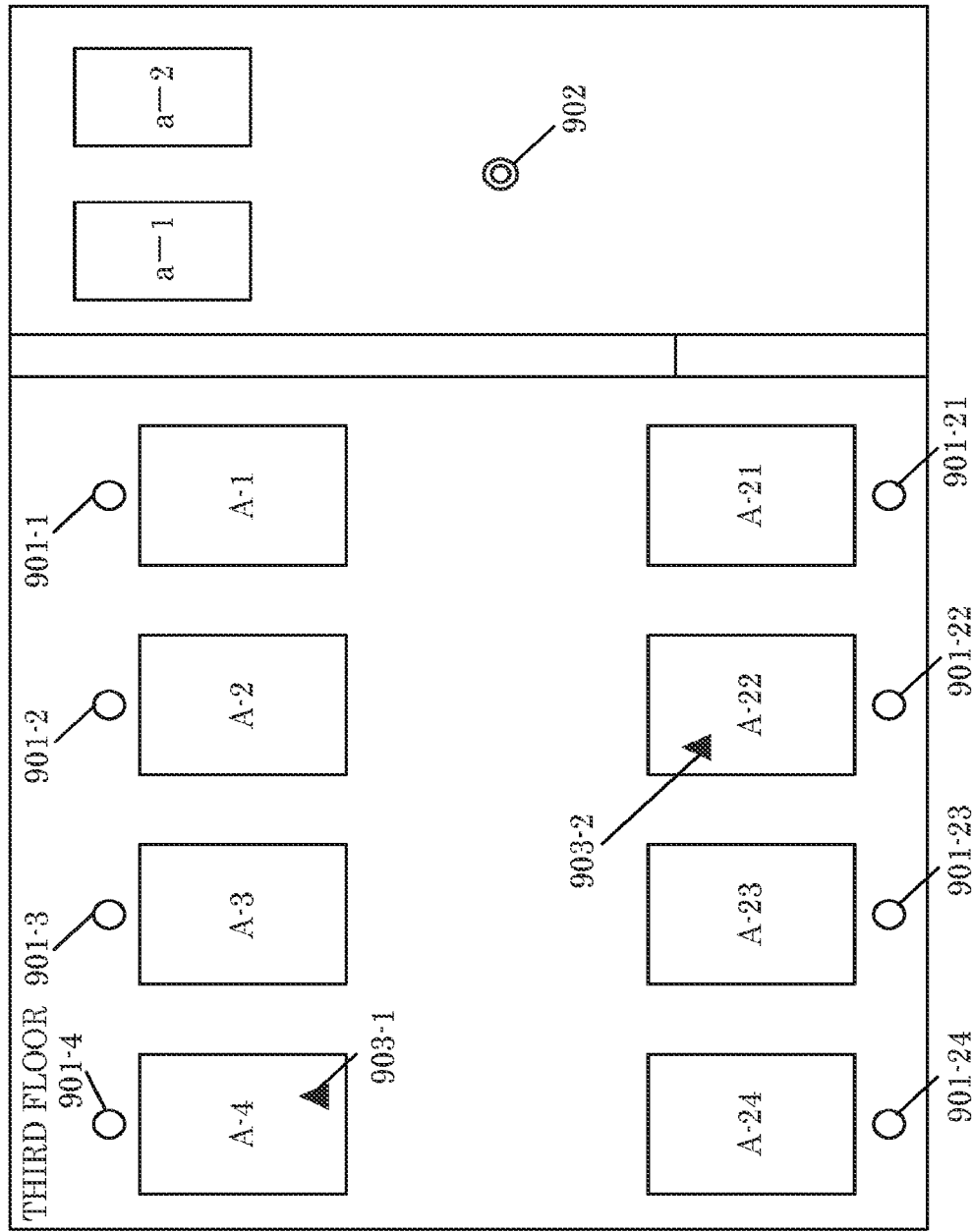
FIG. 14 illustrates a display example displayed by the display according to Embodiment 3.

FIG. 14 is a map of the same location illustrated in FIG. 10. In other words, FIG. 14 is a map of the third floor described with reference to FIG. 10. In FIG. 14, each of A-1, A-2, A-3, A-4, A-21, A-22, A-23, and A-24 indicates a parking space for an automobile, and each of a-1 and a-2 indicates an elevator.

The position of circle 901-1 in FIG. 14 indicates the location of a first device having the same configuration as first device 400 illustrated in FIG. 9. Hereinafter, the first device that has the same configuration as first device 400 and is at the position of 901-1 is referred to as "first device #1 400". First device #1 400 has, as information related to a location or information related to a position, information indicating "A-1", and transmits this information indicating "A-1".

The position of circle 901-2 in. FIG. 14 indicates the location of a first device having the same configuration as first device 400 illustrated in FIG. 9. Hereinafter, the first device that has the same configuration as first device 400 and is at the position of 901-2 is referred to as "first device #2 400". First device #2 400 has, as information related to a location or information related to a position, information indicating "A-2", and transmits this information indicating "A-2".

The position of circle 901-3 in FIG. 14 indicates the location of a first device having the same configuration as first device 400 illustrated in FIG. 9. Hereinafter, the first device that has the same configuration as first device 400 and is at the position of 901-3 is referred to as "first device #3 400". First device #3 400 has, as information related to a location or information related to a position, information indicating "A-3", and transmits this information indicating "A-3".

The position of circle 901-4 in FIG. 14 indicates the location of a first device having the same configuration as first device 400 illustrated in FIG. 9. Hereinafter, the first device that has the same configuration as first device 400 and is at the position of 901-4 is referred to as "first device #4 400". First device #4 400 has, as information related to a location or information related to a position, information indicating "A-4", and transmits this information indicating "A-4".

The position of circle 901-21 in FIG. 14 indicates the location of a first device having the same configuration as first device 400 illustrated in FIG. 9. Hereinafter, the first device that has the same configuration as first device 400 and is at the position of 901-21 is referred to as "first device #21 400". First device #21 400 has, as information related to a location or information related to a position, information indicating "A-21", and transmits this information indicating "A-21".

The position of circle 901-22 in FIG. 14 indicates the location of a first device having the same configuration as first device 400 illustrated in FIG. 9. Hereinafter, the first device that has the same configuration as first device 400 and is at the position of 901-22 is referred to as "first device #22 400". First device #22 400 has, as information related to a location or information related to a position, information indicating "A-22", and transmits this information indicating "A-22".

The position of circle 901-23 in FIG. 14 indicates the location of a first device having the same configuration as first device 400 illustrated in FIG. 9. Hereinafter, the first device that has the same configuration as first device 400 and is at the position of 901-23 is referred to as "first device #23 400". First device #23 400 has, as information related to a location or information related to a position, information indicating "A-23", and transmits this information indicating "A-23".

The position of circle 901-24 in FIG. 14 indicates the location of a first device having the same configuration as first device 400 illustrated in FIG. 9, Hereinafter, the first device that has the same configuration as first device 400 and is at the position of 901-24 is referred to as "first device #24 400". First device #24 400 has, as information related to a location or information related to a position, information indicating "A-24", and transmits this information indicating "A-24".

The position of double circle 902 in FIG. 14 indicates the location of a base station (or AP) having the same configuration as base station 470 illustrated in FIG. 9. Hereinafter, the base station (or AP) having the same configuration as base station 470 in FIG. 9 will be referred to simply as "base station 470". Moreover, here, the SSID of base station 470 at position 902 is "abcdef".

When terminal 450 present in the vicinity of the position indicated on the map in FIG. 14 can wirelessly communicate, terminal 450 may access base station 470 at the position of 902 in FIG. 14.

Accordingly, first device #1 400 at 901-1 in FIG. 14 transmits "abcdef" as information related to an SSID (refer to 401-1 in FIG. 9).

Similarly, first device #2 400 at 901-2 in FIG. 14 transmits "abcdef" as information related to an SSID (refer to 401-1 in FIG. 9).

First device #3 400 at 901-3 in FIG. 14 transmits "abcdef" as information related to an SSID (refer to 401-1 in FIG. 9).

First device #4 400 at 901-4 in FIG. 14 transmits "abcdef" as information related to an SSID (refer to 401-1 in FIG. 9).

First device #21 400 at 901-21 in FIG. 14 transmits "abcdef" as information related to an SSID (refer to 401-1 in FIG. 9).

First device #22 400 at 901-22 in FIG. 14 transmits "abcdef" as information related to an SSID (refer to 401-1 in FIG. 9).

First device #23 400 at 901-23 in FIG. 14 transmits "abcdef" as information related to an SSID (refer to 401-1 in FIG. 9).

First device #24 400 at 901-24 in FIG. 14 transmits "abcdef" as information related to an SSID (refer to 401-1 in FIG. 9).

Hereinafter, an example of specific operations will be given.

Assume a terminal having the same configuration as terminal 450 in FIG. 9 is positioned at 903-1 in FIG. 14 (hereinafter, this terminal will be referred to simply as terminal 450). In such cases, terminal 450 receives the modulated signal transmitted by first device #4 400 at the position of 901-4 in FIG. 14, and obtains position information indicating "A-4". Moreover, terminal 450 receives the modulated signal transmitted by first device #4 400 at the position of 901-4 in FIG. 14, and obtains SSID information indicating "abcdef". With this, terminal 450 accesses base station 470 positioned at 902 in FIG. 14. Moreover, terminal 450 obtains, from base station 470 positioned at 902 in FIG. 14, information such as map information. Terminal 450 then displays map information and position information (for example, see FIG. 10; FIG. 10 is merely one non-limiting example).

Similarly, assume a terminal having the same configuration as terminal 450 in FIG. 9 is positioned at 903-2 in FIG. 14 (hereinafter, this terminal will be referred to simply as terminal 450). In such cases, terminal 450 receives the modulated signal transmitted by first device #22 400 at the position of 901-22 in FIG. 14, and obtains position information indicating "A-22". Moreover, terminal 450 receives the modulated signal transmitted by first device #4 400 at the position of 901-22 in FIG. 14, and obtains SSID information indicating "abcdef". With this, terminal 450 accesses base station 470 positioned at 902 in FIG. 14. Moreover, terminal 450 obtains, from base station 470 positioned at 902 in FIG. 14, information such as map information. Terminal 450 then displays map information and position information (for example, see FIG. 10; FIG. 10 is merely one non-limiting example).

Note that terminal 450 may record the map (surrounding area information) and the position information like that in FIG. 14 in a storage (not illustrated in the drawings) included in terminal 450, and may read the information stored in the storage when required by the user of terminal 450. This makes it possible to use the map (surrounding area information) and the position information in a manner that is convenient to the user.

In this way, since first device 400 transmits the modulated signal via visible light, terminal 450 capable of receiving the modulated signal is limited to being located within a region capable of receiving the optical signal from the position of first device 400. Accordingly, by terminal 450 obtaining the location or position information transmitted by first device 400, terminal 450 can easily (i.e., without having to perform complicated signal processing) obtain accurate position information.

Moreover, when first device 400 is disposed in a location where reception of satellite radio waves from a GPS satellite is difficult, it is possible for terminal 450 to securely obtain accurate position information even in locations in which reception of radio waves from a GPS satellite is difficult, by terminal 450 receiving the modulated signal transmitted by first device 400.

Furthermore, based on the information on the SSID transmitted from first device 400, terminal 450 can securely obtain information by connecting to base station (or AP) 470 and obtaining information. This is because, when information from a visible light modulated signal is obtained by terminal 450, since it is visible light, the user can easily visually recognize first device 400 transmitting the modulated signal, making it possible for the user to easily determine whether the source of information is secure or not. Conversely, for example, when the SSID is obtained from a modulated signal transmitted over radio waves via a wireless LAN, it is difficult for the user to determine which device transmitted the radio waves. Accordingly, from the viewpoint of ensuring information security, obtaining the SSID via visible light communication is more suitable than wireless LAN communication.

Note that wireless communication device 453 in terminal 450 illustrated in FIG. 9 may further receive inputs of a plurality of signals. For example, wireless communication device 453 may receive an input of a control signal for controlling wireless communication device 453, and may receive an input of information, etc., transmitted to base station 470. Here, one conceivable example is that wireless communication device 453 begins performing communication based on the control signal. As described above, in this embodiment, the configuration of the first device is not limited to the configuration of first device 400 in FIG. 9, the configuration of the terminal is not limited to the configuration of terminal 450 in FIG. 9, and the connection destination and configuration of the base station are not limited to the connection destination and configuration of base station 470 in FIG. 9.

Moreover, in the example in FIG. 9, a single base station 470 is present, but a plurality of (secure) base stations (or APs) that terminal 450 can access may be present. In such cases, the symbol related to an SSID that is transmitted by first device 400 in FIG. 9 may include information indicating the SSID of each of the plurality of base stations (or APs). In such cases, as the display of the access destination (the "first display" described above), display 157 in terminal 450 illustrated in FIG. 9 displays a list of the SSIDs of the plurality of base stations and/or a list of the plurality of access destinations. Then, based on the information on the SSIDs of the plurality of base stations (or APs), terminal 450 in FIG. 9 may select one or more base stations to actually wirelessly connect to (in other words, may concurrently connect to a plurality of base stations).

For example, assume there are three base stations 470. Here, the three base stations 470 shall be referred as base station #A, base station #B, and base station #C. Moreover, assume the SSID of base station #A is "abcdef", the SSID of base station #B is "ghijk", and the SSID of base station #C is "pqrstu". In such cases, symbol 600-1 related to an SSID in the frame configuration illustrated in FIG. 11 of the modulated signal transmitted by first device 400 includes information indicating that the SSID of base station #A is "abcdef", the SSID of base station #B is "ghijk", and the SSID of base station #C is "pqrstu". Then, terminal 450 in FIG. 9 receives symbol 600-1 related to an SSID, and based on the information indicating that the SSID of base station #A is "abcdef", the SSID of base station #B is "ghijk", and the SSID of base station #C is "pqrstu", selects one or more base stations 470 to actually wirelessly connect to.

Embodiment 4

Figure 15:
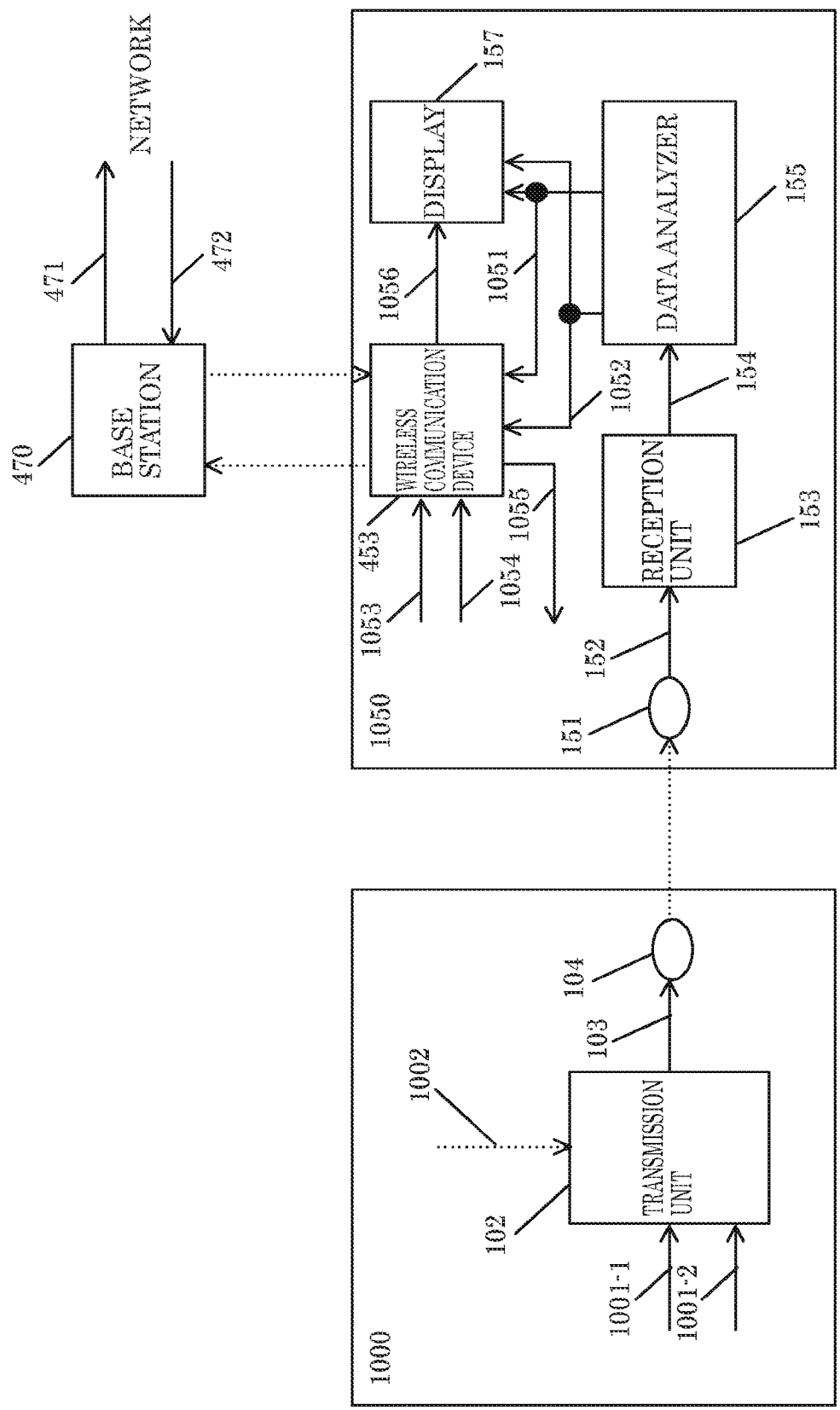
FIG. 15 illustrates a configuration example of a communication system according to Embodiment 4.

FIG. 15 illustrates one example of a configuration of a communication system according to this embodiment.

The communication system Illustrated in FIG. 15 includes, for example, device 1000, terminal 1050, and base station (or AP) 470 that communicates with terminal 1050.

Device 1000 includes, for example, an LED visible light source, lamp, light source, and/or light (hereinafter referred to as "light source 104"). Note that hereinafter, device 1000 is also referred to as "second device" in this embodiment.

Note that in second device 1000 illustrated in FIG. 15, configurations that operate the same as first device 100 illustrated in FIG. 6 share like reference signs. Moreover, in terminal 1050 illustrated in FIG. 15, configurations that operate the same as terminal 150 illustrated in FIG. 6 share like reference signs. Moreover, communication between wireless communication device 453 in terminal 1050 and base station 470 illustrated in FIG. 15 uses, for example, radio waves.

In second device 1000 illustrated in FIG. 15, transmission unit 102 receives inputs of information 1001-1 related to an SSID, information 1001-2 related to an encryption key, and data 1002, generates modulated signal (for optical communication) 103 based on the input signal(s), and outputs modulated signal 103. Modulated signal 103 is then transmitted from light source 104, for example.

Next, information 1001-1 related to an SSID and information 1001-2 related to an encryption key will be described.

First, information 1001-1 related to an SSID will be described.

Information 1001-1 related to an SSID is information indicating the SSID of base station 470 illustrated in FIG. 15. Note that in one example, base station 470 transmits a modulated signal to terminal 1050 over radio waves, and receives the modulated signal from terminal 1050 over radio waves. In other words, second device 1000 can provide access to base station 470, which is a secure access destination for terminal 1050. With this, terminal 1050 illustrated in FIG. 15 can securely obtain information from base station 470.

On the other hand, second device 1000 can restrict the terminals that access base station 470 to terminals in a space in which it is possible to receive optical signals transmitted (emitted) by second device 1000.

Note that when terminal 1050 receives an optical signal transmitted via a predetermined scheme, it may be determined that the notified SSID is the SSID of a secure base station. Moreover, terminal 1050 may also perform processing for determining whether the notified SSID is secure or not. For example, second device 1000 may transmit a predetermined identifier in an optical signal, and terminal 1050 may determine whether the notified SSID is the SSID of a secure base station or not based on the received identifier.

Note that although the only base station that is illustrated in FIG. 15 is base station 470, even when, for example, a base station (or AP) other than base station 470 is also present, terminal 1050 can access base station 470 using the SSID obtained from second device 1000 and obtain information.

Next, information 1001-2 related to an encryption key will be described.

Information 1001-2 related to an encryption key is information related to an encryption key that is necessary in order for terminal 1050 to communicate with base station 470. By obtaining information 1001-2 related to an encryption key from second device 1000, terminal 1050 can perform encrypted communication with base station 470.

This concludes the description of information 1001-1 related to an SSID and information 1001-2 related to an encryption key.

Terminal 1050 in FIG. 15 receives a modulated signal transmitted by second device 1000. Note that in terminal 1050 illustrated in FIG. 15, configurations that operate the same as terminal 150 in FIG. 6 and terminal 450 in FIG. 9 share like reference signs.

Light receiver 151 included in terminal 1050 is, for example, an image sensor such as a CMOS or organic CMOS image sensor. Light receiver 151 receives light including the modulated signal transmitted from second device 1000, and outputs reception signal 152.

Reception unit 153 receives an input of reception signal 152 received via light receiver 151, performs processing such as demodulation and error correction decoding on the modulated signal included in reception signal 152, and outputs reception data 154.

Data analyzer 155 receives an input of reception data 154, and outputs, based on reception data 154, for example, information 1051 on the SSID of the base station to be connected to and information 1052 on the encryption key for communicating with the base station to be connected to. For example, in a wireless local area network (LAN), examples of encryption schemes include wired equivalent privacy (WEP), Wi-Fi protected access (WPA), and Wi-Fi protected access 2 (WPA2) (pre-shared key (PSK) mode, extended authentication protocol (EAP) mode). Note that the encryption method is not limited to these examples.

Display 157 receives inputs of information 1051 on the SSID and information 1052 on the encryption key, and, for example, displays (i) the SSID of the communication partner to be accessed by wireless communication device 453 included in terminal 1050 and (ii) the encryption key (hereinafter this display is referred to as the "first display" in this embodiment).

For example, after the first display, wireless communication device 453 receives inputs of information 1051 on the SSID and information 1052 on the encryption key, and establishes a connection with base station 470 (for example, assume the connection uses radio waves). Here, when base station 470 communicates with wireless communication device 453 included in terminal 1050, base station 470 also transmits the modulated signal using, for example, radio waves.

Thereafter, wireless communication device 453 receives inputs of data 1053 and control signal 1054, demodulates data 1053 in accordance with the control indicated in control signal 1054, and transmits the modulated signal over radio waves.

Then, for example, base station 470 transmits data over the network (471) and receives data from the network (472). Thereafter, for example, base station 470 transmits the modulated signal to terminal 1050 over radio waves.

Wireless communication device 453 included in terminal 1050 performs processing such as demodulation and error correction decoding on the modulated signal received over radio waves, and obtains reception data 1056. Display 157 performs display based on reception data 1056.

Figure 16:
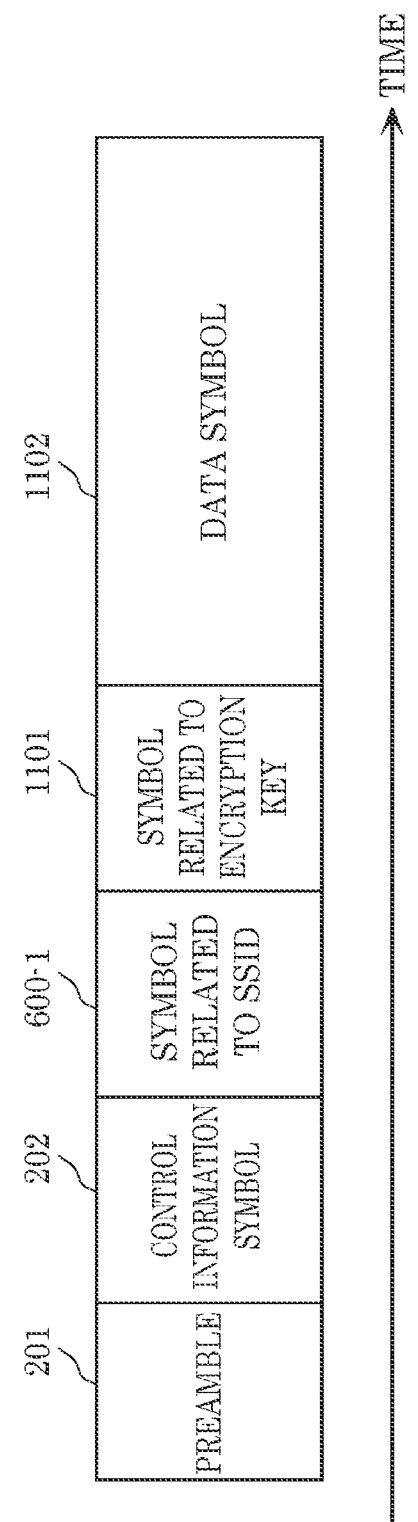
FIG. 16 illustrates a frame configuration example of a modulated signal transmitted by a first device according to Embodiment 4.

FIG. 16 illustrates one example of a frame configuration of a modulated signal transmitted by second device 1000 illustrated in FIG. 15. In FIG. 16, time is represented on the horizontal axis. Moreover, in FIG. 16, symbols that are the same as in FIG. 7 and FIG. 11 share like reference numbers, and repeated description thereof will be omitted.

Symbol 600-1 related to an SSID is a symbol for transmitting information 1001-1 related to an SSID illustrated in FIG. 15, and symbol 1101 related to the encryption key is a symbol for transmitting information 1001-2 related to an encryption key illustrated in FIG. 15. Data symbol 1102 is a symbol for transmitting data 1002 illustrated in FIG. 15.

Second device 1000 transmits preamble 201, control information symbol 202, symbol 600-1 related to an SSID, symbol 1101 related to the encryption key, and data symbol 1102. Note that second device 1000 may transmit a frame including symbols other than those shown in FIG. 16. Moreover, the configuration of the frame, including the order in which the symbols are transmitted, is not limited to the configuration illustrated in FIG. 16.

Figure 17:
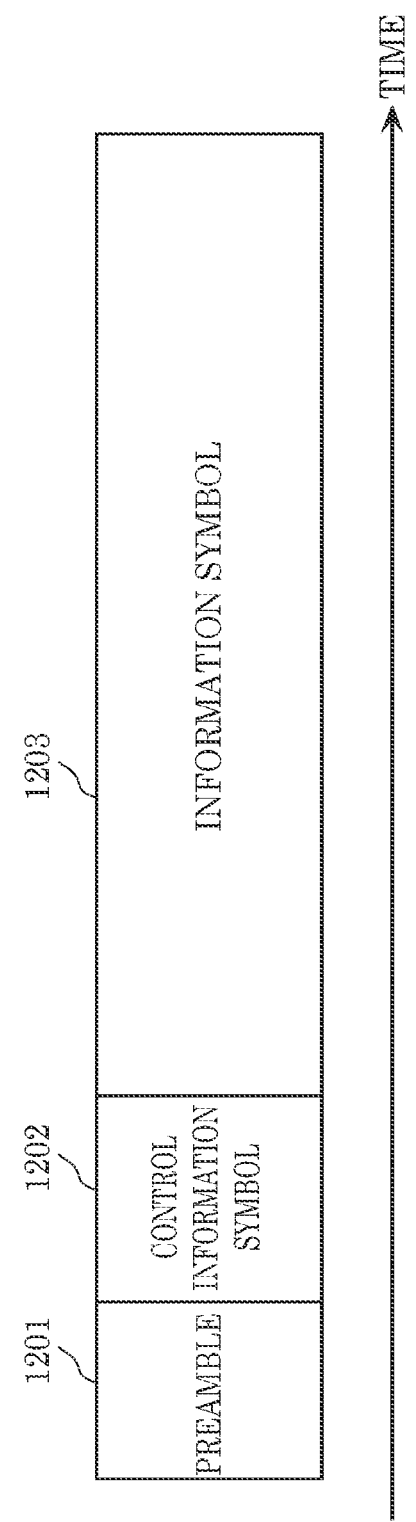
FIG. 17 illustrates a frame configuration example of a modulated signal transmitted by a wireless communication device in a terminal according to Embodiment 4.

FIG. 17 illustrates one example of a frame configuration of a modulated signal transmitted by wireless communication device 453 included in terminal 1050 illustrated in FIG. 15. In FIG. 17, time is represented on the horizontal axis.

As illustrated in FIG. 17, wireless communication device 453 included in terminal 1050 transmits, for example, preamble 1201, and thereafter transmits control information symbol 1202 and information symbol 1203.

Preamble 1201 is a symbol for base station 470 that receives the modulated signal transmitted by wireless communication device 453 in terminal 1050 to perform, for example, signal detection, time synchronization, frame synchronization, frequency synchronization, and/or frequency offset estimation, etc.

Control information symbol 1202 is, for example, a symbol including, for example, information related to the error correction encoding method and/or modulation scheme used in the generation of the modulated signal, information related to the frame configuration, and information related to transmission method. Based on information on control information symbol 1202, base station 470 implements, for example, demodulation of the modulated signal.

Information symbol 1203 is a symbol for wireless communication device 453 in terminal 1050 to transmit data.

Note that wireless communication device 453 in terminal 1050 may transmit a frame including symbols other than those shown in FIG. 17. For example, wireless communication device 453 may transmit a frame including a pilot symbol (reference symbol) between information symbols 1203. Moreover, the configuration of the frame, including the order in which the symbols are transmitted, is not limited to the configuration illustrated in FIG. 17. Moreover, in FIG. 17, a plurality of symbols may be arranged along the frequency axis. In other words, in FIG. 17, symbols may be present on a plurality of frequencies (a plurality of carriers). Moreover, in Embodiment 3, when wireless communication device 453 included in terminal 450 illustrated in FIG. 9 transmits a modulated signal, the frame configuration illustrated in FIG. 17 may be used.

The frame configuration the modulated signal transmitted by base station 470 in this embodiment is the same as the frame configuration illustrated in FIG. 12 and described in Embodiment 3. In other words, as illustrated in FIG. 12, base station 470 transmits, for example, preamble 701, and thereafter transmits control information symbol 702 and information symbol 703.

Preamble 701 is a symbol for wireless communication device 453 in terminal 1050 that receives the modulated signal transmitted by base station 470 to perform, for example, signal detection, time synchronization, frame synchronization, frequency synchronization, and/or frequency offset estimation, etc.

Control information symbol 702 is, for example, a symbol including, for example, information related to the error correction encoding method and/or modulation scheme used in the generation of the modulated signal, information related to the frame configuration, and information related to transmission method. Based on information on control information symbol 702, wireless communication device 453 in terminal 1050 implements, for example, demodulation of the modulated signal.

Information symbol 703 is a symbol for base station 470 to transmit information.

Note that base station 470 in FIG. 15 may transmit a frame including symbols other than those shown in FIG. 12. For example, base station 470 may transmit a frame including a pilot symbol (reference symbol) between information symbols 703. Moreover, the configuration of the frame, including the order in which the symbols are transmitted, is not limited to the configuration illustrated in FIG. 12. Moreover, in FIG. 12, a plurality of symbols may be arranged along the frequency axis. In other words, in FIG. 12, symbols may be present on a plurality of frequencies (a plurality of carriers).

Moreover, for example, a modulated signal that has the frame configuration illustrated in FIG. 16 and is transmitted by second device 1000 at a regular timing, e.g., repeatedly transmitted is conceivable. With this, a plurality of terminals 1050 can implement the above-described operations.

Figure 18:
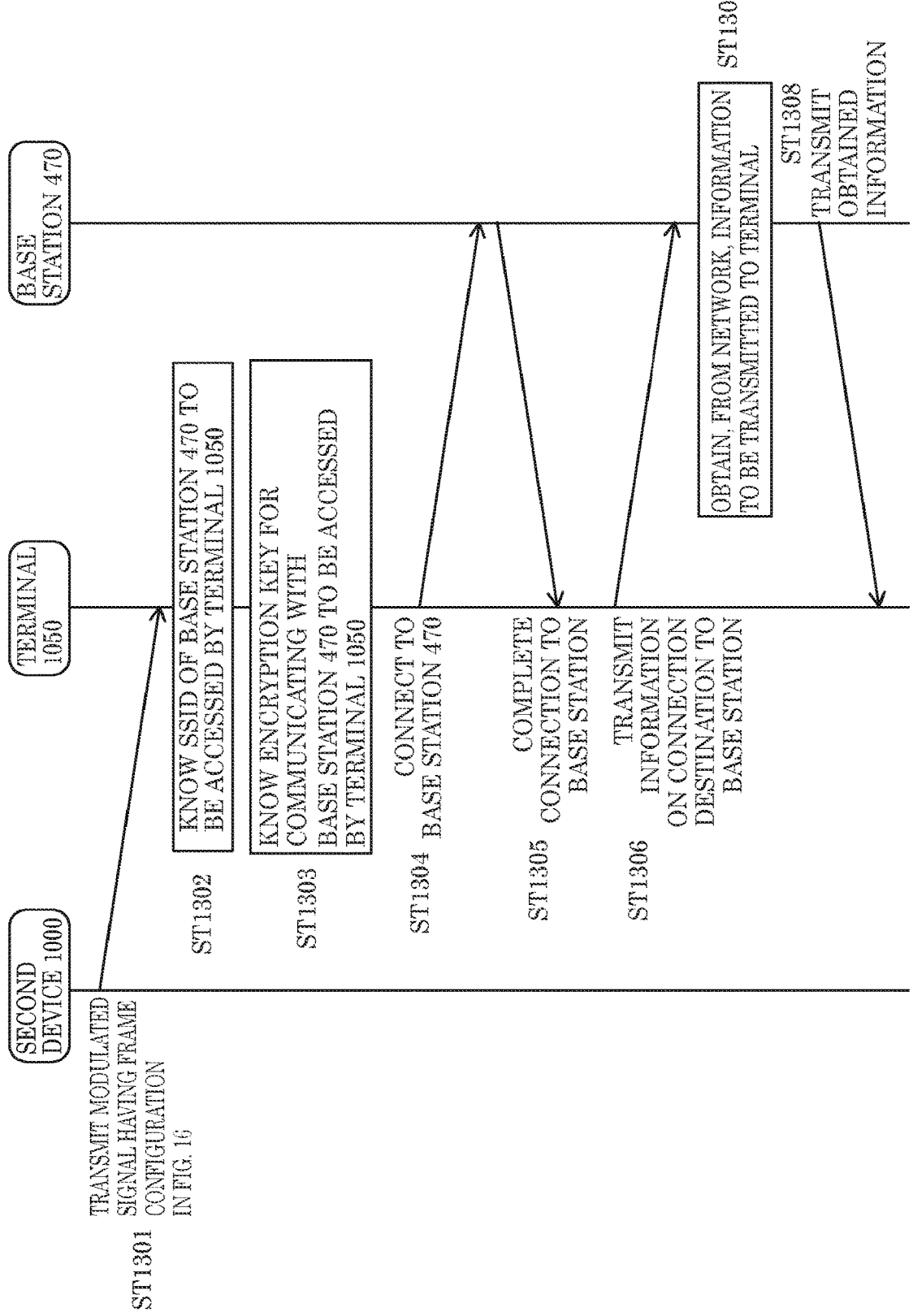
FIG. 18 is a flow chart illustrating an example of processes performed in the communication system according to Embodiment 4.

FIG. 18 is a flow chart illustrating one example of processes implemented by second device 1000, terminal 1050, and base station 470 illustrated in FIG. 15.

First, second device 1000 transmits a modulated signal having the frame configuration illustrated in FIG. 16 (ST1301).

Terminal 1050 obtains the SSID of base station 470 to be accessed by terminal 1050 by receiving the modulated signal transmitted by second device 1000 (ST1302).

Terminal 1050 also obtains the encryption key to be used in communication with base station 470 to be accessed by terminal 1050 (ST1303).

Terminal 1050 then connects with base station 470 over radio waves (ST1304). Terminal 1050 completes the connection with base station 470 by receiving a response from base station 470 (ST1305).

Terminal 1050 then transmits information on the connection destination to base station 470 using radio waves (ST1306).

Base station 470 obtains information for transmitting to terminal 1050 from the network (ST1307).

Base station 470 then transmits the obtained information to terminal 1050 using radio waves, and terminal 1050 obtains the information (ST1308). When necessary, terminal 1050, for example, obtains required information from the network via base station 470.

As described above, based on the information on the SSID and information on the encryption key transmitted from second device 1000, terminal 1050 connects with base station 470 and obtains information to securely obtain information from base station 470, whose security has been authenticated. This is because, when information from a visible light modulated signal is obtained by terminal 1050, since it is visible light, it possible for the user to easily determine whether the source of information is secure or not. Conversely, for example, when the SSID is obtained from a modulated signal transmitted over radio waves via a wireless LAN, it is difficult for the user to determine which device transmitted the radio waves. Accordingly, from the viewpoint of ensuring information security, obtaining the SSID via visible light communication is more suitable than wireless LAN communication.

Note that in this embodiment, a configuration in which second device 1000 transmits encryption key information has been described. However, for example, when base station 470 does not perform encrypted communication using an encryption key, second device 1000 may transmit only SSID information, without transmitting encryption key information. In such cases, the present disclosure can be implemented in the same manner simply by removing the configuration related to an encryption key from the above configurations.

Moreover, the configuration of the second device is not limited to the configuration of second device 1000 illustrated in FIG. 15, the configuration of the terminal is not limited to the configuration of terminal 1050 illustrated in FIG. 15, and the connection destination and configuration of the base station is not limited to the connection destination and configuration of base station 470 illustrated in FIG. 15.

Moreover, in the example in FIG. 15, a single base station 470 is present, but a plurality of (secure) base stations (or APs) that terminal 1050 can access may be present. Note that these plurality of base stations and terminal 1050 respectively transmit and receive modulated signals using radio waves. In such cases, the symbol related to an SSID that is transmitted by second device 1000 in FIG. 15 may include information indicating the SSID of each of the plurality of base stations (or APs). In such cases, as the display of the access destination, display 157 in terminal 1050 illustrated in FIG. 15 displays a list of the SSIDs of the plurality of base stations and/or a list of the plurality of access destinations. Moreover, the symbol related to an encryption key that is transmitted by second device 1000 in FIG. 15 may include information indicating the encryption key to be used for connection with each of the plurality of base stations (or APs). Then, based on the information on the SSIDs of the plurality of base stations and the information on the encryption keys to be used for connection with the plurality of base stations, terminal 1050 in FIG. 15 may select one or more base stations to actually wirelessly connect to (via, for example radio waves) (in other words, may concurrently connect to a plurality of base stations).

For example, assume there are three base stations 470. Here, the three base stations 470 shall be referred as base station #A, base station #B, and base station #C. Moreover, assume the SSID of base station #A is "abcdef", the SSID of base station #B is "ghijk", and the SSID of base station #C is "pqrstu". Moreover, assume the encryption key for connecting with base station #A is "123", the encryption key for connecting with base station #B is "456", and the encryption key for connecting with base station #C is "789".

In such cases, symbol 600-1 related to an SSID in the frame configuration illustrated in FIG. 16 of the modulated signal transmitted by second device 1000 includes information indicating that the SSID of base station #A is "abcdef", the SSID of base station #B is "ghijk", and the SSID of base station #C is "pqrstu". Moreover, symbol 1101 related to the encryption key in the frame configuration illustrated in FIG. 16 includes information indicating that the encryption key for connecting with base station #A is "123", the encryption key for connecting with base station #B is "456", and the encryption key for connecting with base station #C is "789".

Terminal 1050 in FIG. 15 receives symbol 600-1 related to an SSID, and thus obtains information indicating that the SSID of base station #A is "abcdef", the SSID of base station #B is "ghijk", and the SSID of base station #C is "pqrstu". Moreover, terminal 1050 receives symbol 1101 related to the encryption key, and thus obtains information indicating that the encryption key for connecting with base station #A is "123", the encryption key for connecting with base station #B is "456", and the encryption key for connecting with base station #C is "789". Then, based on this information, terminal 1050 selects one or more base station to actually wirelessly (via, for example, radio waves) connect to, and connects to the selected one or more base station.

As described in this embodiment, as a result of terminal 1050 setting which base station 470 to access, utilizing a light source, exemplified here as an LED light source, a mode for making a special setting for processes for establishing a wireless connection between terminal 1050 and base station 470 in the modulated signal for connection over radio waves that is transmitted by terminal 1050 is not required. Moreover, a mode for making a special setting for processes for establishing a wireless connection between terminal 1050 and base station 470 in the modulated signal that is transmitted by base station 470 is not required. With this, in this embodiment, data transmission efficiency in wireless communication can be improved.

Moreover, the encryption key may be an encryption key for an SSID on a wireless LAN, as described above, and may be an encryption key for limiting the connection type, the service type, or the connection region of a network, for example. In other words, it is acceptable so long as an encryption key for limiting something or other is implemented.

Embodiment 5

Figure 19:
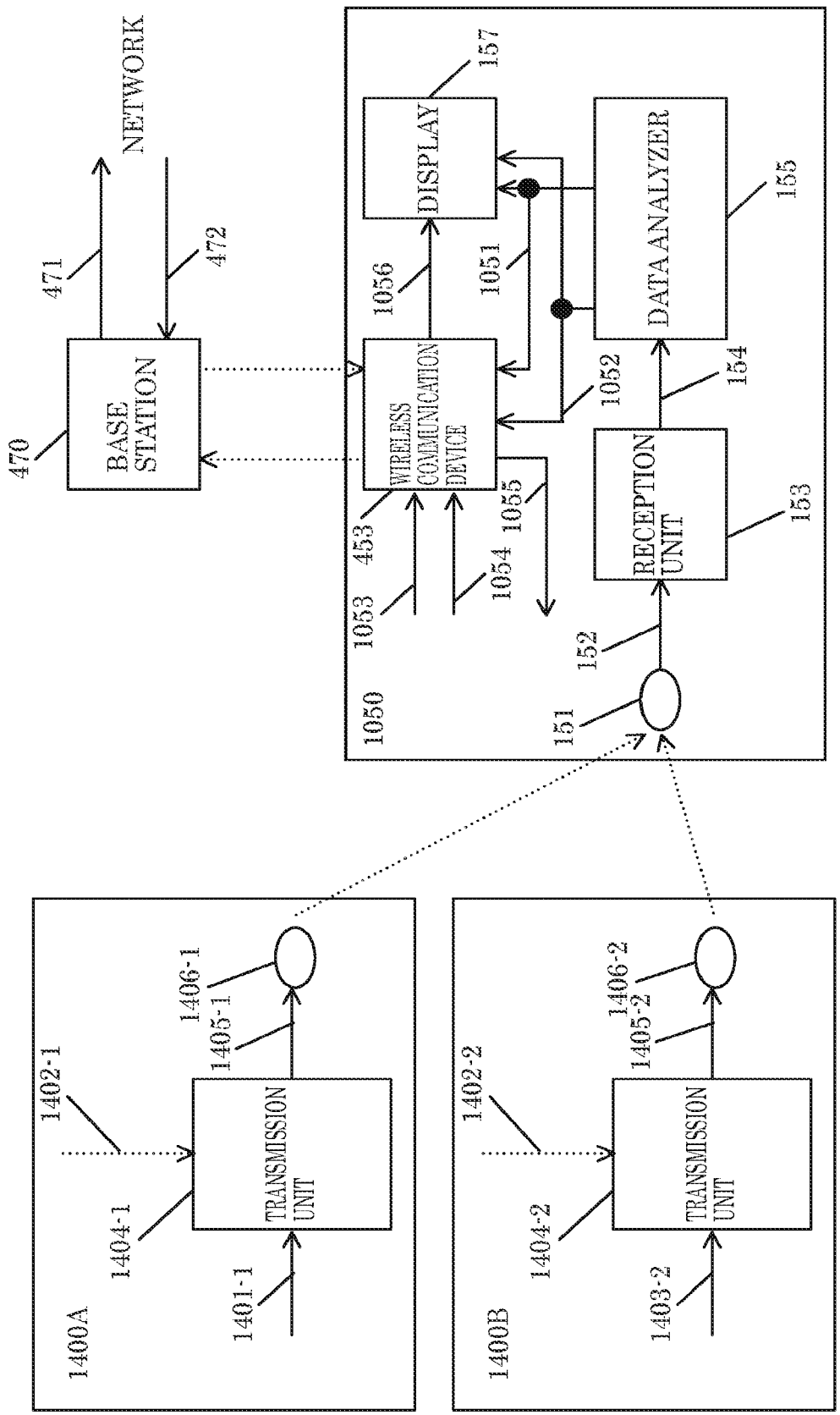
FIG. 19 illustrates a configuration example of a communication system according to Embodiment 5.

FIG. 19 illustrates one example of a configuration of a communication system according to this embodiment.

The communication system illustrated in FIG. 19 includes, for example, devices 1400A and 1400B, terminal 1050, and base station (or AP) 470 that communicates with terminal 1050.

Devices 1400A and 1400B include, for example, an LED visible light source, lamp, light source, and/or light (hereinafter referred to as light sources 1406-1 and 1406-2). Note that hereinafter, device 1400A is also referred to as "third device" and device 1400B is also referred to as "fourth device" in this embodiment.

Moreover, in terminal 1050 illustrated in FIG. 19, configurations that operate the same as terminal 150 illustrated in. FIG. 1 or terminal 1050 illustrated in FIG. 15 share like reference signs. Moreover, in base station (or AP) 470 illustrated in FIG. 19, configurations that operate the same as base station 470 illustrated in FIG. 9 have the same references signs as in FIG. 9. Moreover, communication between wireless communication device 453 in terminal 1050 and base station 470 illustrated in FIG. 19 uses, for example, radio waves.

In third device 1400A illustrated in FIG. 19, transmission unit 1404-1 receives inputs of information 1401-1 related to an SSID and data 1402-1, generates modulated signal (for optical communication) 1405-1 based on the input signals, and outputs modulated signal 1405-1. Modulated signal 1405-1 is then transmitted from light source 1406-1, for example.

In fourth device 1400B illustrated in FIG. 19, transmission unit 1404-2 receives inputs of information 1403-2 related to an encryption key and data 1402-2, generates modulated signal (for optical communication) 1405-2 based on the input signals, and outputs modulated signal 1405-2. Modulated signal 1405-2 is then transmitted from light source 1406-2, for example.

Next, information 1401-1 related to an SSID and information 1403-2 related to an encryption key will be described.

First, information 1401-1 related to an SSID will be described.

Information 1401-1 related to an SSID is information indicating the SSID of base station 470 illustrated in FIG. 19. In other words, third device 1400A can provide access to base station 470 via radio waves, which is a secure access destination for terminal 1050. With this, terminal 1050 illustrated in FIG. 19 can securely obtain information from base station 470.

Note that when terminal 1050 receives an optical signal transmitted via a predetermined scheme, it may be determined that the notified SSID is the SSID of a secure base station. Moreover, terminal 1050 may also perform processing for determining whether the notified SSID is secure or not. For example, third device 1400A may transmit a predetermined identifier in an optical signal, and terminal 1050 may determine whether the notified SSID is the SSID of a secure base station or not based on the received identifier.

Note that although the only base station that is illustrated in FIG. 19 is base station 470, even when, for example, a base station (or AP) other than base station 470 is also present, terminal 1050 can access base station 470 using the SSID obtained from third device 1400A and the encryption key obtained from fourth device 1400B, and obtain information.

Next, information 1403-2 related to an encryption key will be described.

Information 1403-2 related to an encryption key is information related to an encryption key that is necessary in order for terminal 1050 to communicate with base station 470 via radio waves. By obtaining information 1403-2 related to an encryption key from fourth device 1400B, terminal 1050 can perform encrypted communication with base station 470.

This concludes the description of information 1401-1 related to an SSID and information 1403-2 related to an encryption key.

Terminal 1050 in FIG. 19 receives a modulated signal transmitted by third device 1400A.

Light receiver 151 included in terminal 1050 is, for example, an image sensor such as a CMOS or organic CMOS image sensor. Light receiver 151 receives light including the modulated signal transmitted from third device 1400A, and outputs reception signal 152.

Reception unit 153 receives an input of reception signal 152 received via light receiver 151, performs processing such as demodulation and error correction decoding on the modulated signal included in reception signal 152, and outputs reception data 154.

Data analyzer 155 receives an input of reception data 154, and outputs, based on the reception data, for example, information 1051 on the SSID of the base station to be connected to. Wireless communication device 453 obtains, from information 1051 on the SSID, information on the SSID of base station 470 that wireless communication device 453 connects with via radio waves.

Terminal 1050 in FIG. 19 receives a modulated signal transmitted by fourth device 1400B.

Light receiver 151 included in terminal 1050 is, for example, an image sensor such as a CMOS or organic CMOS image sensor. Light receiver 151 receives light including the modulated signal transmitted from fourth device 1400B, and outputs reception signal 152.

Reception unit 153 receives an input of reception signal 152 received via light receiver 151, performs processing such as demodulation and error correction decoding on the modulated signal included in reception signal 152, and outputs reception data 154.

Data analyzer 155 receives an input of reception data. 154, and outputs, based on the reception data, for example, information 1052 on the encryption key for communicating with the base station to be connected to. For example, in a wireless local area network (LAN), examples of encryption schemes include wired equivalent privacy (WEP), Wi-Fi protected access (WPA), and Wi-Fi protected access 2 (WPA2) (pre-shared key (PSK) mode, extended authentication protocol (EAP) mode). Note that the encryption method is not limited to these examples.

Wireless communication device 453 included in terminal 1050 obtains, from information 1052 on the encryption key for communicating with the base station to be connected to (via, for example, radio waves), information on the encryption key of base station 470 that wireless communication device 453 is to connect to.

Display 157 receives inputs of information 1051 on the SSID and information 1052 on the encryption key, and, for example, displays (i) the SSID of the communication partner to be accessed by wireless communication device 453 included in terminal 1050 and (ii) the encryption key (hereinafter this display is referred to as the "first display" in this embodiment).

For example, after the first display, wireless communication device 453 receives inputs of information 1051 on the SSID and information 1052 on the encryption key, and establishes a connection with base station 470 via radio waves. Here, when base station 470 communicates with wireless communication device 453 included in terminal 1050, base station 470 also transmits the modulated signal using, for example, radio waves.

Thereafter, wireless communication device 453 receives inputs of data 1053 and control signal 1054, demodulates data 1053 in accordance with the control indicated in control signal 1054, and transmits the modulated signal over radio waves.

Then, for example, base station 470 transmits data over the network (471) and receives data from the network (472). Thereafter, for example, base station 470 transmits the modulated signal to terminal 1050 over radio waves.

Wireless communication device 453 included in terminal 1050 performs processing such as demodulation and error correction decoding on the modulated signal received over radio waves, and obtains reception data 1056. Display 157 performs display based on reception data 1056.

Figure 20:
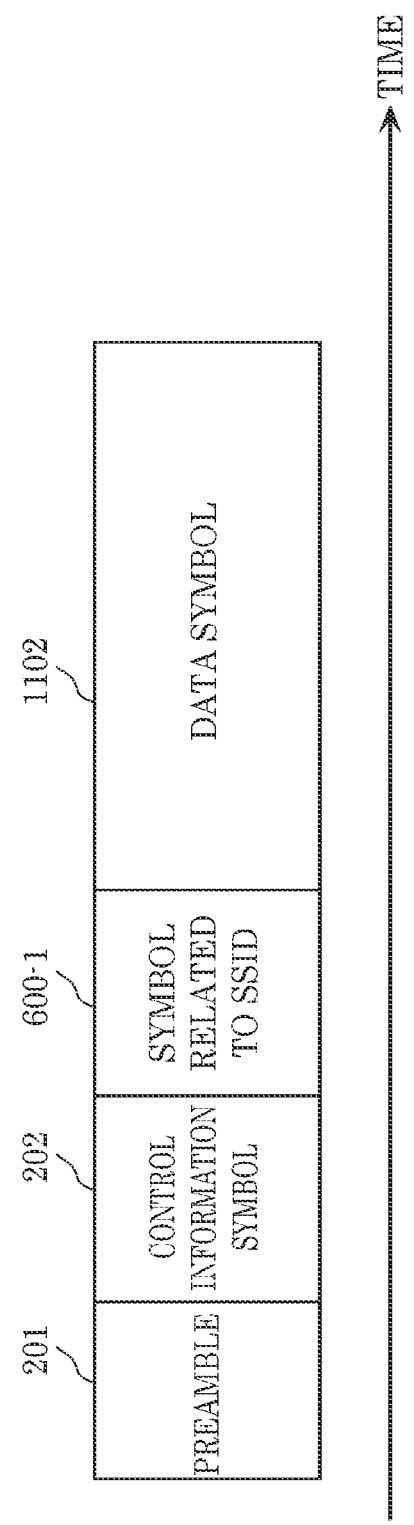
FIG. 20 illustrates a frame configuration example of a modulated signal including an SSID, that is transmitted by a third device according to Embodiment 5.

FIG. 20 illustrates one example of a frame configuration of a modulated signal transmitted by third device 1400A illustrated in FIG. 19. In FIG. 20, time is represented on the horizontal axis. Moreover, in FIG. 20, symbols that are the same as in FIG. 2, FIG. 11, and FIG. 16 share like reference numbers, and repeated description thereof will be omitted.

Symbol 600-1 related to an SSID is a symbol for transmitting information 1401-1 related to an SSID illustrated in FIG. 19. Data symbol 1102 is a symbol for transmitting data 1402-1.

Third device 1400A transmits preamble 201, control information symbol 202, symbol 600-1 related to an SSID, and data symbol 1102. Note that third device 1400A may transmit a frame including symbols other than those shown in FIG. 20. Moreover, the configuration of the frame, including the order in which the symbols are transmitted, is not limited to the configuration illustrated in FIG. 20.

Figure 21:
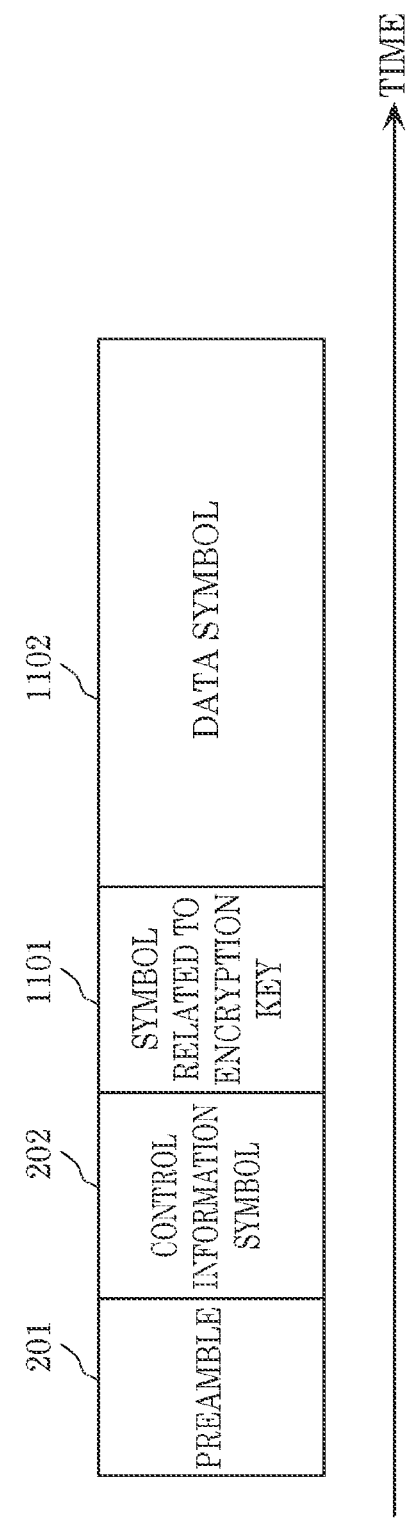
FIG. 21 illustrates a frame configuration example of a modulated signal including an encryption key, that is transmitted by the third device according to Embodiment 5.

FIG. 21 illustrates one example of a frame configuration of a modulated signal transmitted by fourth device 1400B illustrated in FIG. 19. In FIG. 21, time is represented on the horizontal axis. Moreover, in FIG. 21, symbols that are the same as in FIG. 7 and FIG. 16 share like reference numbers, and repeated description thereof will be omitted.

Symbol 1101 related to the encryption key is a symbol for transmitting information 1403-2 related to an encryption key illustrated in FIG. 19. Data symbol 1102 is a symbol for transmitting data 1402-2.

Fourth device 1400B transmits preamble 201, control information symbol 202, symbol 1101 related to the encryption key, and data symbol 1102.

Note that fourth device 1400B in FIG. 19 may transmit a frame including symbols other than those shown in FIG. 21. Moreover, the configuration of the frame, including the order in which the symbols are transmitted, is not limited to the configuration illustrated in FIG. 21.

The frame configuration of the modulated signal transmitted by wireless communication device 453 in this embodiment is the same as the frame configuration illustrated in FIG. 17 and described in Embodiment 4. In other words, as illustrated in FIG. 17, wireless communication device 453 included in terminal 1050 transmits, for example, preamble 1201, and thereafter transmits control information symbol 1202 and information symbol 1203.

Preamble 1201 is a symbol for base station (or AP) 470 that receives the modulated signal transmitted by wireless communication device 453 in terminal 1050 illustrated in FIG. 19 to perform, for example, signal detection, time synchronization, frame synchronization, frequency synchronization, and/or frequency offset estimation, etc.

Control information symbol 1202 is, for example, a symbol including, for example, information related to the error correction encoding method and/or modulation scheme used in the generation of the modulated signal, information related to the frame configuration, and information related to transmission method. Based on information on control information symbol 1202, base station 470 implements, for example, demodulation of the modulated signal.

Information symbol 1203 is a symbol for wireless communication device 453 in terminal 1050 to transmit data.

Note that wireless communication device 453 in terminal 1050 illustrated in FIG. 19 may transmit a frame including symbols other than those shown in FIG. 17. For example, wireless communication device 453 may transmit a frame including a pilot symbol (reference symbol) between information symbols 1203. Moreover, the configuration of the frame, including the order in which the symbols are transmitted, is not limited to the configuration illustrated in FIG. 17. Moreover, in FIG. 17, a plurality of symbols may be arranged along the frequency axis in other words, in FIG. 17, symbols may be present on a plurality of frequencies (a plurality of carriers).

The frame configuration of the modulated signal transmitted by base station 470 in this embodiment is the same as the frame configuration illustrated in FIG. 12 and described in Embodiment 3. In other words, as illustrated in FIG. 12, base station 470 transmits, for example, preamble 701, and thereafter transmits control information symbol 702 and information symbol 703.

Preamble 701 is a symbol for wireless communication device 453 in terminal 1050 illustrated in FIG. 19 that receives the modulated signal transmitted by base station 470 to perform, for example, signal detection, time synchronization, frame synchronization, frequency synchronization, and/or frequency offset estimation, etc.

Control information symbol 702 is, for example, a symbol including, for example, information related to the error correction encoding method and/or modulation scheme used in the generation of the modulated signal, information related to the frame configuration, and information related to transmission method. Based on information on control information symbol 702, wireless communication device 453 in terminal 1050 illustrated in FIG. 19 implements, for example, demodulation of the modulated signal.

Information symbol 703 is a symbol for base station 470 illustrated in FIG. 19 to transmit information.

Note that base station 470 in FIG. 19 may transmit a frame including symbols other than those shown in FIG. 12. For example, base station 470 may transmit a frame including a pilot symbol (reference symbol) between information symbols 703. Moreover, the configuration of the frame, including the order in which the symbols are transmitted, is not limited to the configuration illustrated in FIG. 12. Moreover, in FIG. 12, a plurality of symbols may be arranged along the frequency axis. In other words, in FIG. 12, symbols may be present on a plurality of frequencies (a plurality of carriers).

Moreover, for example, a modulated signal that has the frame configuration illustrated in FIG. 20 and is transmitted by third device 1400A at a regular timing, e.g., repeatedly transmitted is conceivable. With this, a plurality of terminals 1050 can implement the above-described operations. Similarly, a modulated signal that has the frame configuration illustrated in FIG. 21 and is transmitted by fourth device 1400B at a regular timing, e.g., repeatedly transmitted is conceivable. With this, a plurality of terminals 1050 can implement the above-described operations.

Figure 22:
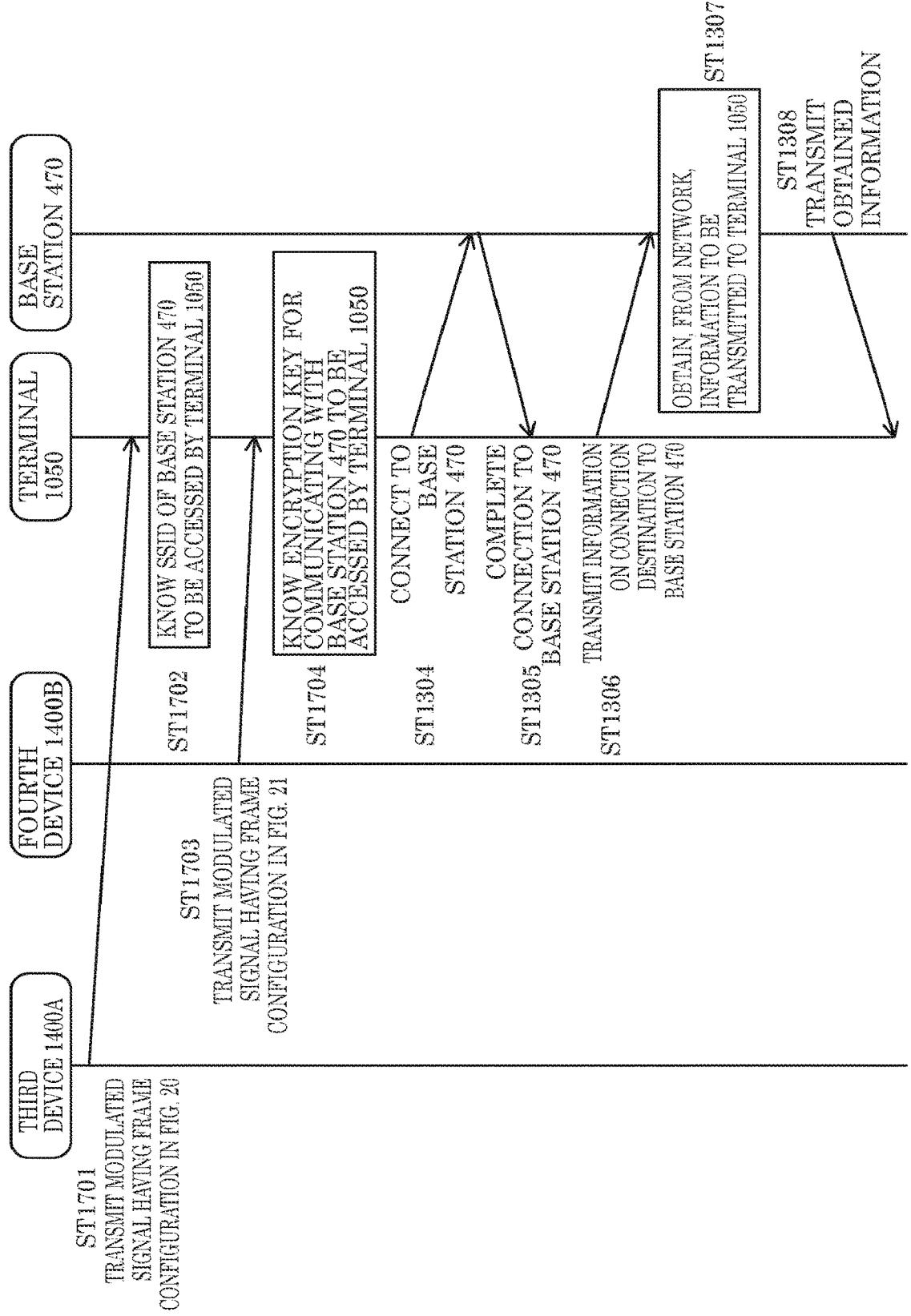
FIG. 22 is a flow chart illustrating an example of processes performed in the communication system according to Embodiment 5.

FIG. 22 is a flow chart illustrating a first example of processes implemented by third device 1400A, fourth device 1400B, terminal 1050, and base station 470 illustrated in FIG. 19. Note that in FIG. 22, configurations that operate in the same manner as FIG. 18 share like reference signs.

First, third device 1400A transmits a modulated signal having the frame configuration illustrated in FIG. 20 (ST1701).

Terminal 1050 obtains the SSID of base station 470 to be accessed by terminal 1050 by receiving the modulated signal transmitted by third device 1400A (ST1702).

Next, fourth device 1400B transmits a modulated signal having the frame configuration illustrated in FIG. 21 (ST1703).

Terminal 1050 obtains the encryption key used to communicate with base station 470 to be accessed by terminal 1050 by receiving the modulated signal transmitted by fourth device 1400B (ST1704).

Terminal 1050 then connects with base station 470 over radio waves (ST1304). Terminal 1050 completes the connection with base station 470 over radio waves by receiving a response from base station 470 (ST1305).

Terminal 1050 then transmits information on the connection destination to base station 470 using radio waves (ST1306).

Base station 470 obtains information for transmitting to terminal 1050 from the network (ST1307).

Base station 470 then transmits the obtained information to terminal 1050 using radio waves, and terminal 1050 obtains the information (ST1308). When necessary, terminal 1050, for example, obtains required information from the network via base station 470.

Figure 23:
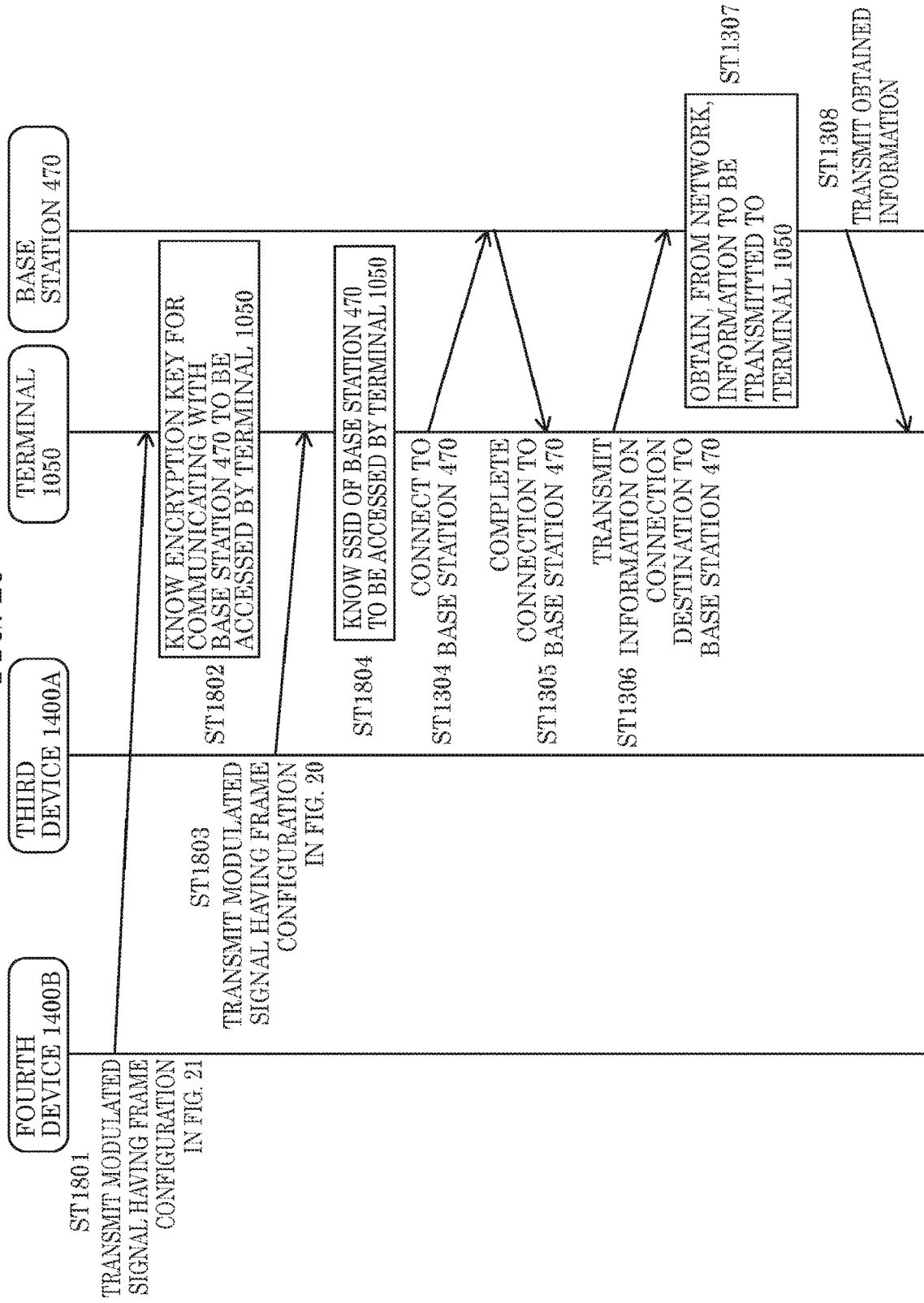
FIG. 23 is a flow chart illustrating another example of processes performed in the communication system according to Embodiment 5.

FIG. 23 is a flow chart illustrating a second example of processes implemented by third device 1400A, fourth device 1400B, terminal 1050, and base station 470 illustrated in FIG. 19. Note that in FIG. 23, configurations that operate in the same manner as FIG. 18 share like reference signs.

First, fourth device 1400B transmits a modulated signal having the frame configuration illustrated in FIG. 21 (ST1801).

Terminal 1050 obtains the encryption key used to communicate with base station 470 to be accessed by terminal 1050 by receiving the modulated signal transmitted by fourth device 1400B (ST1802).

Next, third device 1400A transmits a modulated signal having the frame configuration illustrated in FIG. 20 (ST1803).

Terminal 1050 obtains the SSID of base station 470 to be accessed by terminal 1050 by receiving the modulated signal transmitted by third device 1400A (ST1804).

Terminal 1050 then connects with base station 470 over radio waves (ST1304). Terminal 1050 completes the connection with base station 470 over radio waves by receiving a response from base station 470 (ST1305).

Terminal 1050 then transmits information on the connection destination to base station 470 using radio waves (ST1306).

Base station 470 obtains information for transmitting to terminal 1050 from the network (ST1307).

Base station 470 then transmits the obtained information to terminal 1050 using radio waves, and terminal 1050 obtains the information (ST1308). When necessary, terminal 1050, for example, obtains required information from the network via base station 470.

As described above, based on the SSID transmitted from third device 1400A and the encryption key information transmitted from fourth device 1400B, terminal 1050 connects with base station 470 and obtains information. In other words, since the device that terminal 1050 obtains the SSID information from and the device that terminal 1050 obtains the encryption key information from are different, terminal 1050 can securely obtain the information via base station 470 whose security has been authenticated. This is because, when information from a visible light modulated signal is obtained by terminal 1050, since it is visible light, it possible for the user to easily determine whether the source of information is secure or not. Conversely, for example, when the SSID is obtained from a modulated signal transmitted over radio waves via a wireless LAN, it is difficult for the user to determine which device transmitted the radio waves. Accordingly, from the viewpoint of ensuring information security, obtaining the SSID via visible light communication is more suitable than wireless LAN communication.

Note that in this embodiment, a configuration in which fourth device 1400B transmits encryption key information has been described. However, for example, when base station 470 does not perform encrypted communication using an encryption key, third device 1400A may transmit SSID information, and fourth device 1400B need not transmit encryption key information. In such cases, the present disclosure can be implemented in the same manner simply by removing the configuration related to an encryption key from the above configurations.

Moreover, like in this embodiment, by employing a configuration in which the device that transmits the information related to an SSID (third device 1400A) and the device that transmits information related to an encryption key (fourth device 1400B) are separate devices, it is possible for terminal 1050 to more securely communicate with base station 470.

Figure 24:
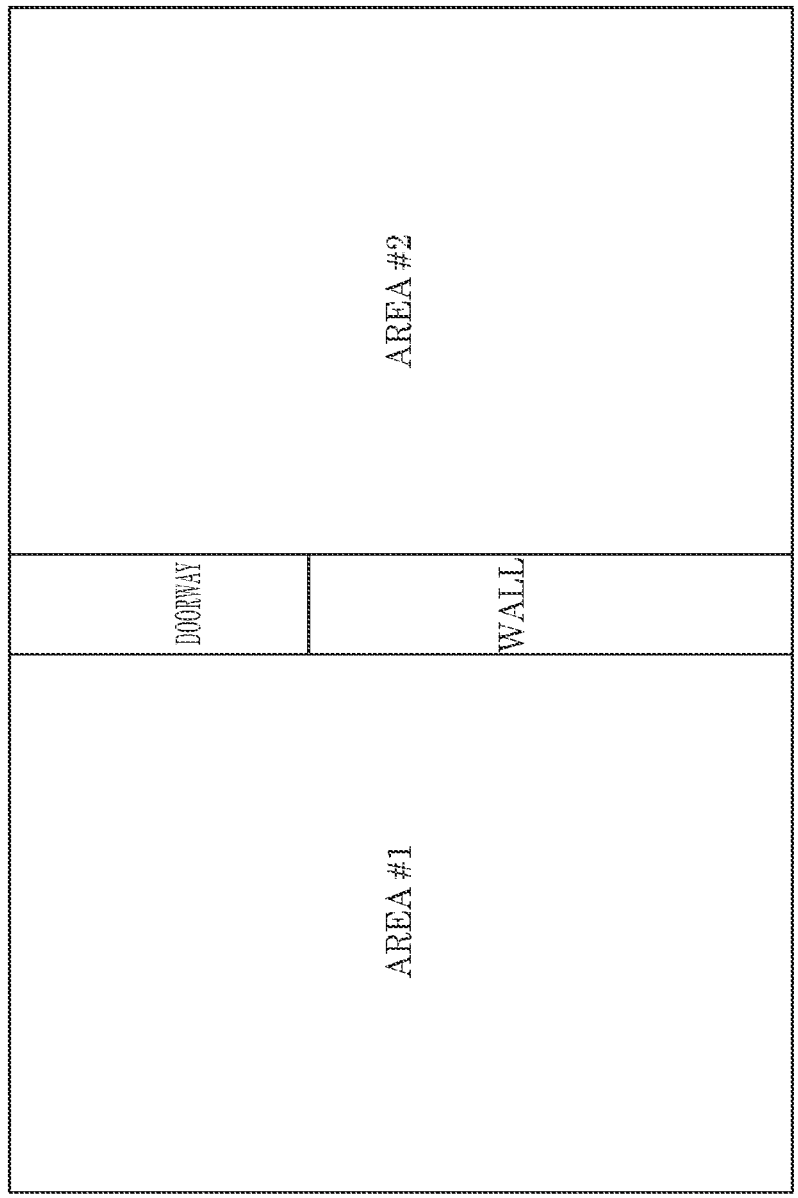
FIG. 24 illustrates one example of a space in which the communication system according to Embodiment 5 is disposed.

For example, consider the space illustrated in FIG. 24. As illustrated in FIG. 24, the space includes area #1 and area #2, and a wall and a doorway between area #1 and area #2. In other words, in the space illustrated in FIG. 24, movement from area #1 to area #2 and movement from area #2 to area #1 is only possible through the doorway.

Base station 470, third device 1400A, and fourth device 1400B are disposed in area #1 in FIG. 24. Only third device 1400A is disposed in area #2. Moreover, assume that the radio waves transmitted by base station 470 are receivable in either of areas #1 or #2 in FIG. 24.

Here, terminal 1050 in area #1 in which fourth device 1400B is disposed can obtain the encryption key for base station 470 from fourth device 1400B and communicate with base station 470. Moreover, even when terminal 1050 connected to base station 470 in area #1 moves to area #2, terminal 1050 can still communicate with base station 470 using the encryption key obtained from fourth device 1400B in area #1. Additionally, even when terminal 1050 connected to base station 470 in area #1 moves to an area other than area #1 or area #2 and then returns to either one of areas #1 or #2, terminal 1050 can still communicate with base station 470 using the encryption key obtained from fourth device 1400B in area #1.

However, terminal 1050 that cannot enter area #1 cannot obtain an encryption key from fourth device 1400B. In such cases, terminal 1050 knows only the SSID of base station (or AP) 470. Therefore, for example, communication with base station 470 via a service that can be accepted with nothing more than knowledge of the SSID of base station 470 may be received by terminal 1050. The service that can be accepted with nothing more than knowledge of the SSID of base station 470 can be more restrictive than a service that can be accepted when both the SSID and the encryption key are known.

Accordingly, it is possible to exclusively allow only terminal 1050 that can enter area #1 to communicate with base station 470. This makes it possible to assure secure communication. Moreover, this makes it possible to construct a system that can provide different services for different areas.

Note that by changing (for example, on a per time interval basis) the encryption key for terminal 1050 to communicate with base station 470, it is possible to prohibit terminal 1050 having an old encryption key from before the change from communicating with base station 470. Using such a system makes it possible to provide even more secure communication.

Moreover, the configuration of the third device is not limited to the configuration of third device 1400A illustrated in FIG. 19, the configuration of the fourth device is not limited to the configuration of fourth device 1400B illustrated in FIG. 19, the configuration of the terminal is not limited to the configuration of terminal 1050 illustrated in FIG. 19, and the connection destination and configuration of the base station is not limited to the connection destination and configuration of base station 470 illustrated in FIG. 19.

Moreover, in the example in FIG. 19, a single base station 470 is present, but a plurality of (secure) base stations (or APs) that terminal 1050 can access may be present. In such cases, the symbol related to an SSID that is transmitted by third device 1400A in FIG. 19 may include information indicating the SSID of each of the plurality of base stations 470. Moreover, the symbol related to an encryption key that is transmitted by fourth device 1400B in FIG. 19 may include information indicating the encryption key to be used for connection with each of the plurality of base stations. In such cases, as the display of the access destination (the "first display" described above), display 157 in terminal 1050 illustrated in FIG. 19 displays a list of the SSIDs of the plurality of base stations and/or a list of the plurality of access destinations. Then, based on the information on the SSIDs of the plurality of base stations and the information on the encryption keys to be used for connection with the plurality of base stations, terminal 1050 in FIG. 19 may select one or more base stations to actually wirelessly connect to (in other words, may concurrently connect to a plurality of base stations).

For example, assume there are three base stations 470. Here, the three base stations 470 shall be referred as base station #A, base station #B, and base station #C. Moreover, assume the SSID of base station #A is "abcdef", the SSID of base station #B is "ghijk", and the SSID of base station #C is "pqrstu". Moreover, assume the encryption key for connecting with base station #A is "123", the encryption key for connecting with base station #B is "456", and the encryption key for connecting with base station #C is "789".

In such cases, symbol 600-1 related to an SSID in the frame configuration illustrated in FIG. 20 of the modulated signal transmitted by third device 1400A includes information indicating that the SSID of base station #A is "abcdef", the SSID of base station #B is "ghijk", and the SSID of base station #C is "pqrstu". Moreover, symbol 1101 related to the encryption key in the frame configuration illustrated in FIG. 21 of the modulated signal transmitted by fourth device 1400B includes information indicating that the encryption key for connecting with base station #A is "123", the encryption key for connecting with base station #13 is "456", and the encryption key for connecting with base station #C is "789".

Terminal 1050 in FIG. 19 receives symbol 600-1 related to an SSM, and thus obtains information indicating that the SSID of base station #A is "abcdef", the SSID of base station #B is "ghijk", and the SSID of base station #C is "pqrstu".

Moreover, terminal 1050 receives symbol 1101 related to the encryption key, and thus obtains information indicating that the encryption key for connecting with base station #A is "123", the encryption key for connecting with base station #B is "456", and the encryption key for connecting with base station #C is "789". Then, based on this information, terminal 1050 selects a base station to wirelessly (via, for example, radio waves) connect to, and connects to the selected base station.

As described in this embodiment, as a result of terminal 1050 setting which base station 470 to access, utilizing a light source, exemplified here as an LED light source, a mode for making a special setting for processes for establishing a wireless connection between terminal 1050 and base station 470 in the modulated signal for connection over radio waves that is transmitted by terminal 1050 is not required. Moreover, a mode for making a special setting for processes for establishing a wireless connection between terminal 1050 and base station 470 in the modulated signal that is transmitted by base station 470 is not required. With this, in this embodiment, data transmission efficiency in wireless communication can be improved.

Moreover, the encryption key may be an encryption key for an SSID on a wireless LAN, as described above, and may be an encryption key for limiting the connection type, the service type, or the connection region of a network, for example. In other words, it is acceptable so long as an encryption key for limiting something or other is implemented.

Embodiment 6

Figure 25:
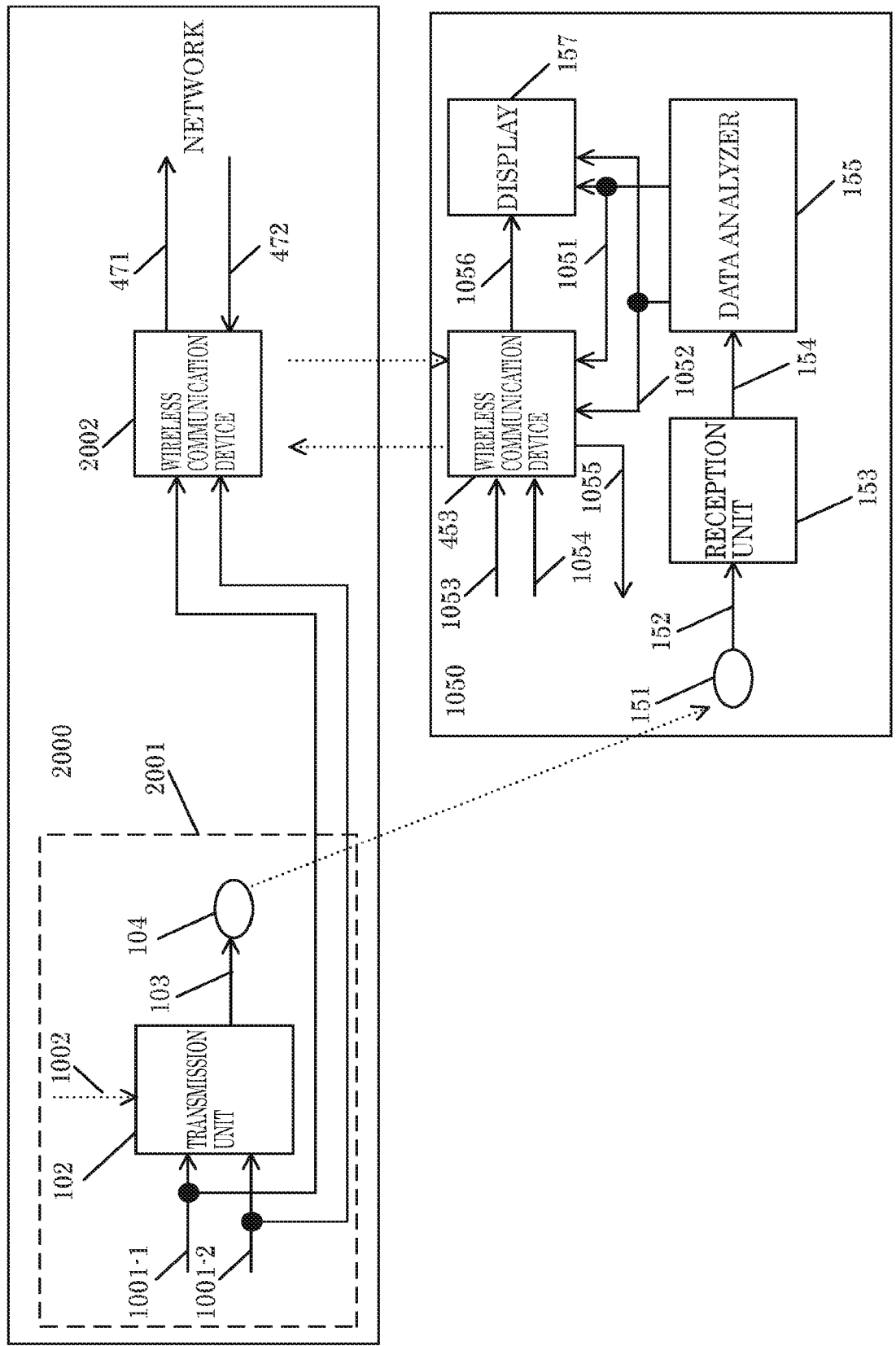
FIG. 25 illustrates a configuration example of a communication system according to Embodiment 6.

FIG. 25 illustrates one example of a configuration of a communication system according to this embodiment.

The communication system illustrated in FIG. 25 includes, for example, base station 2000 and terminal 1050. Moreover, base station 2000 includes transmission device 2001 and wireless communication device 2002. In FIG. 25, symbols that are the same as in FIG. 6 and FIG. 15 share like reference numbers, and repeated description thereof will be omitted. Moreover, communication between wireless communication device 2002 and wireless communication device 453 illustrated in FIG. 25 uses, for example, radio waves.

Transmission device 2001 included in base station (or AP) 2000 in FIG. 25 includes, for example, an LED visible light source, lamp, light source, and/or light (hereinafter referred to as "light source 104"). First, operations performed by transmission device 2001 the element related to the LED lamp, light source, and/or light that emits visible light) will be described.

In transmission device 2001, transmission unit 102 receives inputs of information 1001-1 related to an SSID, information 1001-2 related to an encryption key, and data 1002, generates modulated signal (for optical communication) 103 based on the input signals, and outputs modulated signal 103. Modulated signal 103 is then transmitted from light source 104, for example.

Next, information 1001-1 related to an SSID and information 1001-2 related to an encryption key will be described.

First, information 1001-1 related to an SSID will be described.

Information 1001-1 related to an SSID is information indicating the SSID of wireless communication device 2002, which uses radio waves and is included in base station 2000 illustrated in FIG. 25. In other words, transmission device 2001 can provide access to wireless communication device 2002, which is a wireless secure access destination for terminal 1050. With this, terminal 1050 illustrated in FIG. 25 can securely obtain information from wireless communication device 2002.

On the other hand, transmission device 2001 can restrict the terminals that access wireless communication device 2002 to terminals in a space in which it is possible to receive optical signals transmitted (emitted) by transmission device 2001.

Note that when terminal 1050 receives an optical signal transmitted via a predetermined scheme, it may be determined that the notified SSID is the SSID of a secure base station. Moreover, terminal 1050 may also perform processing for determining whether the notified SSID is secure or not. For example, transmission device 2001 may transmit a predetermined identifier in an optical signal, and terminal 1050 may determine whether the notified SSID is the SSID of a secure base station or not based on the received identifier.

Note that although the only base station that is illustrated in FIG. 25 is base station 2000, even when, for example, a base station (or AP) other than base station 2000 is also present, terminal 1050 can access wireless communication device 2002 of base station 2000 using the SSID and the encryption key obtained from transmission device 2001, and obtain information.

Next, information 1001-2 related to an encryption key will be described.

Information 1001-2 related to an encryption key is information related to an encryption key that is necessary in order for terminal 1050 to communicate with wireless communication device 2002. By obtaining information 1001-2 related to an encryption key from transmission device 2001, terminal 1050 can perform encrypted communication with wireless communication device 2002.

This concludes the description of information 1001-1 related to an SSID and information 1001-2 related to an encryption key.

Terminal 1050 in FIG. 25 receives a modulated signal transmitted by transmission device 2001. Note that in terminal 1050 illustrated in FIG. 25, configurations that operate the same as terminal 150 in FIG. 6 and terminal 1050 in FIG. 15 share like reference signs.

Light receiver 151 included in terminal 1050 is, for example, an image sensor such as a CMOS or organic CMOS image sensor. Light receiver 151 receives light including the modulated signal transmitted from transmission device 2001, and outputs reception signal 152.

Reception unit 153 receives an input of reception signal 152 received via light receiver 151, performs processing such as demodulation and error correction decoding on the modulated signal included in reception signal 152, and outputs reception data 154.

Data analyzer 155 receives an input of reception data 154, and outputs, based on the reception data, for example, information 1051 on the SSID for wireless communication device 2002 included in base station 2000 to be connected to, and information 1052 on the encryption key for communicating with wireless communication device 2002 included in base station 2000 to be connected to. For example, in a wireless local area network (LAN), examples of encryption schemes include wired equivalent privacy (WEP), Wi-Fi protected access (WPA), and Wi-Fi protected access 2 (WPA2) (pre-shared key (PSK) mode, extended authentication protocol (EAP) mode). Note that the encryption method is not limited to these examples.

Display 157 receives inputs of information 1051 on the SSID and information 1052 on the encryption key, and, for example, displays (i) the SSID of the communication partner to be accessed by wireless communication device 453 included in terminal 1050 and (ii) the encryption key (hereinafter this display is referred to as the "first display" in this embodiment).

For example, after the first display, wireless communication device 453 receives inputs of information 1051 on the SSID and information 1052 on the encryption key, and establishes a connection with wireless communication device 2002 in base station 2000 (for example, assume the connection uses radio waves). Here, when wireless communication device 2002 in base station 2000 communicates with wireless communication device 453 included in terminal 1050, wireless communication device 2002 also transmits the modulated signal using, for example, radio waves.

Thereafter, wireless communication device 453 receives inputs of data 1053 and control signal 1054, demodulates data 1053 in accordance with the control indicated in control signal 1054, and transmits the modulated signal over radio waves.

Then, for example, wireless communication device 2002 in base station 2000 transmits data over the network (471) and receives data from the network (472). Thereafter, for example, wireless communication device 2002 in base station 2000 transmits the modulated signal to terminal 1050 over radio waves.

Wireless communication device 453 included in terminal 1050 performs processing such as demodulation and error correction decoding on the modulated signal received over radio waves, and obtains reception data 1056. Display 157 performs display based on reception data 1056.

The frame configuration of the modulated signal transmitted by transmission device 2001 in base station 2000 according to this embodiment is the same as the frame configuration illustrated in FIG. 16 and described in Embodiment 4. In other words, in FIG. 16, symbol 600-1 related to an SSID is a symbol for transmitting information 1001-1 related to an SSID illustrated in FIG. 25, and symbol 1101 related to the encryption key is a symbol for transmitting information 1001-2 related to an encryption key illustrated in FIG. 25. Data symbol 1102 is a symbol for transmitting data 1002 illustrated in FIG. 25.

As illustrated in FIG. 16, transmission device 2001 in base station 2000 transmits preamble 201, control information symbol 202, symbol 600-1 related to an SSID, symbol 1101 related to the encryption key, and data symbol 1102. Note that transmission device 2001 in base station 2000 may transmit a frame including symbols other than those shown in FIG. 16. Moreover, the configuration of the frame, including the order in which the symbols are transmitted, is not limited to the configuration illustrated in FIG. 16.

The frame configuration of the modulated signal transmitted by wireless communication device 453 included in terminal 1050 according to this embodiment is the same as the frame configuration illustrated in FIG. 17 and described in Embodiment 4. In other words, as illustrated in FIG. 17, wireless communication device 453 included in terminal 1050 and illustrated in FIG. 25 transmits, for example, preamble 1201, and thereafter transmits control information symbol 1202 and information symbol 1203.

Here, preamble 1201 is a symbol for wireless communication device 2002 in base station 2000 that receives the modulated signal transmitted by wireless communication device 453 to perform, for example, signal detection, time synchronization, frame synchronization, frequency synchronization, and/or frequency offset estimation, etc.

Control information symbol 1202 is, for example, a symbol including, for example, information related to the error correction encoding method and/or modulation scheme used by terminal 1050 in the generation of the modulated signal, information related to the frame configuration, and information related to transmission method. Based on information on control information symbol 1202, wireless communication device 2002 in base station 2000 implements, for example, demodulation of the modulated signal.

Information symbol 1203 is a symbol for wireless communication device 453 in terminal 1050 to transmit data.

Note that wireless communication device 453 in terminal 1050 may transmit a frame including symbols other than those shown in FIG. 17. For example, wireless communication device 453 may transmit a frame including a pilot symbol (reference symbol) between information symbols 1203. Moreover, the configuration of the frame, including the order in which the symbols are transmitted, is not limited to the configuration illustrated in FIG. 17. Moreover, in FIG. 17, a plurality of symbols may be arranged along the frequency axis. In other words, in FIG. 17, symbols may be present on a plurality of frequencies (a plurality of carriers).

The frame configuration of the modulated signal transmitted by wireless communication device 2002 in this embodiment is the same as the frame configuration illustrated in FIG. 12 and described in Embodiment 3. In other words, as illustrated in FIG. 12, wireless communication device 2002 transmits, for example, preamble 701, and thereafter transmits control information symbol 702 and information symbol 703.

Preamble 701 is a symbol for wireless communication device 453 in terminal 1050 that receives the modulated signal transmitted by wireless communication device 2002 to perform, for example, signal detection, time synchronization, frame synchronization, frequency synchronization, and/or frequency offset estimation, etc.

Control information symbol 702 is, for example, a symbol including, for example, information related to the error correction encoding method and/or modulation scheme used in the generation of the modulated signal, information related to the frame configuration, and information related to transmission method. Based on information on control information symbol 702, wireless communication device 453 in terminal 1050 implements, for example, demodulation of the modulated signal.

Information symbol 703 is a symbol for wireless communication device 2002 to transmit information.

Note that wireless communication device 2002 included in base station 2000 illustrated in FIG. 25 may transmit a frame including symbols other than those shown in FIG. 12. For example, wireless communication device 2002 may transmit a frame including a pilot symbol (reference symbol) between information symbols 703. Moreover, the configuration of the frame, including the order in which the symbols are transmitted, is not limited to the configuration illustrated in FIG. 12. Moreover, in FIG. 12, a plurality of symbols may be arranged along the frequency axis. In other words, in FIG. 12, symbols may be present on a plurality of frequencies (a plurality of carriers).

Moreover, for example, a modulated signal that has the frame configuration illustrated in FIG. 16 and is transmitted by transmission device 2001 at a regular timing, e.g., repeatedly transmitted is conceivable. With this, a plurality of terminals 1050 can implement the above-described operations.

Figure 26:
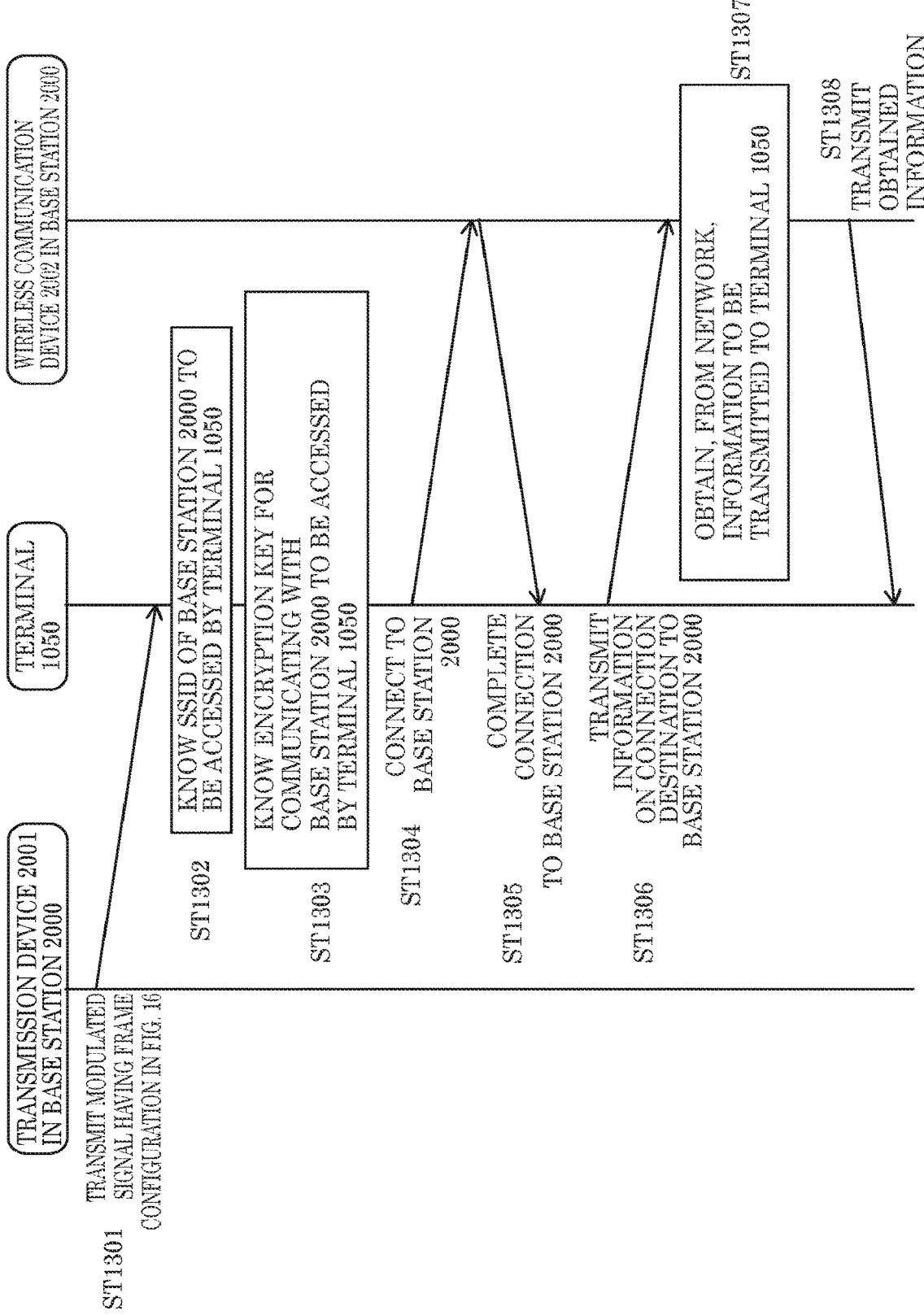
FIG. 26 is a flow chart illustrating an example of processes performed in the communication system according to Embodiment 6.

FIG. 26 is a flow chart illustrating one example of processes implemented by transmission device 2001 in base station 2000, terminal 1050, and wireless communication device 2002 in base station 2000 illustrated in FIG. 25.

First, transmission device 2001 transmits a modulated signal having the frame configuration illustrated in FIG. 16 (ST1301).

Terminal 1050 obtains the SSID of base station 2000 (wireless communication device 2002) to be accessed by terminal 1050 by receiving the modulated signal transmitted by transmission device 2001 (ST1302).

Terminal 1050 also obtains the encryption key to be used in communication with base station 2000 (wireless communication device 2002) to be accessed by terminal 1050 (ST1303).

Terminal 1050 then connects with wireless communication device 2002 in base station 2000 over radio waves (ST1304). Terminal 1050 completes the connection with wireless communication device 2002 in base station 2000 by receiving a response from wireless communication device 2002 in base station 2000 (ST1305).

Terminal 1050 then transmits information on the connection destination to wireless communication device 2002 in base station 2000 using radio waves (ST1306).

Wireless communication device 2002 in base station 2000 obtains information for transmitting to terminal 1050 from the network (ST1307).

Wireless communication device 2002 in base station 2000 then transmits the obtained information to terminal 1050 using radio waves, and terminal 1050 obtains the information (ST1308). When necessary, terminal 1050, for example, obtains required information from the network via wireless communication device 2002 in base station 2000.

As described above, based on the information on the SSID and information on the encryption key transmitted from transmission device 2001 in base station 2000, terminal 1050 connects with wireless communication device 2002 in base station 2000 and obtains information to securely obtain information from base station 2000, whose security has been authenticated. This is because, when information from a visible light modulated signal is obtained by terminal 1050, since it is visible light, it possible for the user to easily determine whether the source of information is secure or not. Conversely, for example, when the SSID is obtained from a modulated signal transmitted over radio waves via a wireless LAN, it is difficult for the user to determine which device transmitted the radio waves. Accordingly, from the viewpoint of ensuring information security, obtaining the SSID via visible light communication is more suitable than wireless LAN communication.

Note that in this embodiment, a configuration in which transmission device 2001 transmits encryption key information has been described. However, for example, when wireless communication device 2002 in base station 2000 does not perform encrypted communicating using an encryption key, transmission device 2001 may transmit only SSID information, without transmitting encryption key information. In such cases, the present disclosure can be implemented in the same manner simply by removing the configuration related to an encryption key from the above configurations included in transmission device 2001.

Moreover, as illustrated in FIG. 25, a configuration is acceptable in which the SSID and encryption key of wireless communication device 2002 in base station 2000 can be rewritten. For example, in FIG. 25, wireless communication device 2002 receives inputs of information 1001-1 related to an SSID and information 1001-2 related to an encryption key. Wireless communication device 2002 in base station 2000 overwrites the SSID and the encryption key in accordance with the input information 1001-1 related to an SSID and information 1001-2 related to an encryption key. With this configuration, even more secure communication between terminal 1050 and wireless communication device 2002 in base station 2000 can be assured. Note that in FIG. 25, although wireless communication device 2002 in base station 2000 has a function of overwriting the SSID and the encryption key, a configuration in which the function for overwriting both or one of the SSID and the encryption key is also acceptable.

Moreover, the configuration of the transmission device is not limited to the configuration of transmission device 2001 illustrated in FIG. 25, the configuration of the terminal is not limited to the configuration of terminal 1050 illustrated in FIG. 25, and the connection destination and configuration of the wireless communication device is not limited to the connection destination and configuration of wireless communication device 2002 illustrated in FIG. 25.

Moreover, in the example in FIG. 25, a single base station 2000 is present, but a plurality of wireless communication devices 2002 in (secure) base stations (or APs) 2000 that terminal 1050 can access may be present. Note that these plurality of wireless communication devices 2002 in base stations 2000 and terminal 1050 respectively transmit and receive modulated signals using radio waves. In such cases, the symbol related to an SSID that is transmitted by transmission device 2001 in FIG. 25 may include information indicating the SSID of each of the plurality of wireless communication devices 2002 in base stations 2000. Moreover, the symbol related to an encryption key that is transmitted by transmission device 2001 in FIG. 25 may include information indicating the encryption key to be used for connection with each of the plurality of wireless communication devices 2002 in base stations 2000. Terminal 1050 in FIG. 25 may select a wireless communication device 2002 in a base station 2000 to wirelessly connect to (for example, over radio waves), based on the information on the SSIDs and encryption key information of the plurality of wireless communication devices 2002 in base stations 2000 (or connect to the plurality of wireless communication devices 2002 in base stations 2000).

For example, assume there are three base stations 2000 including wireless communication devices 2002. Here, the three wireless communication devices 2002 in the three base stations 2000 shall be referred as wireless communication device #A, wireless communication device #B, and wireless communication device #C. Moreover, assume the SSID of wireless communication device #A is "abcdef", the SSID of wireless communication device #B is "ghijk", and the SSID of wireless communication device #C is "pqrstu". Moreover, assume the encryption key for connecting with wireless communication device #A is "123", the encryption key for connecting with wireless communication device #B is "456", and the encryption key for connecting with wireless communication device #C is "789".

In such cases, symbol 600-1 related to an SSID in the frame configuration illustrated in FIG. 16 of the modulated signal transmitted by transmission device 2001 includes information indicating that the SSID of wireless communication device #A is "abcdef", the SSID of wireless communication device #B is "ghijk", and the SSID of wireless communication device #C is "pqrstu". Moreover, symbol 1101 related to the encryption key in the frame configuration illustrated in FIG. 16 includes information indicating that the encryption key for connecting with wireless communication device #A is "123", the encryption key for connecting with wireless communication device #B is "456", and the encryption key for connecting with wireless communication device #C is "789".

Terminal 1050 in FIG. 25 receives symbol 600-1 related to an SSID, and thus obtains information indicating that the SSID of wireless communication device #A is "abcdef", the SSID of wireless communication device #B is "ghijk", and the SSID of wireless communication device #C is "pqrstu". Moreover, terminal 1050 receives symbol 1101 related to the encryption key, and thus obtains information indicating that the encryption key for connecting with wireless communication device #A is "123", the encryption key for connecting with wireless communication device #B is "456", and the encryption key for connecting with wireless communication device #C is "789". Then, based on this information, terminal 1050 selects a base station to wirelessly (via, for example, radio waves) connect to, and connects to the selected base station.

As described in this embodiment, as a result of terminal 1050 setting which wireless communication device 2002 in base station 2000 to access, utilizing a light source, exemplified here as an LED light source, a mode for making a special setting for processes for establishing a wireless connection between terminal 1050 and base station 2000 in the modulated signal for connection over radio waves that is transmitted by terminal 1050 is not required. Moreover, a mode for making a special setting for processes for establishing a wireless connection between terminal 1050 and base station 2000 in the modulated signal that is transmitted by base station 2000 is not required. With this, in this embodiment, data transmission efficiency in wireless communication can be improved.

Moreover, the encryption key may be an encryption key for an SSID on a wireless LAN, as described above, and may be an encryption key for limiting the connection type, the service type, or the connection region of a network, for example. In other words, it is acceptable so long as an encryption key for limiting something or other is implemented.

Embodiment 7

Figure 27:
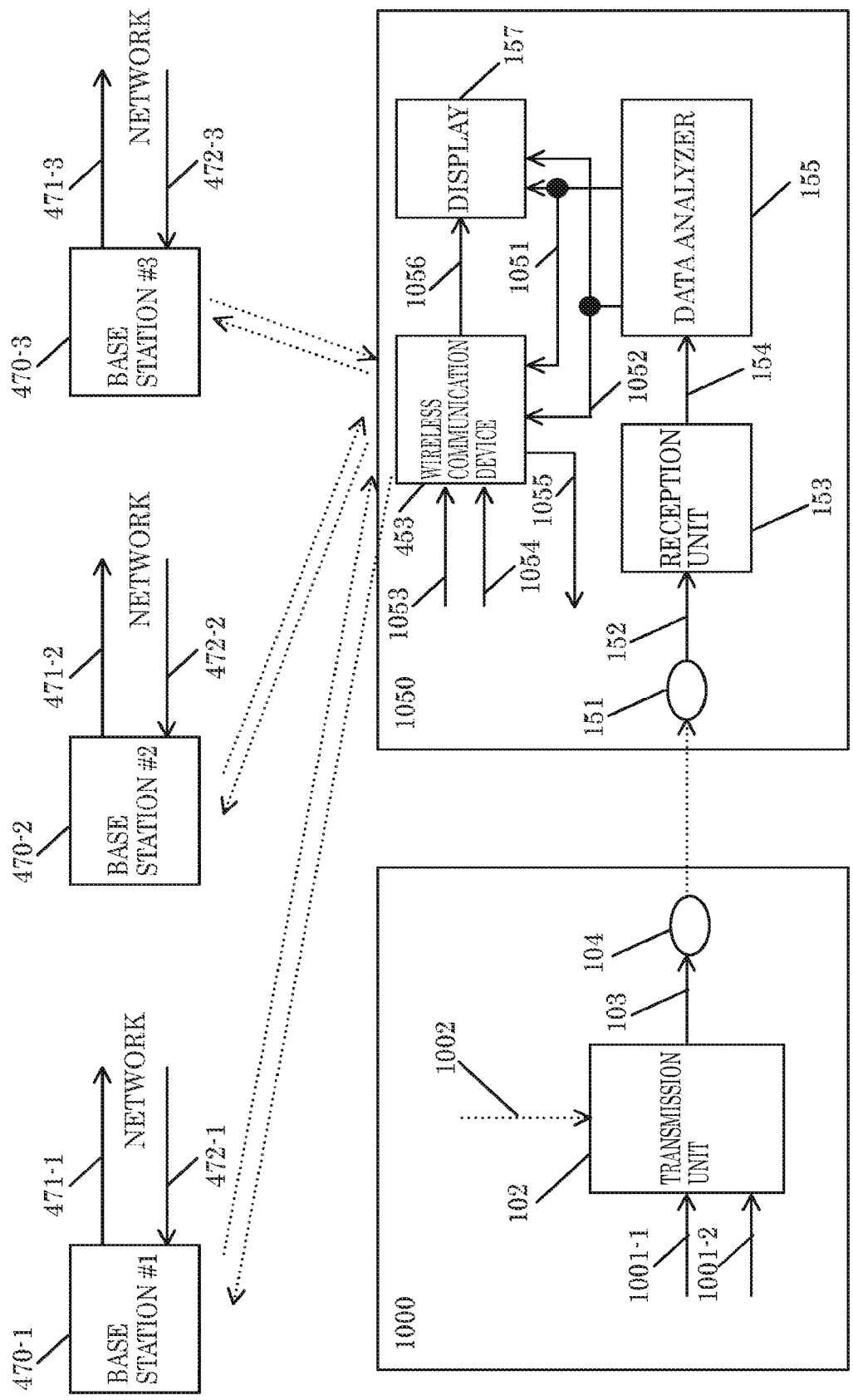
FIG. 27 illustrates a configuration example of a communication system according to Embodiment 7.

FIG. 27 illustrates one example of a configuration of a communication system according to this embodiment.

The communication system illustrated in FIG. 27 includes device 1000, terminal 1050, and base station (or AP) 470-1 (base station #1), base station (or AP) 470-2 (base station #2), and base station (or AP) 470-3 (base station #3) that communicate with terminal 1050. In FIG. 27, symbols that are the same as in FIG. 6, FIG. 9, and FIG. 15 share like reference numbers, and repeated description thereof will be omitted.

Device 1000 includes, for example, an LED visible light source, lamp, light source, and/or light (light source 104). Note that hereinafter, device 1000 is also referred to as "fifth device" in this embodiment. Moreover, communication between wireless communication device 453 and base station 470-1 (base station #1) illustrated in FIG. 27, communication between wireless communication device 453 and base station 470-2 (base station #2) in FIG. 27, and communication between wireless communication device 453 and base station 470-3 (base station #3) in FIG. 27 uses, for example, radio waves.

In fifth device 1000 illustrated in FIG. 27, transmission unit 102 receives inputs of information 1001-1 related to an SSID, information 1001-2 related to an encryption key, and data 1002, generates modulated signal (for optical communication) 103 based on the input signals, and outputs modulated signal 103. Modulated signal 103 is then transmitted from light source 104, for example.

Next, information 1001-1 related to an SSID and information 1001-2 related to an encryption key will be described.

First, information 1001-1 related to an SSID will be described.

Information 1001-1 related to an SSID includes, for example, information indicating the SSID of base station 470-1 (base station #1) in FIG. 27, information indicating the SSID of base station 470-2 (base station #2) in FIG. 27, and information indicating the SSID of base station 470-3 (base station #3) in FIG. 27. Note that in one example, base stations 470-1, 470-2, and 470-3 transmit modulated signals to terminal 1050 over radio waves, and receive modulated signals from terminal 1050 over radio waves. In other words, fifth device 1000 can provide access to base stations 470-1, 470-2, and 470-3, which are secure access destinations for terminal 1050. With this, terminal 1050 illustrated in FIG. 27 can securely obtain information from base stations 470-1, 470-2, and 470-3.

On the other hand, fifth device 1000 can restrict the terminals that access base stations 470-1, 470-2, and 470-3 to terminals in a space in which it is possible to receive optical signals transmitted (emitted) by fifth device 1000.

Note that when terminal 1050 receives an optical signal transmitted via a predetermined scheme, it may be determined that the notified SSID is the SSID of a secure base station. Moreover, terminal 1050 may also perform processing for determining whether the notified SSID is secure or not. For example, fifth device 1000 may transmit a predetermined identifier in an optical signal, and terminal 1050 may determine whether the notified SSID is the SSID of a secure base station or not based on the received identifier.

Note that although the example illustrated in FIG. 27 shows base stations 470-1, 470-2, and 470-3, base stations (or APs) other than base stations 470-1, 470-2, and 470-3 may be present, for example.

Next, information 1001-2 related to an encryption key will be described.

Information 1001-2 related to an encryption key is information related to an encryption key that is necessary in order for terminal 1050 to communicate with base stations 470-1, 470-2, and 470-3. By obtaining information 1001-2 related to an encryption key from fifth device 1000, encrypted communication can be performed between terminal 1050 and base station 470-1, between terminal 1050 and base station 470-2, and between terminal 1050 and base station 470-3.

This concludes the description of information 1001-1 related to an SSID and information 1001-2 related to an encryption key.

Terminal 1050 in FIG. 27 receives a modulated signal transmitted by fifth device 1000. Note that in terminal 1050 illustrated in FIG. 27, configurations that operate the same as terminal 150 in FIG. 6 and terminal 450 in FIG. 9 share like reference signs.

Light receiver 151 included in terminal 1050 is, for example, an image sensor such as a CMOS or organic CMOS image sensor. Light receiver 151 receives light including the modulated signal transmitted from fifth device 1000, and outputs reception signal 152.

Reception unit 153 receives an input of reception signal 152 received via light receiver 151, performs processing such as demodulation and error correction decoding on the modulated signal included in reception signal 152, and outputs reception data 154.

Data analyzer 155 receives an input of reception data 154, and outputs, based on reception data 154, for example, information 1051 on the SSIDs of base stations 470-1, 470-2, and 470-3 to be connected to, and information 1052 on the encryption keys for communicating with base stations 470-1, 470-2, and 470-3 to be connected to. For example, in a wireless local area network (LAN), examples of encryption schemes include wired equivalent privacy (WEP), Wi-Fi protected access (WPA), and Wi-Fi protected access 2 (WPA2) (pre-shared key (PSK) mode, extended authentication protocol (EAP) mode). Note that the encryption method is not limited to these examples.

Display 157 receives inputs of information 1051 on the SSID and information 1052 on the encryption key, and, for example, displays (i) the SSID of the communication partner to be accessed by wireless communication device 453 included in terminal 1050 and (ii) the encryption key (hereinafter this display is referred to as the "first display" in this embodiment).

For example, after the first display, wireless communication device 453 receives inputs of information 1051 on the SSIDs and information 1052 on the encryption keys, and establishes a connection with any one of base stations 470-1, 470-2, or 470-3 (for example, assume the connection uses radio waves). Here, when base station 470 connected to communicates with wireless communication device 453 included in terminal 1050, that base station 470 also transmits the modulated signal using, for example, radio waves.

Thereafter, wireless communication device 453 receives inputs of data 1053 and control signal 1054, demodulates data 1053 in accordance with the control indicated in control signal 1054, and transmits the modulated signal over radio waves.

Then, for example, base station 470 connected to transmits data over the network (any one of 471-1, 471-2, and 471-3) and receives data from the network (any one of 472-1, 472-2, and 472-3). Thereafter, for example, base station 470 connected to transmits the modulated signal to terminal 1050 over radio waves.

Wireless communication device 453 included in terminal 1050 performs processing such as demodulation and error correction decoding on the modulated signal received over radio waves, and obtains reception data 1056. Display 157 performs display based on reception data 1056.

Figure 28:
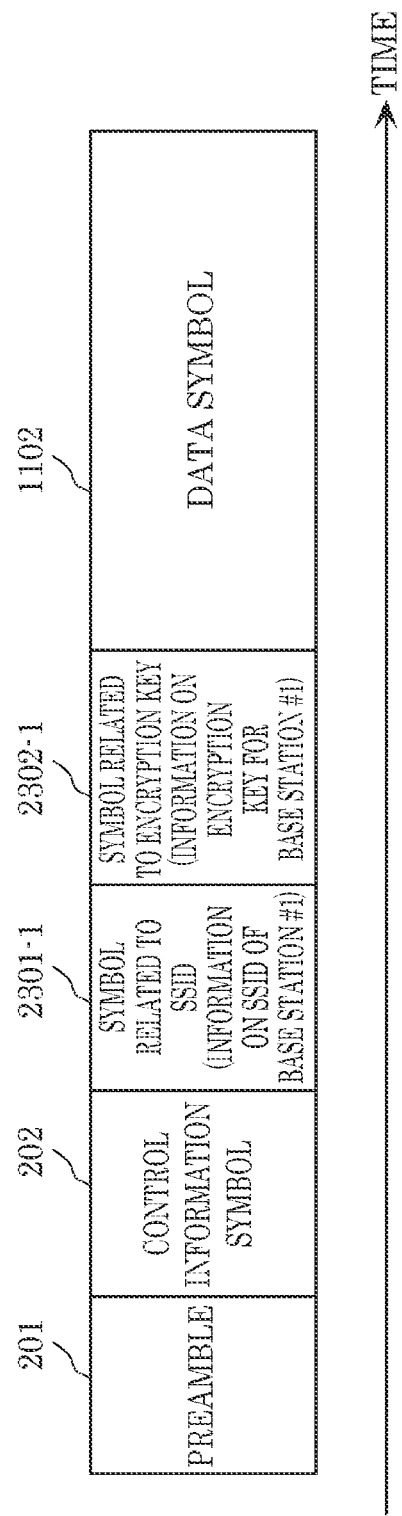
FIG. 28 illustrates a frame configuration example of a modulated signal transmitted by a fifth device according to Embodiment 7.
Figure 29:
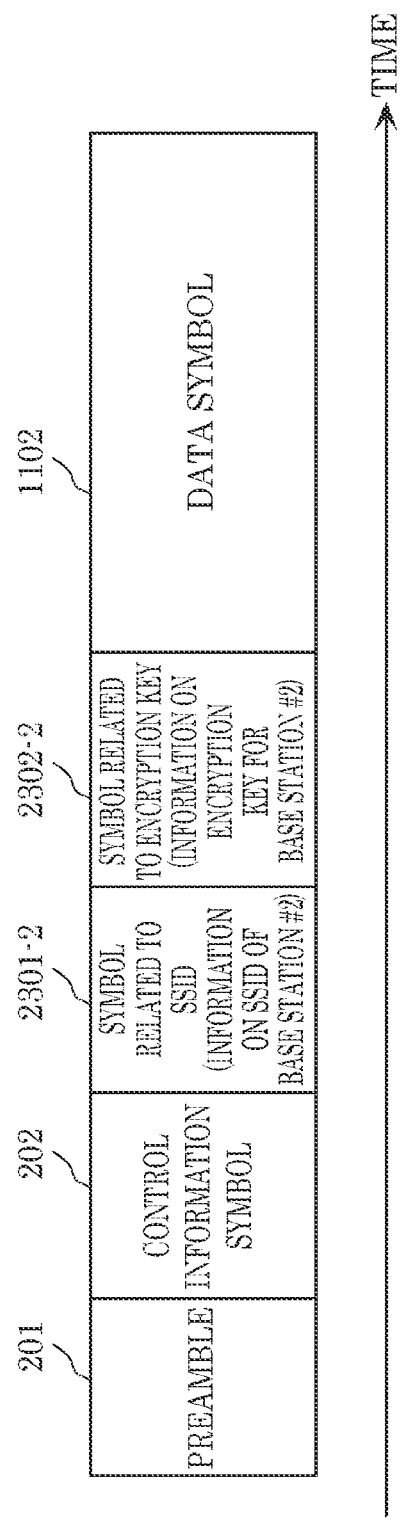
FIG. 29 illustrates a frame configuration example of a modulated signal transmitted by the fifth device according to Embodiment 7.
Figure 30:
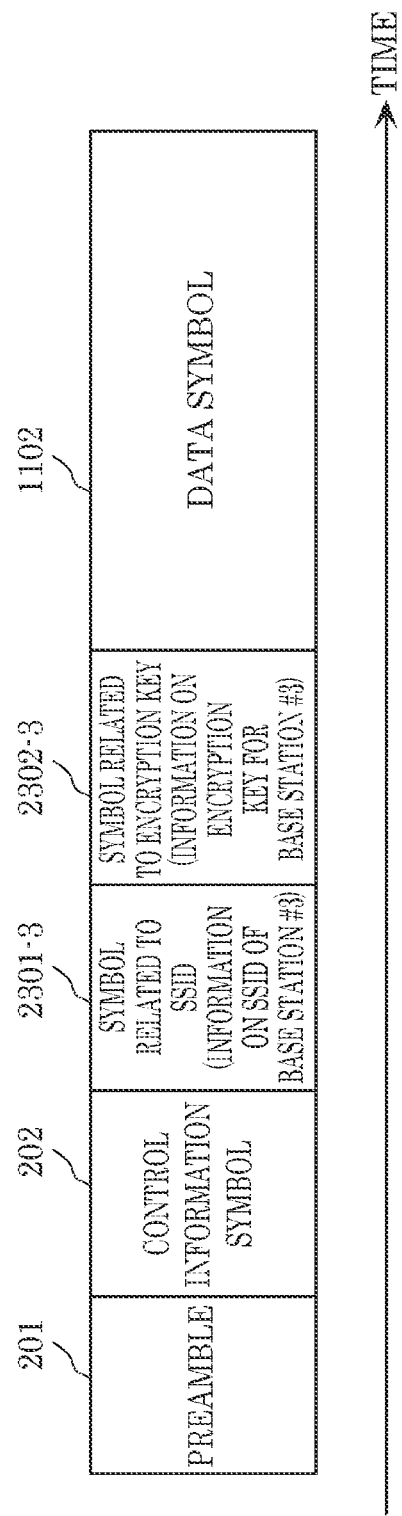
FIG. 30 illustrates a frame configuration example of a modulated signal transmitted by the fifth device according to Embodiment 7.

In the example illustrated in FIG. 27, fifth device 1000 transmits three modulated signals having three different frame configurations. FIG. 28 illustrates frame 2300-1 (frame #1) among the three frame configurations, FIG. 29 illustrates frame 2300-2 (frame #2) among the three frame configurations, and FIG. 30 illustrates frame 2300-3 (frame #3) among the three frame configurations.

FIG. 28 illustrates an example of the configuration of frame 2300-1 (frame #1) of a modulated signal transmitted by fifth device 1000. In FIG. 28, time is represented on the horizontal axis. Moreover, in FIG. 28, symbols that are the same as in FIG. 2 and FIG. 16 share like reference numbers, and repeated description thereof will be omitted. Frame 2300-1 (frame #1) illustrated in FIG. 28 is a frame for transmitting information on the SSID of base station 470-1 (base station #1) in FIG. 27 and information on the encryption key of base station 470-1 (base station #1) in FIG. 27 (the encryption key for accessing base station 470-1).

Symbol 2301-1 related to an SSID is a symbol for transmitting information 1001-1 related to an SSID illustrated in FIG. 27. Moreover, symbol 2301-1 related to an SSID is a symbol for fifth device 1000 in FIG. 27 to transmit the SSID of base station 470-1 (base station #1).

Symbol 2302-1 related to the encryption key is a symbol for transmitting information 1001-2 related to an encryption key illustrated in FIG. 27. Moreover, symbol 2302-1 related to the encryption key is a symbol for fifth device 1000 in FIG. 27 to transmit the encryption key of base station 470-1 (base station #1) (the encryption key for accessing base station 470-1).

Fifth device 1000 transmits preamble 201, control information symbol 202, symbol 2301-1 related to an SSID, symbol 2302-1 related to the encryption key, and data symbol 1102. Note that fifth device 1000 may transmit frame 2300-1 (frame #1) including a symbol other than the symbols illustrated in FIG. 28. Moreover, the configuration of the frame, including the order in which the symbols are transmitted, is not limited to the configuration of frame 2300-1 (frame #1) illustrated in FIG. 28.

FIG. 29 illustrates an example of the configuration of frame 2300-2 (frame #2) of a modulated signal transmitted by fifth device 1000. FIG. 29, time is represented on the horizontal axis. Moreover, in FIG. 29, symbols that are the same as in FIG. 2 and FIG. 16 share like reference numbers, and repeated description thereof will be omitted. Frame 2300-2 (frame #2) illustrated in FIG. 29 is a frame for transmitting information on the SSID of base station 470-2 (base station #2) in FIG. 27 and information on the encryption key of base station 470-2 (base station #2) in FIG. 27 (the encryption key for accessing base station 470-2).

Symbol 2301-2 related to an SSID is a symbol for transmitting information 1001-1 related to an SSID illustrated in FIG. 27. Moreover, symbol 2301-2 related to an SSID is a symbol for fifth device 1000 in FIG. 27 to transmit the SSID of base station 470-2 (base station #2).

Symbol 2302-2 related to the encryption key is a symbol for transmitting information 1001-2 related to an encryption key illustrated in FIG. 27. Moreover, symbol 2302-2 related to the encryption key is a symbol for fifth device 1000 in FIG. 27 to transmit the encryption key of base station 470-2 (base station #2) (the encryption key for accessing base station 470-2).

Fifth device 1000 transmits preamble 201, control information symbol 202, symbol 2301-2 related to an SSID, symbol 2302-2 related to the encryption key, and data symbol 1102. Note that fifth device 1000 may transmit frame 2300-2 (frame #2) including a symbol other than the symbols illustrated in FIG. 29. Moreover, the configuration of the frame, including the order in which the symbols are transmitted, is not limited to the configuration of frame 2300-2 (frame #2) illustrated in FIG. 29.

FIG. 30 illustrates an example of the configuration of frame 2300-3 (frame #3) of a modulated signal transmitted by fifth device 1000. In FIG. 30, time is represented on the horizontal axis. Moreover, in FIG. 30, symbols that are the same as in FIG. 2 and FIG. 16 share like reference numbers, and repeated description thereof will be omitted. Frame 2300-3 (frame #3) illustrated in FIG. 30 is a frame for transmitting information on the SSID of base station 470-3 (base station #3) in FIG. 27 and information on the encryption key of base station 470-3 (base station #3) in FIG. 27 (the encryption key for accessing base station 470-3).

Symbol 2301-3 related to an SSID is a symbol for transmitting information 1001-1 related to an SSID illustrated in FIG. 27. Moreover, symbol 2301-3 related to an SSID is a symbol for fifth device 1000 in FIG. 27 to transmit the SSID of base station 470-3 (base station #3).

Symbol 2302-3 related to the encryption key is a symbol for transmitting information 1001-2 related to an encryption key illustrated in FIG. 27. Moreover, symbol 2302-3 related to the encryption key is a symbol for fifth device 1000 to transmit the encryption key of base station 470-3 (base station #3) (the encryption key for accessing base station 470-3).

Fifth device 1000 transmits preamble 201, control information symbol 202, symbol 2301-3 related to an SSM, symbol 2302-3 related to the encryption key, and data symbol 1102. Note that fifth device 1000 may transmit frame 2300-3 (frame #3) including a symbol other than the symbols illustrated in FIG. 30. Moreover, the configuration of the frame, including the order in which the symbols are transmitted, is not limited to the configuration of frame 2300-3 (frame #3) illustrated in FIG. 30.

Figure 31:
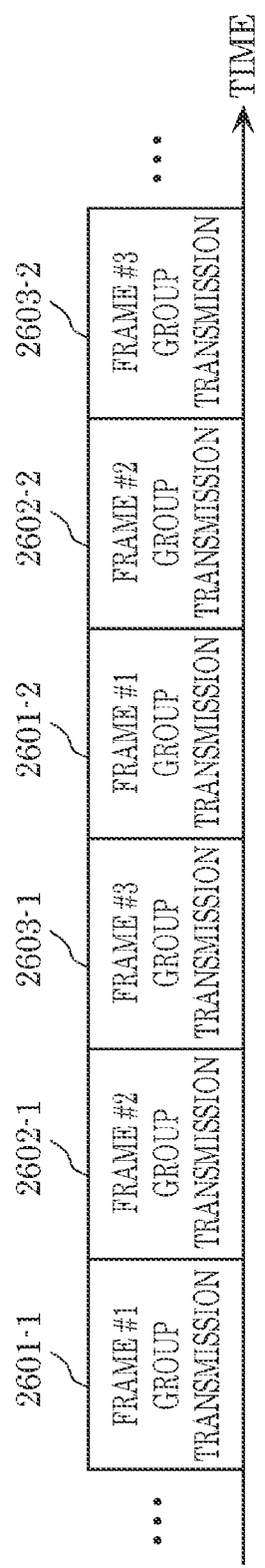
FIG. 31 illustrates one example of a frame transmission method used by the fifth device according to Embodiment 7.

FIG. 31 illustrates an example of a transmission method used when fifth device 1000 transmits frame 2300-1 (frame #1) in FIG. 28, frame 2300-2 (frame #2) in FIG. 29, and frame 2300-3 (frame #3) in FIG. 30. In FIG. 31, time is represented on the horizontal axis.

In FIG. 31, in frame #1 group transmissions of 2601-1 and 2601-2, one or more of frame 2300-1 (frame #1) illustrated in FIG. 28 is transmitted. Moreover, in frame #2 group transmissions of 2602-1 and 2602-2, one or more of frame 2300-2 (frame #2) illustrated in FIG. 29 is transmitted. Moreover, in frame #3 group transmissions of 2603-1 and 2603-2, one or more of frame 2300-3 (frame #3) illustrated in FIG. 30 is transmitted.

Next, this will be described in greater detail.

First, the transmission of one or more of frame 2300-1 (frame #1) illustrated in FIG. 28 in frame #1 group transmissions of 2601-1 and 2601-2 will be described.

For example, when an image sensor such as a CMOS or organic CMOS sensor is used in light receiver 151, it is possible to process reception signals frame by frame of a video or still image. Note that, for example, when a video is labeled "4K 30p", this means that one frame has 3840×2160 pixels, and the number of frames per second is 30.

Accordingly, when fifth device 1000 transmits a modulated signal having a configuration in which frame 2300-1 (frame #1) in FIG. 28, frame 2300-2 (frame #2) in FIG. 29, and frame 2300-3 (frame #3) in FIG. 30 are present, terminal 1050 in FIG. 27 has difficulty in selecting a base station 470 to access from among the plurality of base stations 470-1, 470-2, and 470-3.

In view of this, this embodiment proposes a frame configuration like that illustrated in FIG. 31.
<Method 1-1>

Method 1-1 makes the time period that each of frame #1 group transmissions of 2601-1 and 2601-2 occupies longer than a frame period of a video or still image by including a plurality of frames 2300-1 (frame #1) illustrated in FIG. 28, in frame #1 group transmissions of 2601-1 and 2601-2.

This method makes it possible for terminal 1050 to prevent the reception, from fifth device 1000, of a modulated signal including, in a single frame of a video or still image, frame 2300-1 (frame #1) in FIG. 28, frame 2300-2 (frame #2) in FIG. 29, and frame 2300-3 (frame #3) in FIG. 30, that is to say, a modulated signal including different SSIDs and encryption keys. With this, terminal 1050 illustrated in FIG. 27 can easily select a base station 470 to access from among the plurality of base stations 470-1, 470-2, and 470-3.
<Method 2-1>

Method 2-1 makes the time period that frame 2300-1 (frame #1) in FIG. 28 occupies longer than a frame period of a video or still image.

For example, symbol 2301-1 related to an SSID in FIG. 28 may include a plurality of items of the information on the SSID for base station #1 (i.e., the information on the SSID for base station #1 is repeatedly included), and symbol 2302-1 related to an encryption key may include a plurality of items of the information on the encryption key for base station #1 (the encryption key for connecting with base station #1) the information on the encryption key for base station #1 (the encryption key for connecting with base station #1) is repeatedly included).

This method makes it possible for terminal 1050 to prevent the reception, from fifth device 1000, of a modulated signal including, in a single frame of a video or still image, frame 2300-1 (frame #1) in FIG. 28, frame 2300-2 (frame #2) in FIG. 29, and frame 2300-3 (frame #3) in FIG. 30, that is to say, a modulated signal including different SSIDs and encryption keys. With this, terminal 1050 illustrated can easily select a base station 470 to access from among the plurality of base stations 470-1, 470-2, and 470-3.

Similarly, frame #2 group transmissions of 2602-1 and 2602-2 may have the following configurations.
<Method 1-2>

Method 1-2 makes the time period that frame #2 group transmission occupies longer than a frame period of a video or still image by including a plurality of frames 2300-2 (frame #2) illustrated in FIG. 29, in each of frame #2 group transmissions of 2602-1 and 2602-2.
<Method 2-2>

Method 2-2 makes the time period that frame 2300-2 (frame #2) in FIG. 29 occupies longer than a frame period of a video or still image.

For example, symbol 2301-2 related to an SSID in FIG. 29 may include a plurality of items of the information on the SSID for base station #2 (i.e., the information on the SSID for base station #2 is repeatedly included), and symbol 2302-2 related to an encryption key may include a plurality of items of the information on the encryption key for base station #2 (the encryption key for connecting with base station #2) (i.e., the information on the encryption key for base station #2 (the encryption key for connecting with base station #2) is repeatedly included).

Similarly, frame #3 group transmissions of 2603-1 and 2603-2 may have the following configurations.
<Method 1-3>

Method 1-3 makes the time period that frame #3 group transmission occupies longer than a frame period of a video or still image by including a plurality of frames 2300-3 (frame #3) illustrated in FIG. 30, in each of frame #3 group transmissions of 2603-1 and 2603-2.
<Method 2-3>

Method 2-3 makes the time period that frame 2300-3 (frame #3) in FIG. 30 occupies longer than a frame period of a video or still image.

For example, symbol 2301-3 related to an SSID in FIG. 30 may include a plurality of items of the information on the SSID for base station #3 the information on the SSID for base station #3 is repeatedly included), and symbol 2302-3 related to an encryption key may include a plurality of items of the information on the encryption key for base station #3 (the encryption key for connecting with base station #3) (i.e., the information on the encryption key for base station #3 (the encryption key for connecting with base station #3) is repeatedly included).

Next, the advantageous effects achieved when fifth device 1000 transmits frames like those in FIG. 28 through FIG. 31 will be described.

Figure 32:
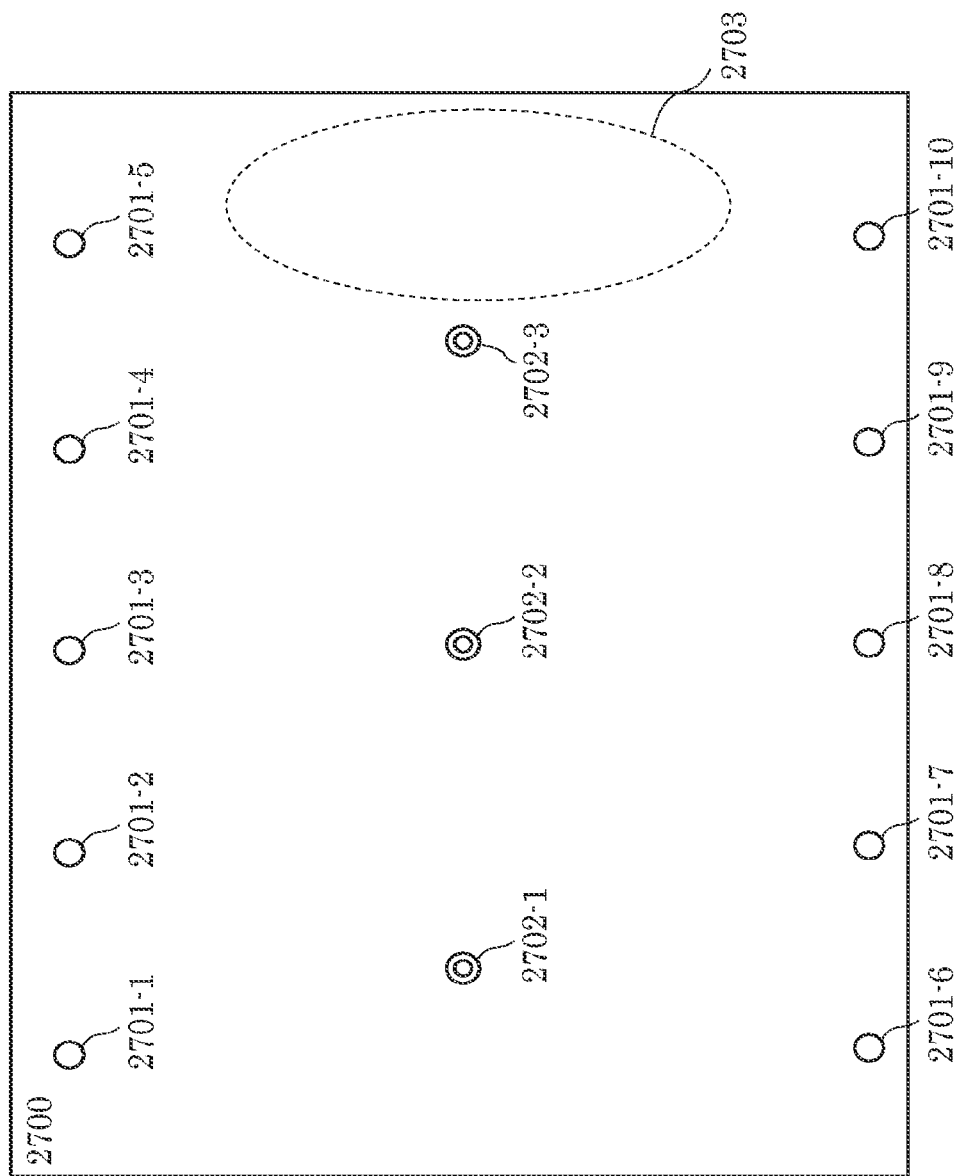
FIG. 32 illustrates one example of a space in which the communication system according to Embodiment 7 is disposed.

As one example, consider area 2700 in FIG. 32. In FIG. 32, fifth devices 1000 are disposed at circles 2701-1, 2701-2, 2701-3, 2701-4, 2701-5, 2701-6, 2701-7, 2701-8, 2701-8, 2701-9, and 2701-10. Moreover, base station 470-1 (base station #1) is disposed at double circle 2702-1, base station 470-2 (base station #2) is disposed at double circle 2702-2, and base station 470-3 (base station #3) is disposed at double circle 2702-3.

For example, 99 terminals having the same configuration as terminal 1050 (hereinafter, each of these terminals is simply referred to as terminal 1050) are present in the area indicated as 2703.

Here, for example, fifth devices 1000 disposed at circles 2701-5 and 2701-10 both transmit information on the SSID of base station 470-3 (base station #3) and information on the encryption key for access to base station 470-3 (base station #3). This is because the base station closest to the positions of circles 2701-5 and 2701-10 is base station 470-3 (base station #3).

In such cases, all 99 of terminals 1050 will access base station 470-3 (base station #3). This means there is a high probability that terminals 1050 will have difficulty accessing base station 470-3 (base station #3) due to congestion.

Taking this point into consideration, by making it so that the 99 terminals 1050 access base station 470-1 (base station #1) (position of double circle 2702-1), base station 470-2 (base station #2) (position of double circle 2702-2), and base station 470-3 (base station #3) (position of double circle 2702-3) as evenly as possible, it is possible to achieve a reduction in terminals 1050 having difficulty accessing a base station 470, as described above.

For example, since the 99 terminals 1050 typically access fifth device 1000 at different timings, when fifth device 1000 transmits a frame, such as those illustrated in FIG. 28 through FIG. 31 in this embodiment, depending on the timing that each of the 99 terminals 1050 accesses fifth device 1000, a single SSID and a single encryption key for one of base stations 470-1, 470-2, or 470-3 are obtained. With this, control is performed such that the 99 terminals 1050 access base stations 470-1, 470-2, or 470-3 as evenly as possible. Accordingly, the above described reduction in terminals 1050 having difficulty accessing a base station 470 can be achieved.

Note that FIG. 31 illustrates an example of a transmission method used when fifth device 1000 transmits frame 2300-1 (frame #1) in FIG. 28, frame 2300-2 (frame #2) in FIG. 29, and frame 2300-3 (frame #3) in FIG. 30. However, the transmission method used when fifth device 1000 transmits frame 2300-1 (frame #1) in FIG. 28, frame 2300-2 (frame #2) in FIG. 29, and frame 2300-3 (frame #3) in FIG. 30 is not limited to this example.

For example, in FIG. 31, the order of frame #1 group transmission, frame #2 group transmission, and frame #3 group transmission by fifth device 1000 is repeated, but the order in which frame #1 group transmission, frame #2 group transmission, and frame #3 group transmission are transmitted is not limited to the example given in FIG. 31, For example, the transmission of frame group 1, the transmission of frame group #2, and the transmission of frame group #3 by fifth device 1000 may be temporally randomized, and, alternatively, the order of the transmission of frame group 1, the transmission of frame group #2, and the transmission of frame group #3 may be a regular order different than the example given in FIG. 31. It is sufficient so long as fifth device 1000 transmits frame #1 group, frame #2 group, and frame #3 group.

Moreover, in FIG. 31, frame #1 group transmission, frame #2 group transmission, and frame #3 group transmission by fifth device 1000 are exemplified as being performed consecutively, but these transmissions do not necessarily need to be performed consecutively. For example, in FIG. 31, there may be a time interval between frame #1 group transmission 2601-1 and frame #2 group transmission 2602-2.

In FIG. 31, the example includes only frame #1 group transmission, frame #2 group transmission, and frame #3 group transmission, but other symbols and/or frames may be included. Furthermore, in FIG. 31 and FIG. 27, there are three base stations 470, but the number of base stations 470 is not limited to this example. Operations in cases in which there are two or more base stations 470 are the same as the example in which there are three base stations 470, Accordingly, for example, when there are N base stations 470 (N is an integer greater than or equal to two), when transmission such as that illustrated in FIG. 31 is performed by fifth device 1000, frame #k group transmission is performed. Note that k is an integer greater than or equal to one and less than or equal to N. Then, in the transmission of frame #k group, there is a symbol related to an SSID (information on the SSID of base station #k) and a symbol related to an encryption key (information on an encryption key for accessing base station #k).

The frame configuration of the modulated signal transmitted by wireless communication device 453 included in terminal 1050 illustrated in FIG. 27 is the same as the frame configuration illustrated in FIG. 17 and described in Embodiment 4. In other words, as illustrated in FIG. 17, wireless communication device 453 included in terminal 1050 and illustrated in FIG. 27 transmits, for example, preamble 1201, and thereafter transmits control information symbol 1202 and information symbol 1203.

Preamble 1201 is a symbol for base stations 470-1, 470-2, and 470-3 that receive the modulated signal transmitted by wireless communication device 453 in terminal 1050 to perform, for example, signal detection, time synchronization, frame synchronization, frequency synchronization, and/or frequency offset estimation, etc.

Control information symbol 1202 is, for example, a symbol including, for example, information related to the error correction encoding method and/or modulation scheme used in the generation of the modulated signal, information related to the frame configuration, and information related to transmission method. Based on information on control information symbol 1202, base stations 470-1, 470-2, and 470-3 implement, for example, demodulation of the modulated signal.

Information symbol 1203 is a symbol for wireless communication device 453 in terminal 1050 to transmit data.

Note that wireless communication device 453 in terminal 1050 illustrated in FIG. 27 may transmit a frame including symbols other than those illustrated in FIG. 17 (for example, a frame including a pilot symbol (reference symbol) between information symbols 1203). Moreover, the configuration of the frame, including the order in which the symbols are transmitted, is not limited to the configuration illustrated in FIG. 17. In other words, in FIG. 17, a plurality of symbols may be present along the frequency axis, that is, symbols may be present on a plurality of frequencies (a plurality of carriers).

The frame configuration of the modulated signal transmitted by base stations 470-1, 470-2, and 470-3 illustrated in. FIG. 27 is the same as the frame configuration illustrated in FIG. 12 and described in Embodiment 3. In other words, as illustrated in FIG. 12, base stations 470-1, 470-2, and 470-3 transmit, for example, preamble 701, and thereafter transmit control information symbol 702 and information symbol 703.

Preamble 701 is a symbol for wireless communication device 453 in terminal 1050 that receives the modulated signal transmitted by base stations 470-1, 470-2, and 470-3 to perform, for example, signal detection, time synchronization, frame synchronization, frequency synchronization, and/or frequency offset estimation, etc.

Control information symbol 702 is, for example, a symbol including, for example, information related to the error correction encoding method and/or modulation scheme used in the generation of the modulated signal, information related to the frame configuration, and information related to transmission method. Based on information on control information symbol 702, wireless communication device 453 in terminal 1050 implements, for example, demodulation of the modulated signal.

Information symbol 703 is a symbol for base stations 470-1, 470-2, and 470-3 to transmit data.

Note that base stations 470-1, 470-2, and 470-3 may transmit a frame including symbols other than the symbols illustrated in FIG. 12. For example, base stations 470-1, 470-2, and 470-3 may transmit a frame including a pilot symbol (reference symbol) between information symbols 703. Moreover, the configuration of the frame, including the order in which the symbols are transmitted, is not limited to the configuration illustrated in FIG. 12. In FIG. 12, a plurality of symbols may be arranged along the frequency axis. In other words, in FIG. 12, symbols may be present on a plurality of frequencies (a plurality of carriers).

Figure 33:
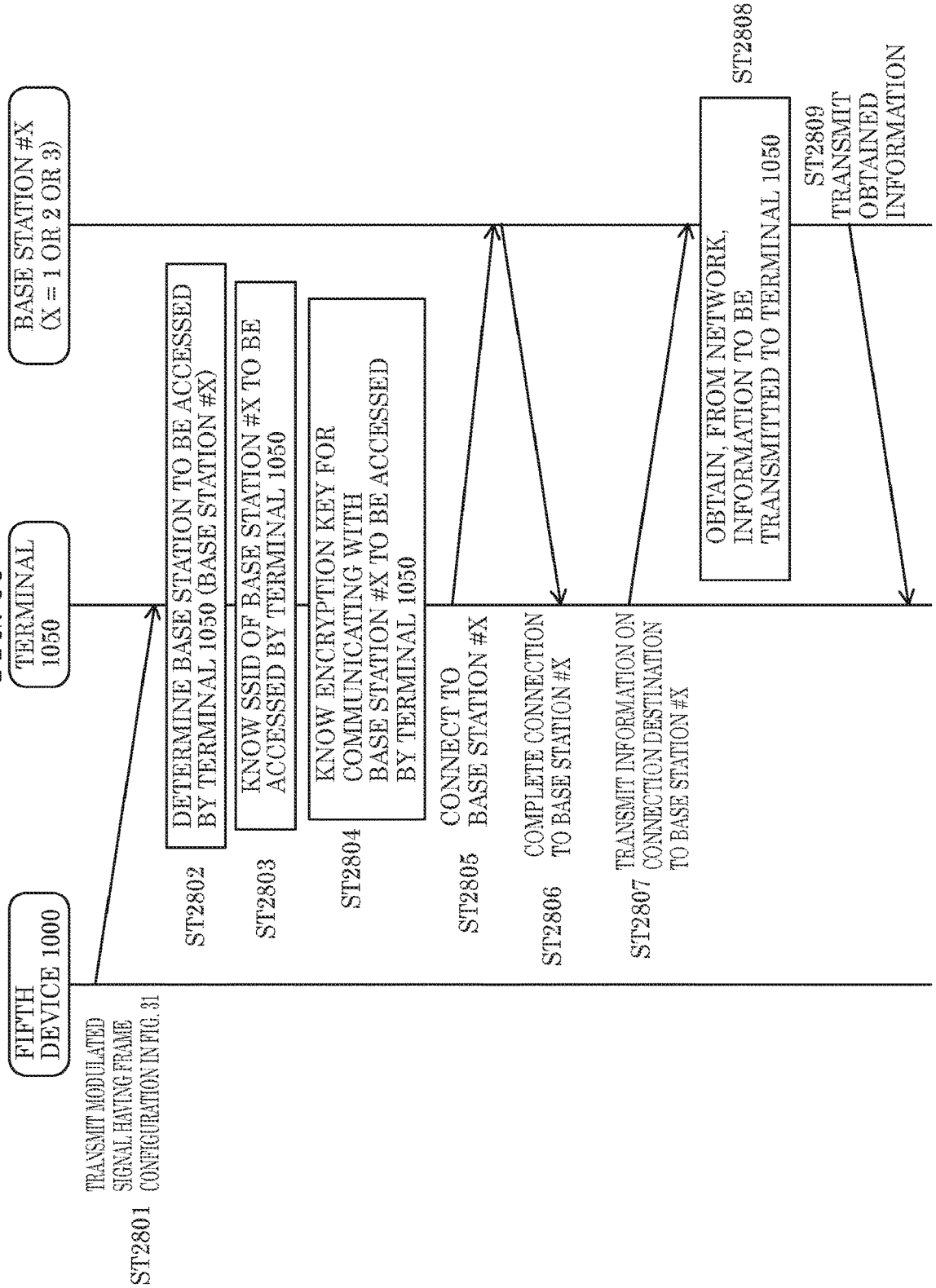
FIG. 33 is a flow chart illustrating an example of processes performed in the communication system according to Embodiment 7.

FIG. 33 is a flow chart illustrating one example of processes implemented by fifth device 1000, terminal 1050, and base station #X. Note that X is equal to 1, 2, or 3.

First, fifth device 1000 transmits a modulated signal having the frame configuration illustrated in FIG. 31 (ST2801).

Terminal 1050 receives the modulated signal transmitted by fifth device 1000, and selects a base station to access from among base station 470-1 (base station #1), base station 470-2 (base station #2), and base station 470-3 (base station #3) in FIG. 27 (ST2802).

Next, this point will be described. Terminal 1050 receives the modulated signal transmitted by fifth device 1000 in order to access any one of base stations 470. Here, terminal 1050 obtains any one of frame #1 group transmission, frame #2 group transmission, and frame #3 group transmission illustrated in FIG. 31, in a single frame of a video or still image. Terminal 1050 then determines which of base station 470-1 (base station #1), base station 470-2 (base station #2), base station 470-3 (base station #3) to access, based on the obtained base station information (for example, an SSID).

Next, terminal 1050 obtains the SSID of base station #X to be accessed by terminal 1050 by receiving the modulated signal transmitted by fifth device 1000 (ST2803).

Terminal 1050 also obtains the encryption key to be used in communication with base station #X to be accessed by terminal 1050 (ST2804).

Terminal 1050 then connects with base station #X over radio waves (ST2805). Terminal 1050 completes the connection with base station #X over radio waves by receiving a response from base station #X (ST2806).

Terminal 1050 then transmits information on the connection destination to base station #X using radio waves (ST2807).

Base station #X obtains information for transmitting to terminal 1050 from the network (ST2808).

Base station #X then transmits the obtained information to terminal 1050 using radio waves, and terminal 1050 obtains the information (ST2809). When necessary, terminal 1050, for example, obtains required information from the network via base station #X.

As described above, based on the information on the SSID and information on the encryption key transmitted from fifth device 1000, terminal 1050 connects with base station 470 and obtains information to securely obtain information from base station 470, whose security has been authenticated. This is because, when information from a visible light modulated signal is obtained, since it is visible light, it possible for the user to easily determine whether the source of information is secure or not. Conversely, for example, when the SSID is obtained from a modulated signal transmitted over radio waves via a wireless LAN, it is difficult for the user to determine which device transmitted the radio waves. Accordingly, from the viewpoint of ensuring information security, obtaining the SSID via visible light communication is more suitable than wireless LAN communication.

Note that in this embodiment, a configuration in which fifth device 1000 transmits encryption key information has been described. However, for example, when base station 470 does not perform encrypted communication using an encryption key, fifth device 1000 may transmit only SSID information, without transmitting encryption key information. In such cases, the present disclosure can be implemented in the same manner simply by removing the configuration related to an encryption key from the above configurations.

Moreover, the configuration of the fifth device is not limited to the configuration of fifth device 1000 illustrated in FIG. 27, the configuration of the terminal is not limited to the configuration of terminal 1050 illustrated in FIG. 27, and the connection destination and configuration of base stations #1, #2, and #3 are not limited to the connection destination and configuration of base stations 470-1, 470-2, and 470-3 illustrated in FIG. 27.

Accordingly, with this embodiment, the above described reduction in terminals 1050 having difficulty accessing a base station 470 can be achieved even when a plurality of terminals 1050 are present in a given area.

Note that in FIG. 32, the frame configurations of the modulated signals transmitted by the fifth devices 1000 disposed at circles 2701-1, 2701-2, 2701-3, 2701-4, 2701-5, 2701-6, 2701-7, 2701-8, 2701-8, 2701-9, and 2701-10 may all be the same as illustrated in FIG. 31, the frame configurations of the modulated signals transmitted by fifth devices 1000 may be mutually different, and two or more of the fifth devices 1000 may transmit modulated signals having the same frame configuration.

Embodiment 8

In this embodiment, a case in which a communication method using optical signals is combined with image processing will described as one example of an application of a communication method using optical signals described above. The communication system according to this embodiment is applicable to, for example, communication between two automobiles (intervehicle communication), and communication between an automobile and a communication device disposed on the road or in the vicinity thereof (road-automobile communication).

First, a basic description of the basic structure according to this embodiment will be given. Note that the application of this basic configuration is not limited to an automobile; the basic configuration can be applied to a mobile terminal such as a smartphone or notebook PC, as well as to other electronic devices.

Figure 34:
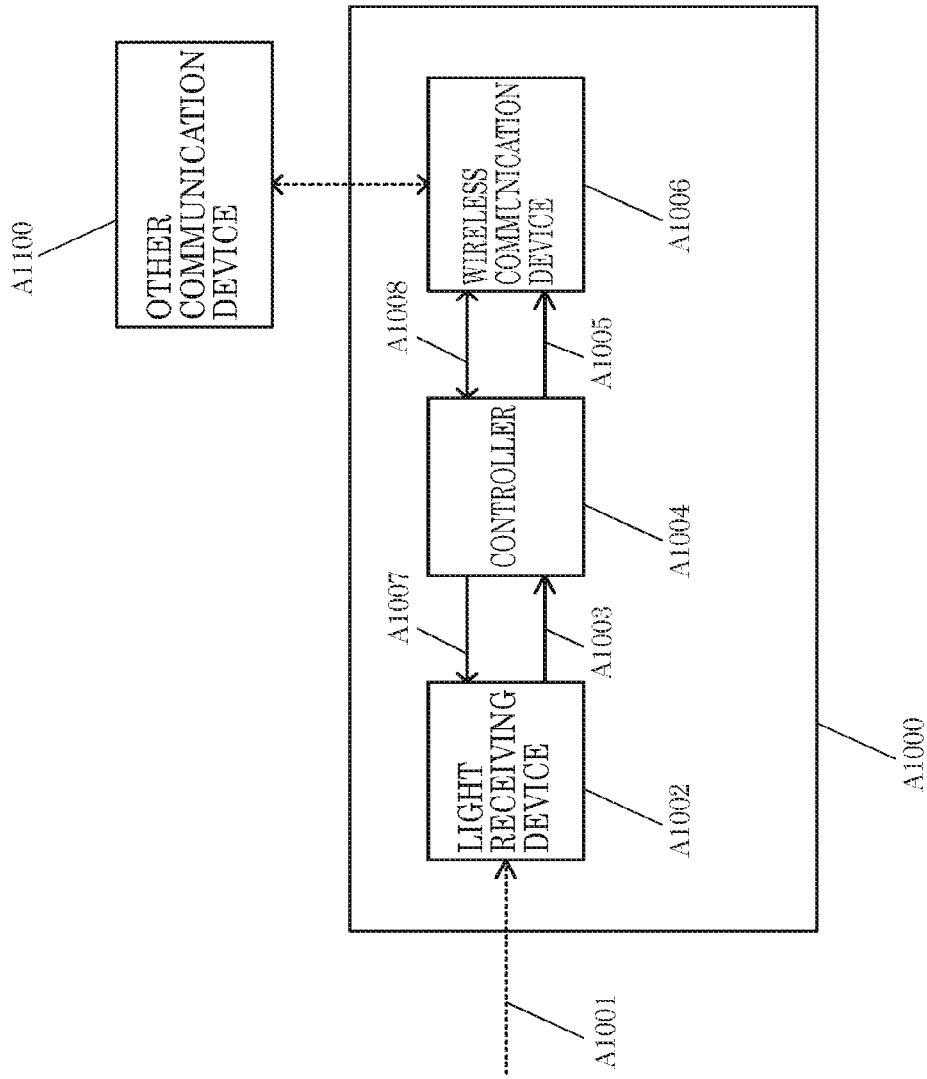
FIG. 34 illustrates a configuration example of a communication device according to Embodiment 8.

FIG. 34 is a block diagram illustrating the configuration of communication device A1000, which is one example of the communication device according to this embodiment. Communication device A1000 includes light receiving device A1002, controller A1004, and wireless communication device A1006.

Light receiving device A1002 receives optical signal A1001 emitted from a transmitter not illustrated in the drawings, and/or captures a sill image or video, and outputs optically received data A1003. Controller A1004, for example, controls other devices included in communication device A1000, and processes optically received data A1003 input from light receiving device A1002 and/or wireless communication reception data input from wireless communication device A1006. Wireless communication device A1006 wirelessly connects to other communication device A1100 based on control signal A1005 from controller A1004 and performs wireless communication for the transmission of wireless communication transmission data and the reception of wireless communication reception data. Wireless communication transmission data and wireless communication reception data are transmitted and received between wireless communication device A1006 and controller A1004 as wireless communication data A1008. Controller A1004 outputs control signal A1007 for controlling operation of light receiving device A1002, and light receiving device A1002 operates according to control signal A1007.

When optically received data. A1.003 generated by light receiving device A1002 includes still image data or video data, controller A1004 may perform image processing using the still image data or video data. An example of the image processing performed by controller A1004 will be given in greater detail later on.

Figure 35:
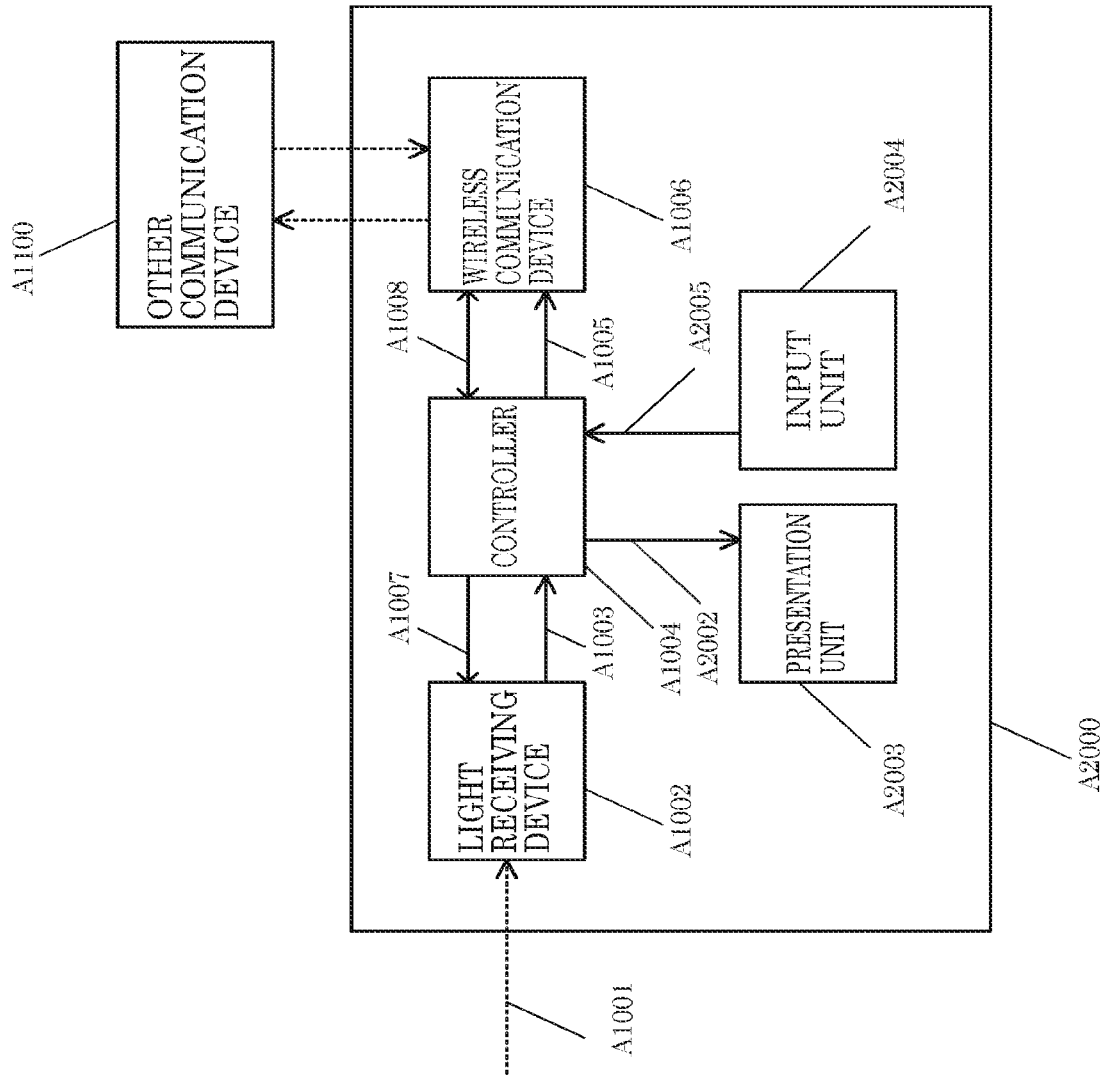
FIG. 35 illustrates another configuration example of the communication device according to Embodiment 8.

FIG. 35 is a block diagram illustrating the configuration of communication device A2000, which is another example of the communication device according to this embodiment. In FIG. 35, elements having the same functions as those in communication device A1000 illustrated in FIG. 34 share like reference signs, and repeated description thereof is omitted. Communication device A2000 differs from communication device A1000 in regard to the inclusion of presentation unit A2003 and input unit A2004.

Controller A1004 generates an image based on, for example, optically received data A1003 and/or wireless communication reception data or some other input information, and information read from memory, and outputs the generated image to presentation unit A2003 as presentation information A2002. For example, presentation information A2002 is, but not limited to, information including image information and/or text information generated based on optically received data A1003 or some other data, and for example, presentation unit A2003 is, but not limited to, a liquid crystal display, plasma display, or organic EL display that displays an image signal generated from the image information and/or text information obtained as the presentation information A2002. For example, presentation information A2002 may be sound information, and presentation unit A2003 may be a speaker that outputs sound in accordance with the sound information. In accordance with an operation made by a user, input unit A2004 outputs, to controller A1004, input information A2005, which is, for example, information indicating the operation performed by the user and/or information indicating text input by the user.

For example, input unit A2004 is, but not limited to, a touch panel, physical key(s), floating touch display, and/or motion sensor. For example, input unit A2004 may be a microphone and input information A2005 may be sound information.

Next, the configuration of light receiving device A1002 will be described in greater detail.

Figure 36:
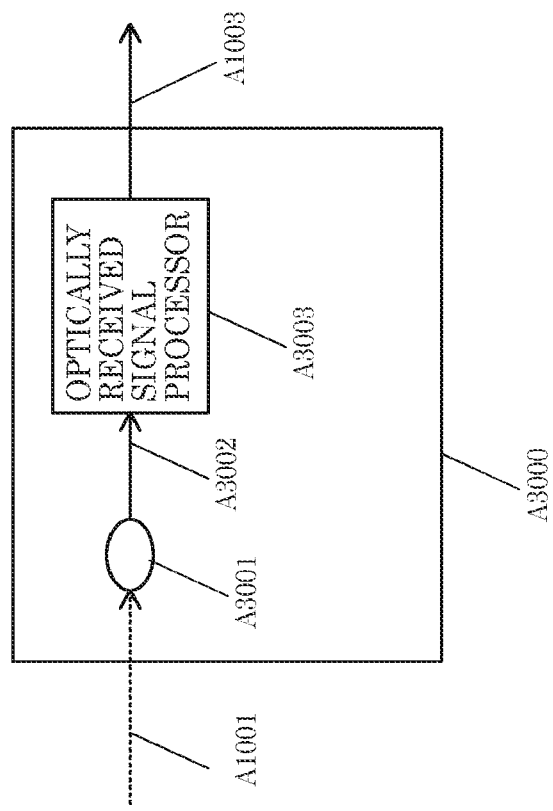
FIG. 36 illustrates a first configuration example of a light receiving device according to Embodiment 8.

FIG. 36 is a block diagram illustrating the configuration of light receiving device A3000, which is a first example of a detailed configuration of light receiving device A1002 according to this embodiment.

Light receiving device A3000 includes light receiver A3001 and optically received signal processor A3003. Light receiver A3001 has, for example, the same configuration as light receiver 151 illustrated in FIG. 6, receives light emitted from an external source, and outputs reception signal A3002. Optically received signal processor A3003 applies predetermined processing to reception signal A3002, and transmits the resulting signal as optically received data A1003.

In one example, the predetermined processing applied to reception signal A3002 by optically received signal processor A3003 includes processing such as demodulating and error correction decoding of components in a modulated signal included in reception signal A3002, and demodulated data A4002 resulting from the demodulation is output as optically received data A1003. In another example, as the predetermined processing, optically received signal processor A3003 generates still image data or video data from reception signal A3002 obtained by light receiver A3001, which is an image sensor such as a CMOS or organic CMOS image sensor, and outputs the generated still image data or video data as optically received data A1003. Here, the still image data or video data may be encoded data encoded using an image compression method or video compression method, and may be uncompressed data. Hereinafter, an example of the configuration of optically received signal processor A3003 will be described in greater detail.

Figure 37:
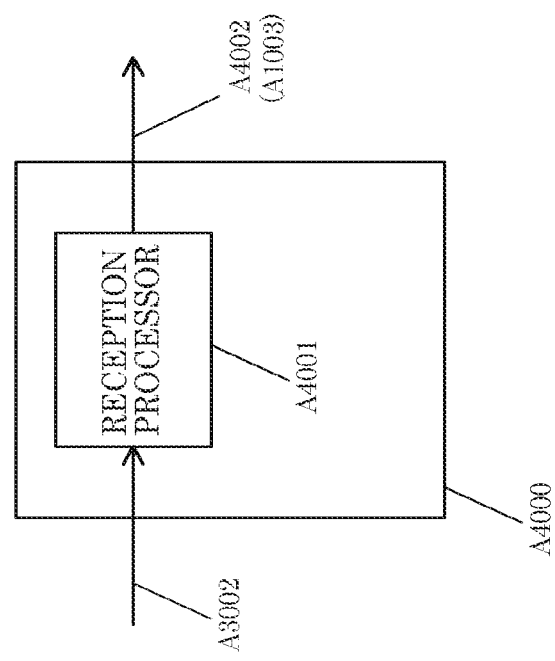
FIG. 37 illustrates a first configuration example of an optically received signal processor according to Embodiment 8.

FIG. 37 illustrates the configuration of optically received signal processor A4000, which is one example of a configuration of optically received signal processor A3003. Optically received signal processor A4000 includes reception processor A4001. Reception processor A4001 implements processing such as demodulation and/or error correction on reception signal A3002, and outputs the resulting demodulated data A4002 as optically received data A1003. Reception signal A3002 inputted into optically received signal processor A4000 may be, for example, in the case of the above-described line scan sampling implementation example, a signal obtained by an image sensor such as a CMOS sensor using a sampling method receiving optical signals such as sampling by frame, and may be a signal sampled at a sampling rate required for reception of optical signals, using an element different from an image sensor that can convert optical signals into electrical signals, such as a photodiode.

Figure 38:
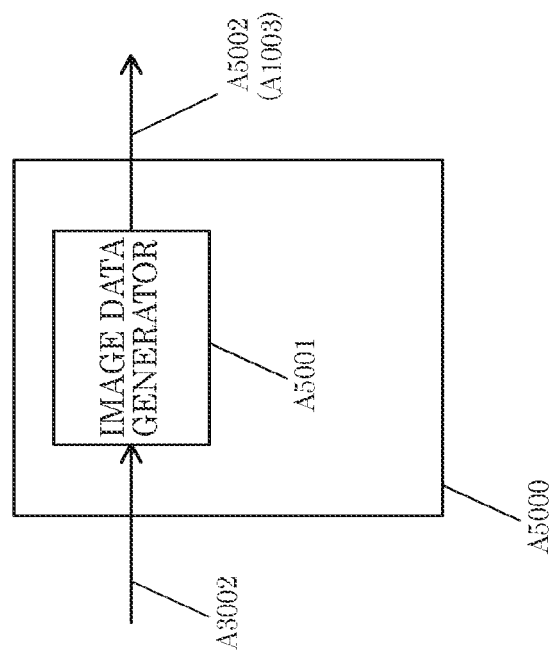
FIG. 38 illustrates a second configuration example of the optically received signal processor according to Embodiment 8.

FIG. 38 illustrates the configuration of optically received signal processor A5000, which is another example of a configuration of optically received signal processor A3003. Optically received signal processor A5000 includes image data generator A5001, and outputs, as optically received data A1003, image data A5002 including optical signal information. In other words, image data generator A5001 generates still image data or video data from reception signal A3002, and outputs image data A5002, which is the generated still image data or video data, as optically received data A1003.

In the following description, for ease of explanation, unless otherwise noted, image data A5002 shall be assumed to be video data. However, it goes without saying that the present disclosure can be implemented in the same manner even if "video data" is rewritten as "still image data" or "a combination of video data and still image data" in the following description.

When light receiving device A1002 includes optically received signal processor A5000, light receiver A3001 is an image sensor such as a CMOS sensor. For example, light receiving device A1002 controls operation of light receiver A3001, obtains reception signal A3002 using a sampling method for receiving optical signals in the first period illustrated in FIG. 39 and obtains reception signal A3002 using an imaging method for capturing video in the second period illustrated in FIG. 39.

Hereinafter, a signal obtained using the sampling method for receiving optical signals will be referred to as an imaging signal for optical communication, and a signal obtained using the imaging method for capturing video will be referred to as an imaging signal for video. Moreover, the data generated by image data generator A5001 based on the imaging signal for optical communication will be referred to as imaging data for optical communication, and data generated by image data generator A5001 based on the imaging signal for video will be referred to as imaging data for video.

Figure 39:
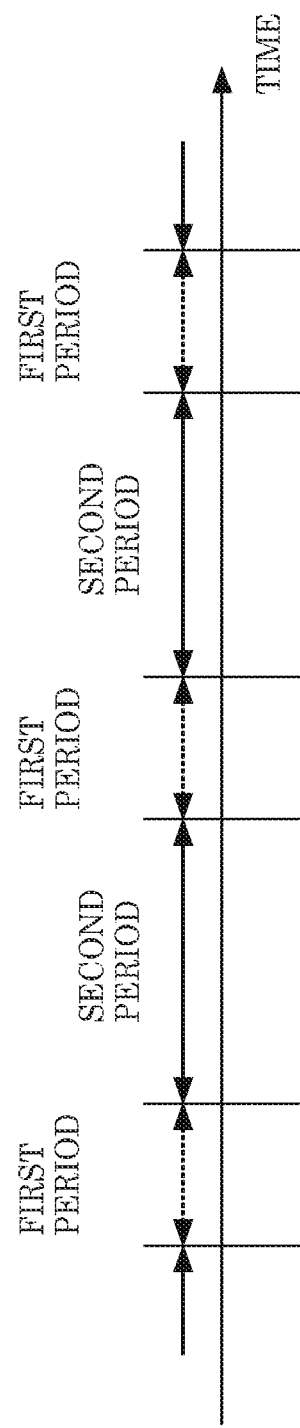
FIG. 39 illustrates an example of control of an image sensor according to Embodiment 8.

FIG. 39 illustrates one example of a control method of an image sensor in a case in which both the imaging signal for optical communication and the imaging signal for video are obtained by a single image sensor using time-division. Light receiving device A1002 obtains an imaging signal for optical communication using a sampling method for receiving optical signals via light receiver A3001 in the first period in FIG. 39, and obtains an imaging signal for video using an imaging method for capturing video via the light receiver A3001 in the second period in FIG. 39.

Here, each of the first period and the second period is a period corresponding to one or more frames in a video. However, light receiving device A1002 may switch between the sampling method for receiving optical signals and the imaging method for capturing video out of sync with the video frames. Light receiving device A1002 may arrange the first periods cyclically or non-cyclically. Moreover, rules for arranging the first periods such as the cycle at which the first periods are arranged may be changed dynamically.

Note that light receiving device A1002 may determine the start and end times of the first periods based on a signal input from an external source. For example, light receiving device A1002 controls operation of light receiver A3001 based on control signal A1007 input from controller A1004. Here, controller A1004 may output a control signal for controlling operation of light receiver A3001 based on a signal received using a communication method such as wireless communication, wired communication, or optical communication from a transmission device external to communication device A1000 or A2000, or data obtained from a sensor such as an image sensor included in communication device A1000 or A2000.

Control information for controlling operation of light receiver A3001 may be, for example, a signal specifying a rule for arranging the first periods and second periods, or a signal instructing light receiver A3001, which normally obtains imaging signals for videos using the imaging method for capturing video, to temporarily or continuously obtain imaging signals for optical communication using the sampling method for receiving optical signals. An example of this will be given later in greater detail.

Note that in the above description, the first period and the second period are exemplified as being arranged alternately, but the control method of the image sensor is not limited to this example. For example, a third period may be arranged that operates the CMOS sensor using an imaging method or a sampling method different from the methods employed in the first period and second period, and a transition period for switching operation of the image sensor may be implemented between the first period and the second period.

Depending on the control method of the image sensor, it is possible to use a single image sensor to obtain both imaging signals for optical communication and imaging signals for video using time-division. As a result, it is possible to reduce the number of image sensors included in the communication device.

Note that light receiving device A1002 may operate light receiver A3001 using the sampling method for receiving optical signals at all times to obtain reception signal A3002.

Upon generating video data A5002, image data generator A5001 may implement encoding processing using a video compression method on a video signal configured of frames generated based on reception signal A3002.

For example, when reception signal A3002 includes both an imaging signal for optical communication and an imaging signal for video, image data generator A5001 may implement video compression processing on a frame generated from the imaging signal for video, excluding images (or frames) generated from the imaging signal for optical communication. Here, light receiving device A1002 outputs, as optically received data A1003, the encoded video data, as well as image data generated from the imaging signal for optical communication.

In the above description, the imaging signal for optical communication is exemplified as being output from light receiving device A1002 as image data, but the imaging signal for optical communication may be output from light receiving device A1002 as data in any format so long as the format allows for demodulation of optical signals. For example, the data may be data arranged in order of an average or gum of luminance values of pixels included in each exposure line or an average or sum of luminance values of pixels included in each of regions into which each pixel line is divided.

Note that the video encoding processing that can be implemented by image data generator A5001 when reception signal A3002 includes the imaging signal for optical communication and the imaging signal for video is not limited to the above-described video encoding processing. For example, image data generator A5001 may implement a common video compression processing on a video including frames configured of imaging signals for optical communication and frames configured of imaging signals for video, and light receiving device A1002 may output, as optically received data A1003, encoded video data generated from imaging signals for optical communication and imaging signals for video.

Next, operations performed by controller A1004 in a case in which light receiving device A1002 includes a configuration of optically received signal processor A5000.

When light receiving device A1002 includes a configuration of optically received signal processor A5000, light receiving device A1002 does not perform processing such as demodulation and error correction on imaging data for optical communication. Accordingly, controller A1004 implements processing such as demodulation and error correction on an optical signal using imaging data for optical communication included in optically received data A1003, and obtains data transmitted via the optical signal.

Note that when optically received data A1003 includes imaging data for video in addition to imaging data for optical communication, controller A1004 may perform, in addition to processing such as demodulation and error correction on the optical signal included in imaging data for optical communication, image processing such as pattern recognition on the imaging data for video, and may further control light receiving device A1002 and/or wireless communication device A1006 based on the result of the image processing such as pattern recognition.

Examples of signal processing using imaging data for video include processing of detecting a body part of a person such as the face, processing of distinguishing between people, processing of detecting a target such as a vehicle or drone, processing of distinguishing between targets such as vehicles and drones, processing of detecting movement or displacement of a detected person or target, and processing of tracking a detected person or target. These processes may be performed by extracting, from imaging data for video, feature amounts determined depending on the intended use of the signal processing and using the extracted feature amounts, and may be performed in a model generated by machine learning using a multilayer neural network. Note that when a model generated by machine learning using a multilayer neural network is used, the imaging data for video may first be preprocessed, and then the preprocessed data may be input into the model generated by machine learning using a multilayer neural network.

Note that in the above description, imaging data for video is used in the signal processing performed by controller A1004, but sound data and/or other data obtained from, for example, a sensor may be used in addition to the imaging data for video, and sound data and/or other data obtained from, for example, a sensor may be used instead of the imaging data for video.

Moreover, when light receiving device A1002 includes a configuration of optically received signal processor A5000 and light receiving device A1002 outputs encoded video data as optically received data A1003, controller A1004 may perform, as the above-described signal processing or part of the signal processing, video decoding processing corresponding to the video encoding processing, on the encoded video data included in optically received data A1003.

Next, an example of the configuration of optically received signal processor A3003 will be given.

Figure 40:
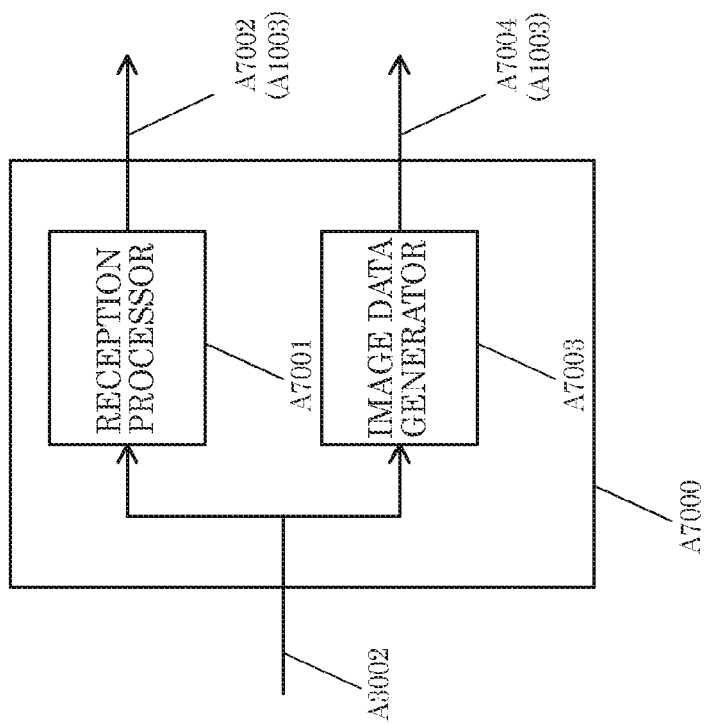
FIG. 40 illustrates a third configuration example of the optically received signal processor according to Embodiment 8.

FIG. 40 illustrates the configuration of optically received signal processor A7000, which is a third example of a configuration of optically received signal processor A3003. Optically received signal processor A7000 includes reception processor A7001 and image data generator A7003.

Reception processor A7001 included in optically received signal processor A7000 includes the same functions as reception processor A4001 included in optically received signal processor A4000 described with reference to FIG. 37.

Image data generator A7003 included in optically received signal processor A7000 includes the same functions as image data generator A5001 included in optically received signal processor A5000 described with reference to FIG. 38.

When light receiving device A1002 includes optically received signal processor A7000, light receiving device A1002 controls light receiver A3001 and obtains an imaging signal for video and an imaging signal for optical communication as reception signal A3002. Optically received signal processor A7000 inputs the imaging signal for video into image data generator A7003, and inputs the imaging signal for optical communication into reception processor A7001. However, it goes without saying that optically received signal processor A7000 may input the imaging signal for optical communication into image data generator A5001.

Optically received signal processor A7000 outputs, as optically received data A1003, demodulated data A7002 and video data A7004.

Here, appended information such as time information indicating the time of reception of modulated signal corresponding to the demodulated data, or metadata, may be appended to demodulated data A7002. Here, time information appended to demodulated data A7002 may be in a format that allows for the relationship between this information and the time information appended to video data A7004 to be distinguished. For example, optically received signal processor A7000 may append the time information for demodulated data A7002 and the time information for video data A7004 based on a common clock signal or time line, and information indicating the relationship between the time information for demodulated data A7002 and the time information for video data A7004, such as information indicating the offset between the time information for demodulated data A7002 and the time information for video data A7004, may be included in the time information for demodulated data A4002 and the time information for video data A5002.

Moreover, demodulated data A7002 may include, as appended information or meta data, position information indicating a position, in an image, of the transmission device or light source that transmitted the modulated signal corresponding to the demodulated data.

The appended information of demodulated data A7002 may include both time information and position information and may include only one of the two. Moreover, other than time information and position information, the appended information of demodulated data A7002 may include relative information related to the demodulated data.

Note that the position information is exemplified as information indicating a position, in an image, of the transmission device or light source, but the position information may be some other type of information. For example, the position information may be information indicating the region in the image used for optical signal detection, or information indicating a position in a three-dimensional space. Position information on a position in a three-dimensional space may be, for example, information indicating a direction in which light receiving device A1002 is capturing an image and a position in the image of the imaging data for video, and may be information indicating a value and region of coordinates in a coordinate system whose origin is the light receiving device or the communication device estimated based on the above data. Moreover, the information may be information indicating a value and region of coordinates in any given coordinate system used for, for example, GPS or three-dimensional mapping, estimated using position information on the communication device or light receiving device. Moreover, when light receiving device A1002 obtains, in addition to imaging data for video, range image data indicating a depth to the captured target, the position in the three-dimensional space may be estimated using the range image data in addition to the imaging data for video.

A range image can be obtained by, for example, using a time-of-flight (TOF) method, a range-finding method that uses stereo disparity, or a laser imaging detection and ranging (LIDER) method.

Demodulated data A7002 and video data A7004 may be transmitted to controller A1004 in communication device A1000 or controller A1004 in communication device A2000 as a plurality of divided data streams or data packet sequences, and may be multiplexed onto a data stream in a format that allows for storing of both demodulated data A7002 and video data A7004 and transmitted to controller A1004 in communication device A1000 or controller A1004 in communication device A2000 in a single data stream or data packet sequence.

Figure 41:
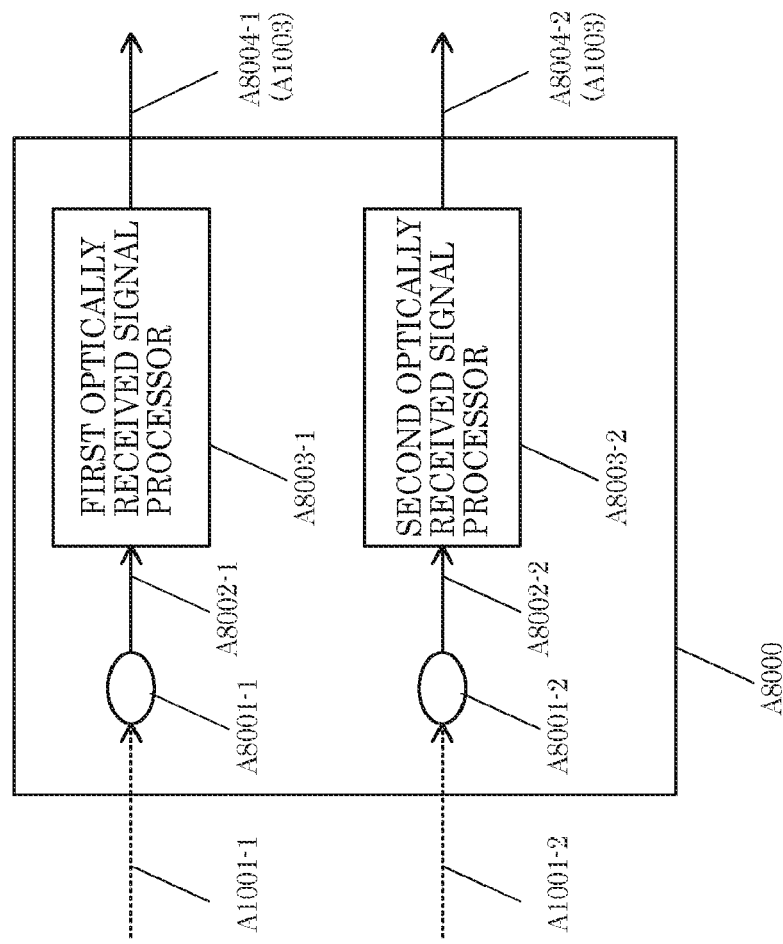
FIG. 41 illustrates a second configuration example of the light receiving device according to Embodiment 8.

FIG. 41 illustrates the configuration of light receiving device A8000, which is a second example of a configuration of light receiving device A1002. Light receiving device A8000 includes first light receiver A8001-1, second light receiver A8001-2, first optically received signal processor A8003-1, and second optically received signal processor A8003-2.

First light receiver A8001-1 is an image sensor such as a CCD, CMOS, or organic CMOS image sensor, second light receiver A8001-2 is an image sensor such as a CCD, CMOS, or organic CMOS image sensor, or a device capable of converting optical signals into electrical signals, such as a photodiode. Light receiving device A8000 operates first light receiver A8001-1 using an imaging method for capturing video, and obtains an imaging signal for video as reception signal A8002-1.

When second light receiver A8001-2 is an image sensor, light receiving device A8000 operates second light receiver A8001-2 using a sampling method for receiving optical signals, and obtains imaging signal for optical communication as reception signal A8002-2. However, when second light receiver A8001-2 is a device capable of converting optical signals into electrical signals, such as a photodiode, light receiving device A8000 obtains reception signal A8002-2 sampled at a sampling rate required for reception of optical signals using second light receiver A8001-2.

First optically received signal processor A8003-1 has the same functions as, for example, optically received signal processor A5000 illustrated in FIG. 38, and outputs image data A8004-1, which is imaging data for video, as optically received data A1003.

Second optically received signal processor A8003-2 has the same functions as, for example, optically received signal processor A4000 illustrated in FIG. 37, and outputs demodulated data A8004-2 as optically received data A1003. Note that second optically received signal processor A8003-2 has the same functions as, for example, optically received signal processor A5000 illustrated in FIG. 38, and outputs image data A8004-2, which is imaging data for optical communication, as optically received data A1003.

With this configuration, since light receiving device A8000 can simultaneously obtain image data A8004-1, which is imaging data for video, and image data A8004-2, which is demodulated data or imaging data for optical communication, light receiving device A8000 can both perform optical communication and capture video, without producing a period in which imaging data for video cannot be obtained.

Note that although light receiving device A8000 is exemplified as including two systems of a combination of a light receiver and an optically received signal processor, light receiving device A8000 may include N (N is an integer greater than or equal to 3) systems of a combination of a light receiver and an optically received signal processor.

Moreover, first light receiver A8001-1 and second light receiver A8001-2 need not be separate components. For example, a portion of the pixels of the image sensor may be used for capturing a video by operating them using the imaging method for capturing video as first light receiver A8001-1, and a different portion of the pixels of the same image sensor may be used for optical communication by operating them using the sampling method for receiving optical signals as second light receiver A8001-2.

Similarly, when light receiving device A8000 includes N or more systems of the light receiver and the optically received signal processor, pixels included in a first region of the image sensor may be used for capturing a video by operating them using the imaging method for capturing video, and pixels included in the second through N-th regions of the image sensor may be used for optical communication by operating them using the sampling method for receiving optical signals. Note that when it is not necessary to perform video capturing and light communication concurrently, without operating any of the pixels of the image sensor using the imaging method for capturing video, the pixels of the image sensor may be divided into a plurality of regions, and the pixels in respective regions may be operated using the sampling method for receiving optical signals to perform a plurality of instances of optical communication in parallel.

Note that when video capturing or optical communication is performed using an image sensor, there is no need to always operate all of the pixels; there may be pixels that are temporarily or continuously not operated, that is to say, elements that do not readout accumulated electric loads resulting from receiving light.

Next, one example of control of the image sensor in a case in which a plurality of optical signals are concurrently received using the image sensor will be given with reference to FIG. 42.

Figure 42:
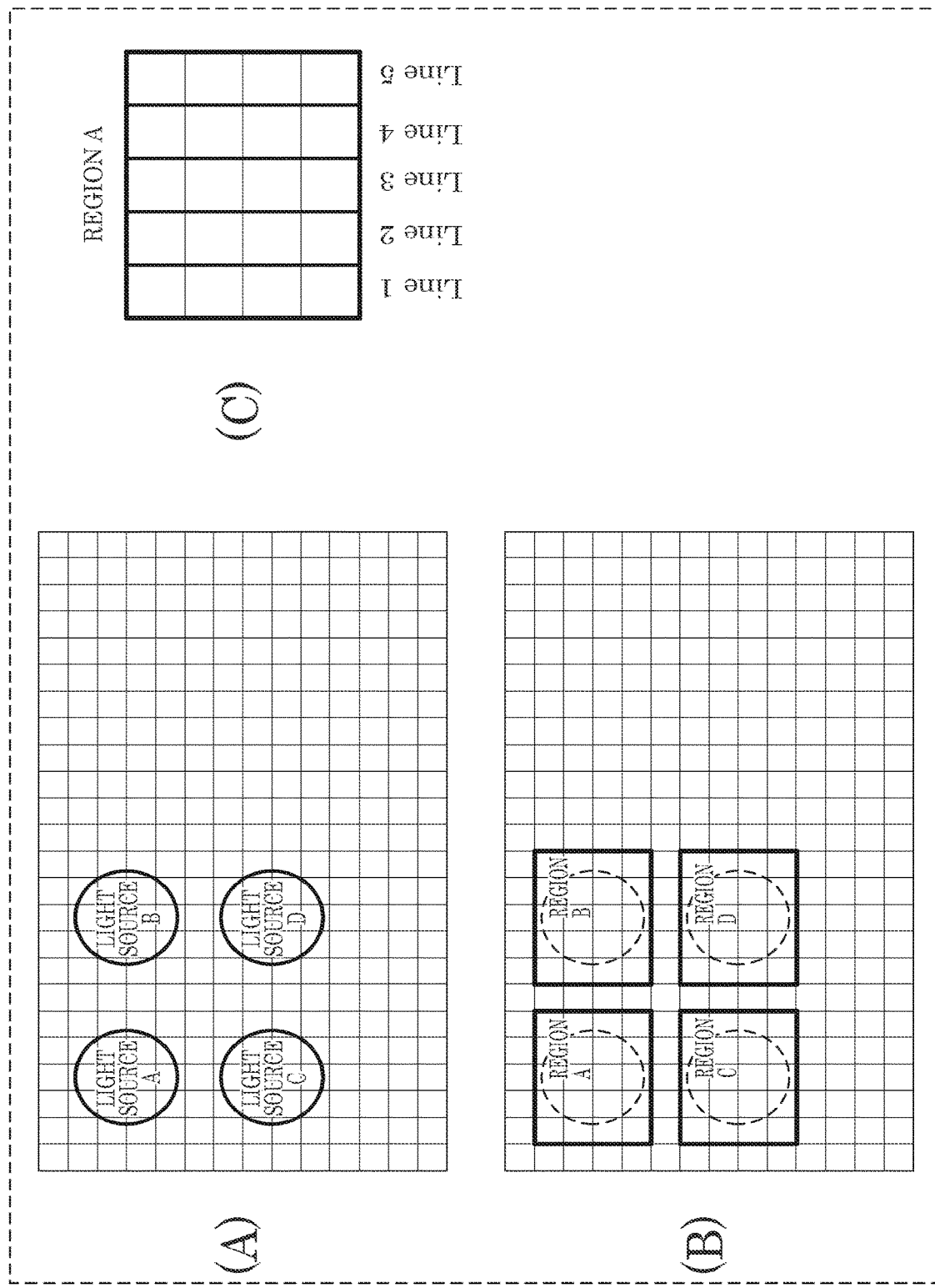
FIG. 42 illustrates an example of performing line scan sampling on a plurality of regions in parallel.

In FIG. 42, (A) illustrates a state in which four light sources A through D that transmit mutually different optical signals are present in a capture region, which is a region that is capturable when the imaging method for capturing video is used. Each of the square regions in the capture region illustrated in (A) in FIG. 42 corresponds to a pixel.

Here, for example, light receiving device A8000 discerns regions A through D including the light sources A through D, as illustrated in (B) in FIG. 42, and for each of the regions A through D, operates the pixels in that region using the sampling method for receiving optical signals to obtain the optical signals.

As one example of a configuration for performing sampling for reception of optical signals for each region, a sampling method in an image sensor having a shutter function for each pixel will be given.

(Example of Line Scan Sampling for Each Region)

An example in which line scan sampling is performed when, as illustrated in (C) in FIG. 42, in region A, a single line is configured of four pixels aligned in the vertical direction (column direction). In this example, region A includes 5 lines. The light receiving device exposes the lines by shifting the exposure period on a line-by-line basis for the five lines in region A to obtain changes in luminance or color of the modulated optical signals. However, note that the size of each of the regions, that is to say, the number of pixels included in the rows and the number of pixels included in the columns in each of the regions is not limited to the example illustrated in FIG. 42; the number of pixels is not limited. Moreover, the size of the regions in which sampling for optical communication is performed may be changed in accordance with the size, position, mutual positional relationship, etc., in the screen of each of the light sources. In the example illustrated in (C) in FIG. 42, although a single line is exemplified as including four pixels aligned in the column direction, for example, a single line may be five pixels aligned in the row direction, whereby there would be considered to be four row direction lines in the case of (C) in FIG. 42.

After the light receiving device reads out the signal from Line 1 in region A of (C) in FIG. 42, which is the left-most line in region A, light receiving device reads out the signals corresponding to the remaining lines one by one, from left to right. When the light receiving device is finished reading out the signal from Line 5, which is the right-most line in region A, the light receiving device returns to Line 1, which is the left-most line, and repeats the process of reading out the signals line by line.

In each of regions B through D in (B) in FIG. 42 as well, the light receiving device also performs line scan sampling by obtaining signals using the same process as in region A. Here, the light receiving device may expose the left-most line in every region at the same time or at different times. Moreover, the light receiving device may expose lines in the same column in regions A and C on the image sensor for the same exposure period, and expose lines in the same column in regions B and D on the image sensor for the same exposure period. However, regions A through D include lines that are exposed for the same exposure period.

Here, an example was given in which a plurality of pixels aligned in the vertical direction (column direction) are exposed for the same period as a single line and signals are read out line by line, but line scan sampling in which a plurality of pixels aligned in the horizontal direction (row direction) are treated as a single line may be performed.

In the above description, at least one pixel in the image sensor is used for both video capturing and optical communication, and switching is performed for switching between whether to obtain a signal corresponding to that pixel or pixels using the imaging method for capturing video or the sampling method for optical communication, but the configuration of the light receiving device including the image sensor is not limited to this example. For example, the image sensor may include pixels used for optical communication aside from the pixels that are used for video capturing.

When the image sensor includes pixels used for optical communication aside from the pixels that are used for video capturing, the shape and/or size of the pixels used for optical communication may be different from the shape and/or size of the pixels used for video capturing.

Moreover, the capturing of video using the pixels for video capturing and the sampling for optical communication using the pixels for optical communication may be controlled independently, and in circumstances in which one of the processing is unnecessary, one of the processing may be stopped, and the supply of power to the circuit for obtaining the signal required in the processing may be stored partially or entirely so as to reduce power consumption.

By performing line scan sampling as described above, as illustrated in (A) in FIG. 42, since it is possible to receive the mutually different modulated signals from the plurality of light sources in parallel, it is possible to achieve the advantageous effect whereby data transmission speeds are increased.

Next, one example of the configuration of controller A1004 included in communication device A1000 or communication device A2000 will be given.

Figure 43:
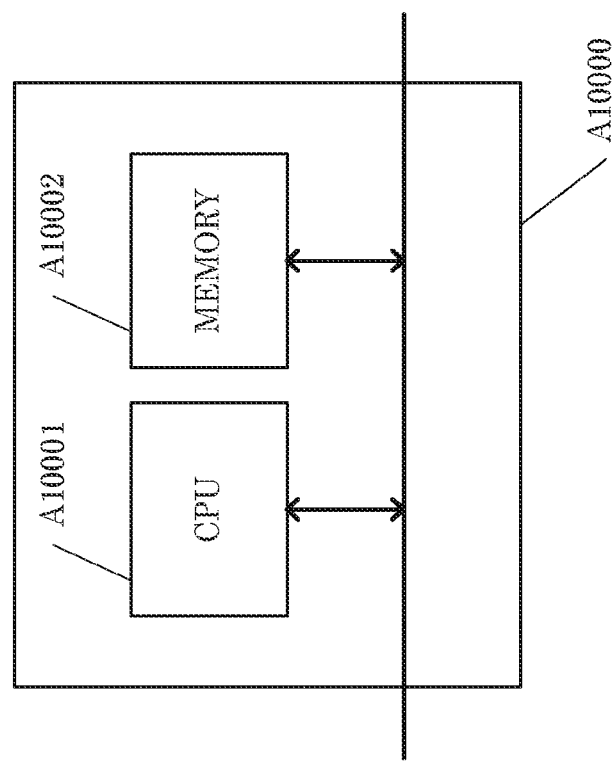
FIG. 43 illustrates a physical configuration example of a controller according to Embodiment 8.

FIG. 43 illustrates controller A10000, which is one example of a physical configuration of controller A1004. Controller A10000 includes central processing unit (CPU) A10001 and memory A10002. Memory A10002 stores, for example, data required for, for example, a program implemented by controller A1004 or processing performed by the controller. CPU A10001 performs processing based on a program read from memory A10002 and achieves the functions of controller A1004. Moreover, for example, memory A10002 stores data such as image data obtained by the reception device and reads out the stored data.

Note that here, the elements that configure controller A10000 are exemplified as a CPU and memory, but controller A10000 may include other elements. For example, controller A10000 may include a graphics processing unit (GPU) in addition to and separate from the CPU, and may include a circuit for performing video encoding processing, video decoding processing, and image processing such as pattern recognition on the imaging data for video. Moreover, controller A10000 may include, for example, an input/output (I/O) for controlling the transferring of data between devices connected to controller A10000 included in, for example, wireless communication device A1006.

Figure 44:
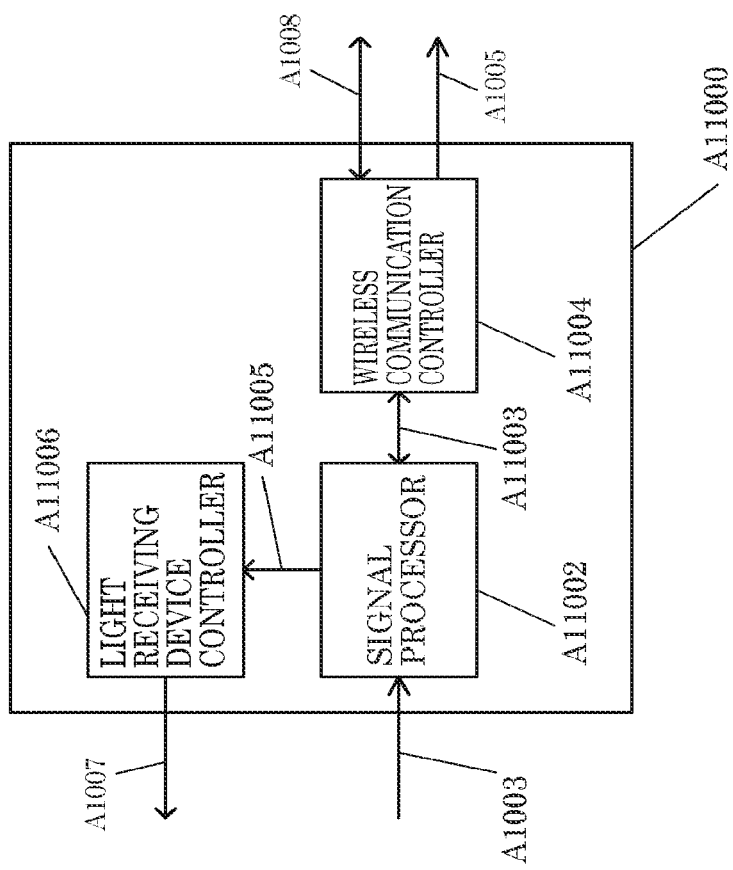
FIG. 44 illustrates a configuration example of the controller according to Embodiment 8.

FIG. 44 illustrates the configuration of controller A11000, which is a first example of the configuration of controller A1004. Controller A11000 includes signal processor A11002, wireless communication controller A11004, and light receiving device controller A11006.

Signal processor A11002 obtains, as optically received data A1003 from light receiving device A1002, image data including imaging data for optical communication, or demodulated data on which demodulation and error correction has been performed, as an optical signal. When optically received data A1003 is image data including imaging data for optical communication, signal processor A11002 obtains a reception signal corresponding to the modulated signal from imaging data for optical communication, and performs demodulation processing and error correction processing on the reception signal to receive demodulated data.

Wireless communication controller A11004 outputs control signal A1005 for controlling operation of wireless communication device A1006 to wireless communication device A1006. Wireless communication controller A11004 transfers the wireless communication reception data received via wireless communication device A1006 to signal processor A11002, and transfers the wireless communication transmission data to be transmitted to other communication devices via wireless communication device A1006 to wireless communication device A1006 from signal processor A11002.

Signal processor A11002 performs signal processing using arbitrary data, such as demodulated data for optical communication, video imaging data, wireless communication reception data obtained via light receiving device A1002 and wireless communication device A1006. For example, signal processor A11002 instructs control of wireless communication device A1006 by wireless communication controller A11004 and instructs control of light receiving device by light receiving device controller A11006, based on the result of the above-described signal processing (A11005).

Light receiving device controller A11006 controls light receiving device A1002 based on the instruction from signal processor A11002. Examples of the control of light receiving device A1002 include controlling whether to obtain a signal using the imaging method for capturing video or the sampling method for receiving optical signals via light receivers A3001, A8001-1, and A8001-2, and the setting of the region of pixels to use the sampling method for receiving optical signals in cases in which a signal is obtained using the sampling method for receiving optical signals using a portion of the pixels included in the image sensor. However, the control of light receiving device A1002 is not limited to these examples. For example, the control of light receiving device A1002 may include the switching of the power of light receiving device A1002 ON and OFF, and the switching of signal processing performed on optically received signals performed in light receiving device A1002. Moreover, some of the control described here may be performed automatically based on the result of the signal processing performed on the optically received signals in light receiving device A1002.

Figure 45:
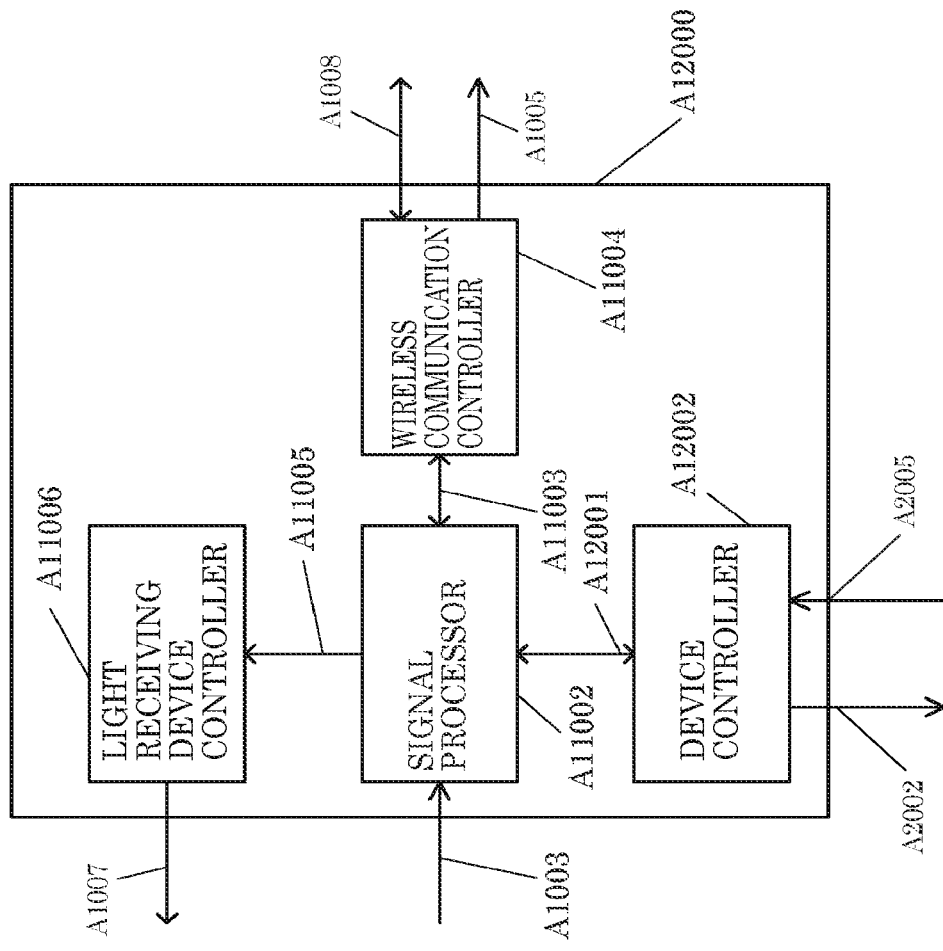
FIG. 45 illustrates another configuration example of the controller according to Embodiment 8.

FIG. 45 illustrates the configuration of controller A12000, which is a second example of the configuration of controller A1004. Controller A12000 differs from controller A11000 in regard to the inclusion of device controller A12002.

Device controller A12002 receives inputs of video imaging data obtained by signal processor A11002 and/or the processing result of signal processor A11002 (A12001), generates an image to be displayed on presentation unit A2003, and outputs the generated image signal to presentation unit A2003 as presentation information A2002. Device controller A12002 obtains input information A2005 obtained by input unit A2004 in accordance with the user operation of input unit A2004, and transfers input information A2005 to signal processor A11002.

With this configuration, signal processor A11002 can perform signal processing based on input information A2005 obtained in accordance with a user operation, in addition to the demodulated data for optical communication, video imaging data, and wireless communication reception data obtained via light receiving device A1002 and wireless communication device A1006. For example, signal processor A11002 instructs control of wireless communication device A1006 by wireless communication controller A11004 and instructs control of light receiving device by light receiving device controller A11006, based on the result of the above-described signal processing (A11005), and instructs the changing of the image displayed on presentation unit A2003.

Hereinafter, as one example of processes performed by controller A1004, a communication control method of controlling wireless communication device A1006 based on demodulated data obtained by receiving an optical signal and the result of image processing such as pattern recognition implemented on the imaging data for video, will be described.

Signal processor A11002 obtains imaging data for video as optically received data A1003 from light receiving device A1002, and implements image processing such as pattern recognition on the imaging data for video. Wireless communication controller A11004 controls wireless communication device A1006 based on the result of image processing in signal processor A11002.

With the communication control method described in this embodiment, demodulated data obtained by receiving an optical signal is associated with appended information such as position information indicating the position, in the image, of the transmitter that transmitted the optical signal or the light source used in the transmission of the optical signal, and the demodulated data appended with the appended information is used. In this embodiment, the information transmitted using optical communication may be any kind of information, and is not limited to a specific kind of information, but in the following description related to the communication control method, as one example, the information transmitted in the optical signal is exemplified as connection information including information required for connection or communication with another wireless communication device, such as the base station SSID described in Embodiments 3 through 7, for example.

Signal processor A11002 performs processing using demodulated data appended with appended information obtained in light receiving device A1002 or signal processor A11002. Here, the demodulated data is connection information corresponding to another wireless communication device. When there are a plurality of items of the obtained connection information, signal processor A11002 controls communication processing implemented by wireless communication device A1006 using the appended information corresponding to each of the items of connection information and the result of image processing such as pattern recognition.

Next, a first example of communication control based on the image processing result will be given.

Figure 46:
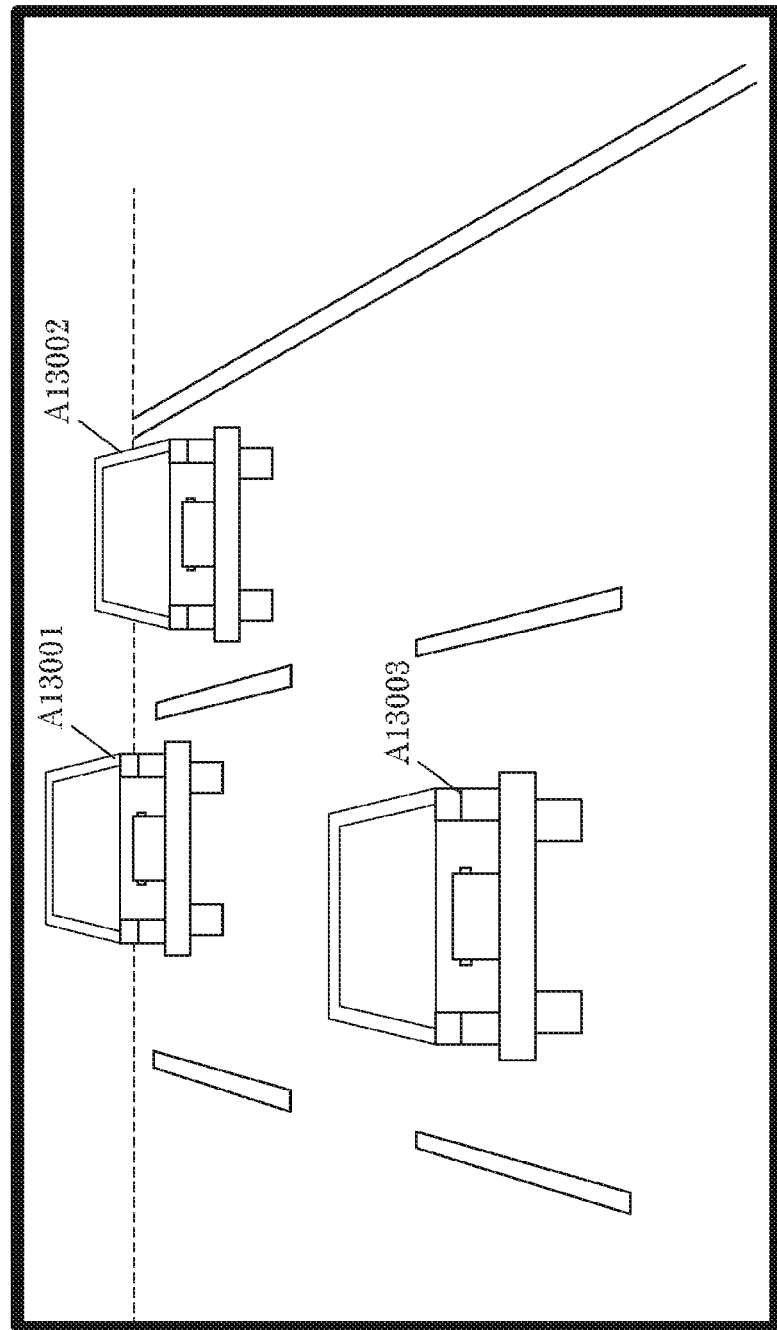
FIG. 46 is a first drawing for illustrating communication control based on an obtained image according to Embodiment 8.

In the first example of the communication control based on the image processing result, communication device A1000, A2000 is implemented as a vehicle or a device provided in a vehicle, and a camera provided in the vehicle is used as light receiving device A1002. FIG. 46 schematically illustrates one example of an image captured by a camera that captures a view in front of the vehicle. In FIG. 46, three vehicles A13001, A13002, and A13003 driving in front of the vehicle corresponding to communication device A1000, A2000 are captured.

Note that in the example given in this embodiment, a camera which captures a view in front of the vehicle is used, but it goes without saying that this embodiment can be implemented in the same manner even when the camera captures a view behind the vehicle or a view to a side of the vehicle.

Here, vehicles A13001, A13002, and A13003 each include a light source such as an LED, and transmission unit 102 that transmits an optical signal using the light source. Examples of light sources that can be used for optical communication include any given light source that is included in the vehicle such as a headlight or tail light, and which light source among the light sources included in the vehicle is to be used for transmitting optical signals may be selected arbitrarily depending on how the optical communication will be used. Moreover, when a plurality of light sources included in the vehicle are used for transmitting optical signals, the vehicle may include a transmission unit for optical communication use for each of the plurality of light sources, and, alternatively, may include a single transmission unit to transmit the optical signals using the plurality of light sources. Note that the vehicle may include a light source for optical communication use apart from the headlight and/or tail light.

Vehicles A13001, A13002, and A13003 include, in addition to the transmission unit and light source for optical communication, a communication device for wireless communication that corresponds to other communication device A1100 described with reference to FIG. 34 and/or FIG. 35. Note that when the host vehicle and vehicles A13001, A13002, and A13003 include functions for the transmission and reception of optical signals and wireless communication, communication device A1000, A2000 included in each of the vehicles has a configuration including transmission unit 102 and light source 104 for optical communication. In such cases, controller A1004 may control the data transmitted by transmission unit 102.

In the first example of communication control based on the image processing result, vehicles A13001, A13002, and A13003 transmit connection information which is information that can be used to connect with the communication device included in another vehicle via optical communication. Hereinafter, the connection information will be exemplified as including information indicating the SSID and the frequency channel used in the communication, in cases in which the communication device included in each of the vehicles operates as a base station.

Note that in the example in the above description, an SSID is notified as the identifier included in the connection information for determining the communication partner, but the identifier information included in the connection information is not limited to an SSID. For example, the identifier may be a physical address such as the media access control (MAC) address of the other communication device, and may be a logical address such as the internet protocol (IP) address of the other communication device. Note that when the identifier information is used to select a resource to be accessed via a network such as the internet, rather than the identifier information being used in the selection of the other communication device to perform direct communication with by the communication device, the identifier information may be the address of the server that performs communication via a network such as the internet or the uniform resource locator (URL), uniform resource name (URN), or uniform resource identifier (URI) used to identify a resource on the internet. So long as the identifier information included in the connection information is information that can identify another communication terminal acting as the access destination or a resource on the internet, any information may be used.

Note that in the above description, the connection information is exemplified as notifying information on the frequency channel used, but the connection information need not include information on the frequency channel used, and may include other information. Examples of other information that can be used as connection information include information related to an encryption key, types of compatible physical layer transmission standard, compatible data formats and/or communication protocols, etc.

Figure 47:
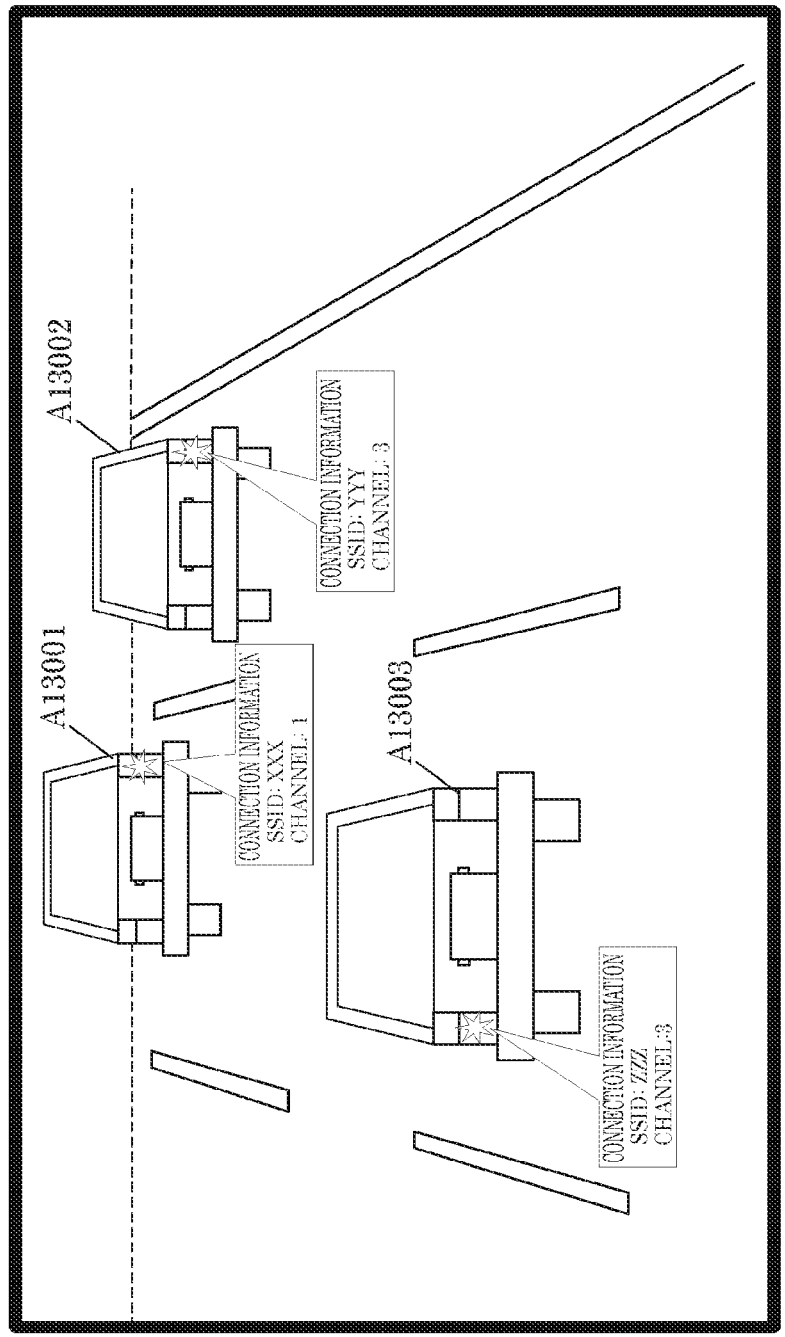
FIG. 47 is a second drawing for illustrating communication control based on an obtained image according to Embodiment 8.

FIG. 47 schematically illustrates connection information obtained, in light receiving device A1002 or controller A1004 of communication device A1000, A2000, by demodulating optical signals transmitted using light sources by the transmission units included in vehicles A13001, A13002, and A13003. Communication device A1000, A2000 obtains connection information from the optical signal transmitted by vehicle A13001 indicating that the SSID is "XXX" and the frequency channel used is 1, obtains connection information from the optical signal transmitted by vehicle A13002 indicating that the SSID is "YYY" and the frequency channel used is 3, and obtains connection information from the optical signal transmitted by vehicle A13003 indicating that the SSID is "ZZZ" and the frequency channel used is 3.

These items of connection information may be substituted with information that can be obtained by wireless communication device A1006 in communication device A1000, A2000 performing carrier sense over a given period, and receiving a signal transmitted from each of a plurality of communication devices. However, it is difficult for communication device A1000, A2000 to determine which of the plurality of other communication devices in the surrounding area transmitted the signal, and there is a possibility that communication device A1000, A2000 will connect and communicate with a communication device that is not the communication device that communication device A1000, A2000 actually wants to communicate with.

Thus, in the first example of communication control based on an image processing result, controller A1004 in communication device A1000, A2000 implements image processing on imaging data for video captured by light receiving device A1002, and detects vehicles A13001, A13002, and A13003 from, for example, the image illustrated in FIG. 46. Here, based on the positions of the light sources of the three optically received signals, controller A1004 associates the three vehicles A13001, A13002, and A13003 detected from the image with the three items of connection information received via optical communication. This makes it possible to identify connection information to use when wireless communication is performed between the three vehicles detected from the images.

Next, controller A1004 determines the reciprocal positional relationship between vehicles A13001, A13002, and A13003 from the image and the positional relationships between each of these vehicles and the host vehicle, and then selects a target to perform wireless communication with. Controller A1004 may select the vehicle closest to the host vehicle, which is vehicle A13003, as the communication target. Controller A1004 may determine which lanes each of the vehicles is driving in and select, as the communication partner, a vehicle that is driving in the same lane as the host vehicle and is positioned frontmost in the image, which is vehicle A13001.

With this configuration, it is possible to perform association with an object detected using signal processing such as pattern recognition based on (i) information difficult to be associated with a device in a real space with wireless communication alone, like an identifier used in wireless communication such as an SSID or address, and (ii) sensing data obtained from a sensor such as the image obtained by the image sensor. As a result, for example, when information such as the surrounding environment and the movement of surrounding vehicles is obtained for the purpose of controlling automated driving including assisted driving, this makes it easier to connect to a communication partner that is appropriate for obtaining such information.

Next, a second example of communication control based on the image processing result will be given.

In the second example of communication control based on the image processing result, the configuration of communication device A1000, A2000 or the configuration of the host vehicle provided with communication device A1000, A2000, and the configuration of other vehicles A13001, A13002 are the same as described in example 1 of the communication control based on the image processing result. The second example of communication control based on the image processing result differs from the first example of communication control based on the image processing result in that vehicle A13003 is replaced by vehicle A15003 that is not equipped with a function of transmitting optical signals.

Figure 48:
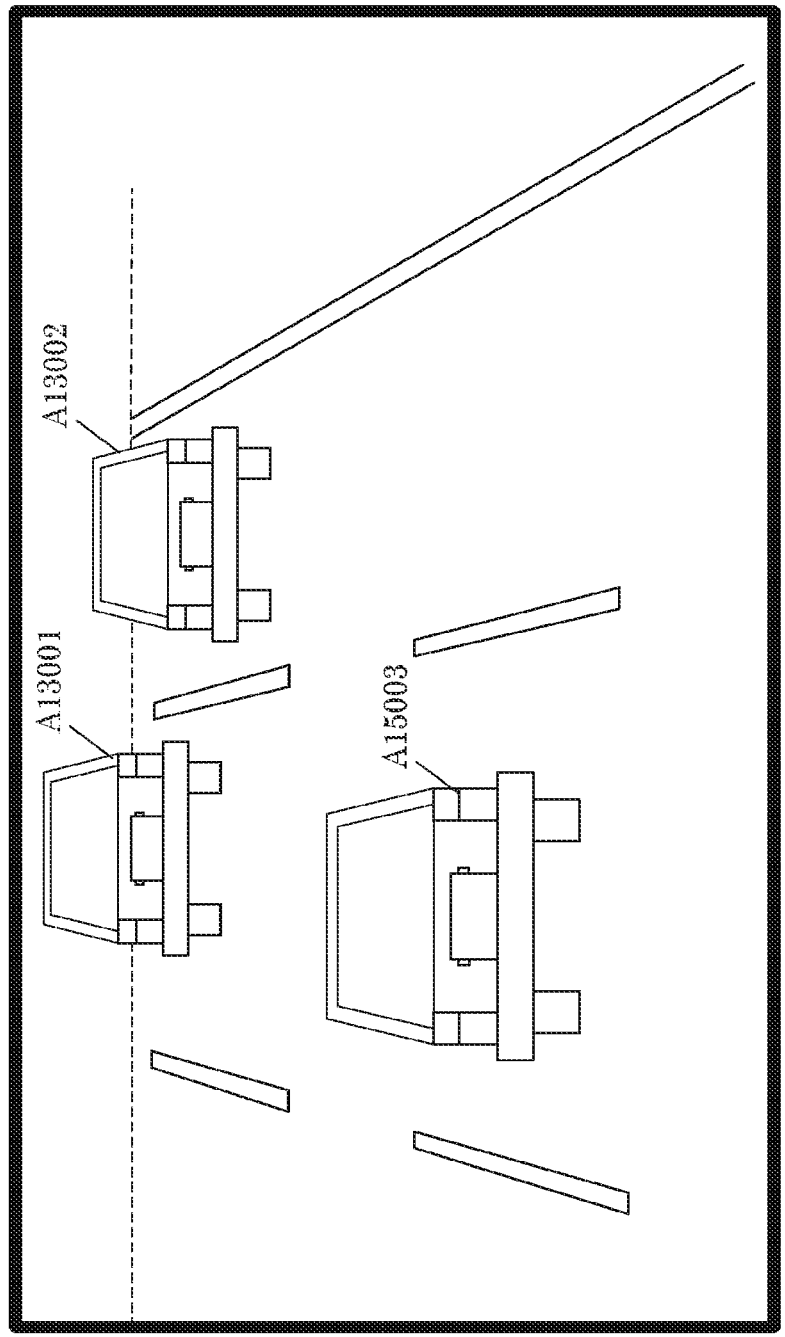
FIG. 48 is a third drawing for illustrating communication control based on an obtained image according to Embodiment 8.

FIG. 48 schematically illustrates one example of an image captured by a camera that captures a view in front of the vehicle, according to the second example of communication control based on the image processing result. In FIG. 48, three vehicles A13001, A13002, and A15003 driving in front of the vehicle corresponding to communication device A1000, A2000 are captured.

Figure 49:
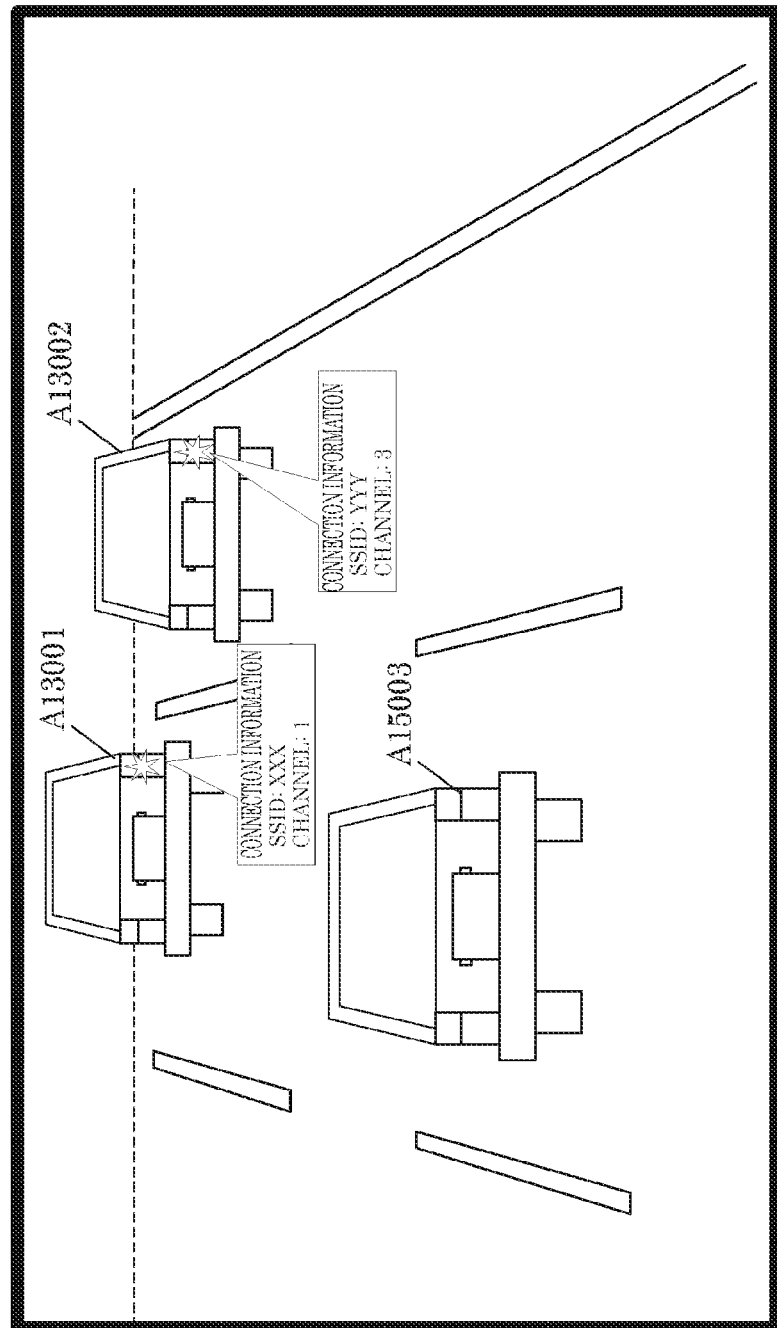
FIG. 49 is a fourth drawing for illustrating communication control based on an obtained image according to Embodiment 8.

FIG. 49 schematically illustrates connection information obtained, in light receiving device A1002 or controller A1004 of communication device A1000, A2000, by demodulating optical signals transmitted using light sources by the transmission units included in vehicles A13001 and A13002. Communication device A1000, A2000 obtains connection information from the optical signal transmitted by vehicle A13001 indicating that the SSID is "XXX" and the frequency channel used is 1, and obtains connection information from the optical signal transmitted by vehicle A13002 indicating that the SSID is "YYY" and the frequency channel used is 3. Here, since vehicle A15003 is not equipped with a function of transmitting optical signals, communication device A1000, A2000 does not obtain connection information relating to A15003.

In the second example of communication control based on an image processing result, controller A1004 in communication device A1000, A2000 implements image processing on imaging data for video captured by light receiving device A1002, and detects vehicles A13001, A13002, and A15003 from, for example, the image illustrated in FIG. 48. Here, based on the positions of the light sources of the two optically received signals, controller A1004 associates, from among vehicles A13001, A13002, and A15003, the two vehicles A13001 and A13002 detected from the image with the two items of connection information received via optical communication. With this, it is possible to identify connection information to be used when performing wireless communication with vehicles A13001 and A13002 detected from the image, as well as identify that the base station or communication device whose SSID is XXX or YYY is not the SSID to be used to communicate with vehicle A15003.

First, an example in which vehicle A15003 does not have a function of transmitting optical signals but has a function of performing wireless communication using the SSID "PPP" will be given.

In such cases, wireless communication device A1006 detects the three SSIDs of XXX, YYY, and PPP as the SSIDs of other communication devices provided in vehicles within a range in which communication is possible, via carrier sense, and controller A1004 determines that PPP is the SSID to be used for communication with A15003, which differs from the SSIDs of XXX and YYY included in the connection information received as optical signals, and thus associates the SSID "PPP" with vehicle A15003.

Controller A1004 determines the reciprocal positional relationship between vehicles A13001, A13002, and A15003 from the image and the positional relationships between each of these vehicles and the host vehicle, and then selects a target to perform wireless communication with. For example, controller A1004 may select the vehicle closest to the host vehicle, which is vehicle A15003, as the communication target. Controller A1004 may determine which lanes each of the vehicles is driving in and select, as the communication partner, a vehicle that is driving in the same lane as the host vehicle and is positioned frontmost in the image, which is vehicle A13001.

With this configuration, it is possible to perform association with an object detected using signal processing such as pattern recognition based on (i) information difficult to be associated with a device in a real space with wireless communication alone, like an identifier used in wireless communication such as an SSID or address, and (ii) sensing data obtained from a sensor such as the image obtained by the image sensor. As a result, for example, when information such as the surrounding environment and the movement of surrounding vehicles is obtained for the purpose of controlling automated driving including assisted driving, this makes it easier to connect to a communication partner that is appropriate for obtaining such information.

Next, an example in which vehicle A15003 has neither a function of transmitting optical signals nor a function of performing wireless communication will be given.

Here, wireless communication device A1006 detects the two SSIDs of XXX and YYY as the SSIDs of other communication devices provided in vehicles within a range in which communication is possible, via carrier sense. Since controller A1004 does not detect an SSID other than XXX and YYY, which are the SSIDs included in the connection information received as optical signals, as the SSID of another communication device provided in a vehicle, controller A1004 determines that vehicle A15003 does not have a function of performing wireless communication or is not a participant that can perform wireless communication.

Controller A1004 determines the reciprocal positional relationship between vehicles A13001, A13002, and A15003 from the image and the positional relationships between each of these vehicles and the host vehicle, and then selects either vehicle A13001 or vehicle A13002 as a target to perform wireless communication with. For example, controller A1004 may select the vehicle that is both closest to the host vehicle and capable of communication, which is vehicle A13002, as the communication target. Controller A1004 may determine which lanes each of the vehicles is driving in and select, as the communication partner, a vehicle that is driving in the same lane as the host vehicle and is positioned frontmost in the image, which is vehicle A13001.

With this configuration, it is possible to perform association with an object detected using signal processing such as pattern recognition based on (i) information difficult to be associated with a device in a real space with wireless communication alone, like an identifier used in wireless communication such as an SSID or address, and (ii) sensing data obtained from a sensor such as the image obtained by the image sensor. As a result, for example, it is possible to determine that information cannot be obtained from communication with vehicle A15003 driving directly in front of the host vehicle, and, for example, when control of automated driving including assisted driving is performed, it is possible to prevent misrecognition of vehicle A13001 or A13002, which the host vehicle is capable of communicating with, for vehicle A15003, which facilitates the provision of appropriate automated driving control.

Next, a third example of communication control based on the image processing result will be given.

In the third example of communication control based on the image processing result, the configuration of communication device A1000, A2000 or the configuration of the host vehicle provided with communication device A1000, A2000, and the configuration of other vehicles A13002 and A13003 are the same as described in example 1 of the communication control based on the image processing result. The third example of communication control based on the image processing result differs from the first example of communication control based on the image processing result in that vehicle A13001 is replaced by police vehicle A17001. Police vehicle A17001 differs from vehicle A13001 in that it is a police vehicle, but has the same configuration as vehicle A13001, and is equipped with functions of transmitting optical signals and performing wireless communication.

Figure 50:
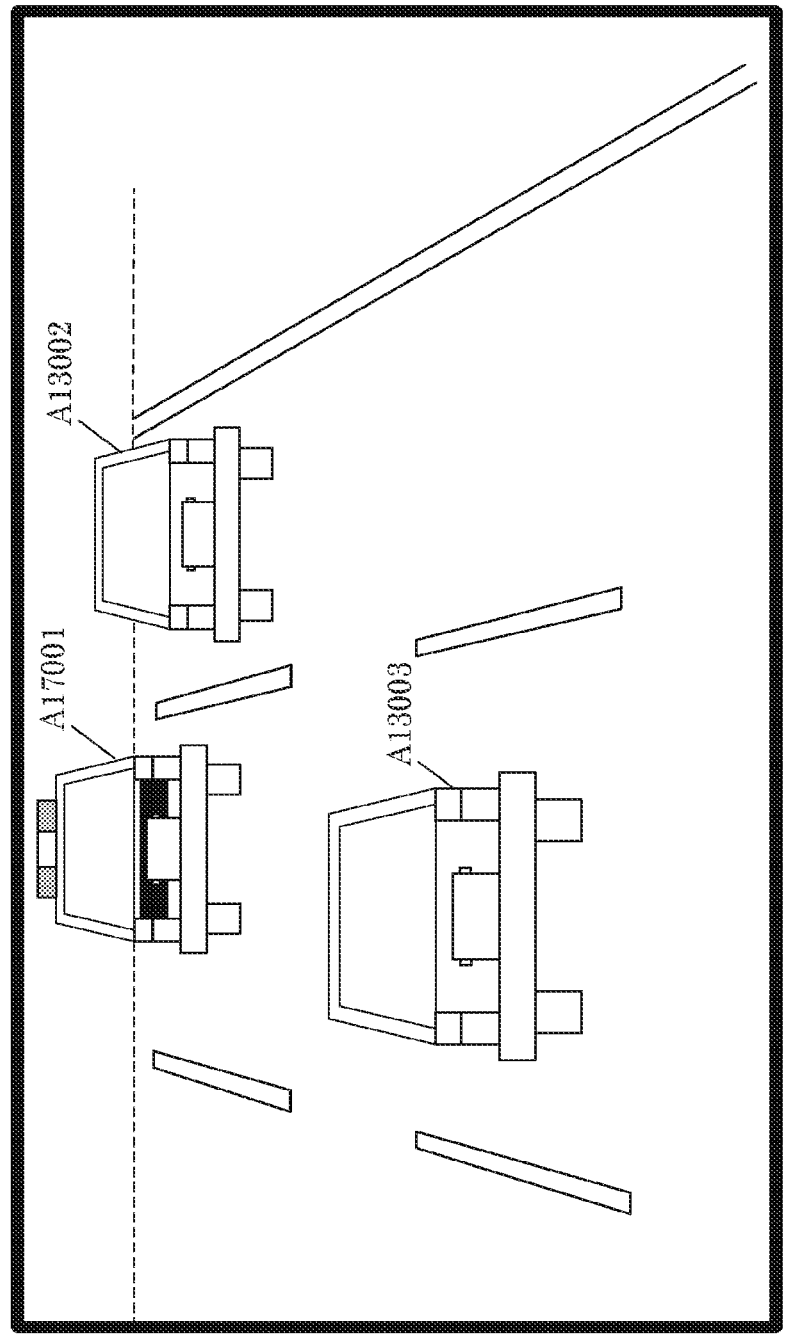
FIG. 50 is a fifth drawing for illustrating communication control based on an obtained image according to Embodiment 8.

FIG. 50 schematically illustrates one example of an image captured by a camera that captures a view in front of the vehicle, according to the third example of communication control based on the image processing result. In FIG. 50, vehicles A13002 and A13003 and police vehicle A17001 driving in front of the vehicle corresponding to communication device A1000, A2000 are captured.

Figure 51:
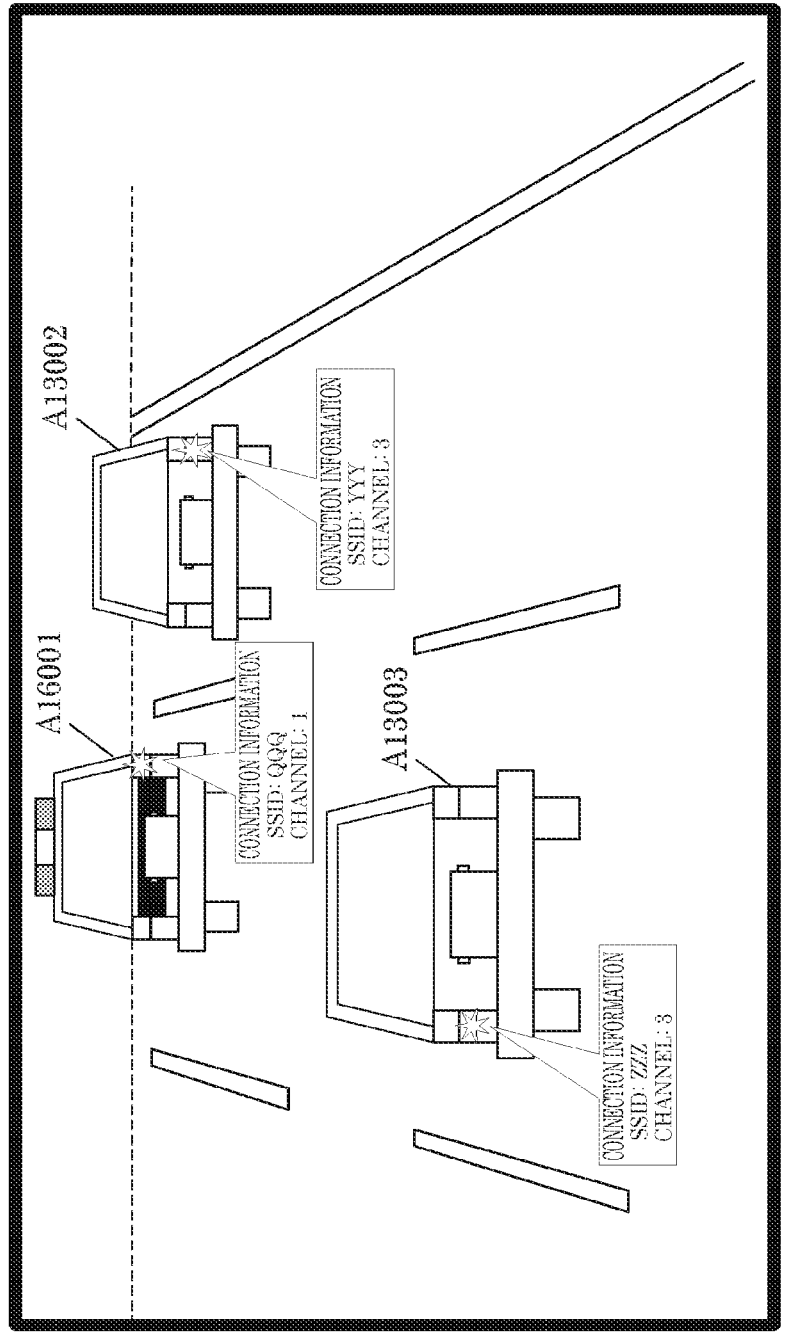
FIG. 51 is a sixth drawing for illustrating communication control based on an obtained image according to Embodiment 8.

FIG. 51 schematically illustrates connection information obtained, in light receiving device A1002 or controller A1004 of communication device A1000, A2000, by demodulating optical signals transmitted using light sources by the transmission units included in vehicles A17001, A13002, and A13003. Communication device A1000, A2000 obtains connection information from the optical signal transmitted by police vehicle A17001 indicating that the SSID is "QQQ" and the frequency channel used is 1, obtains connection information from the optical signal transmitted by vehicle A13002 indicating that the SSID is "YYY" and the frequency channel used is 3, and obtains connection information from the optical signal transmitted by vehicle A13003 indicating that the SSID is "ZZZ" and the frequency channel used is 3.

In the third example of communication control based on an image processing result, controller A1004 in communication device A1000, A2000 implements image processing on imaging data for video captured by light receiving device A1002, and detects police vehicle A17001 and vehicles A13002 and A13003 from, for example, the image illustrated in FIG. 50. Here, based on the positions of the light sources of the three optically received signals, controller A1004 associates police vehicle A17001 and vehicles A13002 and A13003 detected from the image with the three items of connection information received via optical communication. This makes it possible to identify connection information to use when wireless communication is performed with each of police vehicle A17001 and vehicles A13002 and A13002 detected from the images.

Regarding the three vehicles recognized via the image processing, controller A1004 performs detailed classification including determining whether a vehicle is a police vehicle or not using information on, for example, the appearance of the vehicle, and recognizes that vehicle A17001 is a police vehicle. Controller A1004 selects, as a target to perform wireless communication with, police vehicle A17001, which is the vehicle from which the obtainment of information takes priority from among police vehicle A17001 and vehicles A13002 and A13003.

With this configuration, upon recognizing a target object through signal processing such as pattern recognition from sensing data obtained via a sensor such as an image obtained from an image sensor, further detailed classification of the recognized target object is performed, and communication control can be performed based on this classification.

Note that the above-described example of control processing of selecting the police vehicle as a communication partner from which the obtainment of information takes priority is merely one non-limiting example; other control may be performed when a police vehicle is recognized. For example, police vehicle A17001 may include in the transmitted optical signal an identifier for identifying itself as a police vehicle, and controller A1004 may specify the identifier received from the optical signal from police vehicle A17001 to vehicle A13002 or A13003 and obtain information on police vehicle A17001, rather than directly wirelessly connecting to the police vehicle.

Moreover, when a police vehicle is detected through image processing, rather than always performing the same communication control, communication control may be performed that prioritizes the collection of information relating to the police vehicle when, for example, the emergency lights on the recognized police vehicle are recognized to be flashing, or when communication device A1000, A2000 includes a microphone in addition to the image sensor and controller A1004 detects the sound of a siren by implementing pattern recognition signal processing on the sound data obtained via the microphone.

Note that when detecting sound generated by another device using the sound data obtained by the microphone, a modulated signal generated based on transmission data such as an identifier of the device may be transmitted at the same time.

With this configuration, it is possible to associate a device that generates sound recognized through signal processing such as pattern recognition with transmission data such as an identifier transmitted as the sound signal. As a result, it may be possible to easily identify the device that generated the detected sound in an environment including a plurality of devices whose identifiers are known.

Note that a sound signal may be used instead of the optical signal, and in such cases, light receiving device A1002 in communication device A1000, A2000 is replaced with a sound detection device such as a microphone. By using a device that can identify the direction of arrival of sound, such as an array microphone, as the sound detection device, it is possible to more accurately associate the device that generates the sound to be detected with the sound signal.

Note that communication device A1000, A2000 according to this embodiment may include a plurality of wireless communication devices. For example, communication device A1000, A2000 may include a plurality of wireless communication devices that support communication schemes stipulated by mutually different standards, and may include a plurality of wireless communication devices that support the same communication scheme.

Moreover, when communication device A1000, A2000 according to this embodiment is embodied as a vehicle or a communication device provided in a vehicle, light receiving device A1002 may be a camera such as a camera included in a drive recorder, a vehicle backup camera, a camera for checking the surroundings of the vehicle, or a camera used to project an image on a monitor in place of the side view mirrors. In this way, by receiving optical signals using a camera provided for purposes other than optical communication, it is possible to achieve the communication control disclosed in this embodiment without having to add a new camera, which reduces costs and encourages the broad usage of the function of receiving optical signals. Moreover, since this camera is installed such that a region from which information required by the driver, that is to say, information important in operating the vehicle, is captured, by collecting more information by combining signal processing such as image recognition with wireless communication, it is possible to facilitate the provision of appropriate automated driving control and the provision of information to the driver.

The present disclosure describes an aspect of a method and device that use sensing data obtained from a sensor such as an image sensor or microphone to demodulate a transmission signal transmitted using a communication scheme that enables reception by such a sensor.

In the above aspect, by further including an aspect of performing signal processing including pattern recognition such as image recognition on the sensing data obtained by the sensor, it is possible to determine correspondence between a target object in a real space detected or recognized from the sensing data and the transmission source of the transmission signal.

In the above aspect, by further including an aspect of transmitting information such as the SSID, address, or an identifier to be used in processing over a network including communication, it is possible to easily associate the information to be used in processing over a network including communication with a target object in a real space. In other words, conventionally, information to be used in processing over a network in which association with a target object in a real space was difficult can be used based on sensing data obtained from the real space.

In the above aspect, by further including an aspect of using an image sensor as a sensor and transmitting, in an optical signal, information to be used in processing over a network including communication, it is possible to improve the reliability of the association between a visible target object and the information to be used in processing over a network including communication.

In the above aspect, by further including an aspect of transmitting an identifier to be used in transmission such as an SSID or address in an optical signal and selecting an identifier of a target to connect to via communication based on the result of image recognition signal processing, it is possible to perform communication control based the positional relationship of the target object in the real space and based on attributes of the target object, possible to perform communication by specifying the target object desired to be connected to, and possible to obtain information and make control instructions. As a result, for example, it is possible to provide a means for realizing communication with an appropriate communication partner in an environment in which an unspecified number of devices are within communication range, and encourages the creation and broad usage of new communication-based services.

This concludes the description of Embodiment 8 according to the present disclosure.

Figure 52:
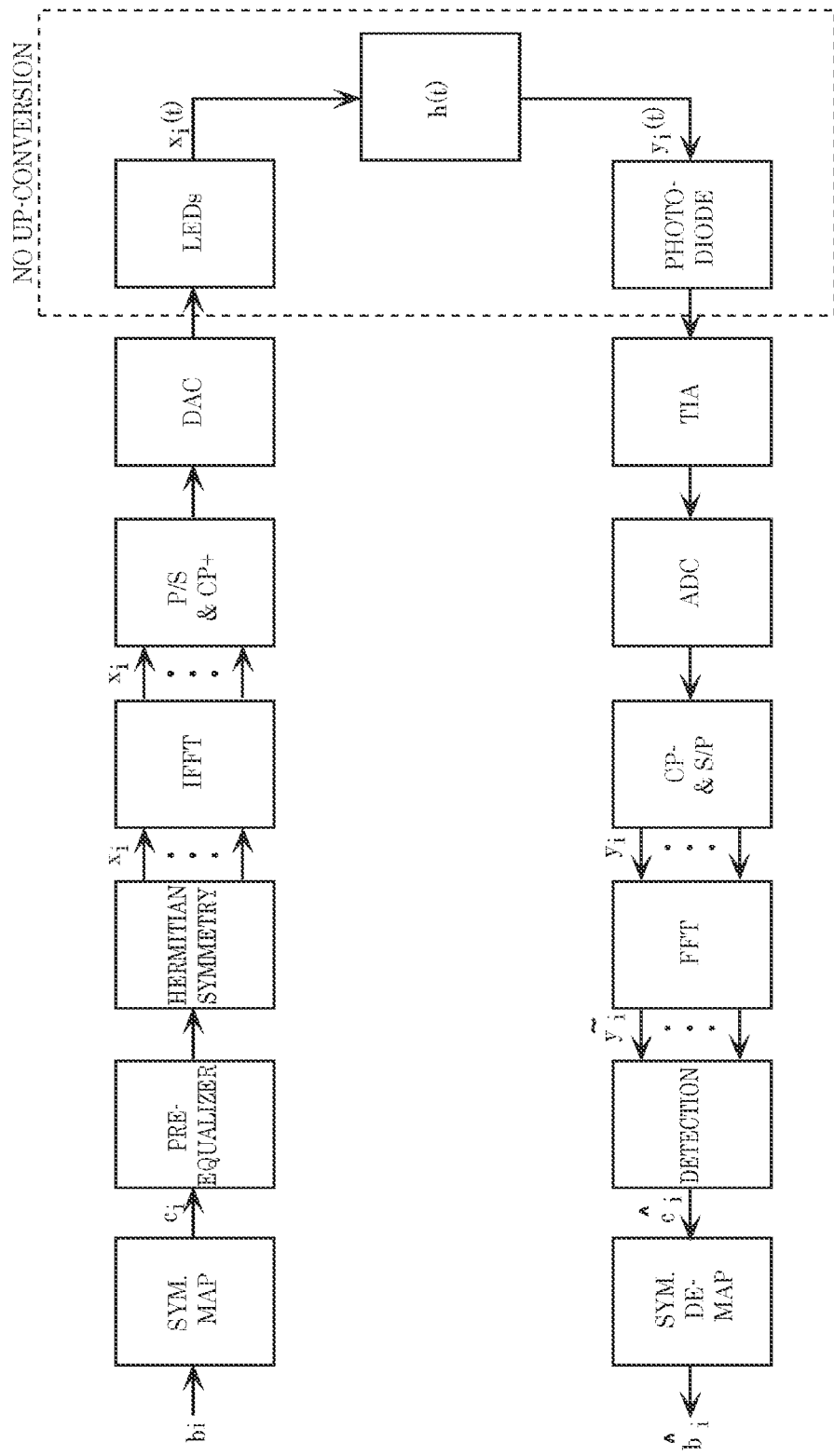
FIG. 52 illustrates a configuration example of another communication system that performs optical communication.

Note that the configuration illustrated in FIG. 5 was presented as one example of a communication system that performs visible light communication, but the configuration of the communication system that performs visible light communication is not limited to the configuration illustrated in FIG. 5. For example, a configuration like that illustrated in FIG. 52 (see, for example, "IEEE 802.11-16/1499r1") is acceptable. In FIG. 52, the transmission signal is transmitted as an optical signal in a baseband bandwidth without being up-converted. In other words, a device that transmits the optical signal according to this embodiment (i.e., a device including a light source) may have the configuration illustrated on the transmission-side in FIG. 52, and a terminal that receives the optical signal according to this embodiment may have the configuration illustrated on the reception-side in FIG. 52.

Embodiment 9

In this embodiment, additional information pertaining to FIG. 52 will be given.

FIG. 52 will be described in more detail. The symbol mapper receives an input of transmission data, performs mapping based on a modulation scheme, and outputs a symbol sequence (ci).

The pre-equalizer receives an input of the symbol sequence, performs pre-equalizing processing on the symbol sequence to reduce the equalizing processes on the reception-side, and outputs a pre-equalized symbol sequence.

The Hermitian symmetry processor receives an input of the pre-equalized symbol sequence, allocates sub-carriers to the pre-equalized symbol sequence to secure Hermitian symmetry, and outputs parallel signals.

The inverse (fast) Fourier transformer receives inputs of the parallel signals, applies an inverse (fast) Fourier transform to the parallel signals, and outputs inverse (fast) Fourier transformed signals.

The parallel serial and cyclic prefix adder receives an input of the inverse (fast) Fourier transformed signals, performs parallel conversion and adds cyclic prefix, and outputs the signal-processed signal.

The digital-to-analog converter receives an input of the signal-processed signal, performs digital-to-analog conversion, outputs an analog signal, and the analog signal is emitted as light from, for example, one or more LEDs.

Note that the pre-equalizer and the Hermitian symmetry processor need not be included. In other words, there may be instances in which the pre-equalizer and the Hermitian symmetry processor do not perform their respective signal processing.

The photodiode receives an input of light, and obtains a reception signal via a transimpedance amplifier (TIA).

The analog-to-digital converter performs an analog-to-digital conversion on the reception signal, and outputs a digital signal.

The cyclic prefix subtractor and serial parallel converter receives an input of the digital signal, subtracts the cyclic prefix, and then performs serial parallel conversion, and receives an input of parallel signals.

The (fast) Fourier transformer receives inputs of the parallel signals, applies a (fast) Fourier transform to the parallel signals, and outputs (fast) Fourier transformed signals.

The detector receives inputs of the (fast) Fourier transformed signals, performs detection, and outputs a series of reception symbols.

The symbol demapper receives an input of the series of reception symbols, performs demapping, and obtains a series of reception data.

In this way, even when such a transmission device that transmits the modulated optical signals and such a reception device that receives the modulated optical signals are applied to the amendments according to the present specification, the embodiments can be implemented in the same manner.

Embodiment 10

In Embodiment 8, an example in which the transmission device transmits a plurality of modulated optical signals and the reception device receives the plurality of modulated optical signals was given with reference to FIG. 42. In this embodiment, an implementation example in such a case will be given.

Figure 53:
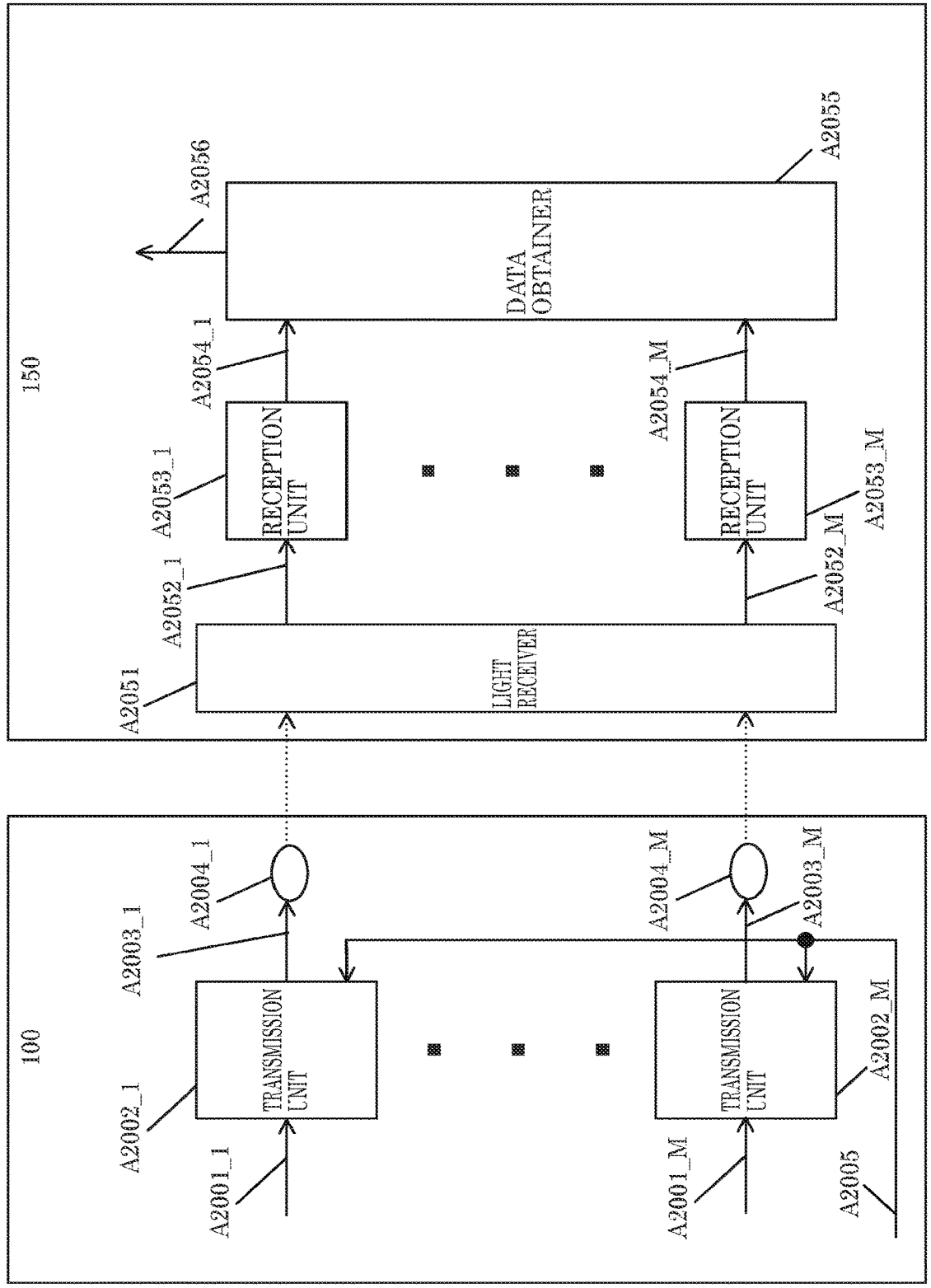
FIG. 53 illustrates configuration examples of a transmission device and a reception device according to Embodiment 10.

FIG. 53 illustrates an example of configurations of a transmission device and a reception device according to this embodiment. In FIG. 53, transmission device 100 transmits a plurality of modulated optical signals, and reception device 150 receives a plurality of modulated optical signals to receive reception data. Note that in FIG. 53, configurations that operate in the same manner as FIG. 6 share like reference signs.

The transmission device in FIG. 53 transmits M modulated optical signals. Note that M is an integer greater than or equal to two.

Transmission unit $A2002\_i$ receives inputs of data $A2001\_i$ and control signal $A2005$, and based on information related to the error correction encoding method and information related to the transmission method included in control signal $A2005$, implements error correction encoding and implements signal processing based on the transmission method to generate and output modulated optical signal A2003_i. Note that i is an integer greater than or equal to one and less than or equal to M.

Modulated optical signal A2003_i is then transmitted from light source A2004_i.

Light receiver A2051, one example of which is an image sensor, receives light corresponding to modulated optical signal A2003_i. Here, light receiver A2051 receives light corresponding to the M modulated optical signals. The method of receiving the plurality of optical reception signals used in light receiver A2051 is, for example, as described in Embodiment 8.

Light receiver A2051 outputs optical reception signal A2052_i corresponding to modulated optical signal 2003_i. Note that i is an integer greater than or equal to one and less than or equal to M.

Reception unit A2053_i receives an input of optical reception signal A2052_i. corresponding to modulated optical signal A2003_i, performs processing such as demodulation and error correction decoding, and outputs reception data A2054_i corresponding to data A2001_i.

Data obtainer A2055 receives inputs of data A2054_1, data A2054_2, . . . , and data A2054_M, and generates and outputs data A2056.

Figure 54:
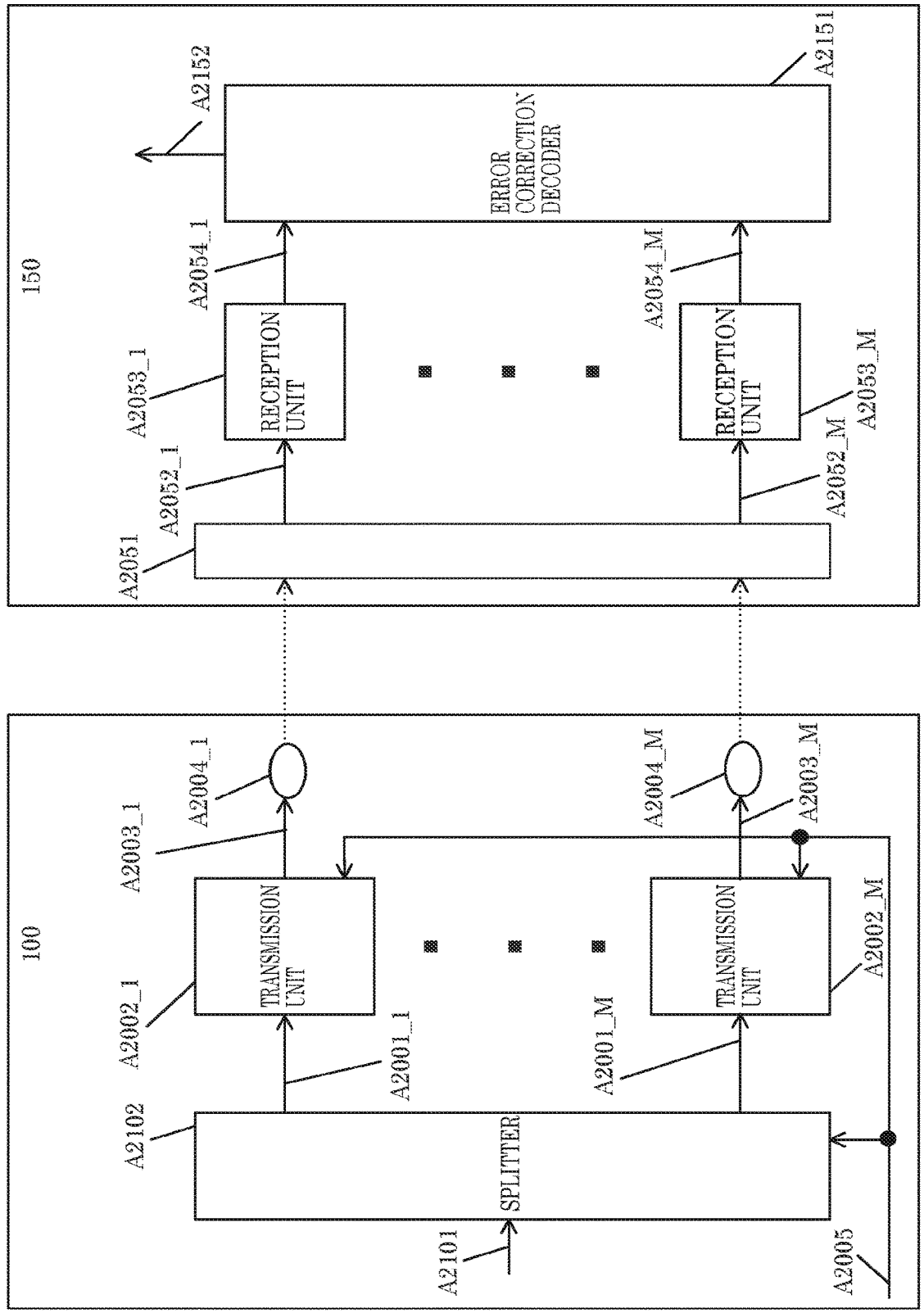
FIG. 54 illustrates configuration examples of the transmission device and the reception device according to Embodiment 10.

FIG. 54 illustrates an example of configurations of a transmission device and a reception device according to this embodiment, which differ from FIG. 53. Note that in FIG. 54, configurations that operate in the same manner as FIG. 53 share like reference signs.

Splitter A2102 receives inputs of information A2101 and control signal A2005, and based on information related to the error correction encoding method included in control signal A2005, performs error correction encoding on information A2101 to generate error correction encoded data. Splitter A2102 then splits the error correction encoded data and outputs error correction encoded data A2001_i.

Note that the splitting of the data into M items of error correction encoded data. A2001_i may be performed using any method. For example, the error correction encoded data may be split into M items and a data sequence of the split M items of data may be allocated as the M items of error correction encoded data A2001_i. Moreover, M data sequences configured of the same data may be generated based on the error correction encoded data, and the data sequences may be allocated as the items of error correction encoded data A2001_i. The method of allocating the error correction encoded data A2001_i is not limited to these examples, any method may be used so long as M data sequences are generated from the error correction encoded data, and the data sequences are allocated as the items of error correction encoded data A2001_i.

Transmission unit A2002_i receives inputs of data A2001_i and control signal A2005, and based on information related to the transmission method included in control signal A2005, implements signal processing based on the transmission method to generate and output modulated optical signal A2003_i. Note that i is an integer greater than or equal to one and less than or equal to M.

Modulated optical signal A2003_i is then transmitted from light source A2004_i.

Light receiver A2051, one example of which is an image sensor, receives light corresponding to modulated optical signal A2003_i. Here, light receiver A2051 receives light corresponding to the M modulated optical signals. The method of receiving the plurality of light reception signals used in light receiver A2051 is, for example, as described in Embodiment 8.

Light receiver A2051 outputs optical reception signal A2052_i corresponding to modulated optical signal 2003_i. Note that i is an integer greater than or equal to one and less than or equal to M.

Reception unit A2053_i receives an input of optical reception signal A2052_i corresponding to modulated optical signal A2003_i, performs processing such as demodulation, and outputs (the log-likelihood ratio of) reception data 2051_i corresponding to data A2001_i.

Error correction decoder A2151 receives inputs of (the log-likelihood ratio of) reception data 2054_1, (the log-likelihood ratio of) reception data 2054_2, . . . , and (the log-likelihood ratio of) reception data 2054_M, performs error correction decoding, and outputs reception data A2152.

Figure 55:
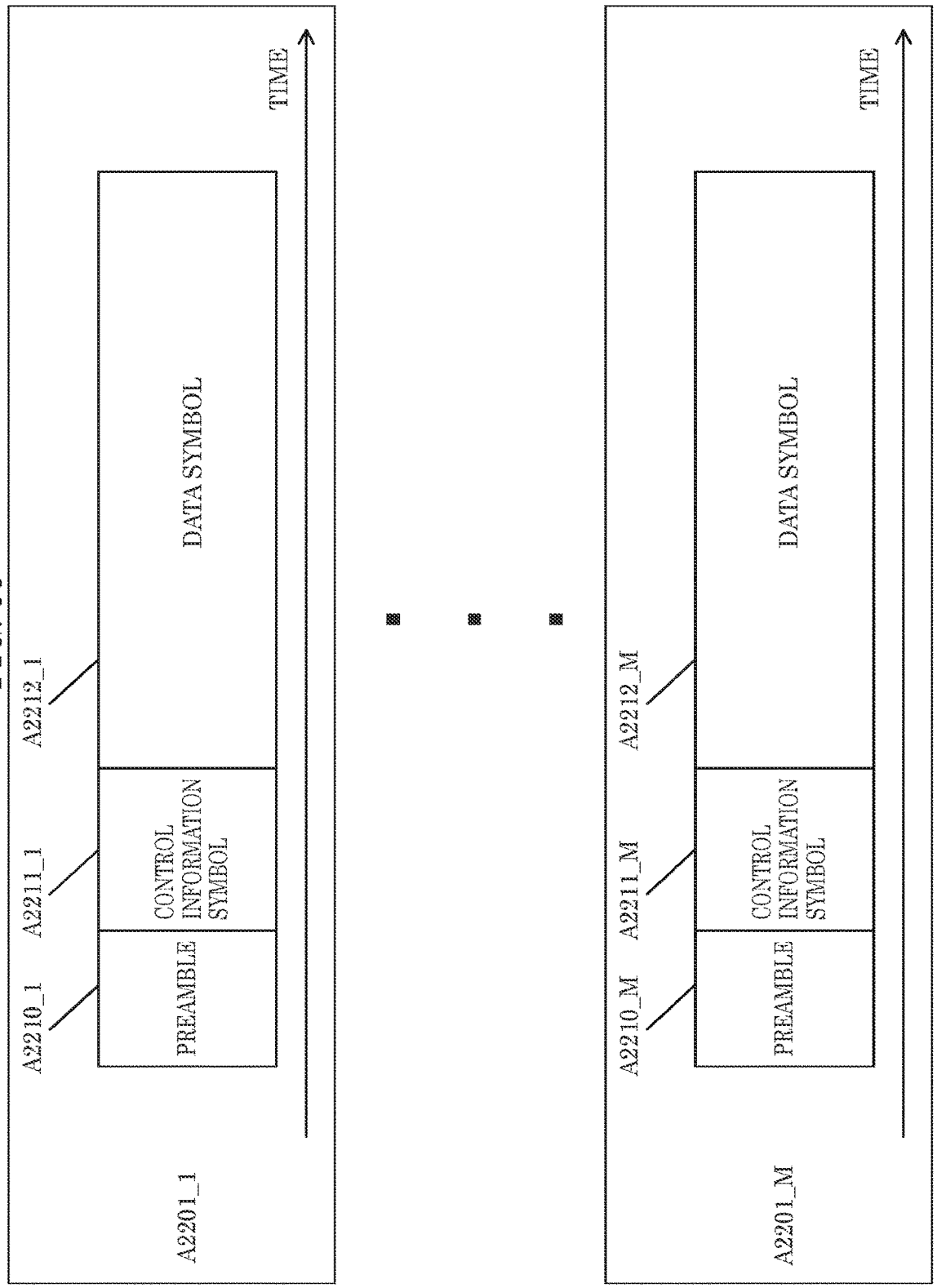
FIG. 55 illustrates one example of a frame configuration of a modulated optical signal according to Embodiment 10.

FIG. 55 illustrates one example of a frame configuration of a modulated optical signal transmitted by transmission device 100 illustrated in FIG. 53 and FIG. 54.

Frame configuration A2201_1 in FIG. 55 is one example of the frame configuration of modulated optical signal A2003_1 illustrated in FIG. 53 and FIG. 54. Note that in frame configuration A2201_1, time is represented on the horizontal axis.

Accordingly, frame configuration A2201_i in FIG. 55 is one example of the frame configuration of modulated optical signal A2003_i illustrated in FIG. 53 and FIG. 54. Note that in frame configuration A2201_i, time is represented on the horizontal axis. Note that i is an integer greater than or equal to one and less than or equal to M (in other words, in FIG. 55, M frame configurations are shown).

As illustrated in frame configuration A2201_i, transmission device 100 illustrated in FIG. 53 and FIG. 54 transmits, in modulated optical signal A2003_i, preamble A2210_i, control information symbol A2211_i, and data symbol A2212_i.

Figure 56:
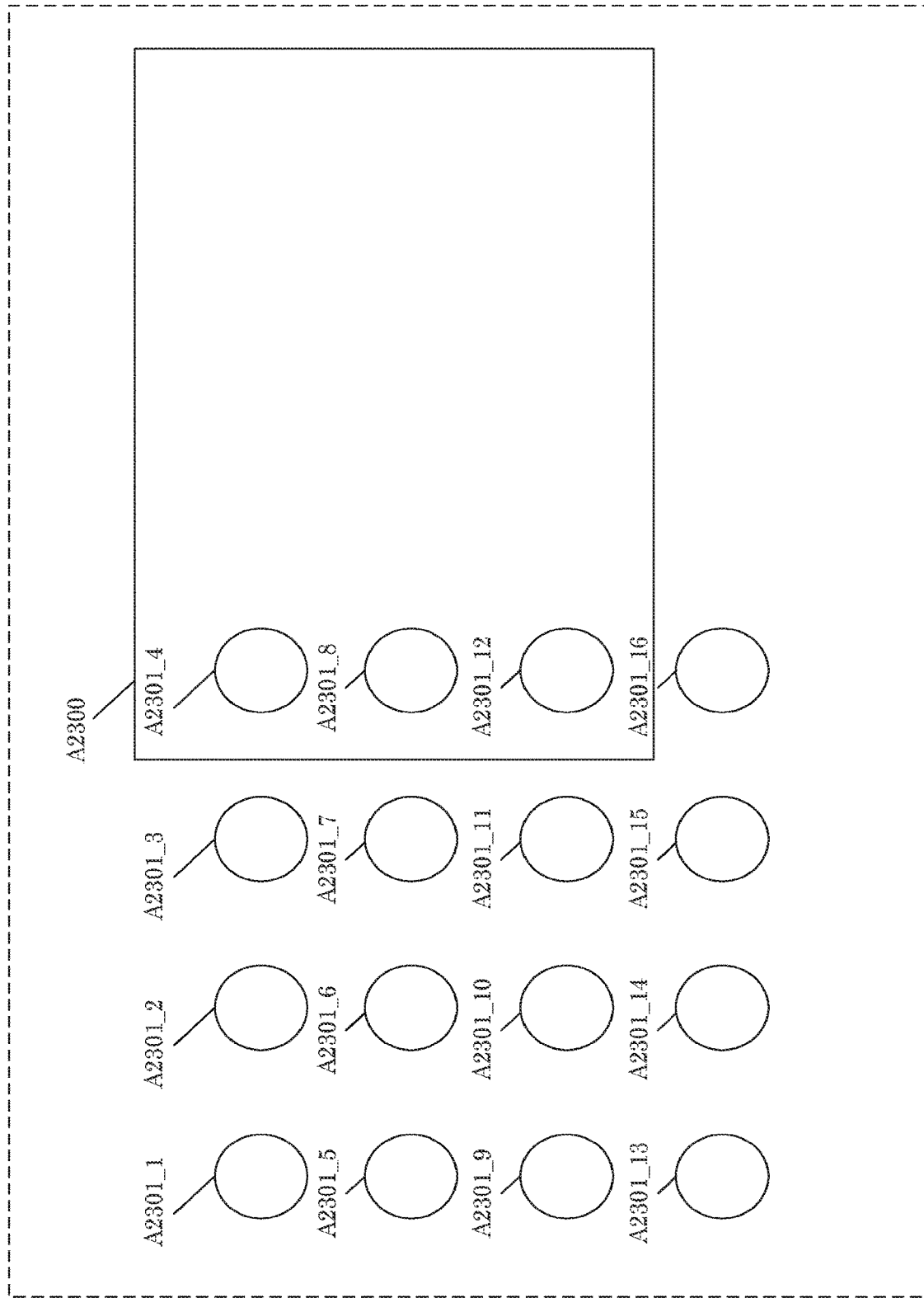
FIG. 56 illustrates one example of a reception state in the reception device according to Embodiment 10.

FIG. 56 illustrates one example of a reception state in reception device 150. Note that in the following example, transmission device 100 illustrated in FIG. 53 and FIG. 54 includes 16 (M=16) light sources.

In FIG. 56, A2300 indicates an image sensor, which is one example of the light receiver, A2301_1 indicates light emitted by a first light source, and this light includes a first modulated optical signal. Note that the first modulated optical signal corresponds to A2201_1 in FIG. 55.

Accordingly, in FIG. 56, A2301_i indicates light emitted by an i-th light source, and this light includes an i-th modulated optical signal. Note that the i-th modulated optical signal corresponds to A2201_i in FIG. 55. Note that i is an integer greater than or equal to one and less than or equal to 16.

In the example of the reception state in reception device 150 illustrated in FIG. 56, the light receiver in reception device 150 receives light from a fourth light source that includes a fourth modulated optical signal, receives light from an eighth light source that includes an eighth modulated optical signal, and receives light from a twelfth light source that includes a twelfth modulated optical signal.

For example, assuming transmission device 100 illustrated in FIG. 53 and/or FIG. 54 transmits 16 modulated optical signals from the 16 light sources, in the state illustrated in FIG. 56, since reception device 150 illustrated in FIG. 53 and/or FIG. 54 cannot receive all 16 of the modulated optical signals, it is difficult to obtain correct reception data in this state. A method for overcoming this problem will be described hereinafter.

Figure 57:
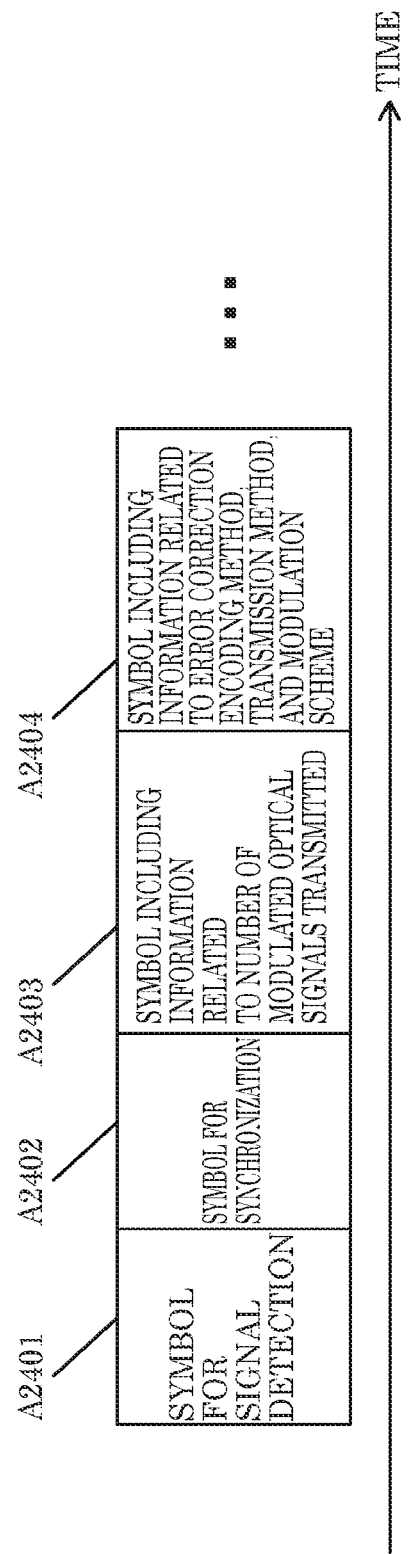
FIG. 57 illustrates one example of a configuration of symbols according to Embodiment 10.

FIG. 57 illustrates one example of a configuration of information included in preamble A2210_i and control information symbol A2211_i in frame configuration A2201_i of modulated optical signal A2003_i illustrated in FIG. 55, and the symbol configuration thereof. Note that i is an integer greater than or equal to one and less than or equal to M (M=16).

Preamble A2210_i and control information symbol A2211_i in frame configuration A2201_i include, as illustrated in FIG. 57, symbol A2401 for signal detection, symbol A2402 for synchronization, symbol A2403 including information related to the number of modulated optical signals transmitted, symbol A2404 including information related to the error correction encoding method, transmission method, and modulation scheme.

Symbol A2401 for signal detection is a symbol for notifying reception device 150 of the existence of the modulated optical signal, and by detecting this symbol, reception device 150 knows that the modulated optical signal exists.

Symbol A2402 for synchronization is a symbol for reception device 150 to perform time synchronization (may include frequency synchronization), and by using this symbol, reception device 150 can perform time synchronization and accurately demodulate the symbols.

Symbol A2403 including information related to the number of modulated optical signals transmitted is a symbol for notifying of the number of modulated optical signals transmitted by transmission device 100, and in the state illustrated in FIG. 56, symbol A2403 including information related to the number of modulated optical signals transmitted transmits information indicating "16".

In the reception state illustrated in FIG. 56, reception device 150 receives symbol A2403 including information related to the number of modulated optical signals transmitted, and thus knows that the number of modulated optical signals transmitted by transmission device 100 is 16. Note that in the case of the reception state illustrated in FIG. 56, reception device 150 knows that it has only received three of the 16 modulated optical signals.

Symbol A2404 including information related to the error correction encoding method, transmission method, and modulation scheme is, for example, a symbol including information on the error correction encoding method, transmission method, and modulation scheme used in the data symbol (symbol for transmitting data) in modulated optical signal A2003_i, and by receiving this symbol, reception device 150 can know the error correction encoding method, transmission method, and modulation scheme used in modulated optical signal A2003_i.

In the case of the frame configuration illustrated in FIG. 55, in modulated optical signal A2003_1 through modulated optical signal A2003_16, the symbols in FIG. 57 are transmitted by transmission device 100. As a result, even when reception device 150 cannot receive all of the modulated optical signals, like illustrated in FIG. 56, it is possible to know the number of modulated optical signals transmitted by transmission device 100, and thus reception device 150 can know whether all modulated optical signals have been received or not. When not all of the modulated optical signals have been received, signal processing can be cancelled midway, which achieves the advantageous effect that unnecessary power consumption can be reduced.

Figure 58:
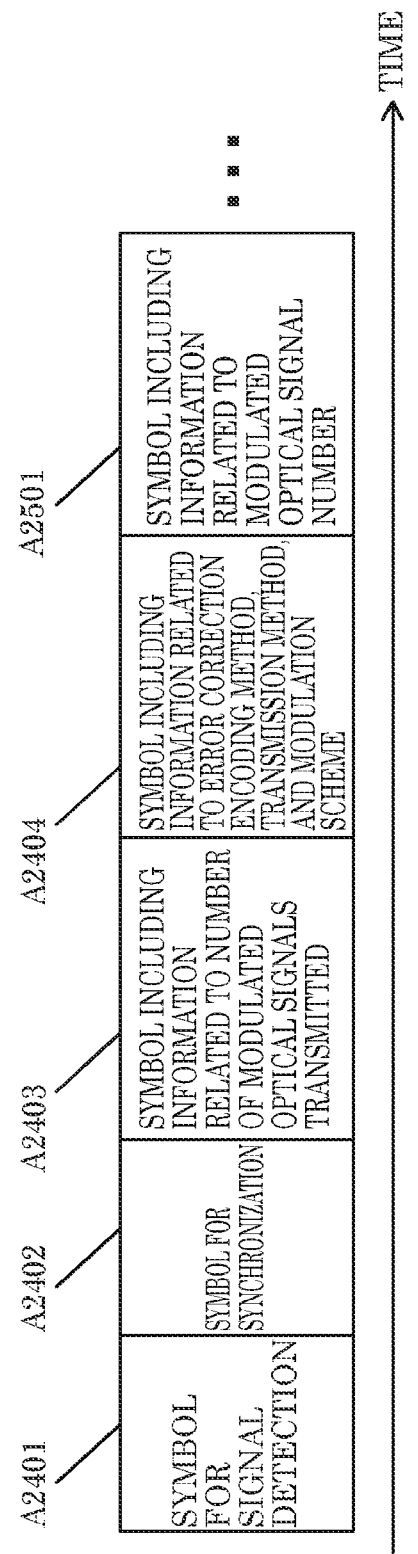
FIG. 58 illustrates another example of a configuration of symbols according to Embodiment 10.

FIG. 58 illustrates one example, which differs from the example illustrated in FIG. 57, of a configuration of information included in preamble A2210_i and control information symbol A2211_i in frame configuration A2201_i of modulated optical signal A2003_i illustrated in FIG. 55, and the symbol configuration thereof. Note that i is an integer greater than or equal to one and less than or equal to M (=16), and in FIG. 58, configurations that operate in the same manner as FIG. 57 share like reference signs. Accordingly, since those configurations have already been described, repeated description thereof will be omitted.

FIG. 58 differs from FIG. 57 in that symbol A2501 including information related to modulated optical signal number has been added to the symbols that transmission device 100 transmits.

Since FIG. 58 illustrates frame configuration A2201_i of modulated optical signal A2003_i in FIG. 55, that is to say, the frame configuration of the i-th modulated optical signal, symbol A2501 including information related to modulated optical signal number includes information indicating "i".

For example, symbol A2501 including information related to modulated optical signal number transmitted in the first modulated optical signal by transmission device 100 includes information indicating "1".

In the reception state illustrated in FIG. 56, reception device 150 receives symbol A2403 including information related to the number of modulated optical signals transmitted, and thus knows that the number of modulated optical signals transmitted by transmission device 100 is 16. Then, since reception device 150 receives symbol A2501 including information related to modulated optical signal number included in the fourth modulated optical signal, symbol A2501A including information related to modulated optical signal number included in the eighth modulated signal, and symbol A2501A including information related to modulated optical signal number included in the twelfth modulated signal, reception device 150 knows that the fourth modulated optical signal, the eighth modulated optical signal and the twelfth modulated optical signal have been received. As a result of knowing this situation, reception device 150 implements operations for improving the reception condition, and thus improves data reception quality. Note that these operations will be described in greater detail later.

Figure 59:
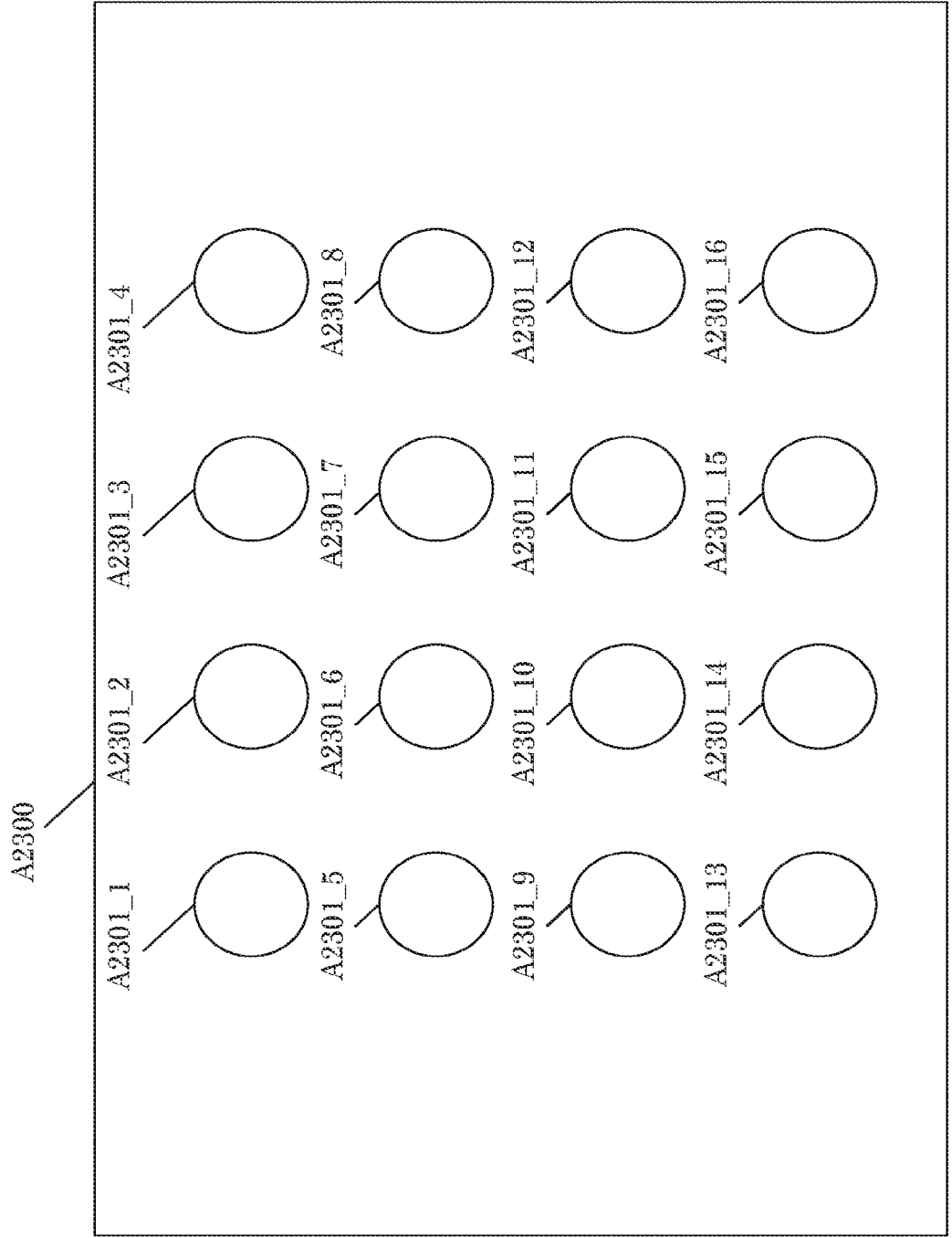
FIG. 59 illustrates another example of a reception state in the reception device according to Embodiment 10.
Figure 60:
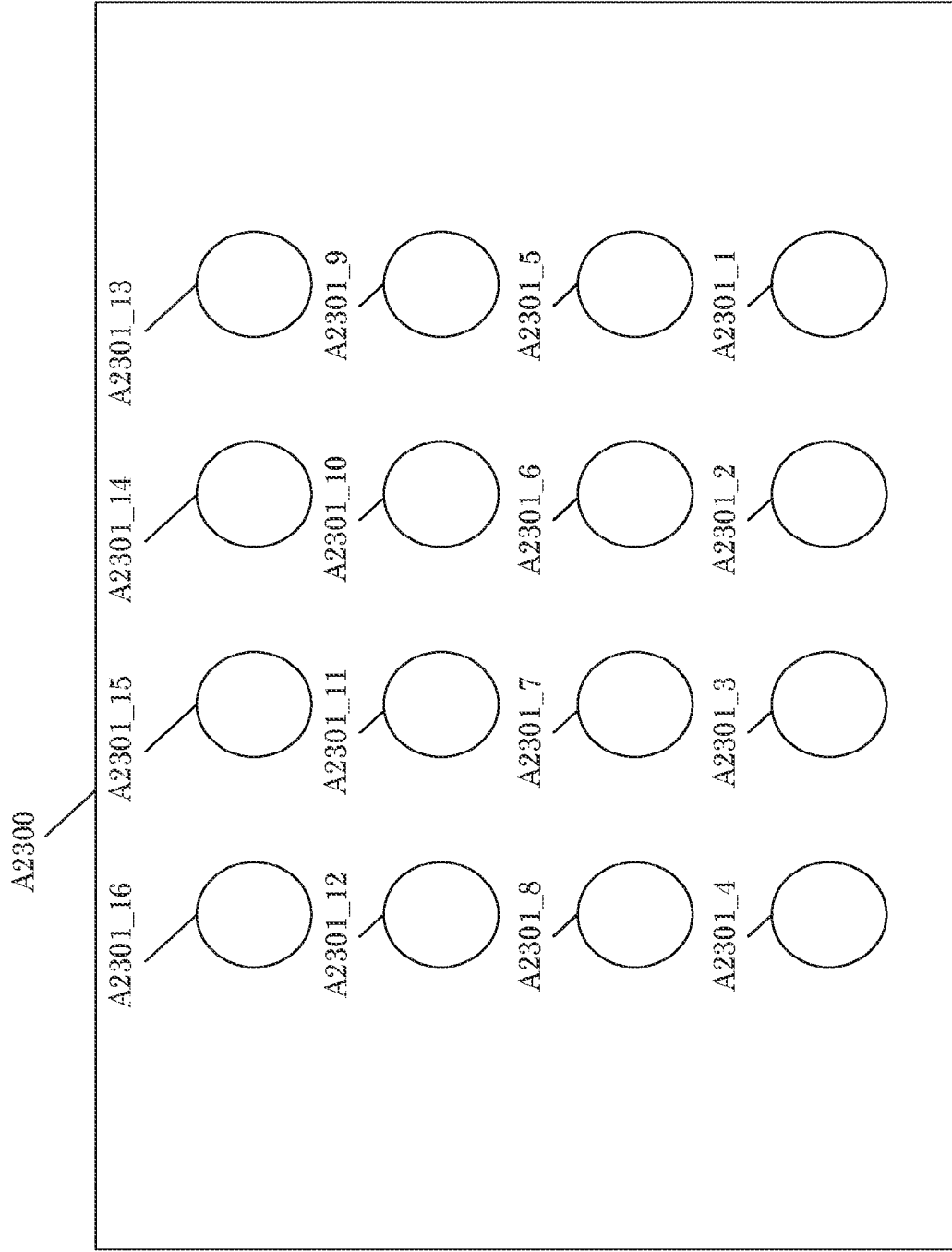
FIG. 60 illustrates another example of a reception state in the reception device according to Embodiment 10.

Other examples of reception states in reception device 150 are illustrated in FIG. 59 and FIG. 60. Note that in FIG. 59 and FIG. 60, configurations that operate in the same manner as FIG. 56 share like reference signs. Accordingly, since those configurations have already been described, repeated description thereof will be omitted.

In the example of the reception state in reception device 150 illustrated in FIG. 59, light receiver A2300 in reception device 150 receives light from a first light source that includes a first modulated optical signal through light from a sixteenth light source that includes a sixteenth modulated optical signal, that is to say, 16 modulated optical signals. In the example illustrated in FIG. 59, for example, the first modulated optical signal is received at the upper-left region of light receiver A2300.

In the example of the reception state in reception device 150 illustrated in FIG. 60, light receiver A2300 in reception device 150 receives light from a first light source that includes a first modulated optical signal through light from a sixteenth light source that includes a sixteenth modulated optical signal, that is to say, 16 modulated optical signals. In the example illustrated in FIG. 60, for example, the first modulated optical signal is received at the bottom-right region of light receiver A2300, which differs from the example in FIG. 59.

The reception states in FIG. 59 and FIG. 60 are merely examples; the situation in which reception device 150 receives the first modulated optical signal through sixteenth modulated optical signal differs depending on the environment. Taking this into consideration, since each modulated optical signal includes symbol A2501 including information related to modulated optical signal number, like in FIG. 58, reception device 150 can know which part of the light receiver will receive which modulated optical signal. Then, reception device 150 receives the i-th reception data obtained from the reception signal of the i-th modulated optical signal, and when the first through sixteenth reception data needs to be rearranged, since the reception data indicates which modulated optical signal it corresponds to, it is possible to distinguish this from symbol A2501 including information related to modulated optical signal number, whereby the reception data can be correctly rearranged, which improves data reception quality.

Next, a configuration method of a frame different from the example above will be described.

FIG. 55 illustrates one example of a frame configuration of a modulated optical signal transmitted by transmission device 100 illustrated in FIG. 53 and FIG. 54, and since this has already been described above, repeated description will be omitted.

Figure 61:
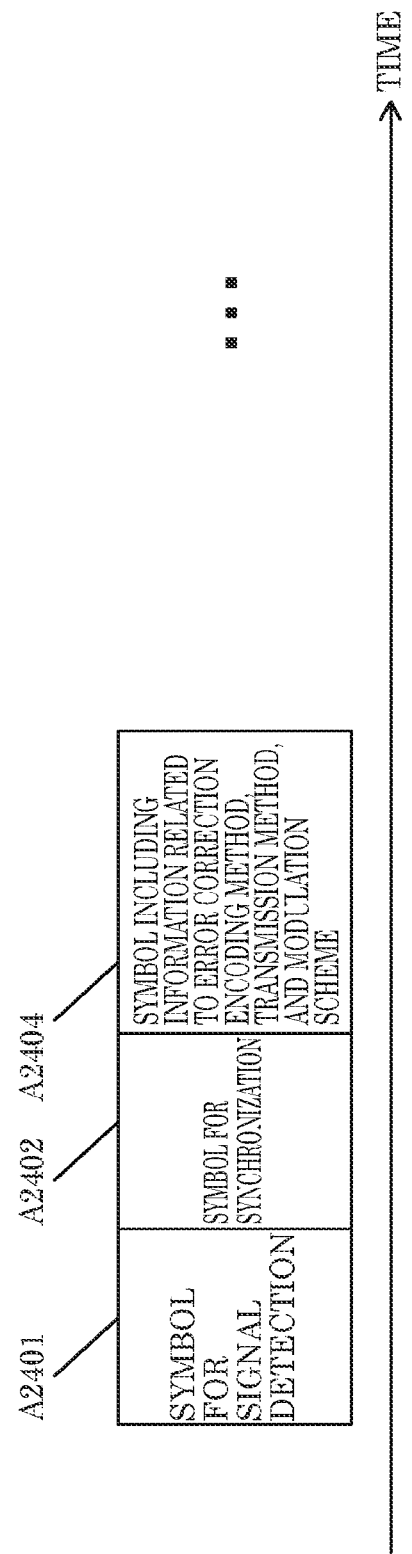
FIG. 61 illustrates another example of a configuration of symbols according to Embodiment 10.

For example, assume the configuration of the preamble and the control information symbol in frame configuration A2201_1 in modulated optical signal A2003_1 in FIG. 55 is as illustrated in FIG. 57, and the configuration of the preamble and the control information symbol in frame configuration A2201_2 in modulated optical signal. A2003_2 through frame configuration A2201_16 in modulated optical signal A2003_16 is as illustrated in FIG. 61. Note that in FIG. 61, configurations that operate in the same manner as FIG. 57 share like reference signs. The characterizing feature of FIG. 61 is that symbol A2403 including information related to the number of modulated optical signals transmitted is not included. In other words, the characterizing feature is that transmission device 100 only transmits symbol A2403 including information related to the number of modulated optical signals transmitted in modulated optical signal A2003_1.

Here, when the reception state in reception device 150 is the state illustrated in FIG. 56, reception device 150 does not receive symbol A2403 including information related to the number of modulated optical signals transmitted, so reception device 150 cannot know the number of modulated optical signals transmitted by transmission device 100. Thus, reception device 150 determines that correctly receiving the data is difficult, stops the signal processing in the reception operations, and thus can reduce unnecessary power consumption.

Note that in the description of this example, transmission device 100 is described as transmitting symbol A2403 including information related to the number of modulated optical signals transmitted only in modulated optical signal A2003_1, but this example is not limiting. So long as transmission device 100 transmits symbol A2403 including information related to the number of modulated optical signals transmitted in one or more of the modulated optical signals from among modulated optical signals A2003_1 through A2003_16, the same advantageous effects as described above can be achieved.

Next, yet another example will be given.

FIG. 55 illustrates one example of a frame configuration of a modulated optical signal transmitted by transmission device 100 illustrated in FIG. 53 and FIG. 54, and since this has already been described above, repeated description will be omitted.

Figure 62:
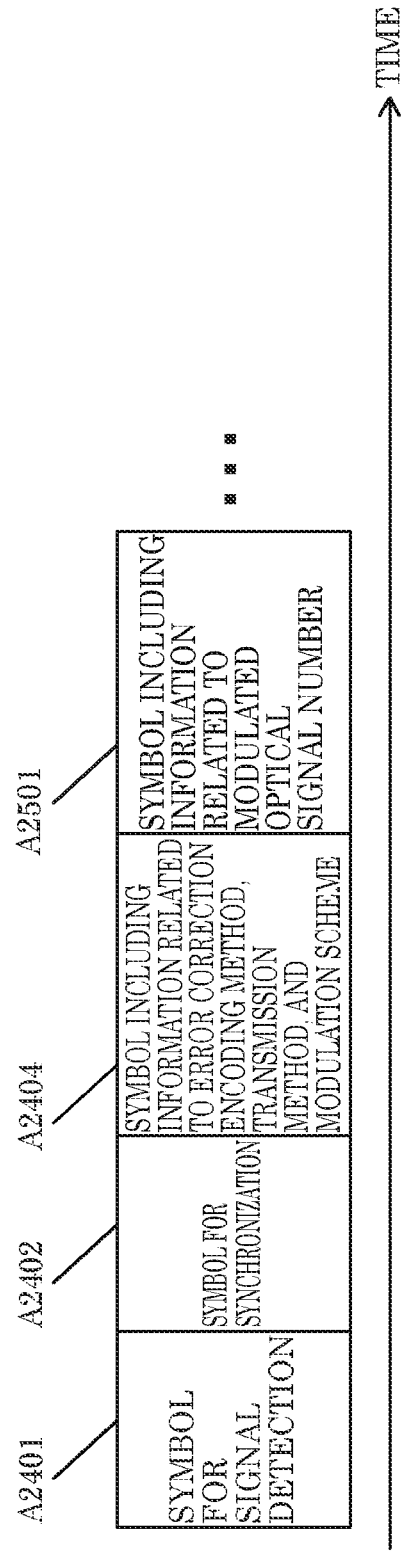
FIG. 62 illustrates another example of a configuration of symbols according to Embodiment 10.

For example, assume the configuration of the preamble and the control information symbol in frame configuration A2201_1 in modulated optical signal A2003_1 in FIG. 55 is as illustrated in FIG. 58, and the configuration of the preamble and the control information symbol in frame configuration A2201_2 in modulated optical signal A2003_2 through frame configuration A2201_16 in modulated optical signal A2003_16 is as illustrated in FIG. 62. Note that in FIG. 62, configurations that operate in the same manner as FIG. 57 and FIG. 58 share like reference signs. The characterizing feature of FIG. 62 is that symbol A2403 including information related to the number of modulated optical signals transmitted is not included. In other words, the characterizing feature is that transmission device 100 only transmits symbol A2403 including information related to the number of modulated optical signals transmitted in modulated optical signal A2003_1.

Here, when the reception state in reception device 150 is the state illustrated in FIG. 56, reception device 150 does not receive symbol A2403 including information related to the number of modulated optical signals transmitted, so reception device 150 cannot know the number of modulated optical signals transmitted by transmission device 100. Thus, reception device 150 determines that correctly receiving the data is difficult, stops the signal processing in the reception operations, and thus can reduce unnecessary power consumption.

Note that in the description of this example, transmission device 100 is described as transmitting symbol A2403 including information related to the number of modulated optical signals transmitted only in modulated optical signal A2003_1, but this example is not limiting. So long as transmission device 100 transmits symbol A2403 including information related to the number of modulated optical signals transmitted in one or more of the modulated optical signals from among modulated optical signals A2003_1 through A2003_16, the same advantageous effects as described above can be achieved.

In yet another example, transmission device 100 may transmit the preamble and the control information symbol in one or more of the modulated optical signals from among modulated optical signals A2003_1 through A2003_16.

As described above, when the transmission device transmits a plurality of modulated optical signals, as described in this embodiment, as a result of transmitting the modulated optical signals, advantageous effects whereby the reception device can achieve high data reception quality and can reduce power consumption can be achieved.

Note that in this embodiment, the number of modulated optical signals that the transmission device transmits is exemplified as, but not limited to, 16. For example, when the transmission device has a configuration like that of 100 illustrated in FIG. 53, the number of modulated optical signals transmitted may be changed depending on the time of transmission. For example, at a first time, 16 modulated optical signals may be transmitted, at a second time, eight modulated optical signals may be transmitted, and at a third time, one modulated optical signal may be transmitted. Moreover, in the case of this example, at the first time, information indicating 16 is transmitted in symbol A2404 including information related to the number of modulated optical signals transmitted, at the second time, information indicating eight is transmitted in symbol A2404 including information related to the number of modulated optical signals transmitted, and at the third time, information indicating one is transmitted in symbol A2404 including information related to the number of modulated optical signals transmitted.

Then, in this embodiment, the frame configuration was exemplified as the frame configuration illustrated in FIG. 55, but the frame configuration is not limited to this example; other symbols may be present in the frame. Moreover, the order in which the symbols are transmitted is not limited to the order illustrated in FIG. 55.

Furthermore, the configurations of the preamble and the control information symbol were exemplified as those illustrated in FIG. 57, FIG. 58, FIG. 61, and FIG. 62, but in each of these figures, one or more symbols may be omitted, or other symbols may be present. Operations can be performed in the same manner with such configurations. In other words, the configurations of the preamble and the control information symbol are not limited to the examples in FIG. 57, FIG. 58, FIG. 61, and FIG. 62. Moreover, the order in which symbols included in the preamble and the control information symbol is not limited to the examples in. FIG. 57, FIG. 58, FIG. 61, and FIG. 62.

Embodiment 11

In this embodiment, an implementation method for improving data reception quality by reception device 150 when, for example, the reception state of reception device 150 is like the situation illustrated in FIG. 56 will be described.

Figure 63:
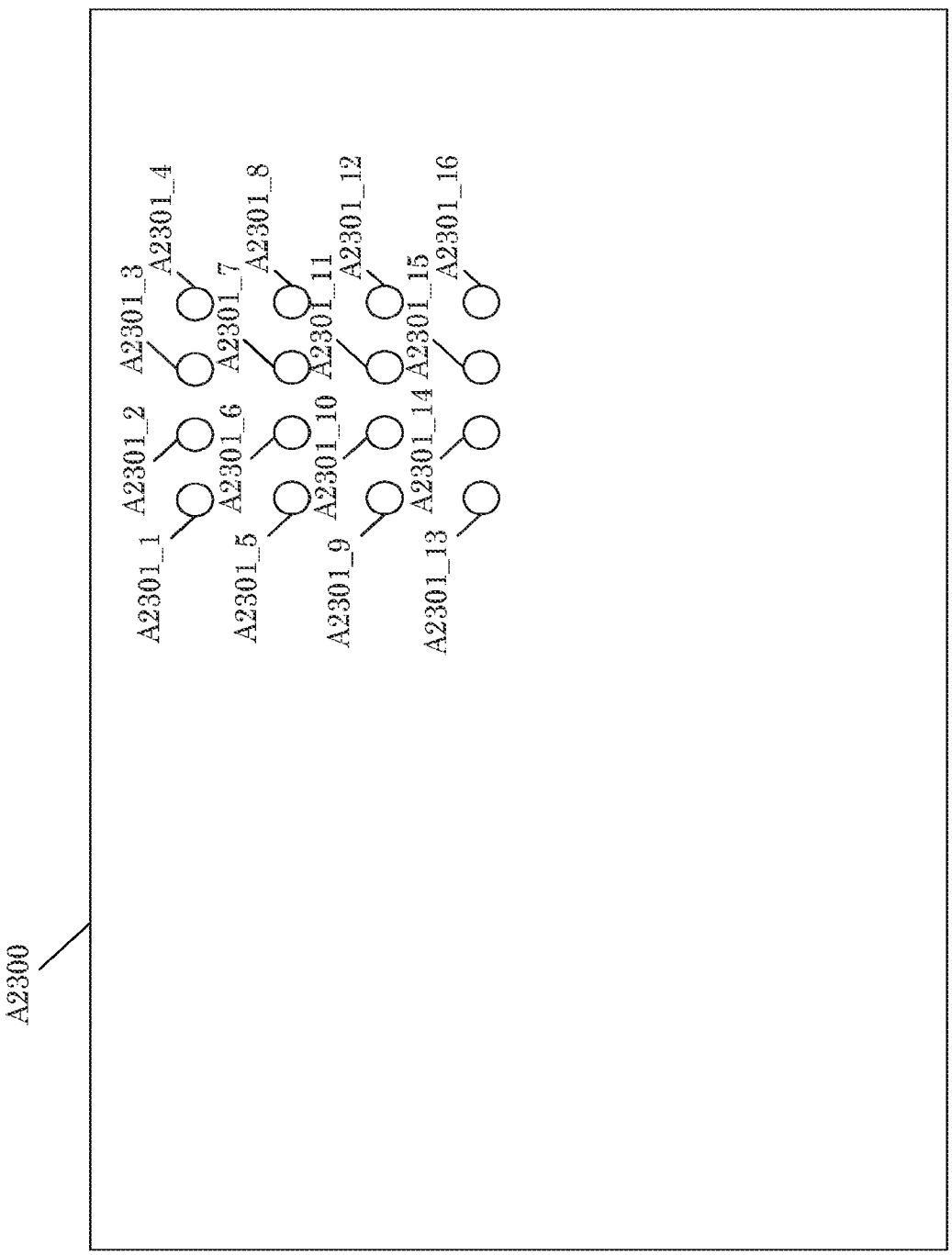
FIG. 63 illustrates another example of a configuration of symbols according to Embodiment 11.

As described in Embodiment 10, it is difficult for reception device 150 to correctly obtain reception data in a situation like that illustrated in FIG. 56, for example. Moreover, there are instances in which the reception state of reception device 150 is like that illustrated in FIG. 63. In FIG. 63, configurations that operate in the same manner as FIG. 56 share like reference signs.

In FIG. 63, since the surface area of the light emitted by each light source in the light receiver such as the image sensor is small, there is a problem that the data reception quality in reception device 150 decreases. Moreover, when line scanning is performed or line scan sampling is performed per region, reception device 150 may experience a significant reduction in data reception quality.

In this embodiment, an example of a configuration of reception device 150 that overcomes this problem will be given.

Transmission device 100 in FIG. 53 is one example of a configuration of the transmission device that transmits data. Note that since FIG. 53 has already been described, repeated description thereof will be omitted.

Figure 64:
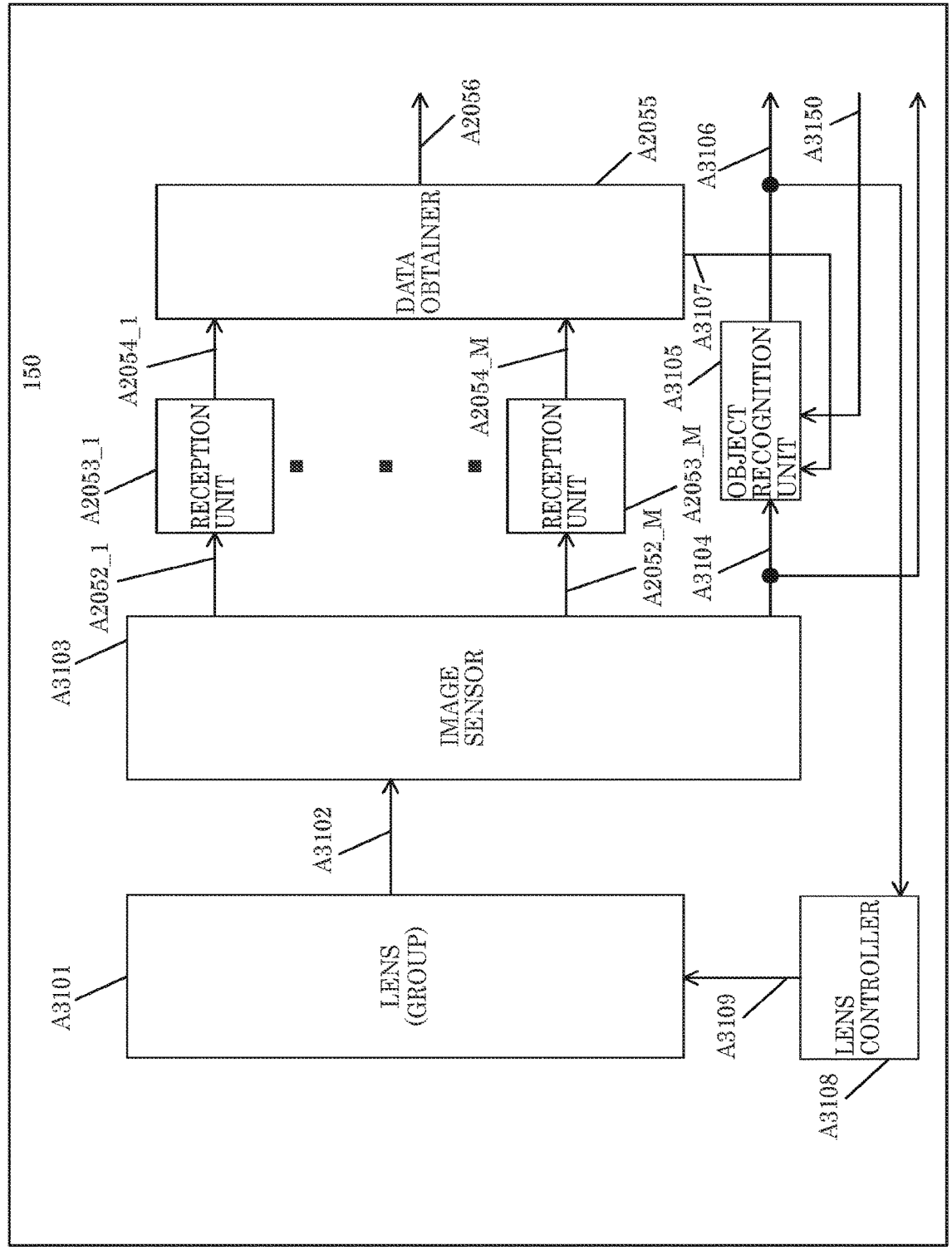
FIG. 64 illustrates one example of a configuration of a reception device according to Embodiment 11.

The configuration of reception device 150 that receives the modulated optical signal transmitted by transmission device 100 in FIG. 53 is illustrated in FIG. 64.

Another example of a configuration of the transmission device that transmits data that is different from the example of FIG. 53 is transmission device 100 illustrated in FIG. 54. Note that since FIG. 54 has already been described, repeated description thereof will be omitted.

Figure 65:
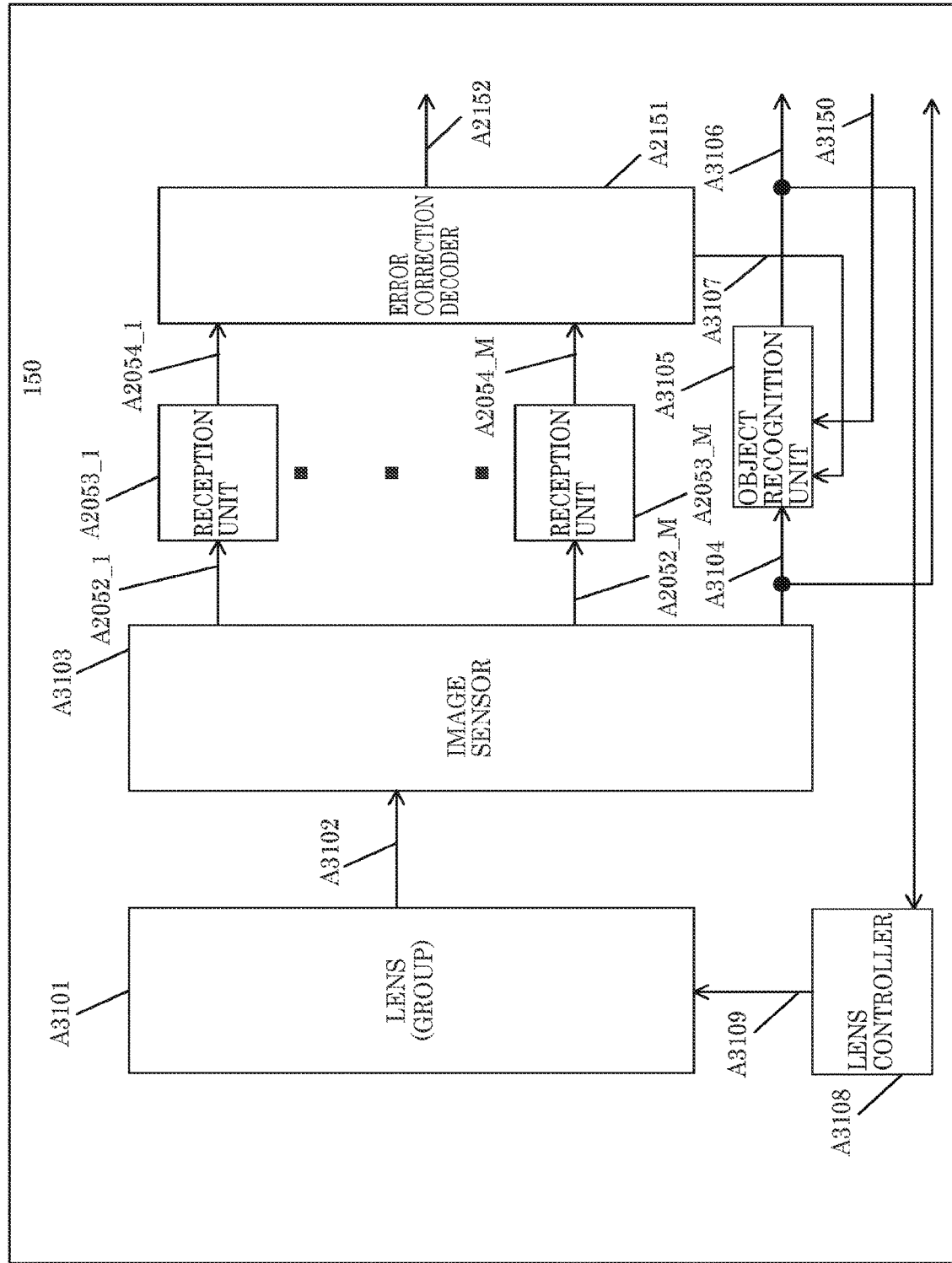
FIG. 65 illustrates another example of a configuration of the reception device according to Embodiment 11.

The configuration of reception device 150 that receives the modulated optical signal transmitted by transmission device 100 in FIG. 54 is illustrated in FIG. 65.

Hereinafter, reception device 150 illustrated in FIG. 64 and FIG. 65 be described.

FIG. 64 illustrates one example of a configuration of reception device 150 that receives the modulated optical signal transmitted by transmission device 100 illustrated in FIG. 53, and configurations that operate the same as FIG. 53 share like reference signs.

Lens (group) A3101 receives an input of lens control signal A3109, and performs control such as focal length, aperture, and focus control.

Image sensor (light receiver) A3103 receives and input of light A3102 that has passed through the lens, and outputs optical reception signals A2052_1 through A2502_M and image signal A3104. Note that image signal A3104 may subsequently be subjected to signal processing and displayed as an image on an internal display, and may be displayed as an image on an external display via an interface.

Data obtainer A2055 receives inputs of reception data A2054_1 through A2054_M, and outputs data A2056 and reception state information A3107.

Reception state information A3107 may be, for example, the information related to the number of modulated optical signals transmitted obtained from symbol A2403 including information related to the number of modulated optical signals transmitted, which is transmitted by transmission device 100 described in Embodiment 10, or the information related to modulated optical signal number obtained from symbol A2501 including information related to modulated optical signal number transmitted by transmission device 100 described in Embodiment 10. Moreover, reception state information A3107 may be information indicating a reception state, generated from the information related to the number of modulated optical signals transmitted and/or the information related to modulated optical signal number. Note that these examples are not limiting.

Object recognition unit A3105 receives inputs of image signal A3104, reception state information A3107 and instruction signal A3150, and performs object recognition based on instruction signal A3150. For example, when instruction signal A3150 indicates "perform communication", object recognition unit A3105 starts modulated optical signal recognition. Here, object recognition unit A3105 receives inputs of image signal A3104 and reception state information A3107, and outputs object recognition signal A3106. These operations will be described in greater detail later.

Lens controller A3108 receives an input of object recognition signal A3106, recognizes a reception state, examples of which are illustrated in FIG. 56, FIG. 63, etc., and outputs control signal A3109 corresponding to control such as determining whether to perform lens control, and when performing lens control, determines the set value for focal length, the set value for aperture, and the setting for focus. In FIG. 64, lens controller A3108 is exemplified as receiving an input of object recognition signal A3106, but may receive inputs of other signals.

FIG. 65 illustrates one example of a configuration of reception device 150 that receives the modulated optical signal transmitted by transmission device 100 illustrated in FIG. 54, and configurations that operate the same as FIG. 53 and FIG. 54 share like reference signs. Note that since operations performed by lens (group) A3101, image sensor A3103, object recognition unit A3105, and lens controller A3108 have already been described, repeated description is omitted.

Error correction decoder A2155 receives inputs of reception data A2054_1 through A2054_M, and outputs data A2056 and reception state information A3107.

Next, a detailed example of a control method of lens (group) A3101 in FIG. 64 and FIG. 65 will be given.

As described in Embodiment 10, for example, when the reception state of reception device 150 is the state illustrated in FIG. 56, since the light receiver is not receiving light emitted by some of the light sources, it is difficult for reception device 150 to correctly receive the data. Moreover, as described above, when the reception state of reception device 150 is the state illustrated in FIG. 63, a problem arises in that the data reception quality of reception device 150 is poor.

However, when the reception state of reception device 150 is a state like one of those illustrated in FIG. 59 and FIG. 60, data reception quality is high.

From the above, when reception device 150 controls lens (group) A3101 so as to achieve a state like one of those illustrated in FIG. 59 and FIG. 60, data reception quality improves. The configurations of reception device 150 illustrated in FIG. 64 and FIG. 65 are examples of configurations for realizing this.

A detailed example of control of reception device 150 illustrated in FIG. 64 and FIG. 65 will be given.

Assume the reception state of reception device 150 is the state illustrated in, for example, FIG. 56. Here, since reception state information A3107 in FIG. 64 and FIG. 65 is information generated based on the information related to the number of modulated optical signals transmitted and the information related to modulated optical signal number, as described above, object recognition unit A3105 in FIG. 64 and FIG. 65 recognizes that three of the 16 modulated optical signals have been received.

Furthermore, object recognition unit A3105 recognizes, from image signal A3104, the reception state of the modulated optical signals, for example, which positions on the image sensor the three modulated optical signals are received at. In other words, object recognition unit A3105 performs object recognition as depicted in FIG. 56. Accordingly, object recognition unit A3105 recognizes the reception state of the modulated optical signals and that the 16 modulated optical signals have not been received. Furthermore in the case of this example, based on these recognition results, object recognition unit A3105 determines to perform lens control, and determines a suitable set value for focal length, a suitable set value for aperture, and a suitable setting for focus for realizing suitable communication, and outputs object recognition signal A3106 including this information. Note that it is sufficient if object recognition signal A3106 includes at least the suitable set value for focal length; object recognition signal A3106 need not include the suitable set value for aperture and the suitable setting for focus.

Lens controller A3108 receives an input of object recognition signal A3106, and based on, for example, the suitable set value for focal length, the suitable set value for aperture, and the suitable setting for focus included in object recognition signal A3106, outputs lens control signal A3109 for controlling lens (group) A3101.

By implementing this sequence of operations, reception device 150 illustrated in FIG. 64 and FIG. 65 can achieve a reception state such as those illustrated in FIG. 59 and FIG. 60, and thus achieve the advantageous effect that high data reception quality can be achieved.

Although the above example pertains to controlling the reception state of reception device 150 from the state illustrated in FIG. 56 to a state like one of those illustrated in FIG. 59 and FIG. 60, this example is not limiting. For example, the reception state of reception device 150 may be controlled from the state illustrated in FIG. 63 to a state like one of those illustrated in FIG. 59 and FIG. 60. However, these examples are not limiting.

Next, an example of control of reception device 150 illustrated in FIG. 66 and FIG. 67 that differs from FIG. 64 and FIG. 65 will be given.

Figure 66:
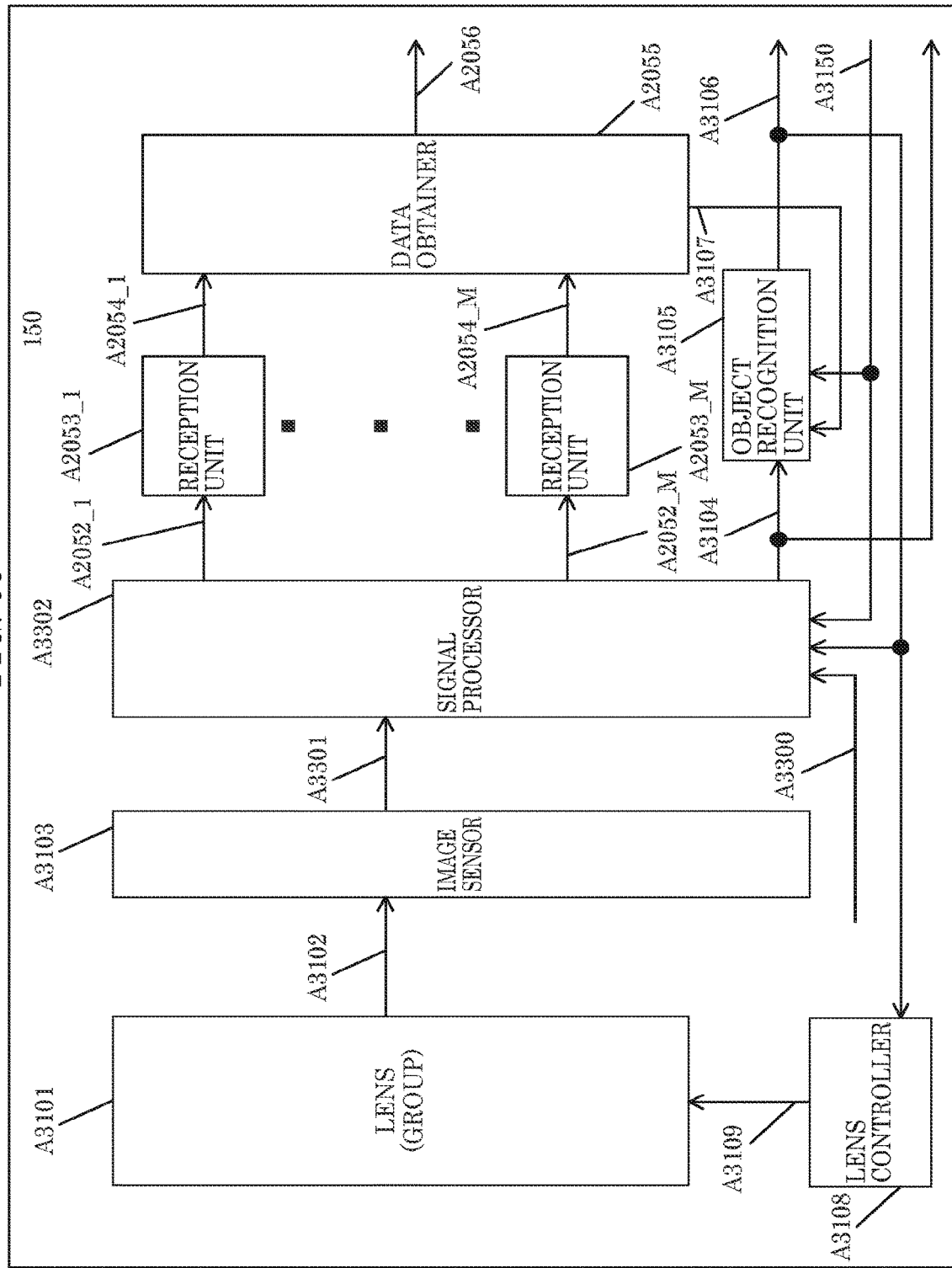
FIG. 66 illustrates another example of a configuration of the reception device according to Embodiment 11.

FIG. 66 illustrates one example of a configuration of reception device 150 that receives the modulated optical signal transmitted by transmission device 100 illustrated in FIG. 53, and configurations that operate the same as FIG. 64 share like reference signs. Repeated description of configurations that have already been described will be omitted.

Reception device 150 in FIG. 66 differs from reception device 150 in FIG. 64 in regard to the inclusion of signal processor A3302 disposed after image sensor A3103.

Here, assume signal processor A3302 includes at least a function for processing zoom (enlarging (and/or shrinking) an image).

Accordingly, signal processor A3302 receives inputs of image signal A3301, zoom signal A3300, object recognition signal A3106, and instruction signal A3150, and when instruction signal A3150 indicates "capturing mode (perform image capturing)", signal processor A3302 performs signal processing for zooming on image signal A3301 based on the zoom information (enlarging (and/or shrinking) an image) included in zoom signal A3300, and outputs signal-processed image signal A3104.

When instruction signal A3150 indicates "communication mode (perform communication)", signal processor A3302 performs signal processing for zooming on image signal A3301 based on the information included in object recognition signal A3106, such as the suitable set value for focal length, the suitable set value for aperture, and the suitable setting for focus, and outputs signal-processed image signal A3104 and signal-processed optical reception signals 2052_1 through A2052_M. With this, as described above, since the reception state is improved, the advantageous effect that data reception quality is improved can be achieved.

Note that since the method for improving the reception state used in lens controller A3108 has already been described, repeated description thereof will be omitted.

By implementing the above, reception device 150 can achieve the advantageous effect of an improvement in data reception quality since the reception state improves. In FIG. 66, when lens (group) A3101 does not include a function for changing the focal length, changing of the focal length to improve reception is not performed.

Figure 67:
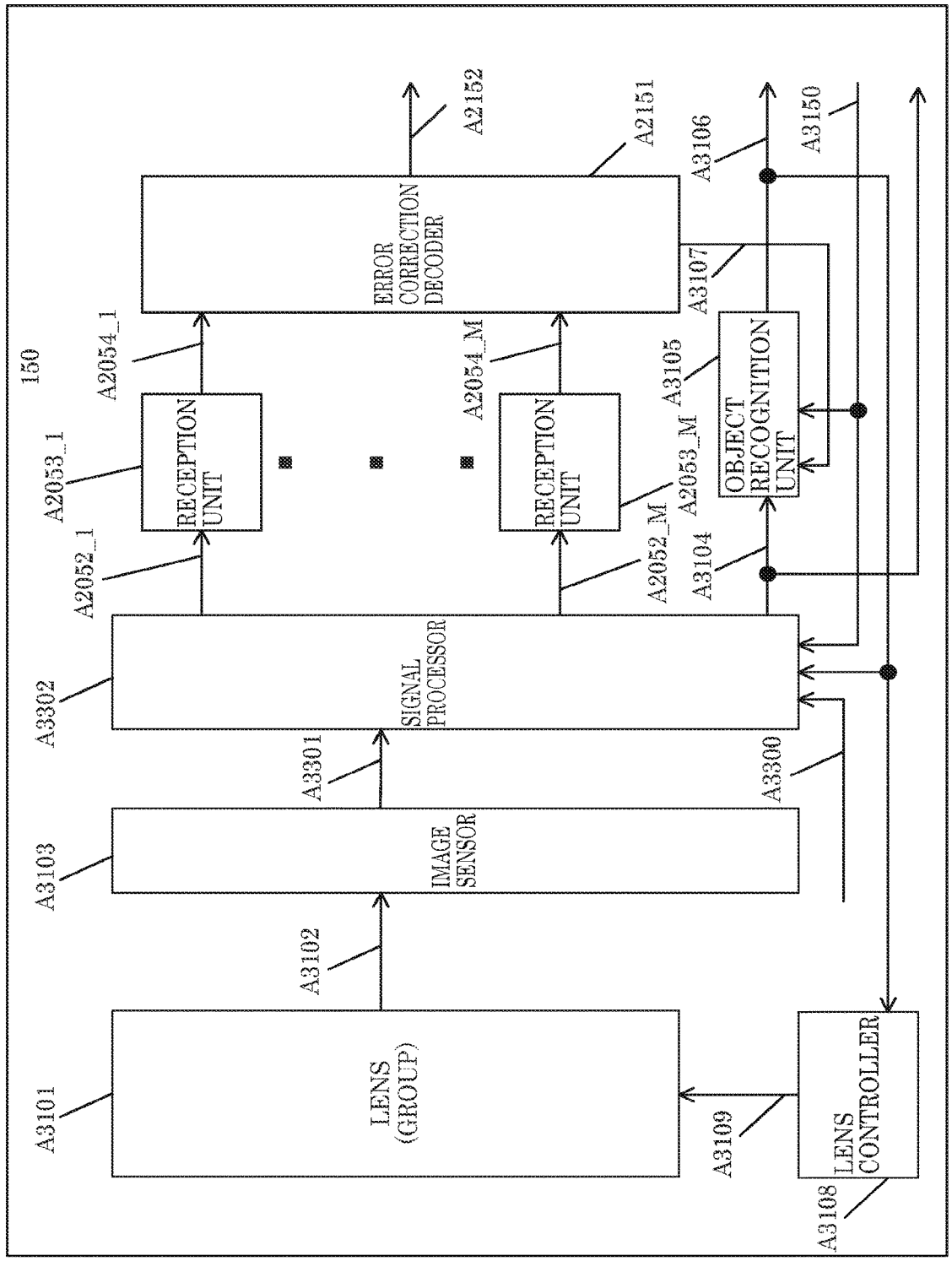
FIG. 67 illustrates another example of a configuration of the reception device according to Embodiment 11.

FIG. 67 illustrates one example of a configuration of reception device 150 that receives the modulated optical signal transmitted by transmission device 100 illustrated in FIG. 54, and configurations that operate the same as FIG. 65 share like reference signs. Repeated description of configurations that have already been described will be omitted.

Reception device 150 in FIG. 67 differs from reception device 150 in FIG. 65 in regard to the inclusion of signal processor A3302 disposed after image sensor A3103, like in FIG. 66.

Note that since operations performed by signal processor A3302 have already been described in detail, repeated description thereof will be omitted. Moreover, as already described, the advantageous effect of an improvement in data reception quality can be achieved since the reception state improves.

Note that since the method for improving the reception state used in lens controller A3108 has already been described, repeated description thereof will be omitted.

By implementing the above, reception device 150 can achieve the advantageous effect of an improvement in data reception quality since the reception state improves. In FIG.

67, when lens (group) A3101 does not include a function for changing the focal length, changing of the focal length to improve reception is not performed.

Note that in reception device 150 illustrated in FIG. 64, FIG. 65, FIG. 66, and FIG. 67, lens (group) A3101 can be set with a plurality of focal length values. For example, conceivable methods include that the focal length can be set in a range of from 12 mm to 35 mm, inclusive, and that the focal length can be set to 12 mm and 25 mm. The following description will be based on this example.

As a first example, consider a case in which a plurality of discrete focal length values are supported.

When reception device 150 in FIG. 64, FIG. 65, FIG. 66, and FIG. 67 is set to communication mode via instruction signal A3150, reception device 150 begins performing communication, and at this time, the focal length of lens (group) A3101 shall be set to, for example, the widest angle of 12 mm. Note that when the focal length is set to the widest angle, as in FIG. 56, it is highly probable that the reception state in which reception of a portion of the modulated optical signals is difficult can be avoided. With this, the advantageous effect that data reception quality can be improved can be achieved. However, in order to further improve data reception quality, the focal length, for example, may be controlled to a suitable value.

Note that in this example, focal lengths of 12 mm and 25 mm are supported, but even when two or more focal lengths are supported, setting, for example, the focal length to the widest angle upon starting communication is an effective method for improving data reception quality.

As a second example, consider a case in which a focal length can be consecutively (or minutely) set.

When reception device 150 in FIG. 64, FIG. 65, FIG. 66, and FIG. 67 is set to communication mode via instruction signal A3150, reception device 150 begins performing communication, and at this time, the focal length of lens (group) A3101 shall be set to, for example, the widest angle of 12 mm. Note that when the focal length is set to the widest angle, as in FIG. 56, it is highly probable that the reception state in which reception of a portion of the modulated optical signals is difficult can be avoided. With this, the advantageous effect that data reception quality can be improved can be achieved. However, in this example, since it is possible to minutely set the focal length, for example, even when the focal length is set to 14 mm, there is a high probability that the same advantageous effect can be achieved. However, in order to further improve data reception quality, the focal length, for example, may be controlled to a suitable value.

In reception device 150 in FIG. 66 and FIG. 67, assume signal processor A3302 includes a function for processing zoom (enlarging (and/or shrinking) an image). In this example, assume an image enlargement of 1× (image is not enlarged), and image enlargement of 2×, and an image enlargement of 4× are supported.

When reception device 150 in FIG. 66, and FIG. 67 is set to communication mode via instruction signal A3150, reception device 150 begins performing communication, and at this time, the zoom (enlarging (and/or shrinking) an image) in signal processor A3302 shall be set to, for example, "an image enlargement of 1× (image is not enlarged)", which results in the widest angle. Note that when the focal length is set to the widest angle, like in FIG. 56, it is highly probable that the reception state in which reception of a portion of the modulated optical signals is difficult can be avoided. With this, the advantageous effect that data reception quality can be improved can be achieved. However, in order to further improve data reception quality, the zoom value, for example, may be controlled to a suitable value.

Embodiment 12

In the present embodiment, a configuration of a communication system that includes a transmission device and a reception device and is equipped in a vehicle, and processing operations performed by the communication system will be described. Note that the transmission device and the reception device described in the present specification may include all or some of the respective functions of the transmission devices and the reception devices described in the above embodiments.

Figure 68:
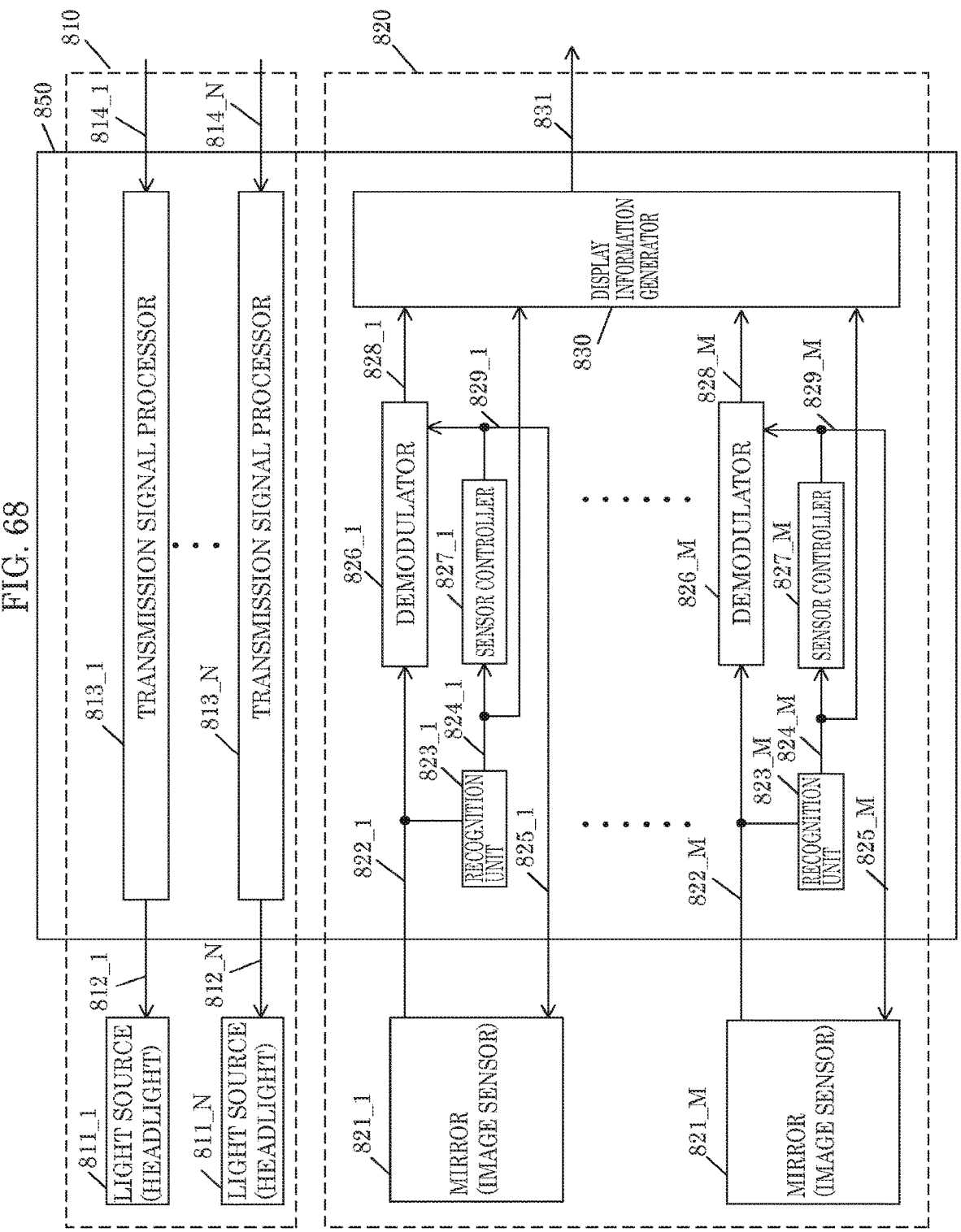
FIG. 68 illustrates one example of a configuration of a communication system according to Embodiment 12.

FIG. 68 illustrates one example of a configuration of a communication system equipped in a vehicle.

The communication system includes transmission device 810 and reception device 820.

For example, transmission device 810 transmits (emits) N modulated optical signals. Note that N is an integer that is greater than or equal to 2 (however, N may be an integer that is greater than or equal to 1). Such a transmission device 810 includes N transmission sets for generating the N modulated optical signals, each of which is an optical signal. Each transmission set includes light source 811_$i$ and transmission signal processor 813_$i$. Note that i is an integer that is greater than or equal to 2 and less than or equal to N (however, i may be an integer that is greater than or equal to 1).

Transmission signal processor 813_$i$ generates and outputs modulated signal 812_1 based on information 814_$i$. Note that transmission device 810 does not necessarily transmit N modulated optical signals. In other words, transmission device 810 need not transmit any modulated optical signals, and, alternately, transmission device 810 may transmit (emit) at least one and at most N modulated optical signals.

Light source 811_$i$ is configured of, for example, at least one light emitter such as an LED, and is used as, for example, the left headlight of a vehicle, the right headlight of a vehicle, the left tail light of a vehicle, a fog light (or right and left fog lights) of a vehicle, a brake light (or right and left brake lights), or a position light (or right and left position lights). Note that light source 811_$i$ is not limited to these lights, and may be used as a light or lamp for some other application.

This light source 811_$i$ transmits a modulated optical signal, which is an optical signal based on modulated signal 812_$i$, from transmission signal processor 813_$i$, by changing the luminance of emitted light in accordance with modulated signal 812_$i$. Although the data transmission method is exemplified as being accomplished by changing the luminance of light in the present embodiment, the data transmission method may be accomplished by changing the color in a color space or color system resulting from changes in the stimulus values X, Y, and Z.

For example, information 814_$i$ includes model identification information (or model information) that identifies the model of the vehicle equipped with the communication system, information indicating the speed of the vehicle, and information indicating the location of light source 811_$i$ on the vehicle body. The information indicating the location of light source 811_$i$ on the vehicle body is, for example, information indicating the location on the vehicle body equipped with the communication system, and specifically, is information indicating, for example, the front-left or front-right of the vehicle, the back-left or back-right of the vehicle, the center of the front of the vehicle, or the center of the rear of the vehicle.

Reception device 820 includes M reception sets that each receive a modulated optical signal, and display information generator 830. Note that M is an integer greater than or equal to one. Each reception set includes (electronic) mirror 821_j, recognition unit 823_j, demodulator 826_j, and sensor controller 827_j. Note that j is an integer that is greater than or equal to one and less than or equal to M.

Mirror 821_j is, for example, an electronic mirror, and functions as a light receiver that receives light. In other words, mirror 821_j is implemented electronically as, for example, the left side mirror of the vehicle, the right side mirror of the vehicle, the back mirror of the vehicle, or a mirror fitted to a bumper of the vehicle. Note that mirror 821_j is not limited to these examples of mirrors, and may be used as a mirror for some other application or a mirror that is fitted to some other location.

More specifically, mirror 821_j includes, for example, an image sensor such as a CMOS or organic CMOS or CCD image sensor. Such a mirror 821_j receives ambient light and outputs imaging data 822_j. Here, mirror 821_j changes the scanning method, i.e., the method used by the image sensor to read an amount of light, in accordance with control signal 829_j from sensor controller 827_j.

In other words, when control signal 829_j indicates control for video, mirror 821_j reads the amount of light using a line scan sampling method with a long exposure time to output imaging data 822_j for video, like in Embodiment 8.

When control signal 829_j indicates optical communication control, mirror 821_j reads the amount of light using a line scan sampling method with a short exposure time to output imaging data 822_j for optical communication, like in Embodiment 8. Imaging data 822_j for optical communication is data that is based on a modulated optical signal transmitted from transmission device 810 included in a communication system equipped in another vehicle. More specifically, as illustrated in FIG. 42, mirror 821_j performs line scan sampling per region of the image sensor. In other words, mirror 821_j performs line scan sampling on each of one or a plurality of regions indicated by control signal 829_j.

This allows mirror 821_j to simultaneously receive a plurality of modulated optical signals. Moreover, since reception device 820 includes a plurality of mirrors 821_j, even more modulated optical signals can be received simultaneously. Note that line sampling is used in the above example, but the amount of light may be read from each pixel without performing line sampling.

Recognition unit 823_j performs pattern recognition and object recognition and the like on imaging data 822_j for video, which is output from mirror 821_j. With this, recognition unit 823_j can recognize an object that is transmitting a modulated optical signal from among objects appearing in an image included in the imaging data for video. Hereinafter, such an object will be referred to as a transmitting object. Recognition unit 823_j outputs object recognition signal 824_j indicating a recognition result of the transmitting object. Note that when the transmitting object is a vehicle and includes, for example, a communication system like the communication system illustrated in FIG. 68, the modulated optical signal transmitted (emitted) by the transmitting object includes model identification information (or model information), information indicating the speed of the vehicle, and information indicating the location of the light source on the vehicle body.

Sensor controller 827_j outputs control signal 829_j based on object recognition signal 824_j to demodulator 826_j and mirror 821_j. For example, when object recognition signal 824_j indicates that no transmitting object is recognized, sensor controller 827_j outputs control signal 829_j indicating control for video. However, when object recognition signal 824_j indicates that a transmitting object is recognized, sensor controller 827_j alternately outputs control signal 829_j indicating control for video and control signal 829_j indicating control for optical communication in a cyclic manner, like illustrated in FIG. 39 described in Embodiment 8, for example. Here, control signal 829_j indicating control for optical communication indicates a region of the image sensor in which the transmitting object recognized by recognition unit 823_j appears. When a plurality of transmitting objects are recognized, control signal 829_j indicating control for optical communication indicates, for each of the plurality of recognized transmitting objects, the region of the image sensor in which the transmitting object appears. As a result, mirror 821_j can perform line scan sampling in those regions to simultaneously receive a plurality of modulated optical signals.

When demodulator 826_j obtains imaging data (optical reception signal) 822_j for video from mirror 821_j, demodulator 826_j outputs reception data 828_j included in the imaging data (optical reception signal) 822_j for video. Moreover, when demodulator 826_j obtains imaging data (optical reception signal) 822_j for optical communication from mirror 821_j, demodulator 826_j performs processing such as demodulation and error correction decoding on the imaging data (optical reception signal) 822_j for optical communication. More specifically, demodulator 826_j obtains control signal 829_j from sensor controller 827_j, and identifies the region including the transmitting object indicated in control signal 829_j from the image sensor. Demodulator 826_j then performs processing such as demodulation and error correction decoding on the data corresponding to the identified region from among the imaging data (optical reception signal) 822_j for optical communication, and outputs reception data 828_j.

Accordingly, reception data 828_j is reception estimation data for data transmitted by a transmitting object. Reception data 828_i thus includes the model identification information, information indicating the speed of the vehicle, and information indicating the location of the light source on the vehicle body, as transmitted by the transmitting object. Note that the transmitting object is, for example, an oncoming vehicle, a vehicle traveling ahead, or a vehicle following behind.

Display information generator 830 obtains reception data 828_j and object recognition signal 824_j from each of the M reception sets. Display information generator 830 then generates and outputs display information 831 based on reception data 828_j and object recognition signal 824_j. A display included in the vehicle displays an image based on display information 831.

This makes it possible to display an image of the surrounding area of the vehicle equipped with the communication system on the display. Moreover, when a vehicle that transmits a modulated optical signal, for example, is present in the surrounding area, information related to the vehicle can be shown in association with the vehicle appearing in the image. Information related to the vehicle includes model identification information for the vehicle, information indicating the speed of the vehicle, and information indicating the location of the light source on the vehicle body.

With such a transmission and reception method used in the communication system, it is possible to achieve the advantageous effects that data transmission distances of at least 100 meters can be ensured, and modulated optical signals can be transmitted and received even when vehicle speed is less than or equal to 200 km/h.

Mirror 821_j may include functionality for instantaneously switching the focal length of the lens used to project an image onto the image sensor. This has the advantage that it is possible to instantaneously receive modulated optical signals from each of a plurality of transmitting objects (for example, vehicles) whose distances to the vehicle equipped with the communication system are different.

Note that at least one element in the communication system according to the present embodiment, excluding light source 811_1 through light source 811_N and mirror 821_1 through mirror 821_M, may be configured as CPU and/or LSI 850.

The above description states that "when the transmitting object is a vehicle and includes, for example, a communication system like the communication system illustrated in FIG. 68, the modulated optical signal transmitted (emitted) by the transmitting object includes model identification information, information indicating the speed of the vehicle, and information indicating the location of the light source on the vehicle body". Hereinafter, advantages of the modulated optical signal including model identification information, information indicating the speed of the vehicle, and information indicating the location of the light source on the vehicle body will be described.

In the above description, reception device 820 receives a modulated optical signal transmitted by a transmitting object and performs processing such as demodulation on the modulated optical signal to obtain model identification information (or model information) on the transmitting object, information indicating the speed of the vehicle, and information indicating the location of the light source on the vehicle body.

Here, when reception device 820 obtains model identification information (or model information) on the transmitting object, for example, assume reception device 820 includes a storage that stores a database related to the relationship between vehicle model and vehicle size, although such a storage is not illustrated in FIG. 68, For example, assume the storage stores the following database.

When the model identification information indicates "0000000000" (binary), this indicates "vehicle model #0, overall length=3395 mm, vehicle body width=1475 mm, overall height=1780 mm".

When the model identification information indicates "0000000001" (binary), this indicates "vehicle model #1, overall length=4840 mm, vehicle body width=1820 mm, overall height=1695 mm".

When the model identification information indicates "1111111111" (binary), this indicates "vehicle model #1023, overall length=4270 mm, vehicle body width=1785 mm, overall height=1445 mm".

Accordingly, reception device 820 obtains the model identification information by receiving and demodulating the modulated optical signal transmitted by the transmitting object, and the storage included in reception device 820 receives an input of the model identification information, and obtains and outputs information indicating vehicle model, overall length, vehicle body width, and overall height from the above-described database.

Accordingly, reception device 820 can estimate the distance to the transmitting object based on the information indicating vehicle model, overall length, vehicle body width, and overall height. Moreover, it is possible to more accurately comprehend the transmitting object in display information generator 830 included in the reception device.

In this way, as a result of the transmitting object transmitting the modulated optical signal including the model information, the reception device that receives the modulated optical signal can achieve the advantageous effect that the reception device can more accurately comprehend the state of the transmitting object.

Figure 70:
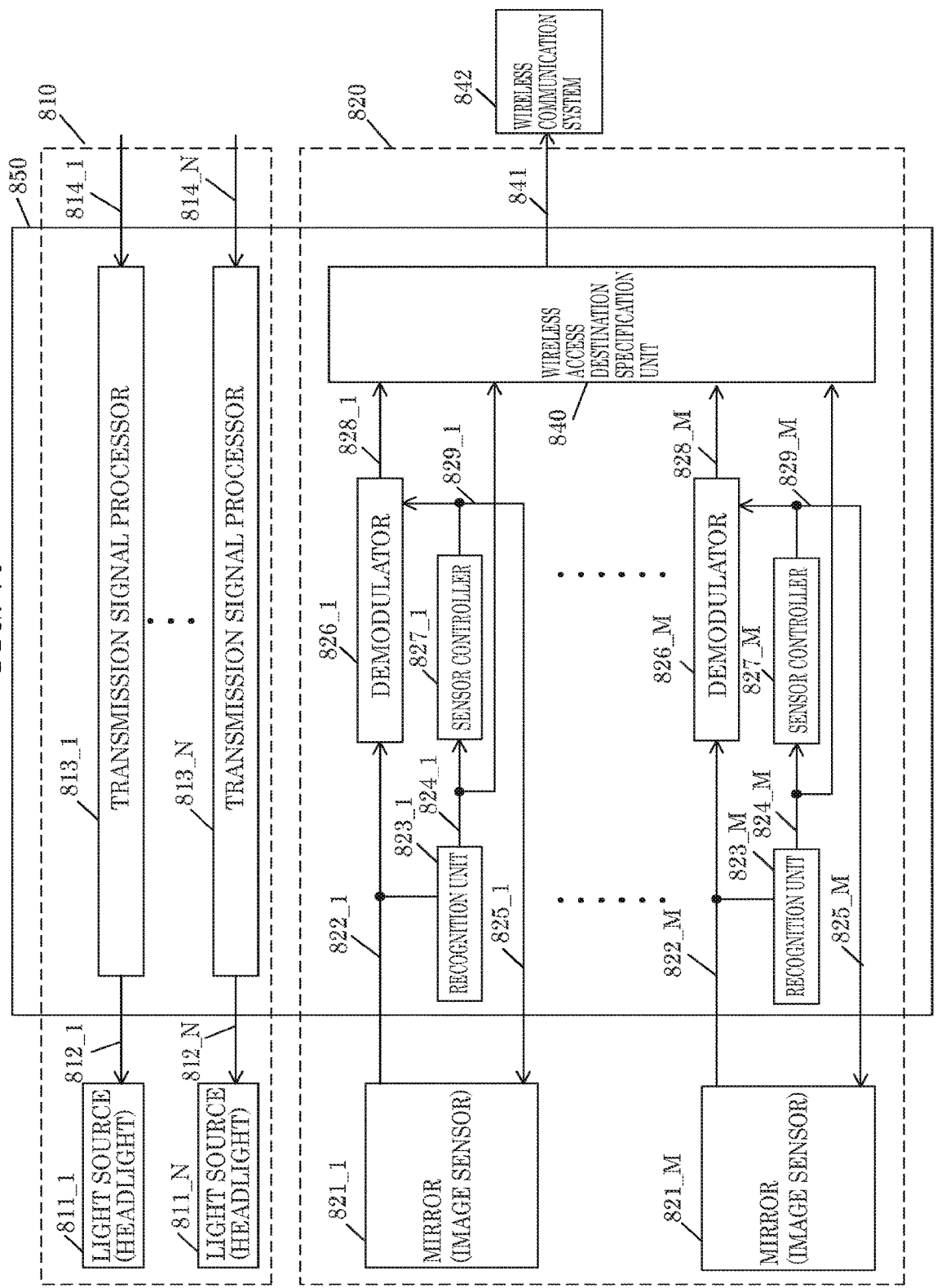
FIG. 70 illustrates another example of a configuration of a communication system according to Embodiment 12.

Note that when the communication system includes wireless communication system 842, like in. FIG. 70, the communication system may obtain the information indicating vehicle type, overall length, vehicle body width, and overall height and the like, by wireless communication system 842 transmitting the modulated signal including the model identification information, the communication partner of wireless communication system 842 obtaining the model identification information, modulating and transmitting data indicating vehicle type, overall length, vehicle body width, and overall height and the like, and the communication system then receiving this modulated signal. Note that the operations illustrated in FIG. 70 will be described later.

The reception device obtains information indicating the location of the light source on the vehicle body. Next, advantages thereof will be described by way of example.

For example, assume the vehicle including the communication system obtained only the modulated optical signal from the light source in the right headlight of the transmitting object. In this case, reception device 820 in the communication system demodulates only a reception signal corresponding to the modulated optical signal from the light source in the right headlight, and recognizes that it has obtained information from the right headlight based on the information indicating the location of the light source on the vehicle body that is included in the reception signal.

With this, the vehicle including the communication system recognizes that one vehicle is present based on the light source included in the right headlight, and also knows that a portion of the vehicle is obstructed by an obstruction. Moreover, the vehicle can recognize that the portion of the transmitting object that is obstructed by the obstruction is the left side.

In this way, as a result of the transmitting object transmitting information indicating the location of the light source on the vehicle body from each light source, it is possible to achieve the advantageous effect that the communication system that receives this information can estimate the status of the transmitting object in greater detail.

Figure 69:
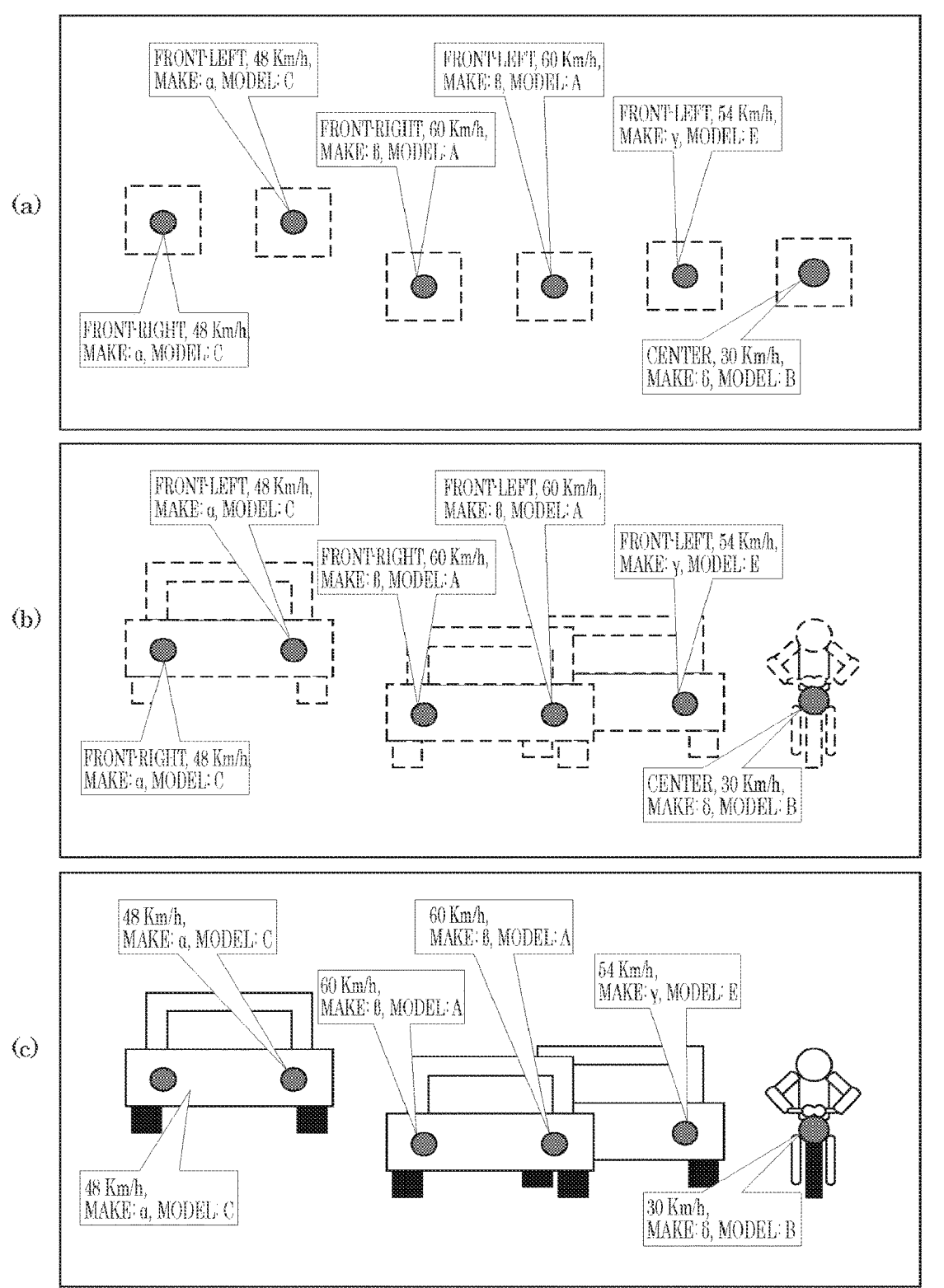
FIG. 69 illustrates one example of a recognition result according to Embodiment 12.

Next, the recognition result in recognition unit 823_i will be described. FIG. 69 illustrates one example of a recognition result.

For example, recognition unit 823_j obtains object recognition signal 824_j from mirror 821_j being used as a rearview mirror. As illustrated in (a) in FIG. 69, as a result of performing, for example, pattern recognition on object recognition signal 824_j, recognition unit 823_j recognizes headlights of vehicles following behind as transmitting objects. Recognition unit 823_j then identifies the locations of the transmitting objects in object recognition signal 824_j.

Demodulator 826_1 performs processing such as demodulation and error correction on each of regions in imaging data 822_j for optical communication. Each region is a region including a location of a transmitting object identified by recognition unit 823_j. With this, demodulator 826_i obtains information on the transmitting object from the region. The information on the transmitting object includes model identification information for the vehicle, information indicating the speed of the vehicle, and information indicating the location of the light source on the vehicle body. For example, as illustrated in (a) in FIG. 69, model identification information indicates, for example, "make: α, model: C", the information indicating the speed of the vehicle indicates, for example, "48 Km/h", and the information indicating the location of the light source on the vehicle body indicates, for example, "front-right".

Display information 831 output from display information generator 830 includes information on each transmitting object obtained by demodulator 826_i. Accordingly, so long as a control unit such as the electronic control unit (ECU) in the vehicle obtains display information 831, the sizes, shapes, and locations of other vehicles in the surrounding area of the vehicle can be recognized, as illustrated in (b) in FIG. 69. Specifically, the control unit identifies, for example, the size and shape of a vehicle based on the vehicle model indicated in the model identification information, by referencing a database, for example. Then, based on the information indicating the location of the light source on the vehicle body that is included in the information on the transmitting object, and the information indicating the location and size of the light source on the vehicle body that appears in object recognition signal 824_j, the control unit recognizes the location and size of the vehicle that appears in object recognition signal 824_j and ambient information, such as information on obstructions present and how an obstruction overlaps with a vehicle.

In other words, the control unit can quickly recognize the size, shape, and location of another vehicle based on the information on the transmitting object, without having to recognize them from the image that is object recognition signal 824_j. Stated differently, it is possible to reduce the image processing load and increase the speed that another vehicle present in the surrounding area can be recognized. However, when the vehicle is equipped with, for example, sensors (not illustrated in FIG. 68) that recognize objects and these sensors recognize the size, shape, and location of another vehicle, reception device 820 can obtain and use the model identification information, information indicating the speed of the vehicle, and information indicating the location of the light source on the vehicle body, which are included in the modulated optical signal transmitted by a light source of the transmitting object, to achieve the advantageous effect that the state of the transmitting object and the state of the surrounding area of the transmitting object can be more accurately known.

Moreover, since the information on the transmitting object includes information indicating the location of the light source on the vehicle body, the control unit can quickly recognize whether both the left and right headlights of the other vehicle appear in the image, or whether one of the left and right headlights is obstructed. The control unit can furthermore recognize motorcycles and bicycles, which are difficult to distinguish between with existing sensors that recognize objects based on model identification information. Moreover, since the information on the transmitting object includes information indicating the speed of the vehicle, the control unit can accurately recognize the speed of that vehicle. This makes it possible to achieve the above-described advantageous effects.

Display information 831 output from display information generator 830 includes object recognition signal 824_j in addition to the information on the transmitting object. Note that here, object recognition signal 824_j includes video data or still image data.

Accordingly, so long as a control unit such as the electronic control unit (ECU) in the vehicle obtains display information 831, an image of other vehicles in the surrounding area that appear in the image can be displayed on the vehicle display, as illustrated in (c) in FIG. 69. Furthermore, the control unit can superimpose and display information on the transmitting object on the image that is shown on the display. In other words, information obtained from a light source that is the transmitting object appearing in the image can be shown in association with the light source. The present embodiment is also capable of achieving such advantageous effects.

FIG. 70 illustrates one example of a configuration of a communication system equipped in a vehicle which differs from the example illustrated in FIG. 68. Note that elements in the communication system illustrated in FIG. 70 that are the same as in the communication system illustrated in FIG. 68 share like reference numbers, and detailed, repeated description thereof will be omitted.

In the communication system illustrated in FIG. 68, the information that is transmitted and received via modulated optical signals is the model identification information, the information indicating the speed of the vehicle, and the information indicating the location of the light source on the vehicle body. In the communication system illustrated in FIG. 70, the information that is transmitted and received via the modulated optical signal is information related to wireless access to the vehicle, which differs from the communication system illustrated in FIG. 68. In other words, the communication system illustrated in FIG. 70 transmits, to other vehicles via modulated optical signals, information related to wireless access to the vehicle equipped with the communication system (i.e., the host vehicle that transmits the information). Note that here, the host vehicle will be referred to as the "first vehicle".

Information related to wireless access is, for example, when the communication method of wireless communication system 842 is a method that uses a wireless local area network (LAN), information indicating the service set identifier (SSID). In such cases, transmission device 810 in the communication system illustrated in FIG. 70 transmits (emits) information indicating the SSID of wireless communication system 842 included in the communication system, using a modulated optical signal. Note that the communication method used by wireless communication system 842 is not limited to a method that uses a wireless LAN; when the communication method used by wireless communication system 842 is some other wireless communication method that uses radio waves, identification information that makes it possible to identify wireless communication system 842 can be used as the information related to wireless access. Note that this point has already been described in detail in other embodiments of the present specification.

Furthermore, a modulated optical signal including information related to wireless access to wireless communication system 842 included in a communication system equipped in another vehicle (hereinafter "second vehicle") is transmitted by the communication system of the second vehicle, and the communication system of the first vehicle illustrated in FIG. 70 receives the modulated optical signal including the information related to wireless access to wireless communication system 842 included in the communication system of the second vehicle. The communication system of the first vehicle locates the modulated signal transmitted by wireless communication system 842 included in the communication system of the second vehicle, based on the information related to wireless access to wireless communication system 842 included in the communication system of the second vehicle, and communicates with the communication system of the second vehicle wirelessly (i.e., over radio waves).

More specifically, the communication system of the first vehicle that is illustrated in FIG. 70 includes wireless access destination specification unit 840 instead of display information generator 830 illustrated in FIG. 68, and further includes wireless communication system 842.

Transmission signal processor 813_*i* in transmission device 810 generates and outputs modulated signal 812_1 based on information 814_*i*. This information 814_*i* is information related to wireless access to the host vehicle, that is to say, information related to wireless access to the first vehicle. Accordingly, light source 811_*i* in transmission device 810 transmits (emits) a modulated optical signal including the information related to wireless access to the host vehicle.

Mirror 821_*j* included in reception device 820 receives, for example, a modulated optical signal including information related to wireless access to the second vehicle, and outputs imaging data 822_*j* for optical communication. With this, reception data 828_*j* output from demodulator 826_*j* includes, as information on the transmitting object, information related to wireless access to the second vehicle. Just like with the communication system illustrated in FIG. 68, this allows mirror 821_*j* to simultaneously receive a plurality of modulated optical signals with the communication system illustrated in FIG. 70 as well. In other words, with the communication system illustrated in FIG. 70, a plurality of items of information related to wireless access to a plurality of other vehicles can be simultaneously obtained from one reception unit.

Wireless access destination specification unit 840 obtains reception data 828 from each of M reception units. With this, if there are a plurality of other vehicles that each include the communication system corresponding to FIG. 70 in the surrounding area of the first vehicle, wireless access destination specification unit 840 in the first vehicle can simultaneously obtain the plurality of items of information related to wireless access to the plurality of other vehicles. Wireless access destination specification unit 840 then outputs the plurality of items of information 841 related to wireless access to the plurality of other vehicles to wireless communication system 842.

Wireless communication system 842 selects a communication partner using the plurality of items of information 841 related to wireless access to the plurality of other vehicles, and wirelessly communicates with the wireless communication system included in the communication system equipped in the selected vehicle. For example, wireless communication system 842 transmits a modulated signal including model identification information for the host vehicle and information indicating the speed of the host vehicle, and transmits the modulated signal to the other vehicle's communication system wirelessly (using radio waves). Furthermore, wireless communication system 842 included in the first vehicle receives the modulated signal including model identification information for the other vehicle and information indicating the speed of the other vehicle.

It is possible to simultaneously receive a plurality of modulated optical signals with one reception unit even with the communication system illustrated in FIG. 70. Furthermore, since the communication system illustrated in FIG. 70 includes a plurality of reception units, even more modulated optical signals can be simultaneously received. Still furthermore, the communication system illustrated in FIG. 70 is capable of achieving the same advantageous effects as the communication system illustrated in FIG. 68.

Note that transmission device 810 included in the communication system illustrated in FIG. 70 may transmit a modulated optical signal including the information indicating the SSID of wireless communication system 842 or the cellular terminal ID of wireless communication system 842, in addition to or instead of the information related to wireless access.

Moreover, as another example that differs from the above example, transmission device 810 illustrated in FIG. 70 may transmit, in addition to the information related to access to wireless communication system 842, the model identification information, the information indicating the speed of the vehicle, and the information indicating the location of the light source on the vehicle body, just like in the example illustrated in FIG. 68. In such cases, transmission device 810 illustrated in FIG. 70 may include the functionality of display information generator 830 described with reference to FIG. 68.

Embodiment 13

In the present embodiment, a configuration of a device that does not include a light source and generates a modulated optical signal by using reflected outside light such as reflected sunlight, and processing operations performed by such a device will be described.

Figure 71:
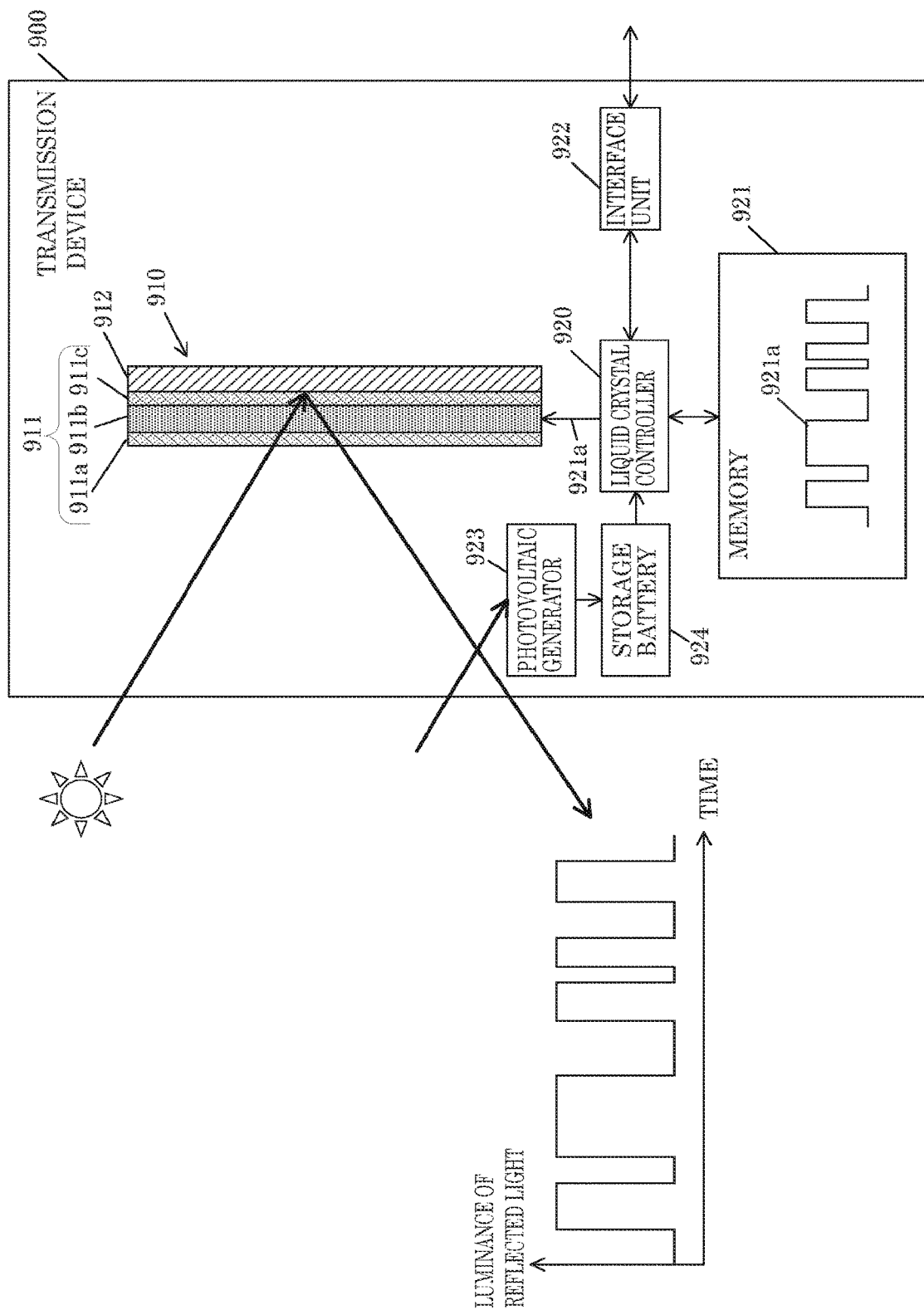
FIG. 71A illustrates one example of a configuration of a transmission device according to Embodiment 13.
FIG. 71B illustrates one example of a liquid crystal screen according to Embodiment 13.

FIG. 71A illustrates one example of a configuration of the transmission device according to the present embodiment.

Transmission device 900 includes optical transmission unit (also referred to as a modulated signal generator) 910, liquid crystal controller 920, memory 921, and interface unit 922.

Memory 921 is, for example, read only memory (ROM) or random access memory (RAM), and includes a region for storing modulated signal 921*a*.

Liquid crystal controller 920 controls modulated signal generator 910. More specifically, liquid crystal controller 920 reads modulated signal 921*a* from memory 921, and applies a control voltage based on modulated signal 921*a* to liquid crystal 911*b* of optical transmission unit 910. For example, modulated signal 921*a* shall be expressed as s(t). Note that t is time. The control voltage based on modulated signal 921*a* shall be expressed as—s(t)+α. Note that α is a real number.

Optical transmission unit 910 includes liquid crystal panel 911 and reflective panel 912 that is stacked on liquid crystal panel 911. Liquid crystal panel 911 includes liquid crystal 911*b* and two polarizing panels 911*a* and 911*c* that sandwich liquid crystal 911*b*. The polarization directions of transmitted light of the two polarizing panels 911*a* and 911*c* differ by 90°. The luminous transmittance of liquid crystal panel 911 changes in accordance with the control voltage applied to liquid crystal 911*b*.

More specifically, when the value of the control voltage applied to liquid crystal 911*b* is 0 V, liquid crystal 911*b* twists the oscillation direction of light passing through liquid crystal 911*b* 90 degrees. As a result, the light that passes through polarizing panel 911*a* is twisted by liquid crystal 911*b* and then passes though polarizing panel 911*c*. In other words, when the value of the control voltage applied to liquid crystal 911*b* is 0 V, when sunlight or light from a lamp is incident, the light passes through liquid crystal panel 911, reflects off reflective panel 912, and once again passes through and is emitted from liquid crystal panel 911, as illustrated in FIG. 71A. Note that in this example, the light is twisted 90°, but the light may be twisted X°. However, X satisfies the following conditions: X greater than or equal to 0° and less than 360°, excluding 0° and 180°. With this, the values of X yield different luminances but allow for light to pass.

On the other hand, when the value of the control voltage that is applied to liquid crystal 911b is a predetermined value that is greater than or less than 0 V (i.e., an operating voltage value), liquid crystal 911b does not twist the oscillation direction of light passing through liquid crystal 911b. As a result, the light that passes through polarizing panel 911a is not twisted by liquid crystal 911b, and thus does not pass though polarizing panel 911c. In other words, when the value of the control voltage that is applied to liquid crystal 911b is a predetermined value that is greater than or less than 0 V (i.e., an operating voltage value), the light incident on liquid crystal panel 911 does not pass through liquid crystal panel 911. Note that in this example, the phrasing "is not twisted" is used, but this may be rephrased as "twisted Y°". However, Y satisfies the following conditions: Y greater than or equal to 0° and less than 360°, excluding 0° and 180°. With this, depending on the value of Y, it is possible to create a state in which luminance slightly remains.

Accordingly, modulated signal generator 910 changes the luminance of outside light such as sunlight or light from a lamp, etc., that is incident on modulated signal generator 910 over time in accordance with modulated signal 921a to emit modulated signal 921a as an optical signal, that is to say, as a modulated optical signal.

For example, modulated signal 921a may include information related to the SSID of a base station, as described in Embodiment 3, and may include information related to an encryption key to be used in communication with a base station, as described in Embodiment 4. Moreover, modulated signal 921a may include information on the location where transmission device 900 is fitted. Note that the information included in modulated signal 921a is not limited to these examples; modulated signal 921a may include other information.

Interface unit 922 is electrically coupled to an external device external to transmission device 900, and relays the reception and transmission of signals between liquid crystal controller 920 and the external device. For example, interface unit 922 is a device used for universal serial bus (USB) communication, Bluetooth (registered trademark) communication, close-proximity wireless communication, or radio frequency identifier (RFID) communication.

For example, at the time of initial configuration of modulated signal 921a, liquid crystal controller 920 receives data related to modulated signal 921a from the external device via interface unit 922, and stores modulated signal 921a in memory 921. Moreover, when updating modulated signal 921a stored in memory 921 as well, liquid crystal controller 920 receives data related to the updated modulated signal 921a from the external device via interface unit 922. Liquid crystal controller 920 then rewrites the existing modulated signal 921a stored in memory 921 into the new modulated signal 921a. Note that the external device may be, for example, a server connected to transmission device 900 over a communication network. Moreover, the existing modulated signal 921a may be stored in memory 921 and, when necessary, may be called so that transmission device 900 can transmit a modulated signal corresponding to this modulated signal.

When the external device is a server, the server may manage a database related to the modulated signal and data content. In such cases, the reception device that is the reception partner of transmission device 900 can obtain the database from the server to demodulate the modulated signal. For example, assume transmission device 900 changes the data to be transmitted as described above. In such cases, when the reception device cannot obtain information related to changes made in the database, the reception device has difficulty demodulating the data. However, as described above, the reception device can demodulate the modulated signal transmitted by transmission device 900 by accessing the server, obtaining the database, and demodulating the modulated signal based on the database.

Transmission device 900 may include photovoltaic generator 923 and storage battery 924. Photovoltaic generator 923 receives outside light such as sunlight, converts the outside light into power, and stores the converted power in storage battery 924. In this case, liquid crystal controller 920 controls optical transmission unit 910 based on power supplied from storage battery 924. Note that transmission device 900 may internally include a small battery such as a button cell in place of photovoltaic generator 923 and storage battery 924.

With such a transmission device 900 according to the present embodiment, there is no need to include a light source, and modulated optical signal can be generated and transmitted simply by applying a control voltage to liquid crystal 911b. This saves electricity and reduces the size of transmission device 900. Accordingly, transmission device 900 can be fitted to a small object such as a bicycle, motorcycle, or person. Although the modulated optical signal is generated using reflected sunlight or light from a lamp in FIG. 71A, as an example of another method, the modulated optical signal can be generated even when optical transmission unit 910 is used as a lamp (headlight).

Note that in the above description, liquid crystal 911b is described as twisting the polarization direction of light passing through liquid crystal 911b 90° or X° based on the value of voltage applied to liquid crystal 911b, but this can be reworded as the polarization direction of light having passed through liquid crystal 911b is changed 90° or X° compared to the polarization direction of light before passing through liquid crystal 911b.

In the above example of liquid crystal panel 911, the polarization directions of light passing through polarizing panels 911a and 911c differ by 90°, but the angle formed between the polarization direction of light passing through polarizing panel 911a and the polarization direction of light passing through polarizing panel 911c is not limited to 90°. For example, the angle formed between the polarization direction of light passing through polarizing panel 911a and the polarization direction of light passing through polarizing panel 911c may be less than 90°, and may be 0°.

For example, when the angle formed between the polarization direction of light passing through polarizing panel 911a and the polarization direction of light passing through polarizing panel 911c is 0°, that is to say, when the polarization direction of light passing through polarizing panel 911a and the polarization direction of light passing through polarizing panel 911c are the same, since light does not pass through liquid crystal panel 911 when a voltage of 0 V is applied to liquid crystal 911b, light is not reflected when transmission device 900 is not operating, and light is reflected as a modulated optical signal in accordance with the voltage applied to liquid crystal 911*b* by liquid crystal controller 920 when transmission device 900 is operating. With this configuration, since transmission device 900 only reflects light when emitting a modulated optical signal, it is possible to easily determine whether a modulated optical signal is being transmitted in the reception device.

On the other hand, a configuration in which polarizing panel 911*a* and polarizing panel 911*c* are arranged so that the angle formed between the polarization direction of light passing through polarizing panel 911*a* and the polarization direction of light passing through polarizing panel 911*c* is 90° reflects unmodulated light even when transmission device 900 is not operating, and so this configuration is favorable in applications where, for example, light is desired to be reflected in a state in which a signal is not transmitted.

Next, the switching between an operational state in which transmission device 900 outputs a modulated optical signal and a non-operational state in which transmission device 900 does not output a modulated optical signal and simply reflects light (or does not reflect light) will be described. Transmission device 900 may control the control voltage applied to liquid crystal 911*b* by liquid crystal controller 920 so that a modulated optical signal is output, as an operational state, when, for example, light of a certain intensity or higher is incident on transmission device 900. In such cases, the determination of whether light of a certain intensity or higher is incident on transmission device 900 may be performed based on the power converted by photovoltaic generator 923. For example, transmission device 900 may control liquid crystal panel 911 using liquid crystal controller 920 when power of a predetermined threshold or higher is output from photovoltaic generator 923. Moreover, transmission device 900 may switch between the operational state and the non-operational state according to a control signal input from an external source via interface unit 922. Here, the control information input from an external source may include information specifying either the timing or cycle for generating and outputting the modulated optical signal, and may include information specifying the data to be transmitted as the modulated optical signal.

With this configuration, when light to be reflected and modulated by transmission device 900 is not incident on transmission device 900 or when a modulated optical signal is output but the strength of the modulated optical signal is so weak that it is difficult for the reception device to receive it, it is possible to reduce the amount of power consumed to a level lower than when operations for constantly outputting a modulated optical signal are always performed, since operations performed by at least part of transmission device 900 are stopped. Note that transmission device 900 may have any configuration that generates and outputs modulated optical signals in a constant operational state.

Note that the configuration of the device that generates a modulated signal using liquid crystals is not limited to the example illustrated in FIG. 71A. For example, data corresponding to modulated signal 921*a* may be accumulated in memory 921. The device that does not include liquid crystals may be stacked together with reflective panel 912 like illustrated in FIG. 71A. Here, "liquid crystals" shall be something that has a state in which it transmits light (note that this state may exhibit a slight decrease in luminance) and a state in which it blocks light (note that luminance may slightly remain in this state). The state in which the liquid crystals transmit light and the state in which the liquid crystals block light are controlled in the time domain so as to generate modulated signal 921*a*. With this, it is possible to generate a time-domain signal of modulated signal 921*a*. Moreover, in the transmission device illustrated in FIG. 71A, the liquid crystal panel may include a plurality of pixels. In such cases, the timing of the time-based change of the state in which the liquid crystals transmit light and the state in which the liquid crystals block light can be implemented in the same manner. Moreover, in the above example, the transmission device is exemplified as including liquid crystals, but even if some other device that can make time-based change of the state in which the liquid crystals transmit light and the state in which the liquid crystals block light is used, it can be implemented in the same manner.

Moreover, a plurality of the transmission devices illustrated in FIG. 71A can be operated in parallel. Operations performed in such cases will be described with reference to FIG. 71B.

In FIG. 71B, for example, a liquid crystal screen includes liquid crystals corresponding to first liquid crystal region transmission device 101, liquid crystals corresponding to second liquid crystal region transmission device 7102, liquid crystals corresponding to third liquid crystal region transmission device 7103, liquid crystals corresponding to fourth liquid crystal region transmission device 7104, liquid crystals corresponding to fifth liquid crystal region transmission device 7105, liquid crystals corresponding to sixth liquid crystal region transmission device 7106, liquid crystals corresponding to seventh liquid crystal region transmission device 7107, liquid crystals corresponding to eighth liquid crystal region transmission device 7108, and liquid crystals corresponding to ninth liquid crystal region transmission device 7109.

For example, first liquid crystal region transmission device 7101, second liquid crystal region transmission device 7102, third liquid crystal region transmission device 7103, fourth liquid crystal region transmission device 7104, fifth liquid crystal region transmission device 7105, sixth liquid crystal region transmission device 7106, seventh liquid crystal region transmission device 7107, eighth liquid crystal region transmission device 7108, and ninth liquid crystal region transmission device 7109 each have the configuration of transmission device 900 illustrated in FIG. 71A. However, it is not necessary to individually provide liquid crystal controller 920, interface unit 922, the battery, and the power supply for each transmission device; first liquid crystal region transmission device 7101, second liquid crystal region transmission device 7102, third liquid crystal region transmission device 7103, fourth liquid crystal region transmission device 7104, fifth liquid crystal region transmission device 7105, sixth liquid crystal region transmission device 7106, seventh liquid crystal region transmission device 7107, eighth liquid crystal region transmission device 7108, and ninth liquid crystal region transmission device 7109 may share a common liquid crystal controller 920, interface unit 922, battery, and power supply.

For example, first liquid crystal region transmission device 7101, second liquid crystal region transmission device 7102, third liquid crystal region transmission device 7103, fourth liquid crystal region transmission device 7104, fifth liquid crystal region transmission device 7105, sixth liquid crystal region transmission device 7106, seventh liquid crystal region transmission device 7107, eighth liquid crystal region transmission device 7108, and ninth liquid crystal region transmission device 7109 illustrated in FIG. 71B may each transmit (emit) a different modulated optical signal.

In such cases, for example, it is sufficient so long as the image sensor that receives the modulated optical signal captures the liquid crystals corresponding to first liquid crystal region transmission device 7101, the liquid crystals corresponding to second liquid crystal region transmission device 7102, the liquid crystals corresponding to third liquid crystal region transmission device 7103, the liquid crystals corresponding to fourth liquid crystal region transmission device 7104, the liquid crystals corresponding to fifth liquid crystal region transmission device 7105, the liquid crystals corresponding to sixth liquid crystal region transmission device 7106, the liquid crystals corresponding to seventh liquid crystal region transmission device 7107, the liquid crystals corresponding to eighth liquid crystal region transmission device 7108, and the liquid crystals corresponding to ninth liquid crystal region transmission device 7109; the reception device can demodulate the respective modulated optical signals to obtain reception data corresponding to the data transmitted by first liquid crystal region transmission device 7101, reception data corresponding to the data transmitted by second liquid crystal region transmission device 7102, reception data corresponding to the data transmitted by third liquid crystal region transmission device 7103, reception data corresponding to the data transmitted by fourth liquid crystal region transmission device 7104, reception data corresponding to the data transmitted by fifth liquid crystal region transmission device 7105, reception data corresponding to the data transmitted by sixth liquid crystal region transmission device 7106, reception data corresponding to the data transmitted by seventh liquid crystal region transmission device 7107, reception data corresponding to the data transmitted by eighth liquid crystal region transmission device 7108, and reception data corresponding to the data transmitted by ninth liquid crystal region transmission device 7109.

Note that in FIG. 71B, different modulated optical signals need not be transmitted by the different transmission devices.

For example, first liquid crystal region transmission device 7101 and second liquid crystal region transmission device 7102 may transmit the same modulated optical signal; first liquid crystal region transmission device 7101 and ninth liquid crystal region transmission device 7109 may transmit the same modulated optical signal; fifth liquid crystal region transmission device 7105 and eighth liquid crystal region transmission device 7108 may transmit the same modulated optical signal; and fourth liquid crystal region transmission device 7104, fifth liquid crystal region transmission device may transmit the same 7105, and sixth liquid crystal region transmission device 7106 may transmit the same modulated optical signal. Note that the method used to transmit the same modulated optical signal from a plurality of liquid crystal region transmission devices is not limited to the example above.

As described above, by dividing the liquid crystal screen into a plurality of regions and generating a plurality of modulated optical signals across the plurality of regions, it is possible to achieve the advantageous effect of an improvement in data transmission speeds.

Figure 72:
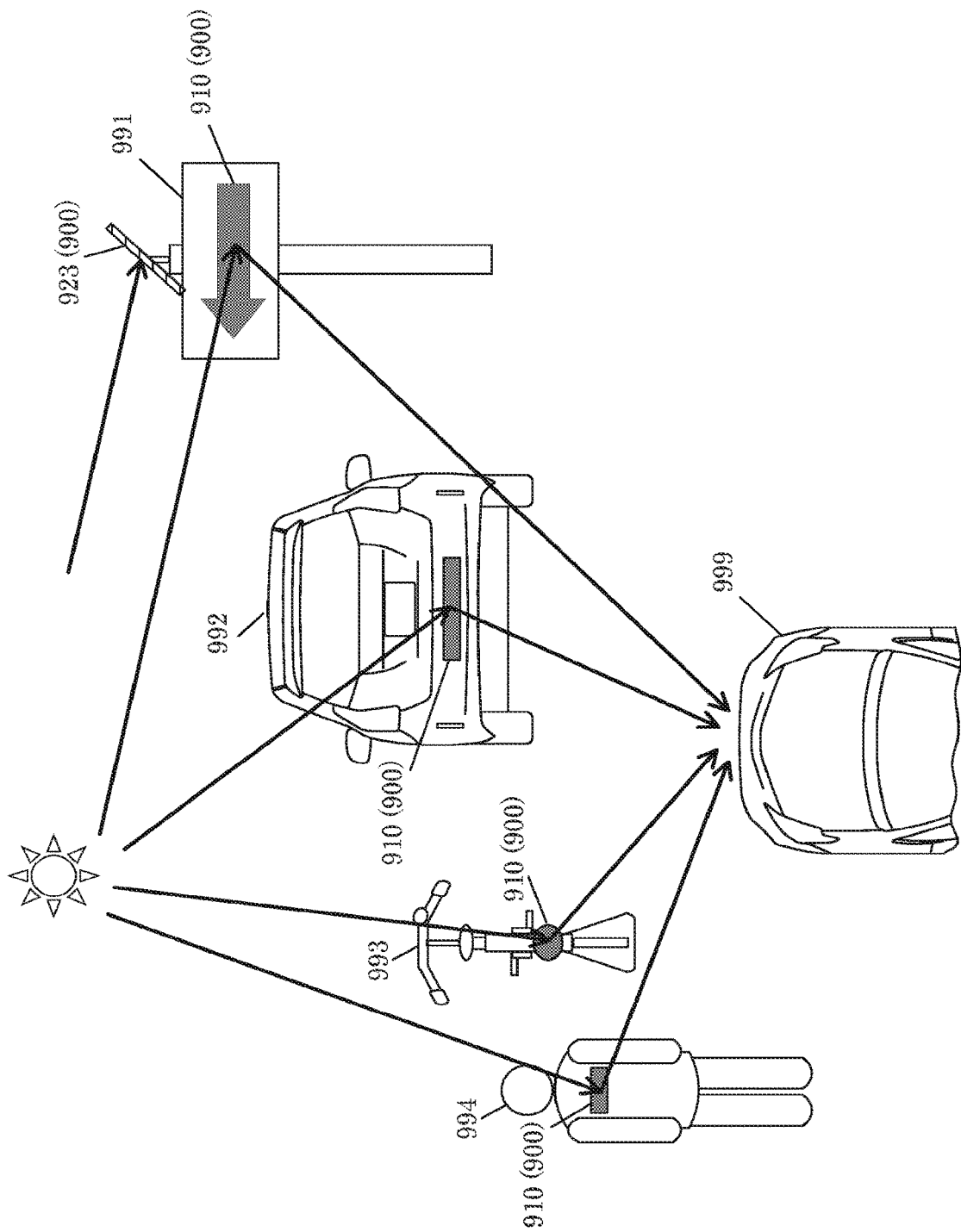
FIG. 72 illustrates a usage example of a transmission device according to Embodiment 13.

FIG. 72 illustrates a usage example of transmission device 900.

For example, transmission device 900 is fitted to road sign 991, vehicle 992, bicycle 993, or clothes worn by person 994. Other examples of objects to which transmission device 900 may be fitted include an obstruction in a parking lot, such as a cart, trolley, or wall, or a curb.

When transmission device 900 is fitted to road sign 991, optical transmission unit 910 is affixed to the front surface of road sign 991. This makes it possible to use transmission device 900 as a device for providing road assistance information. In other words, transmission device 900 changes the luminance of reflected light in accordance with modulated signal 921$a$ to transmit road assistance information, which is information that road sign 991 should convey, to vehicles 999, etc., in the surrounding area of road sign 991. Here, when sunlight can be anticipated, such as during daytime, for example, the modulated optical signal can be obtained by reflective panel 912 reflecting the sunlight. In such cases, power for driving liquid crystal controller 920 can be obtained by, for example, photovoltaic generator 923. Moreover, when sunlight cannot be anticipated, such as during nighttime, for example, the modulated optical signal can be obtained by reflective panel 912 reflecting light from vehicles or lamps such as street lights, for example.

Moreover, when transmission device 900 is fitted to first vehicle 992, transmission device 900 is affixed to the rear bumper of vehicle 992, for example. With this, transmission device 900 can transmit information related to first vehicle 992 to, for example, second vehicle 999 located behind first vehicle 992, by changing the luminance of the reflected light according to modulated signal 921$a$. For example, during daytime when the weather is clear, light sources such as the tail lamps of second vehicle 992 are not turned on, but in these types of cases, the modulated optical signal can be transmitted by using reflected light, for example. Moreover, when sunlight cannot be anticipated, such as during nighttime, for example, second vehicle 992 (and other vehicles) can obtain the modulated optical signal by reflective panel 912 reflecting light emitted by second vehicle 992 or light from lamps such as street lights, for example.

When transmission device 900 is fitted to bicycle 993, transmission device 900 is affixed as a reflector to the back of bicycle 993. With this, transmission device 900 can transmit information related to bicycle 993 to second vehicle 999 by changing the luminance of the reflected light according to modulated signal 921$a$. In this way, since the size of transmission device 900 can be reduced according to the present embodiment as well, it is possible to fit transmission device 900 to a small object such as bicycle 993.

When transmission device 900 is fitted to clothes worn by person 994, transmission device 900 is affixed as a reflector to the clothes worn by the person. With this, transmission device 900 can transmit information related to person 994 to, for example, second vehicle 999 in the surrounding area of person 994, by changing the luminance of the reflected light according to modulated signal 921$a$. In this way, since the size of transmission device 900 can be reduced according to the present embodiment as well, it is possible to fit transmission device 900 to a small object such as a person via their clothes. Note that objects to which transmission device 900 can be fitted are not limited to the above examples.

Although the present embodiment is exemplified as including optical transmission unit 910, a color QR code (registered trademark) may be included instead of transmission device 900. Moreover, although the luminous transmittance of the light is uniformly changed across the entire liquid crystal panel 911 in the present embodiment, the luminous transmittance of the light may be changed per region of liquid crystal panel 911. For example, assume liquid crystal panel 911 is divided into four or eight regions. In such cases, the luminous transmittance of each region into which liquid crystal panel 911 is divided is controlled. This allows transmission device 900 to simultaneously transmit a plurality of modulated optical signals. The plurality of modulated optical signals may be the same modulated optical signal or may be mutually different modulated optical signals. Moreover, the luminous transmittance of each region need not be changed with respect to time. This makes it possible to transmit information according to a spatial pattern of luminous transmittance for each region. For example, assume the above-described state in which the liquid crystals transmit light is defined as "1" and the above-described state in which the liquid crystals block light is defined as "0". Moreover, assume the state of first liquid crystal region transmission device 7101 illustrated in FIG. 71B is the state in which the liquid crystals block light. Under these conditions, the reception device receives information indicating "0" by receiving the modulated optical signal transmitted by first liquid crystal region transmission device 7101.

Similarly, the reception device receives information indicating "0" when the state of second liquid crystal region transmission device 7102 is the state in which the liquid crystals block light. The reception device receives information indicating "0" when the state of third liquid crystal region transmission device 7103 is the state in which the liquid crystals block light.

The reception device receives information indicating "0" when the state of fourth liquid crystal region transmission device 7104 is the state in which the liquid crystals block light.

The reception device receives information indicating "0" when the state of fifth liquid crystal region transmission device 7105 is the state in which the liquid crystals block light.

The reception device receives information indicating "0" when the state of sixth liquid crystal region transmission device 7106 is the state in which the liquid crystals block light.

The reception device receives information indicating "0" when the state of seventh liquid crystal region transmission device 7107 is the state in which the liquid crystals block light.

The reception device receives information indicating "0" when the state of eighth liquid crystal region transmission device 7108 is the state in which the liquid crystals block light.

The reception device receives information indicating "1" when the state of ninth liquid crystal region transmission device 7109 is the state in which the liquid crystals transmit light.

Accordingly, in this example, the reception device receives 9-bit information indicating "000000001" (binary). As a result of first liquid crystal region transmission device 7101, second liquid crystal region transmission device 7102, third liquid crystal region transmission device 7103, fourth liquid crystal region transmission device 7104, fifth liquid crystal region transmission device 7105, sixth liquid crystal region transmission device 7106, seventh liquid crystal region transmission device 7107, eighth liquid crystal region transmission device 7108, and ninth liquid crystal region transmission device 7109 maintaining the above-described state, 9-bit information indicating "000000001" is continuously transmitted.

Note that the state may be changed over time, and in such cases, transmission device 900 (optical transmission unit 910) transmits data in 9-bit units along the time axis.

Moreover, a color QR code (registered trademark) or transmission device 900, for example, may be fitted to, for example, a bag or a cart.

Note that transmission device 900 may transmit a cellular terminal ID by changing the luminance of reflected light in accordance with modulated signal 921a indicating that cellular terminal ID.

Embodiment 14

In the present embodiment, the configuration of, for example, mirror 821_j included in reception device 820 described in Embodiment 12 will be described in detail.

Figure 73:
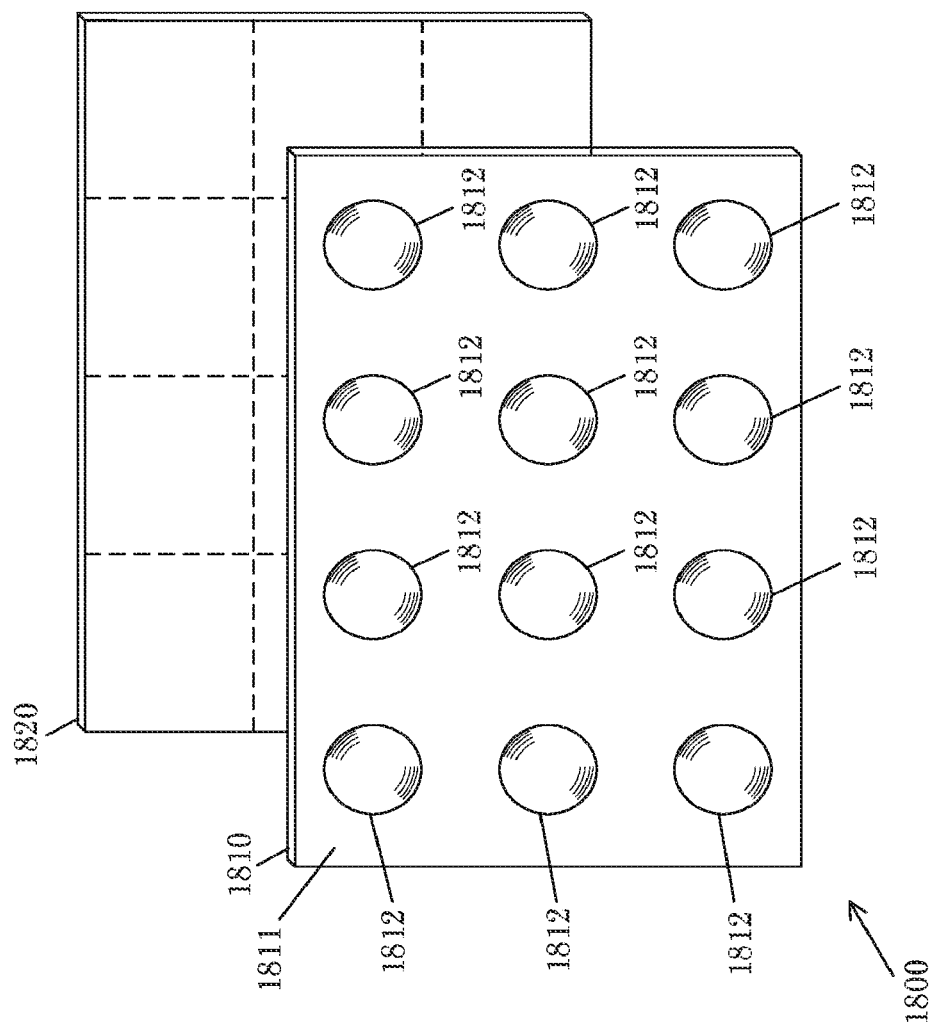
FIG. 73 illustrates one example of a configuration of a mirror according to Embodiment 14.

FIG. 73 illustrates one example of a configuration of a mirror according to the present embodiment.

Mirror 1800 illustrated in FIG. 73 corresponds to mirror 821_j included in reception device 820 described in Embodiment 12. Mirror 1800 includes array lens 1810 and image sensor 1820.

Array lens 1810 includes a substantially rectangular, plate-shaped substrate 1811, and a plurality of lenses 1812 arrayed on substrate 1811. For example, substrate 1811 and plurality of lenses 1812 are formed as an integrated structure from, for example, resin or glass. Plurality of lenses 1812 are arranged in three rows and four columns along the surface of substrate 1811. In this example, the focal length of each of the plurality of lenses 1812 is different.

Image sensor 1820 receives light projected by the plurality of lenses 1812 of array lens 1810. In other words, each region of image sensor 1820 receives light projected from a lens 1812 corresponding to that region. Since plurality of lenses 1812 are arrayed in three rows and four columns, the regions of image sensor 1820 are also arrayed in three rows and four columns, and each of the regions of image sensor 1820 receives light projected from a lens 1812 corresponding to that region.

Accordingly, when a transmission device that transmits a modulated optical signal is imaged on image sensor 1820 by array lens 1810, each region of image sensor 1820 receives light including that modulated optical signal. Each region of image sensor 1820 then outputs imaging data (an optical reception signal) based on the light reception result.

In this example, as described above, the focal length of each of the plurality of lenses 1812 of array lens 1810 is different. Accordingly, the plurality of regions of image sensor 1820 can simultaneously output a plurality of items of imaging data (plurality of optical reception signals) representing the same scene at mutually different focal lengths. With any of the plurality of items of imaging data (plurality of optical reception signals), there is a high probability that the modulated optical signal can be received with favorable reception quality. As a result, the reception device that includes mirror 1800 can lighten the processing load for combining the focal lengths in order to receive the modulated optical signal from the transmission device, and receive the modulated signal. In other words, communication distance can be secured over a wide range with this reception device. Moreover, in the present embodiment, since a plurality of items of imaging data having mutually different focal lengths can be obtained without the need for a mechanism that moves mechanically, the occurrence of malfunctions in the reception device, for example, can be reduced. In other words, when a mechanism that mechanically moves is used, movement of the mechanism is restricted, for example, by the formation of condensation and the freezing of that condensation due to changes in temperature, and by high-temperature environments, but the present embodiment is less perceptible to such negative effects from changes in temperature. Accordingly, it is possible to reduce the occurrence of malfunctions and the like.

Note that in the above example, mirror 1800 includes a single image sensor 1820, but mirror 1800 may include a plurality of image sensors arrayed in a matrix. In other words, each of the plurality of image sensors receives light projected by a lens 1812 that corresponds to that image sensor. Moreover, in the above example, array lens 1810 includes 12 lenses 1812 arrayed in three rows and four columns, but the number of lenses 1812 and the number of rows and columns into which lenses 1812 are arrayed are not limited to this example. It is sufficient so long as array lens 1810 includes two or more lenses 1812, and these two or more lenses 1812 may be arrayed in any manner.

Embodiment 15

In the present embodiment, control of the luminance of a light source included in a transmission device that transmits a modulated optical signal, which is an optical signal, will be described.

For example, when a light source of a transmission device described in each of the above embodiments is used for lighting purposes, the transmission of the section of the modulated optical signal that is for transmitting data (hereinafter referred to as an information transmission period) causes a reduction in the amount of light output and a reduction in the luminance of the output light that is used for lighting.

In view of this, in the present embodiment, an information transmission period and a lighting period are provided in order to secure a sufficient amount of light for lighting. The information transmission period is a period exclusively for transmitting the section of the modulated optical signal that is for transmitting data, and the lighting period as a period exclusively for lighting. For example, the information transmission period and the lighting period are arranged alternately. However, the information transmission period and the lighting period need not be arranged alternately, and may be arranged in any manner along the time axis.

Figure 74A:
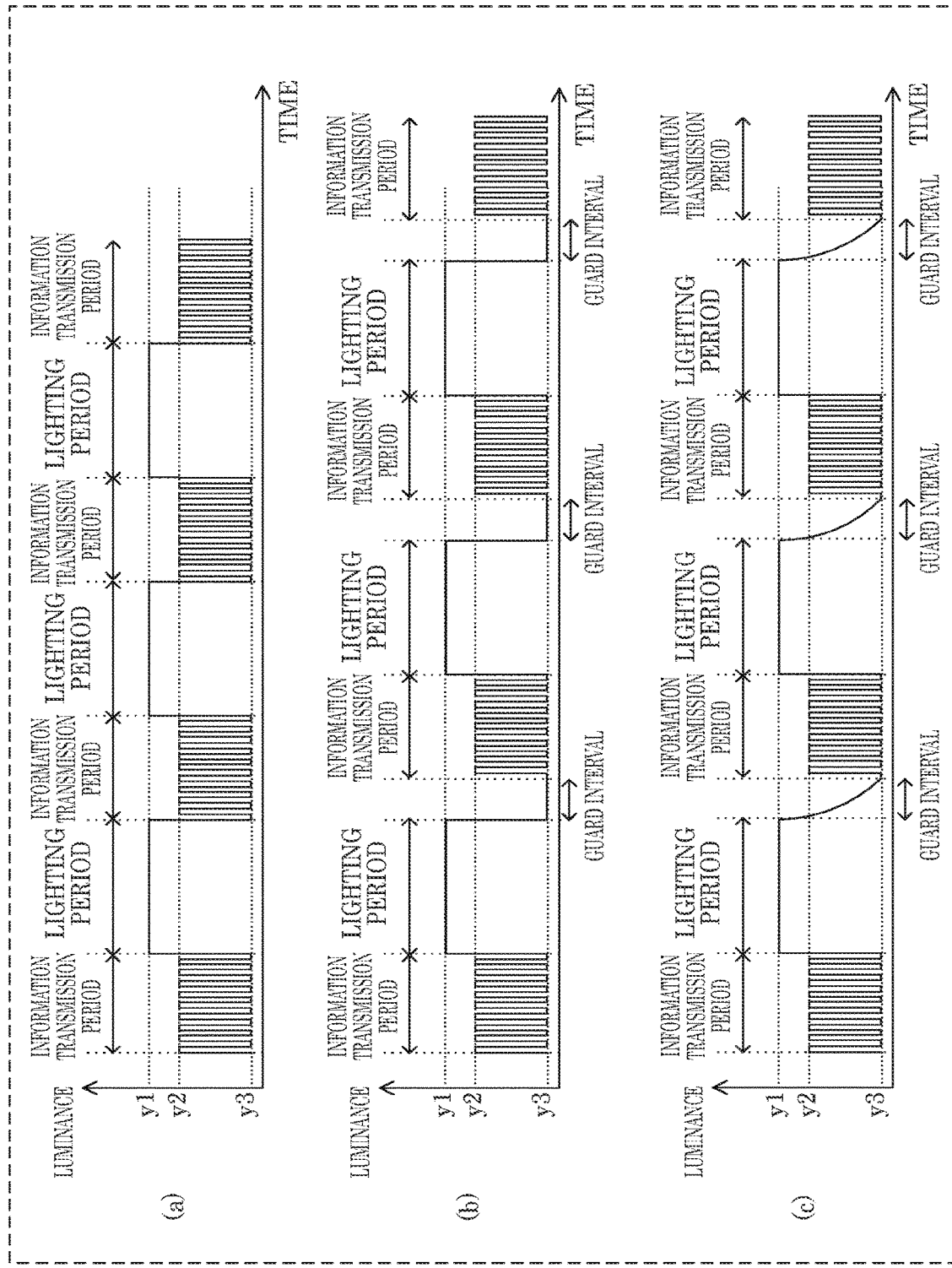
FIG. 74A illustrates one example of changes in luminance in the information transmission period and the lighting period according to Embodiment 15.

FIG. 74A illustrates one example of changes in luminance in the information transmission period and the lighting period.

As illustrated in (a) in FIG. 74A, the transmission device causes the light source to emit light having first luminance y1 in the lighting period. Moreover, as illustrated in (a) in FIG. 74A, the transmission device transmits, in the information transmission period, a modulated optical signal configured of, for example, second luminance y2 and third luminance y3 lower than second luminance y2. However, the method of transmitting a modulated optical signal in the information transmission period is not limited to the example illustrated in (a) in FIG. 74A.

This makes it possible to inhibit a reduction in the amount of light for lighting compared to when no lighting period is provided.

Here, the transmission device may set first luminance y1 and second luminance y2 to different luminances. For example, the transmission device may set first luminance y1 higher than second luminance y2, as illustrated in (a) in FIG. 74A. With this, the reduction in light for lighting in the information transmission period is compensated for by light for lighting in the lighting period, which makes it possible to further inhibit a reduction in the amount of light for lighting.

Moreover, the transmission device may change the ratio between first luminance y1 and second luminance y2 or the time ratio between the information transmission period and lighting period in accordance with the ambient brightness. In other words, the time-based configuration of the information transmission period and the lighting period may be changed according communication to the ambient environment or communication environment, such as data transmission speed needs or communication quality needs. In such cases, luminance y2 of the information transmission period and luminance y1 of the lighting period may be changed via the time-based configuration of the information transmission period and the lighting period.

Moreover, for example, when the ambient brightness changes with changes in the time of day, such as from morning to daytime, and from daytime to night time, the transmission device may change the above-described luminance ratio or time ratio according to the time of day.

Moreover, the transmission device may control the light source so that a guard interval is provided between the information transmission period and the lighting period, as illustrated in (b) and (c) in FIG. 74A. With this, it is possible to reduce the unpleasantness felt from the switching between the information transmission period and the lighting period. This furthermore makes it easier for the reception device to receive the first symbol in the information transmission period.

The transmission device according the present embodiment is implemented with, for example, the configuration of transmission device 100 illustrated in FIG. 6. In other words, transmission device 100 includes light source 104 and transmission unit 102. Transmission unit 102 causes light source 104 to emit a modulated optical signal having first luminance y1 in the lighting period, and causes light source 104 to emit a modulated optical signal having second luminance y2 in the information transmission period.

On the other hand, the reception device that receives the modulated optical signal transmitted from the transmission device according to the present embodiment receives light based on the modulated optical signal, and by receiving, in the modulated optical signal corresponding to the information transmission period, for example, a reference signal for synchronizing a time or frame, extracts the information transmission period from the reception signals. The reception device then outputs analysis information by analyzing data based on the modulated optical signal.

With this, in a state in which a reduction of the amount of light for lighting has been inhibited, the reception device can receive the modulated optical signal and obtain analysis information.

Furthermore, first luminance y1 and second luminance y2 may be different. For example, first luminance y1 may be higher than second luminance y2. With this, it is possible to receive the modulated optical signal and obtain analysis information while the reduction in light for lighting in the information transmission period is being compensated for by light for lighting in the lighting period.

Moreover, the reception device may receive light in the guard interval provided between the lighting period and the information transmission period.

This makes it easier for the reception device to receive the first symbol in the information transmission period.

The reception device according the present embodiment is implemented with, for example, the configuration of reception device 150 illustrated in FIG. 6. In other words, reception device 150 includes light receiver 151 and data analyzer 155. Light receiver 151 receives a modulated optical signal transmitted from light source 104 by receiving a modulated optical signal corresponding to a modulated optical signal having second luminance y2 in the information transmission period. Data analyzer 155 then outputs analysis information by analyzing data based on the modulated optical signal.

Figure 74B:
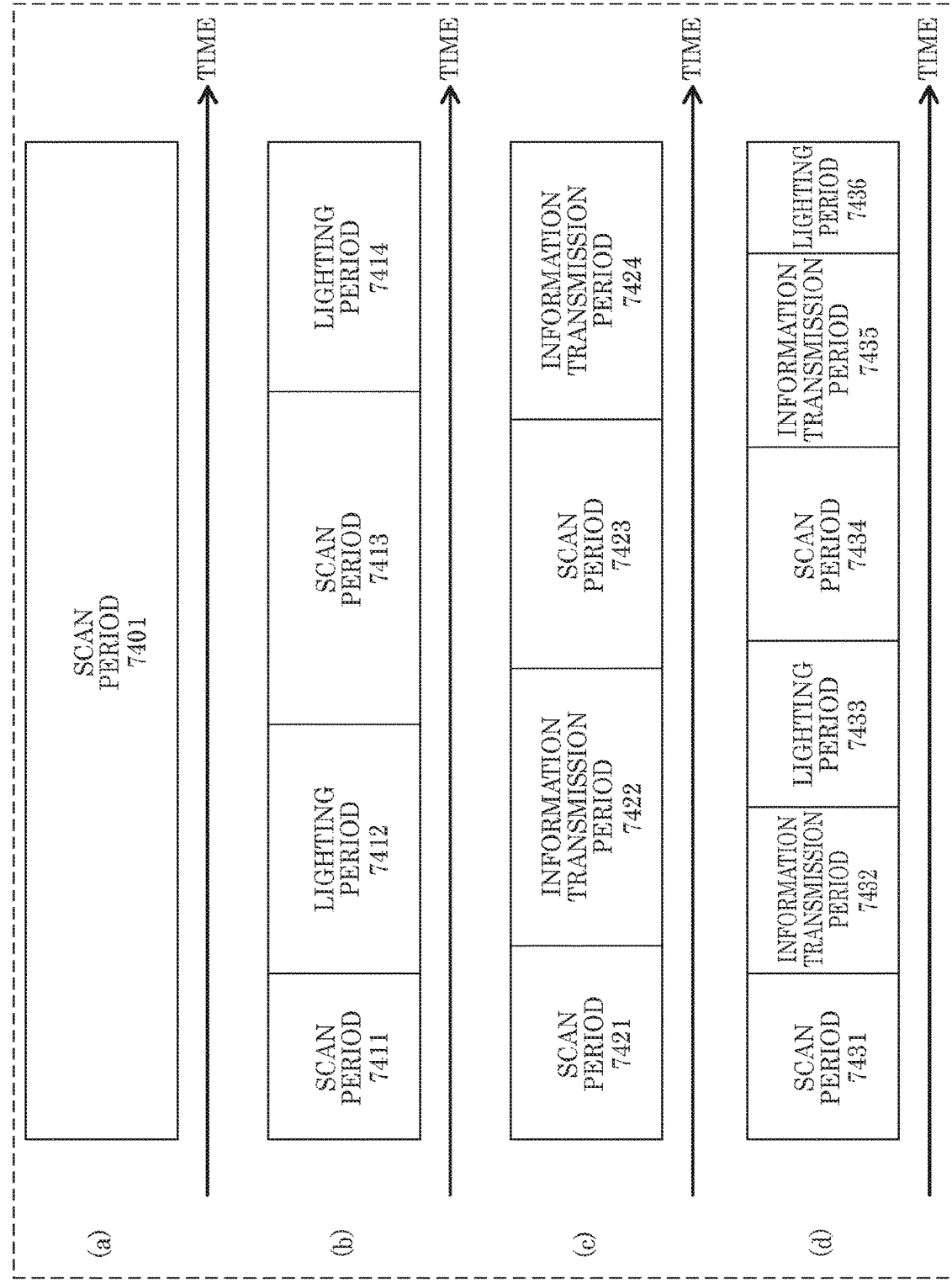
FIG. 74B illustrates one example of a frame configuration according to Embodiment 15.

FIG. 74B illustrates one example, which differs from the example illustrated in FIG. 74A, of a frame configuration, along the time axis, of the transmission device that transmits (emits) the modulated optical signal. Note that in FIG. 74B, time is represented on the horizontal axis.

In FIG. 74B, (a) illustrates one example of a first frame configuration of transmission device. In (a) in FIG. 74B, a frame of scan period 7401 is transmitted. Note that scan period 7401 is a time period in which a frame for implementing Embodiment 13 is transmitted.

Accordingly, the first vehicle that includes the transmission device includes the reception device. The first vehicle emits light so that the light is incident on transmission device 900 illustrated in FIG. 71A that is in the surrounding area of the first vehicle, as described in Embodiment 13 (a plurality of transmission device 900 may be present). This light emission period corresponds to scan period 7401 in FIG. 74B (this also applies to scan period 7411, scan period 7413, scan period 7421, scan period 7423, scan period 7431, and scan period 7434). For example, in the scan period, the first vehicle may emit light while changing the direction in which light is emitted.

The reception device included in the first vehicle obtains the data by receiving and demodulating the modulated optical signal transmitted by transmission device 900 reflecting light. Note that a reception device included in a vehicle other than the first vehicle may obtain the data by receiving and demodulating the modulated optical signal.

In FIG. 74B, (b) illustrates an example of a second frame configuration of transmission device. Scan periods 7411 and 7413 in (b) in FIG. 74B serve the same role as scan period 7401 in (a) in FIG. 74B. Lighting periods 7412 and 7414 in (b) in FIG. 7413 correspond to the lighting period illustrated in FIG. 74A, and serve the same role as described with reference to FIG. 74A. Accordingly, repeated description will be omitted.

In FIG. 74B, (c) illustrates an example of a third frame configuration of transmission device. Scan periods 7421 and 7423 in (c) in FIG. 74B serve the same role as scan period 7401 in (a) in FIG. 74B. Information transmission periods 7422 and 7424 in (c) in FIG. 74B correspond to the information transmission period illustrated in FIG. 74A, and serve the same role as described with reference to FIG. 74A. Accordingly, repeated description will be omitted.

In FIG. 74B, (d) illustrates an example of a fourth frame configuration of transmission device. Scan periods 7431 and 7434 in (d) in FIG. 74B serve the same role as scan period 7401 in (a) in FIG. 74B. Information transmission periods 7432 and 7435 in (d) in FIG. 74B correspond to the information transmission period illustrated in FIG. 74A, and serve the same role as described with reference to FIG. 74A. Accordingly, repeated description will be omitted. Lighting periods 7433 and 7436 in FIG. 74B correspond to the lighting period illustrated in. FIG. 74A, and serve the same role as described with reference to FIG. 74A. Accordingly, repeated description will be omitted.

Although the frame configurations illustrated in FIG. 74A and FIG. 74B were presented as examples of the frame configuration of the modulated optical signal emitted by the transmission device, the frame configuration is not limited to these examples. So long as the frame is configured of, from among the three types of periods—namely the scan period, the lighting period, and the information transmission period—at least one or at least two of these types of periods, such a frame configuration can be implemented in the same manner as described above and achieve the same advantageous effects as described above.

Note that the scan period, the lighting period, and the information transmission period may include other symbols such as a control information transmission symbol or a reference symbol.

The transmission device may change the frame configuration in accordance with the communication status or the environment that the vehicle including the transmission device is in, for example. For example, the type of periods that make up the frame may be changed, and the length of time in each period may be changed. Moreover, the user may set the frame configuration of the transmission device.

Figure 74C:
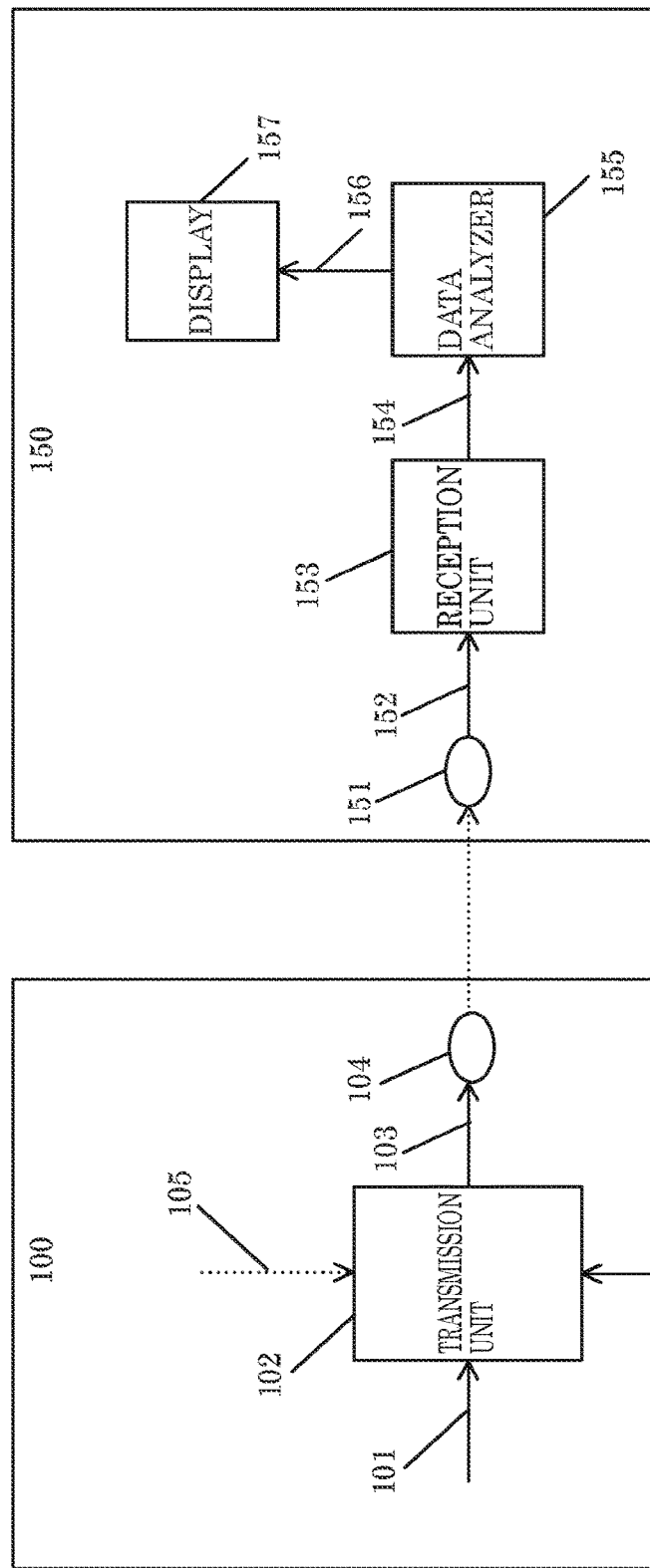
FIG. 74C illustrates a configuration example of a communication system according to Embodiment 15.

FIG. 74C illustrates a configuration of the transmission device and the reception device that receives the modulated optical signal transmitted by the transmission device. Note that in FIG. 74C, objects that operate the same as in FIG. 6 share like reference marks. Accordingly, repeated description thereof will be omitted.

FIG. 74C differs from FIG. 6 in that transmission unit 102 receives an input of control signal 7499. In this example, transmission unit 102 changes, in control signal 7499, the frame configuration of the modulated optical signal emitted by light source 104. Note that control signal 7499 includes, for example, a signal based on communication status, a signal based on information such as information on the environment of the vehicle that includes the transmission device, and/or a signal indicating settings configured by the user.

Note that the temporal length of the lighting period may be changed according to the length of the information transmission period in order to adjust the brightness. Moreover, the temporal length of the lighting period may be changed according to the environment of the vehicle (for example, the ambient brightness as affected by the time of day or the ambient brightness as affected by the weather). Furthermore, the length of the lighting period may be changed taking into consideration the length of the information transmission period and the environment of the vehicle. This achieves the advantageous effect that favorable brightness can be achieved.

Moreover, the transmission device may be characterized by the transmission of a frame configuration made up of a scan period, like the frame configuration illustrated in (a) in FIG. 74B, and/or a frame configuration made up of scan periods and lighting periods, like the frame configuration illustrated in (b) in FIG. 74B. This achieves the advantageous effect that information related to the surrounding environment can be obtained. Moreover, the user may set the frame configuration so as to be made up of a scan period, such as the frame configuration illustrated in (a) in FIG. 74B, and/or a so as to be made up of scan periods and lighting periods, such as the frame configuration illustrated in (b) in FIG. 74B. For example, the user may configure settings so that the transmission device transmits a modulated optical signal having a frame configuration like that in (a) in FIG. 74B or (b) in FIG. 74B. In such cases, the vehicle including the transmission device collects information about the surrounding area (for example, light source 104 may be configured to emit light in various directions). On the other hand, when the user is driving on the road, it is conceivable that the user may want to choose a frame configuration. This is because, for example, when light is emitted in various directions, this light may interfere with a user driving a vehicle in an oncoming lane. Being able to choose a frame configuration makes it possible to achieve the advantageous effect that such an occurrence can be avoided.

Note that in the present embodiment, the transmission device and the reception device are exemplified as, but not limited to being equipped in a vehicle. The transmission device and the reception device may be equipped in something other than a vehicle, and may be provided as stand-alone units. Even in such cases, the operations described in the present embodiment can be implemented and the same advantageous effects can be achieved.

In the above example, an information transmission period and a lighting period are provided in order to ensure a sufficient amount of light for lighting, but a plurality of light sources may be used. In other words, the transmission device may include a light source exclusively for transmitting modulated optical signals (hereinafter referred to as a "communications light source") and a light source exclusively for lighting (hereinafter referred to as a "lighting light source"). In such cases, the transmission device may include a plurality of communications light sources. The plurality of communications light sources may have mutually different transmission speeds. Furthermore, any communications light source may output a modulated optical signal towards the ground.

Figure 75:
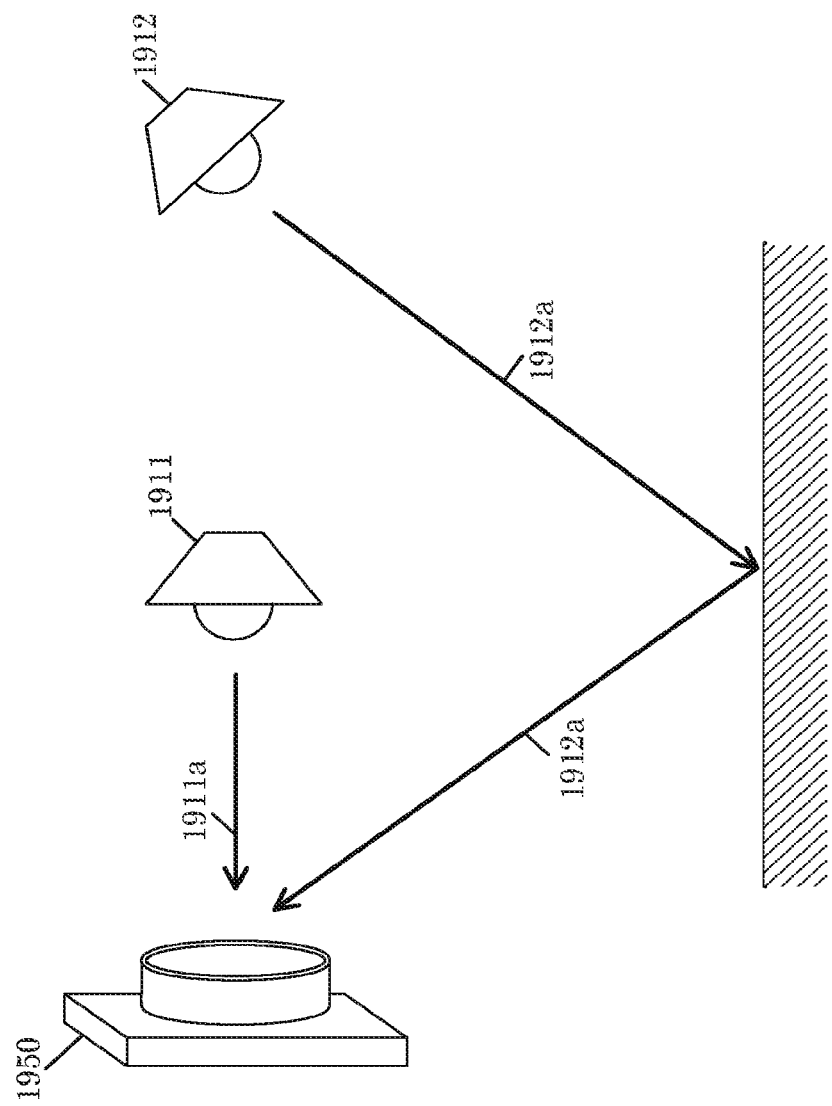
FIG. 75 illustrates one example of a transmission device including a lighting light source and a communications light source according to Embodiment 15.

FIG. 75 illustrates an example of a plurality of communications light sources outputting modulated optical signals.

First communications light source 1911 outputs modulated optical signal 1911a toward reception device 1950. Second communications light source 1912 outputs modulated optical signal 1912a.

Here, for example as illustrated in FIG. 75, from the perspective of reception device 1950, second communications light source 1912 is obstructed by first communications light source 1911. Second communications light source 1912 therefore outputs modulated optical signal 1912a toward the ground. With this, modulated optical signal 1912a reflects off the ground and is incident on reception device 1950. As a result, even when second communications light source 1912 is obstructed by first communications light source 1911, reception device 1950 can receive modulated optical signal 1912a from second communications light source 1912.

(Supplemental Information 1)

It goes without saying that the embodiments described in the present specification may be combined with other aspects.

Moreover, the embodiments are merely examples. For example, while a modulation scheme, an error correction coding method (error correction code, code length, encode rate, etc., to be used), control information, etc., are exemplified, it is possible to carry out the present disclosure with the same configuration even when other types of a modulation scheme, an error correction coding method (error correction code, code length, encode rate, etc., to be used), control information, etc., are applied.

Regarding the modulation scheme, even when a modulation scheme other than the modulation schemes described herein is used, it is possible to carry out the embodiments and the other subject matter described herein. For example, amplitude phase shift keying (APSK) (such as 16APSK, 64APSK, 128APSK, 256APSK, 1024APSK and 4096 APSK), pulse amplitude modulation (PAM) (such as 4PAM, 8PAM, 16PAM, 64PAM, 128PAM, 256PAM, 1024PAM and 4096PAM), phase shift keying (PSK) (such as BPSK, QPSK, 8PSK, 16PSK, 64PSK, 128PSK, 256PSK, 1024PSK and 4096PSK), and quadrature amplitude modulation (QAM) (such as 4QAM, 8QAM, 16QAM, 64QAM, 128QAM, 256QAM, 1024QAM and 4096QAM) may be applied, or in each modulation scheme, uniform mapping or non-uniform mapping may be performed. Moreover, a method for arranging 2, 4, 8, 16, 64, 128, 256, 1024, etc., signal points on an I-Q plane (a modulation scheme having 2, 4, 8, 16, 64, 128, 256, 1024, etc., signal points) is not limited to a signal point arrangement method of the modulation schemes described herein.

In the present specification, conceivable devices that include the wireless communication device described in the present specification include a communications and broadcast apparatus, such as a broadcast station, a base station, an access point, a terminal or a mobile phone, or a communication apparatus such as a television, a radio, a terminal, a personal computer, a mobile phone, an access point, or a base station. Moreover, the wireless communication device described in the present specification is conceivably a device having communication functions that is connectable via some interface to a device for executing an application in, for example, a television, a radio, a personal computer or a mobile phone.

In the present specification, conceivable devices that include the receiver described in the present specification include a communications and broadcast apparatus, such as a broadcast station, a base station, an access point, a terminal or a mobile phone, or a communication apparatus such as a television, a radio, a terminal, a personal computer, a mobile phone, an access point, or a base station.

Moreover, in the wireless communication via radio waves according to this embodiment, symbols other than data symbols, such as pilot symbols (preamble, unique word, post-amble, reference symbol, etc.) or symbols for control information, may be arranged in any way in a frame. Here, the terms "pilot symbol" and "control information symbol" are used, but the naming of such symbols is not important; the functions that they perform are.

A pilot symbol may be a known symbol that is modulated using PSK modulation in a transceiver (alternatively, a symbol transmitted by a transmitter can be known by a receiver by the receiver being periodic), and the receiver detects, for example, frequency synchronization, time synchronization, and a channel estimation (channel state information (CSI)) symbol (of each modulated signal) by using the symbol.

Moreover, the symbol for control information is a symbol for transmitting information required to be transmitted to a communication partner in order to establish communication pertaining to anything other than data (such as application data) (this information is, for example, the modulation scheme, error correction encoding scheme, or encode rate of the error correction encoding scheme used in the communication, or settings information in an upper layer).

(Supplemental Information 2)

Methods based on specifications stipulated by Moving Picture Experts Group (MPEG) 2, H.264/Advanced Video Coding (AVC), H.265/High. Efficiency Video Coding (HEVC), VC-1, VP8, and VP9, etc., may be used as the video encoding method described in the above embodiments. However, a video encoding method different from the above examples may be used as the video encoding method described in the above embodiments.

Note that the present disclosure is not limited to the above embodiments; various modifications can be applied to them. For example, the above embodiments are implemented as a communication device, but this example is not limiting; the embodiments may be realized as a communication method implemented as software, hardware, or software paired with hardware.

Note that a program for executing the above-described communication method, transmission method, or reception method may be stored in read only memory (ROM) in advance to cause a central processing unit (CPU) to operate this program.

Moreover, the program for executing the communication method, transmission method, or reception method may be stored in a computer-readable storage medium, the program stored in the recording medium may be recorded in random access memory (RAM) in a computer, and the computer may be caused to operate according to this program.

Each functional block of each of the above-described embodiments, etc., may be partially or entirely realized as a large scale integration (LSI) circuit, which is an integrated circuit. Each process described in each of the above embodiments may be controlled partially or entirely by one LSI circuit or a combination of LSI circuits. These LSI circuits may be formed as separate chips, or may be formed as one chip so as to include the entire configuration or part of the functional block. The LSI circuit may include a data input and a data output. The term "LSI circuit" is used here, but the integrated circuit may also be referred to as an integrated circuit (IC), a system LSI circuit, a super LSI circuit or an ultra LSI circuit depending on the degree of integration. Moreover, the circuit integration technique is not limited to LSI, and may be realized by a dedicated circuit or a general purpose processor. After manufacturing of the LSI circuit, a field programmable gate array (FPGA) or a reconfigurable processor which is reconfigurable in connection or settings of circuit cells inside the LSI circuit may be used. The present disclosure may be implemented as digital processing or analog processing. Furthermore, if an integrated circuit technology that replaces LSI emerges as semiconductor technology advances or when a derivative technology is established, it goes without saying that the functional blocks may be integrated by using such technology. Implementation of biotechnology, for example, is a possibility.

(Supplemental Information 3)

Note that at least one of the field programmable gate array (FPGA) and central processing unit (CPU) may be configured to be able to download all or part of software required for implementing the communication method, transmission method, or reception method described in the present disclosure via wireless or wired communication, and moreover may be configured to be able to download all or part of software for receiving updates via wireless or wired communication. The downloaded software may be stored in storage, and the digital signal processing described in the present disclosure may be implemented by operating at least one of the FPGA and CPU based on the stored software.

Here, a device including at least one of the FPGA and CPU may connect to a communications modem over a wired or wireless connection, and the device and communications modem may implement the communications method, transmission method, or reception method described in the present disclosure.

For example, a communication device (transmission device or reception device) such as the base station, AP, and terminal described in the present specification may include at least one of the FPGA and the CPU, and include an interface for obtaining, from an external source, software for operating at least one of the FPGA and the CPU. Furthermore, the communication device may include storage for storing software obtained from an external source, and may implement the signal processing described in the present disclosure by operating the FPGA and/or CPU based on the stored software.

The transmission device described in the present specification may be included in a first automobile or vehicle, and the reception device described in the present specification may be included in a second automobile or vehicle, and the transmission and receiving of data may be implemented under such a configuration.

The transmission device or part of the functions of the transmission device described in the present specification may be connected to the first automobile or vehicle via an interface, and the reception device or part of the functions of the reception device described in the present specification may be connected to the second automobile or vehicle via an interface, and the transmission of data may be implemented via transmission and reception thereby.

The transmission device described in the present specification may be included in a first automobile or vehicle, and the transmission and receiving of data between this transmission device and the reception device described in the present specification may be implemented under such a configuration.

The reception device described in the present specification may be included in a second automobile or vehicle, and the transmission and receiving of data between this reception device and the transmission device described in the present specification may be implemented under such a configuration.

Furthermore, the transmission device or part of the functions of the transmission device described in the present specification may be connected to the first automobile or vehicle via an interface, and the transmission and receiving of data between this string of transmission devices and the reception device described in the present specification may be implemented under such a configuration.

The reception device or part of the functions of the reception device described in the present specification may be connected to the second automobile or vehicle via an interface, and the transmission and receiving of data between this string of reception devices and the transmission device described in the present specification may be implemented under such a configuration.

When the automobile or vehicle includes the transmission device or part of the transmission device described in the present specification, or when the automobile or vehicle and the transmission device described in the present specification or part of the functions of the transmission device described in the present specification are connected via an interface, the light source included in the transmission device described in the present specification may be a light source included in the automobile or vehicle.

Figure 76:
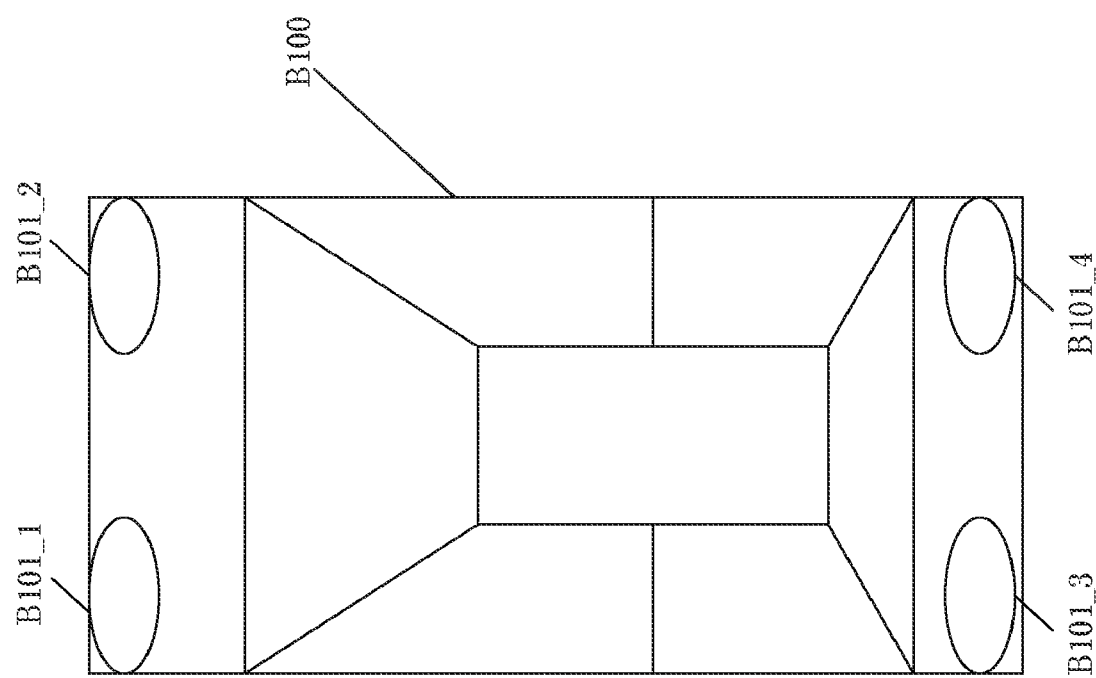
FIG. 76 illustrates one example of a plurality of light sources included in a vehicle.

For example, automobile B100 illustrated in FIG. 76 includes light sources B101_1, B101_2, B101_3, and B101_4, and one or more of these light sources may be the light source to be used by the transmission device according to the present specification for transmitting the modulated optical signal.

Moreover, the function for selecting which light source among the plurality of light sources included in automobile B100 the transmission device according to the present specification uses for transmitting the modulated optical signal may be included in the transmission device or a device connected to the transmission device. Moreover, the brightness of the light source, the angle of emission of the light source, the positioning of the light source may be configurable.

When the automobile or vehicle includes the reception device or part of the reception device described in the present specification, or when the automobile or vehicle and the reception device described in the present specification or part of the functions of the reception device described in the present specification are connected via an interface, the light receiver included in the reception device described in the present specification may be a light receiver included in the automobile or vehicle (for example, an image sensor or photodiode).

Figure 77:
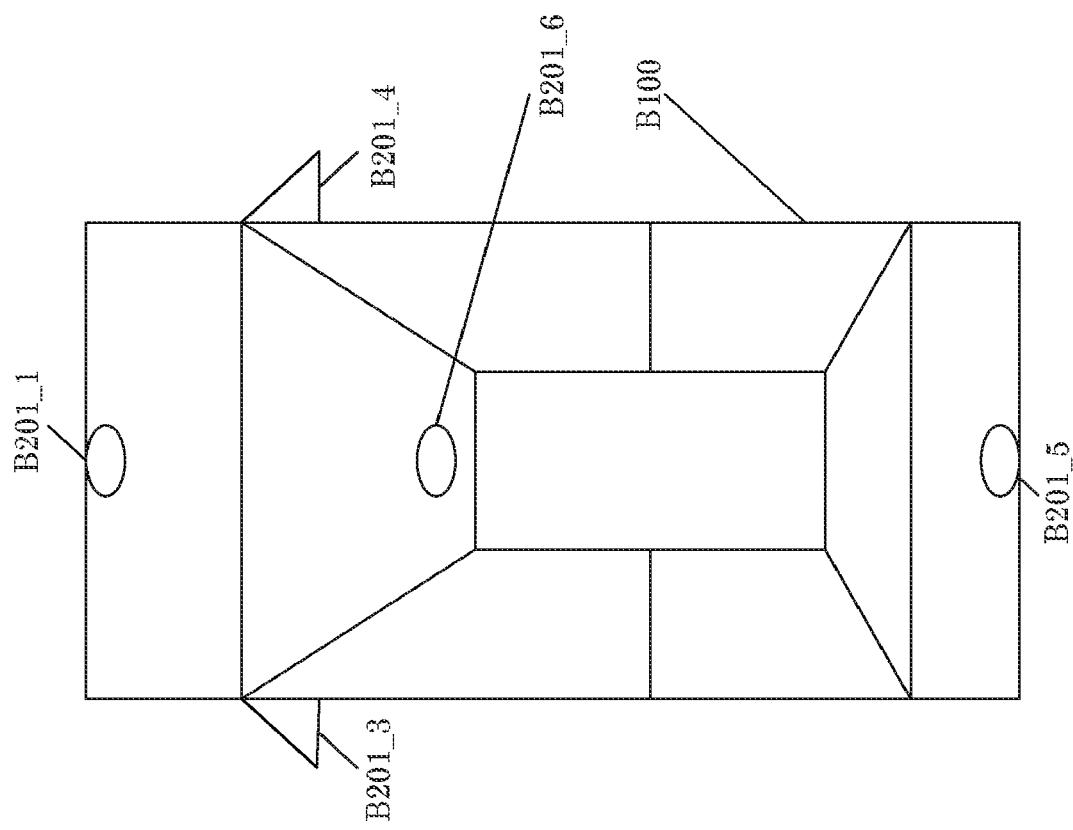
FIG. 77 illustrates one example of a plurality of light receivers included in a vehicle.

For example, automobile B100 illustrated in FIG. 77 includes light receivers B201_1, B201_2, B201_3, B201_4, B201_5, and B201_6, and one or more of these light receivers may be the light receiver to be used by the reception device according to the present specification for receiving the modulated optical signal.

Moreover, the function for selecting which light receiver among the plurality of light receivers included in automobile B100 the reception device according to the present specification uses for receiving the modulated optical signal may be included in the reception device or a device connected to the reception device. Moreover, the angle of the light receiver and the positioning of the light receiver may be configurable.

Furthermore, the reception device described in the present specification may display, on the front panel included in the automobile or in the cockpit of the vehicle, a notification indicating that data has been received. Moreover, the reception device described in the present specification may notify a user that data has been received by vibrating the steering wheel of, for example, the automobile, or vibrating a vibrator included on the steering wheel.

(Supplemental Information 4)

In the present specification, a server may provide an application related to processes pertaining to the reception device, and the functions of the reception device according to the present specification may be implemented by the terminal installing the application. Note that the application may be provided to the terminal by the communication device including in the transmission device according to the present specification connecting to a server over a network, and may be provided to the terminal by a communication device including a different transmission function connecting to a server over a network.

Similarly, in the present specification, a server may provide an application related to processes pertaining to the transmission device, and the functions of the transmission device according to the present specification may be implemented by the terminal installing the application. Note that a method in which the application is provided to a different communication device by the communication device connecting to a server over a network is conceivable.

Moreover, a server may provide software related to the light source included in the transmission device and the light receiver included in the reception device, and transmission and reception of the modulated optical signal by the light source included in the transmission device and the light receiver included in the reception device, respectively, may be supported by obtaining this software.

Furthermore, the transmission device according to the present specification may function as a server, and an application included in the transmission device may be provided to the communication device using some communication means, and the reception device according to the present specification can be implemented by the application obtained by the communication device downloading the application.

Note that in the present specification, there is reference to a "lamp" and a "light source", but the method may be a method of a projector or display displaying, for example, an image, a video, or advertisement, and the modulated optical signal being included in that light. In other words, the "lamp" and the "light source" may include functions other than the emission of light. Moreover, the "lamp" and the "light source" may comprise a plurality of lamps and light sources, respectively.

Furthermore, the transmission method used by the communication device that generates a modulated optical signal and emits light may be a method other than the transmission method described in the present specification. Moreover, the modulated optical signal may include information other than what is described in the present specification.

Moreover, the lamp and/or light source, such as an LED lamp and/or light source, may itself include the functions of the transmission device described in the present specification.

Furthermore, the transmission device and the reception device disclosed in the present specification are exemplified as, but not limited to being equipped in a vehicle. The transmission device and the reception device may be equipped in something other than a vehicle, and may be provided as stand-alone units. Even in such cases, the operations described in the present specification can be implemented and the same advantageous effects can be achieved.

(Supplemental Information 5)

The communication device and reception device according to the present disclosure may be implemented as any one of the aspects according to Embodiments 1 through 11.

In other words, a first communication device according to one aspect of the present disclosure includes: a light receiver that receives a first optical signal and a second optical signal and generates a reception signal, the first optical signal transmitting first identifier information indicating an identifier of the first communication device, and the second optical signal transmitting second identifier information indicating an identifier of a second communication device; a demodulator that demodulates the reception signal to obtain the first identifier information and the second identifier information; a camera that captures a region including the first optical signal and the second optical signal to obtain video data or still image data; a controller that selects, based on the video data or still image data, one of the first identifier information or the second identifier information; and a communicator that communicates with a communication device corresponding to the selected identifier information.

A second communication device according to one aspect of the present disclosure includes: a light receiver that captures a predetermined region to obtain a reception signal for demodulating an optical signal emitted to the predetermined region and video data or still image data for use in image processing: a demodulator that demodulates the image data to obtain a plurality of items of identifier information indicating identifiers of other corresponding communication devices; a controller that selects, based on the video data or still image data, one item of identifier information from among the plurality of items of identifier information; and a communicator that wirelessly communicates with another communication device that corresponds to the selected identifier information.

A first reception device according to one aspect of the present disclosure includes: a first light receiver that receives a first optical signal and a second optical signal and generates an optical reception signal, the first optical signal transmitting first identifier information indicating an identifier of a first communication device and the second optical signal transmitting second identifier information indicating an identifier of a second communication device; a demodulator that demodulates the optical reception signal to obtain the first identifier information and the second identifier information; a second light receiver that obtains video data or still image data in which a region including the first optical signal and the second optical signal is captured; and a controller that selects, based on the video data or the still image data, one of the first identifier information or the second identifier information.

A second reception device according to one aspect of the present disclosure includes: a light receiver that receives a first optical signal and a second optical signal and generates a reception signal, the first optical signal transmitting first identifier information indicating an identifier of a first communication device and the second optical signal transmitting second identifier information indicating an identifier of a second communication device; a demodulator that demodulates the reception signal to obtain the first identifier information and the second identifier information; a camera that captures a region including the first optical signal and the second optical signal to obtain video data or still image data; and an analyzer that analyzes the video data or the still image data to generate relative position information indicating a positional relationship between a first transmitter that transmitted the first optical signal and a second transmitter that transmitted the second optical signal.

A third reception device according to one aspect of the present disclosure includes: a light receiver that uses an image sensor to receive a first optical signal and a second optical signal and generates a reception signal, the first optical signal transmitting first identifier information indicating an identifier of a first communication device, the second optical signal transmitting second identifier information indicating an identifier of a second communication device; a demodulator that demodulates the reception signal to obtain the first identifier information and the second identifier information; and an analyzer that generates first position information indicating a position of a first transmitter that transmitted the first optical signal and second position information indicating a position of a second transmitter that transmitted the second optical signal.

A fourth reception device according to one aspect of the present disclosure includes: a light receiver that captures a predetermined region to obtain a reception signal for demodulating an optical signal emitted to the predetermined region and video data or still image data for use in image processing; a demodulator that demodulates the reception signal to receive demodulated data; and an analyzer that analyzes the video data or still image data to generate attribute information indicating an attribute of a transmitter that transmitted an optical signal corresponding to the demodulated data.

Moreover, the transmission method and the reception method according to the present disclosure may be in accordance with the aspect according to Embodiment 15.

In other words, the transmission method according to one aspect of the present disclosure includes: in a first period, causing a light source to emit light having a first luminance; and in a second period, causing the light source to transmit an optical signal by causing the light source to alternately emit light having a second luminance and light having a third luminance lower than the second luminance. For example, the first period is the lighting period illustrated in FIG. 74A, and the second period is the information transmission period illustrated in FIG. 74A.

With this, in the second period, since the light source transmits an optical signal by alternately emitting light having the second luminance and light having the third luminance, the reception device can securely obtain information such as an SSID by receiving the optical signal. Moreover, when the light source is also used for lighting, the amount of light that is output for lighting can be expected to decrease due to the transmission of the optical signal. However, with the transmission method according to this aspect, it is possible to inhibit a reduction in the amount of light output for lighting since the light source emits light having the first luminance in the first period.

Moreover, the transmission method may further control the light source so as to provide a guard interval between the first period and the second period.

Since this provides a guard interval like illustrated in, for example, (b) and (c) in FIG. 74A, it is possible to reduce the unpleasantness felt from the switching between the first period and the second period. This furthermore makes it easier for the reception device to receive the first symbol in the second period.

Moreover, the first luminance and the second luminance may be different.

For example, the transmission device may set the first luminance higher than the second luminance, as illustrated in (a) in FIG. 74A. With this, the reduction in light for lighting in the second period is compensated for by light for lighting in the first period, which makes it possible to further inhibit a reduction in the amount of light for lighting.

Moreover, the reception method according to one aspect of the present disclosure includes: in a first period, receiving light having a first luminance from a light source; in a second period, receiving an optical signal transmitted from the light source, by alternately receiving light having a second luminance and light having a third luminance lower than the second luminance; and outputting analysis information by analyzing data based on the optical signal.

This makes it possible for the reception device to securely obtain information such as an SSID by receiving the optical signal. Moreover, when the light source is also used for lighting, the amount of light that is output for lighting can be expected to decrease due to the transmission of the optical signal. However, with the reception method according to this aspect, it is possible to receive the optical signal and obtain the analysis information, in a state in which a reduction in the amount of light output for lighting is inhibited, since the light source emits light having the first luminance in the first period.

The reception method may further include receiving light in a guard interval provided between the first period and the second period.

Since this provides a guard interval like illustrated in, for example, (b) and (c) in FIG. 74A, the first symbol in the second period can be easily received.

Moreover, the first luminance and the second luminance may be different.

For example, the first luminance may be higher than the second luminance, as illustrated in (a) in FIG. 74A. With this, it is possible to receive the optical signal and obtain analysis information while the reduction in light for lighting in the second period is being compensated for by light for lighting in the first period.

Variation of Embodiments 1 to 15

Hereinafter, a variation example for each of Embodiments 1 to 15 will be described per item.

<Vehicle Visible Light Communication>

In the above embodiments, when a vehicle receives a modulated optical signal, an image sensor is used in place of a mirror on the vehicle, such as a side mirror or rearview mirror, as illustrated in, for example, FIG. 68, and the image sensor receives the modulated optical signal. However, rather than an image sensor that is used in place of a mirror, an image sensor for receiving modulated optical signals may be provided in the vehicle. Alternatively, instead of an image sensor, a photodiode for receiving modulated optical signals may be provided in the vehicle. Note that in the present disclosure, since the modulated optical signal is light, the "reception" of a modulated optical signal means both reception in a communications sense and reception in an optical sense.

When a photodiode is used to receive modulated optical signals, the optical communication system that includes the photodiode may have the configuration illustrated in FIG. 52.

Moreover, when modulated optical signals are transmitted from a vehicle, the vehicle or an element included in the vehicle may transmit the modulated optical signals, or a device not included in but provided on or equipped in the vehicle may transmit the modulated optical signal. Moreover, it goes without saying that the transmission device that transmits/emits the modulated optical signals may be used independently.

<Switching Between Methods>

As described above, there are two methods for transmitting modulated optical signals. The first of the two methods transmits modulated optical signals using baseband transmission, as described with reference to, for example, FIG. 1, FIG. 2, FIG. 3, and FIG. 4, and the second of the two methods transmits modulated optical signals using the configuration illustrated in FIG. 52. Baseband transmission is transmission based on an ASK, Manchester encoding, or a line scan (line scan sampling) method.

The transmission device may switch between these two methods. For example, the transmission device switches the transmission method based on, for example, a targeted transmission distance (data reception quality) or transmission speed, and the modulated optical signal is transmitted using the transmission method switched to, i.e., the first method or the second method. Stated differently, the transmission device emits or radiates light using the transmission method switched to.

Figure 78:
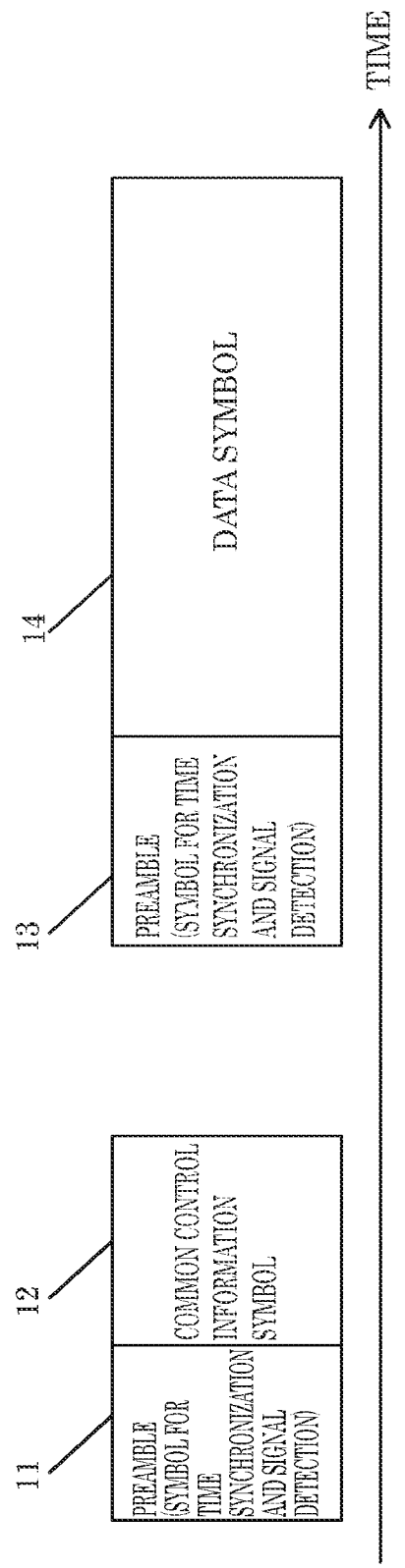
FIG. 78 illustrates one example of a frame configuration of a modulated optical signal.

FIG. 78 illustrates one example of a frame configuration of a modulated optical signal.

The transmission device transmits preamble 11, common control information symbol 12, preamble 13, and data symbol 14.

Each of preamble 11 and preamble 13 includes a symbol for performing time synchronization and signal detection. The reception device may perform frequency offset estimation, frequency synchronization, and channel estimation using the preamble. Common control information symbol 12 includes at least information indicating the above-described transmission method, i.e., the first method or the second method.

For example, the transmission device transmits preamble 11 and common control information symbol 12 using the first method, and transmits preamble 13 and data symbol 14 using the transmission method indicated in common control information symbol 12.

Note that the frame configuration illustrated in FIG. 78 includes a gap of time between the end time of the transmission of common control information symbol 12 and the start time of the transmission of preamble 13. In other words, preamble 13 and data symbol 14 are not transmitted immediately after common control information symbol 12 is transmitted, but is transmitted after elapse of a predetermined amount of time. When the reception device receives common control information symbol 12, during this predetermined amount of time, the reception device can switch modes so that the reception device can receive the modulated optical signal using the transmission method indicated in common control information symbol 12. Note that usage of the predetermined amount of time is not required. In other words, preamble 13 and data symbol 14 may be transmitted immediately after common control information symbol 12 is transmitted.

Moreover, each of the first method and the second method may be any kind of transmission method. For example, the first method and the second method may have mutually different sampling frequencies. Moreover, the number of transmission methods used is not limited to two; three or more transmission methods may be used. In such cases, common control information symbol 12 indicates any one of the three or more methods.

<Groupcast>

The transmission device may groupcast, unicast, or multicast (or broadcast) the modulated optical signal. Note that in groupcast, unicast, or multicast, the transmission device may transmit the modulated optical signal by changing the luminance of the light emitted by the light source that is included in the transmission device, and, alternatively, may transmit the modulated optical signal by using reflected outside light, like in the configuration illustrated in FIG. 71A, for example. Moreover, the groupcast transmits data to a plurality of specified communication partners.

For example, the transmission device may specify the transmission destination for groupcast, unicast, or multicast using an IP address. In other words, when the transmission device performs unicast, the transmission device transmits the IP address of the terminal that is the transmission destination. When the transmission device performs groupcast, the transmission device transmits the IP address assigned to the group that is the transmission destination. The group that is the transmission destination is, for example, a group to which standard-sized vehicles belong, a group to which large vehicles belong, or a group to which electric automobiles belong. The IP addresses of these groups may be static or arbitrarily assigned based on place or time. For example, when the reception device of a vehicle passes through an electronic toll collection (ETC) system gate, the reception device may receive, from an antenna provided at the gate, the IP address of the group to which that vehicle belongs. This assigns lip addresses to groups of vehicles that pass through the gate.

When the transmission device performs multicast, the transmission device transmits the IP address corresponding to the multicast.

Note that when the transmission device performs groupcast or multicast, the transmission device may transmit a MAC address for the groupcast or the multicast. For example, a specific MAC address may be set for the groupcast or multicast. Specifically, all of the hits of the specific MAC address are either 1 or 0.

<Visible Light Communication Relaying>

Figure 79:
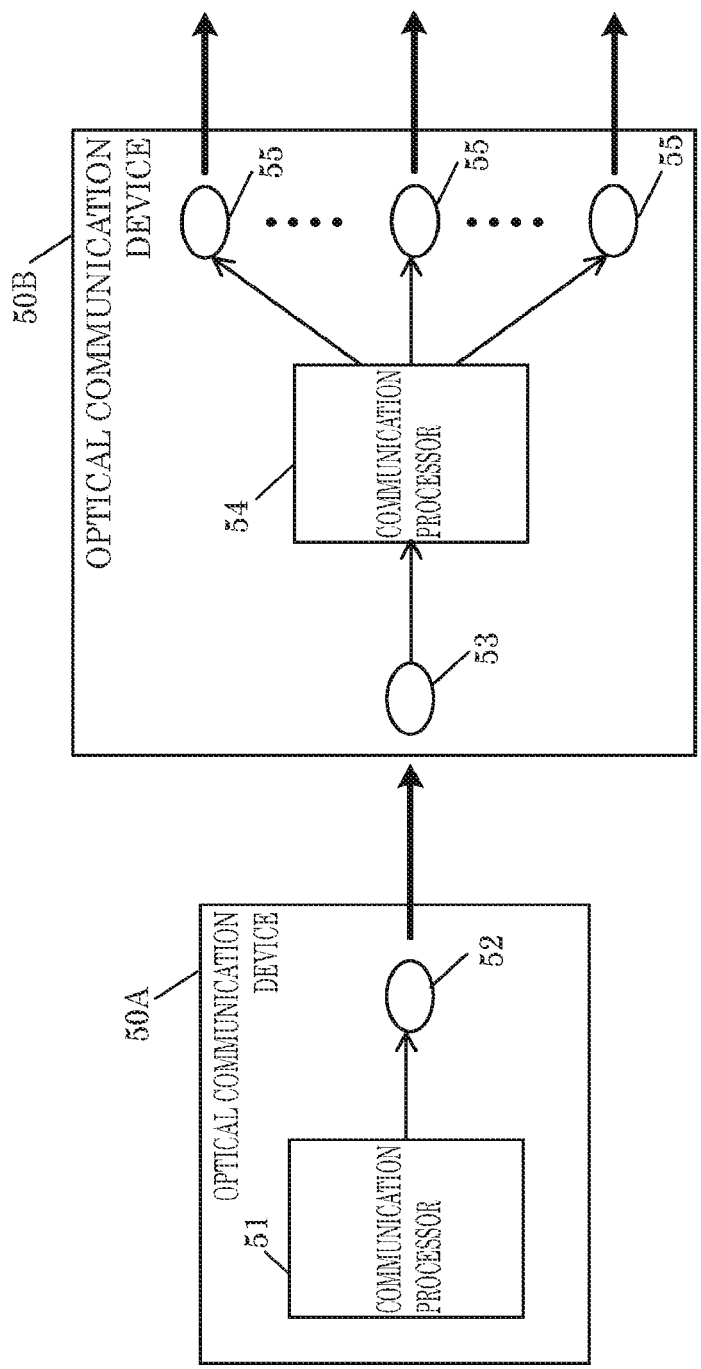
FIG. 79 illustrates one example of the relaying of visible light communication.

FIG. 79 illustrates one example of the relaying of visible light communication.

For example, when optical communication device 50A transmits a modulated optical signal to a communication partner device, optical communication device 50B relays the transmission of that modulated optical signal.

Optical communication device 50A includes communication processor 51 and light emitter 52. Light emitter 52 is, for example, a light source such as a light emitting diode (LED) or an organic electro-luminescent (EL) light source. Communication processor 51 causes a modulated optical signal to be transmitted from light emitter 52 by changing the luminance of the light emitted by light emitter 52.

Optical communication device 50B includes light receiver 53, communication processor 54, and a plurality of light emitters 55. Light receiver 53 is an element such as an image sensor or photodiode, and receives a modulated optical signal transmitted from light emitter 52 included in optical communication device 50A and outputs a signal indicated by the modulated optical signal to communication processor 54. Communication processor 54 causes a modulated optical signal to be transmitted from each of the plurality of light emitters 55 by changing the luminance of the light emitted by the plurality of light emitters 55 in accordance with the signal. In this way, optical communication device 50B relays the transmission of a modulated optical signal from optical communication device 50A to a communication partner device.

Here, in the relaying of the modulated optical signal, the frame of the transmission signal may include a region for transmitting destination information, and either groupcast or multicast may be specified as the destination information. Moreover, in the above example, optical communication device 50B is exemplified as transmitting a modulated optical signal from each of the plurality of light emitters 55, but a modulated optical signal may be transmitted from a single light emitter 55. Moreover, in the relaying of the modulated optical signal, the number of hops may be specified. For example, the frame of the modulated optical signal may include a region for transmitting the number of hops. In such cases, optical communication device 50B may increment the number of hops, and when the number of hops reaches the upper limit, may stop the relaying. Moreover, the frame of the modulated optical signal that is transmitted may include information indicating the upper limit of the number of hops. Accordingly, optical communication device 50B transmits a transmission frame including information indicating destination information, a number of hops, and the upper limit for the number of hops.

Moreover, optical communication device 50B may continuously or regularly transmit the modulated optical signal a plurality of times rather than transmitting the modulated optical signal a single time. Furthermore, optical communication device 50B may transmit the same modulated optical signal as the modulated optical signal transmitted by optical communication device 50A, may further append additional data to the data indicated by the modulated optical signal transmitted by optical communication device 50A, and then transmit a modulated optical signal indicating that data.

<Supplemental Information for the Scan Period, the Lighting Period, and the Information Transmission Period>

With the scan period illustrated in FIG. 74B, the vehicle including the transmission device and the reception device (the first vehicle described above) emits light so that light is incident on each of the one or more transmission devices 900 illustrated in FIG. 72. Here, the vehicle may emit light while changing the directivity of the light, and may emit light while changing the radiation width of the light. Note that converse to the scan period, with the lighting period, the vehicle may emit light while maintaining a constant directivity. However, the directivity of the lighting period may be set to one of a plurality of candidate directivities.

Moreover, in the information transmission period, the vehicle may iteratively transmit information or data. In other words, information may be repeatedly transmitted.

For example, when the vehicle transmits a first data group, the directivity of light used to transmit the first data group the first time and the directivity of light used to transmit the first data group the second time may be different. More specifically, the vehicle changes the directivity of light by moving the light source for transmitting the first data group or changing the optical system (for example, a lens or reflective surface) for transmitting the first data group. The vehicle may change the directivity of light by electronically changing a characteristic of the lens.

Alternatively, the vehicle may transmit a plurality of first data groups simultaneously. In such cases, the vehicle transmits the plurality of first data groups simultaneously by using, for example, a plurality of LEDs. Note that in such cases, each of the plurality of LEDs may emit light in a different direction (emit light having a different directivity).

<Modulated Optical Signal that Uses Reflected Light>

Figure 80:
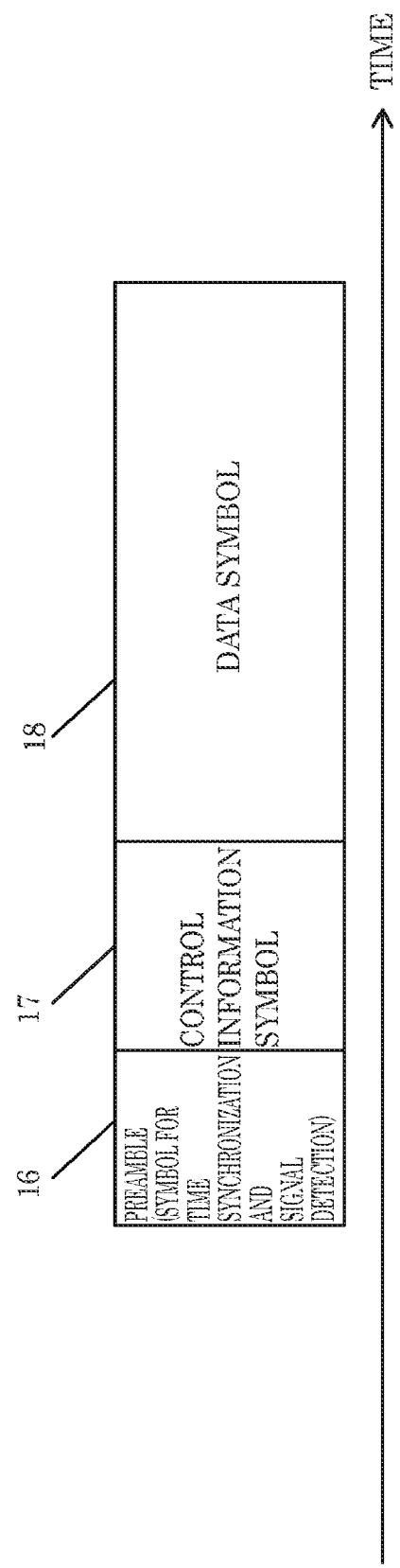
FIG. 80 illustrates one example of a frame configuration of a modulated optical signal transmitted by a transmission device according to Embodiment 13.

FIG. 80 illustrates one example of a frame configuration of a modulated optical signal transmitted by transmission device 900 according to Embodiment 13. Note that the modulated optical signal transmitted by transmission device 900 according to Embodiment 13 is a signal generated using reflected outside light such as sunlight.

Transmission device 900 transmits preamble 16, control information symbol 17, and data symbol 18, for example as illustrated in FIG. 80. In other words, transmission device 900 transmits the above-described preamble 16 and symbols by switching liquid crystal panel 911 between a state in which the liquid crystals transmit light and a state in which the liquid crystals block light, that is to say, by switching optical transmission unit 910 between a light-reflecting state and a non-light-reflecting state.

Preamble 16 includes a symbol for performing time synchronization and signal detection. The reception device may perform frequency offset estimation, frequency synchronization, and channel estimation using the preamble. Such a preamble 16 is a data sequence known to transmission device 900 that controls the transmittance of light and the reception device that receives the modulated optical signal from transmission device 900.

Control information symbol 17 indicates, for example, the type of data symbol 18. More specifically, control information symbol 17 indicates information such as information about a road sign (i.e., sign information), or information about the vehicle equipped with transmission device 900. The information about the vehicle indicates, for example, "the vehicle is moving" or "the vehicle is not moving". Control information symbol 17 may include information on the transmission method or error correction encoding method for data symbol 18.

Figure 81:
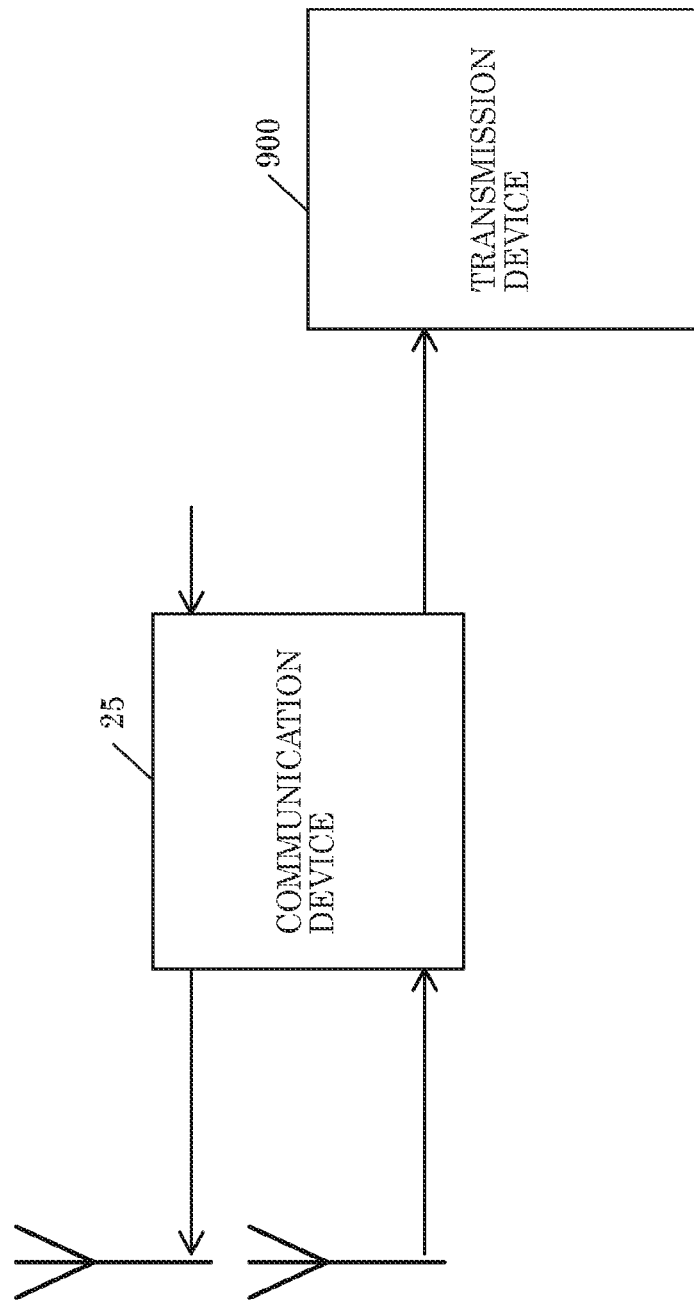
FIG. 81 illustrates a transmission device and a communication device according to Embodiment 13.

FIG. 81 illustrates transmission device 900 that controls the transmittance of light described in. Embodiment 13, and communication device 25.

Communication device 25 is an external device that communicates with interface unit 922 included in transmission device 900 (see FIG. 71A), and receives modulated signals via an antenna. Communication device 25 generates transmission data based on data obtained from the modulated signal, and transmits the transmission data to transmission device 900. Transmission device 900 receives the transmission data transmitted from communication device 25, and stores a modulated signal based on the transmission data into memory 921. Here, so long as the modulated signal is already stored in memory 921, transmission device 900 may overwrite the existing modulated signal with the modulated signal based on the transmission data. With this, based on the transmission data, transmission device 900 can change the modulated optical signal or data sequence transmitted as a result of controlling the state of liquid crystal panel 911. Here, transmission device 900 may change control information symbol 17 as necessary.

Note that communication device 25 may receive the modulated signal via wireless communication using radio waves, and, alternatively, may receive the modulated signal via visible light communication or wired communication.

<Plurality of Light Sources and Plurality of Light Receivers>

Figure 82:
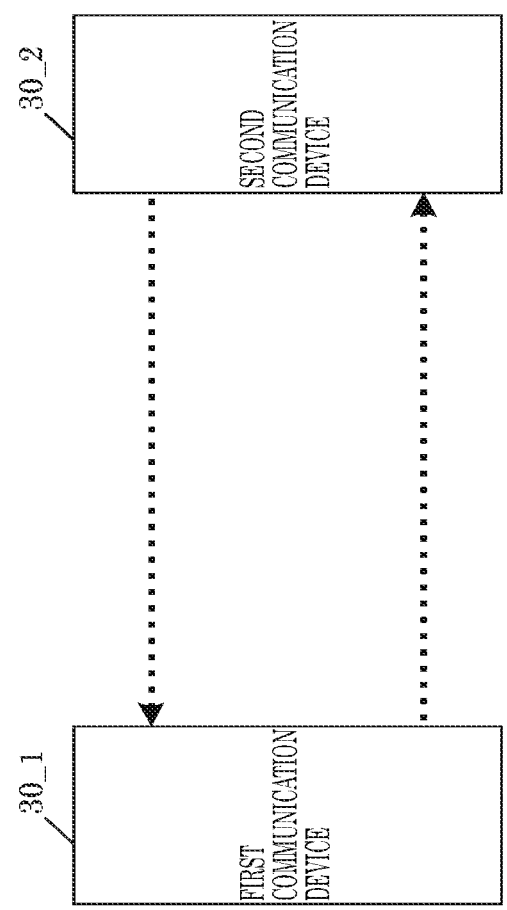
FIG. 82 illustrates communication between a first communication device and a second communication device.

FIG. 82 illustrates communication between first communication device 30_1 and second communication device 30_2.

Each of first communication device 30_1 and second communication device 30_2 includes a plurality of light sources for transmitting modulated optical signals and a plurality of light receivers for receiving modulated optical signals. First communication device 30_1 and second communication device 30_2 perform optical communication (for example, visible light communication) using the included plurality of light sources and plurality of light receivers.

Figure 83:
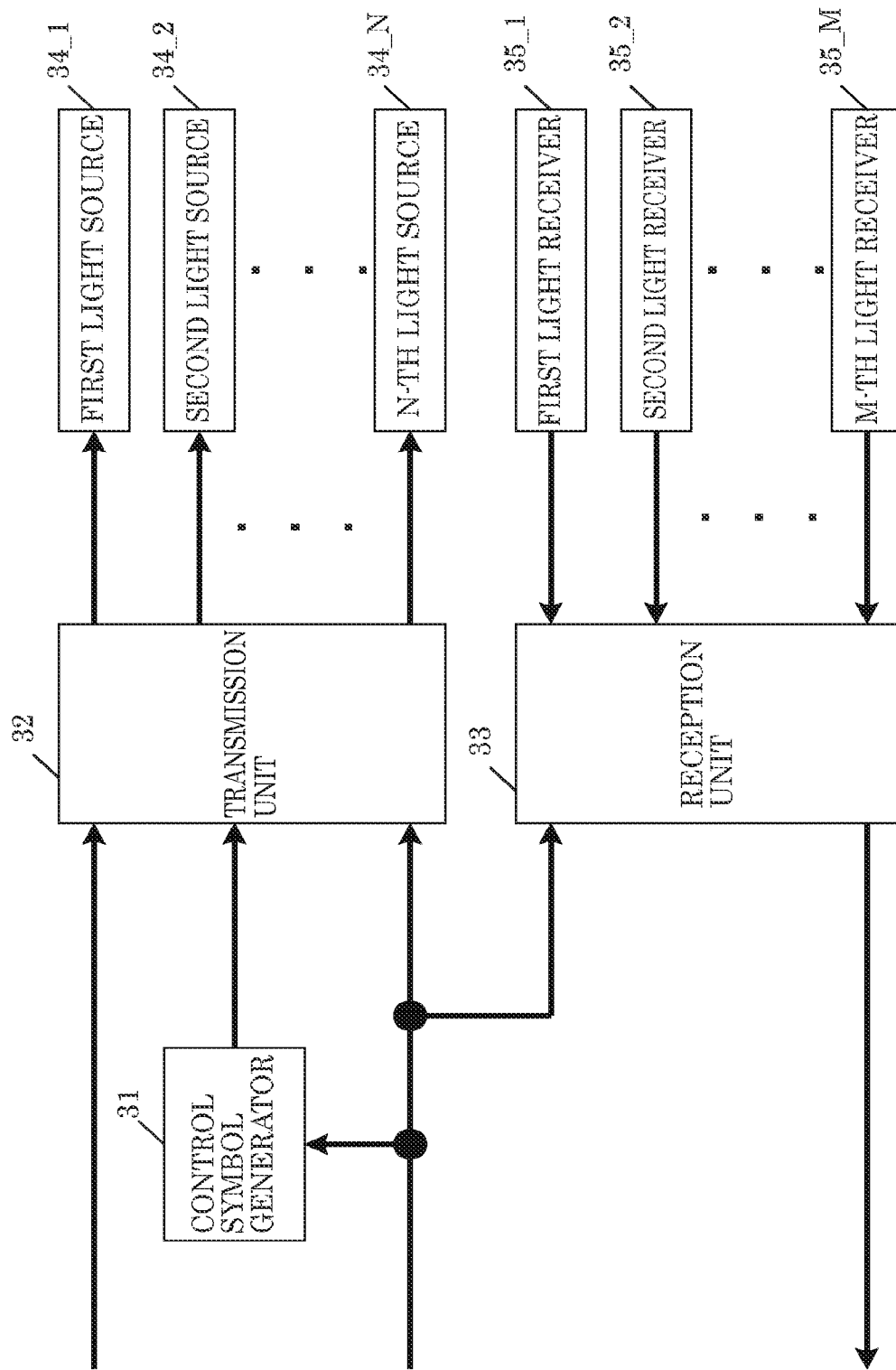
FIG. 83 illustrates a configuration example of a communication device.

FIG. 83 illustrates an example of a configuration of a communication device. For example, each of first communication device 30_1 and second communication device 30_2 has the configuration illustrated in FIG. 83.

Each of first communication device 30_1 and second communication device 30_2 includes control symbol generator 31, transmission unit 32, reception unit 33, first light source 34_1 through N-th light source 34_N (N is an integer that is greater than or equal to 2), and first light receiver 35_1 through M-th light receiver 35_M (M is an integer that is greater than or equal to 2).

Control symbol generator 31 generates a control information symbol. This control information symbol is, for example, control information symbol A2211 _i illustrated in. FIG. 55, common control information symbol 12 illustrated in FIG. 78, or control information symbol 17 illustrated in FIG. 80.

Transmission unit 32 generates a modulated signal having a frame configuration including the control information symbol generated by control symbol generator 31, and outputs the generated modulated signal to at least one light source among first light source 34_1 through N-th light source 34_N. In other words, transmission unit 32 may transmit the same modulated signal to two or more light sources among first light source 34_1 through N-th light source 34_N, and, alternatively, may transmit a different modulated signal to the respective light sources. Moreover, transmission unit 32 may, based on the modulated signal obtained by reception unit 33, select a light source to be used in the next instance of optical communication from among first light source 34_1 through N-th light source 34_N.

Each of first light source 34_1 through N-th light source 34_N transmits a modulated optical signal, which is an optical signal, by emitting light in accordance with the modulated signal output from transmission unit 32. Here, first light source 34_1 through N-th light source 34_N may emit light having mutually different directivities. Alternatively, the directions in which these light sources emit light may be mutually different. Moreover, the light sources may be disposed in different locations. This makes it possible to inhibit interference between the modulated optical signals transmitted from first light source 34_1 through N-th light source 34_N.

First light receiver 35_1 through M-th light receiver 35_M receive the same modulated optical signal or mutually different modulated optical signals. Each of first light receiver 35_1 through M-th light receiver 35_M outputs a modulated signal based on the received modulated optical signal to reception unit 33.

Reception unit 33 obtains the modulated signals output from first light receiver 35_1 through M-th light receiver 35_M. Moreover, reception unit 33 may, based on the modulated signals, select a light receiver to be used in the next instance of optical communication from among first light receiver 35_1 through M-th light receiver 35_M.

For example, when first communication device 30_1 transmits a modulated optical signal to second communication device 30_2, first communication device 30_1 first transmits a modulated optical signal including a training symbol from each of first light source 34_1 through N-th light source 34_N, in order to cause second communication device 30_2 to select a light receiver to be used in the optical communication. The transmission and reception of such a training symbol allows second communication device 30_2 to know light sources that simultaneously interfere. Hereinafter, training using a training symbol will be described in detail.

Figure 84:
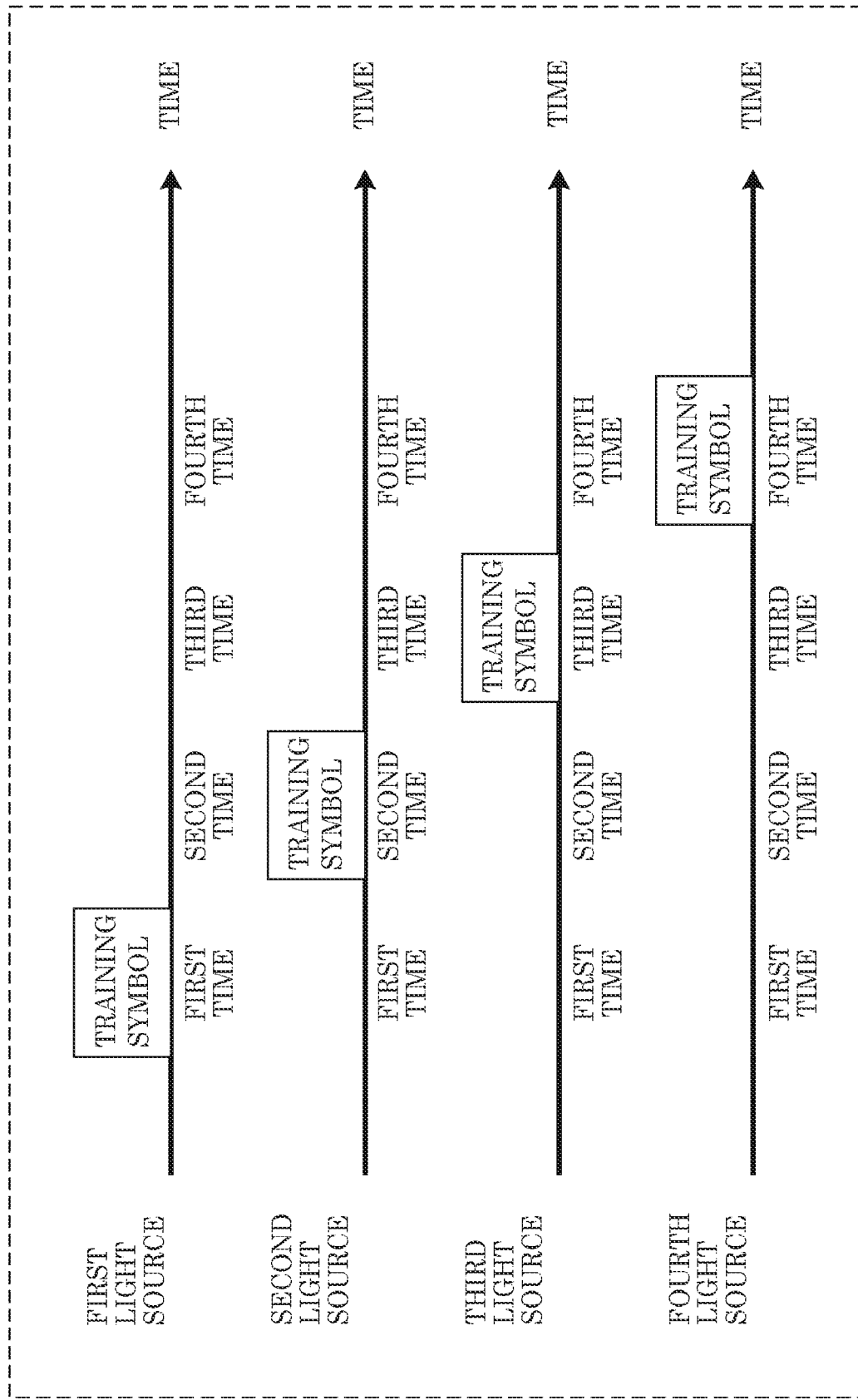
FIG. 84 illustrates one example of the timing at which a training symbol is transmitted from each of a plurality of light sources.

FIG. 84 illustrates one example of the timing at which the training symbol is transmitted from each of a plurality of light sources. Note that in the following example, N=4.

Firstly, first light source 34_1 transmits a first training symbol at a first time. Next, second light source 34_2 transmits a second training symbol at a second time. Next, third light source 34_3 transmits a third training symbol at a third time. Lastly, fourth light source 34_4 transmits a fourth training symbol at a fourth time. In other words, the first training symbol, the second training symbol, the third training symbol, and the fourth training symbol are transmitted by time division multiplexing (TDM). Here, the first training symbol may include information indicating an identification (ID) unique to first light source 34_1. Similarly, the second training symbol may include information indicating an ID unique to second light source 34_2, the third training symbol may include information indicating an ID unique to third light source 34_3, and the fourth training symbol may include information indicating an ID unique to fourth light source 34_4. With this, when second communication device 30_2, which is the communication partner of first communication device 30_1, receives a training symbol, second communication device 30_2 can identify which light source transmitted the training symbol.

Figure 85:
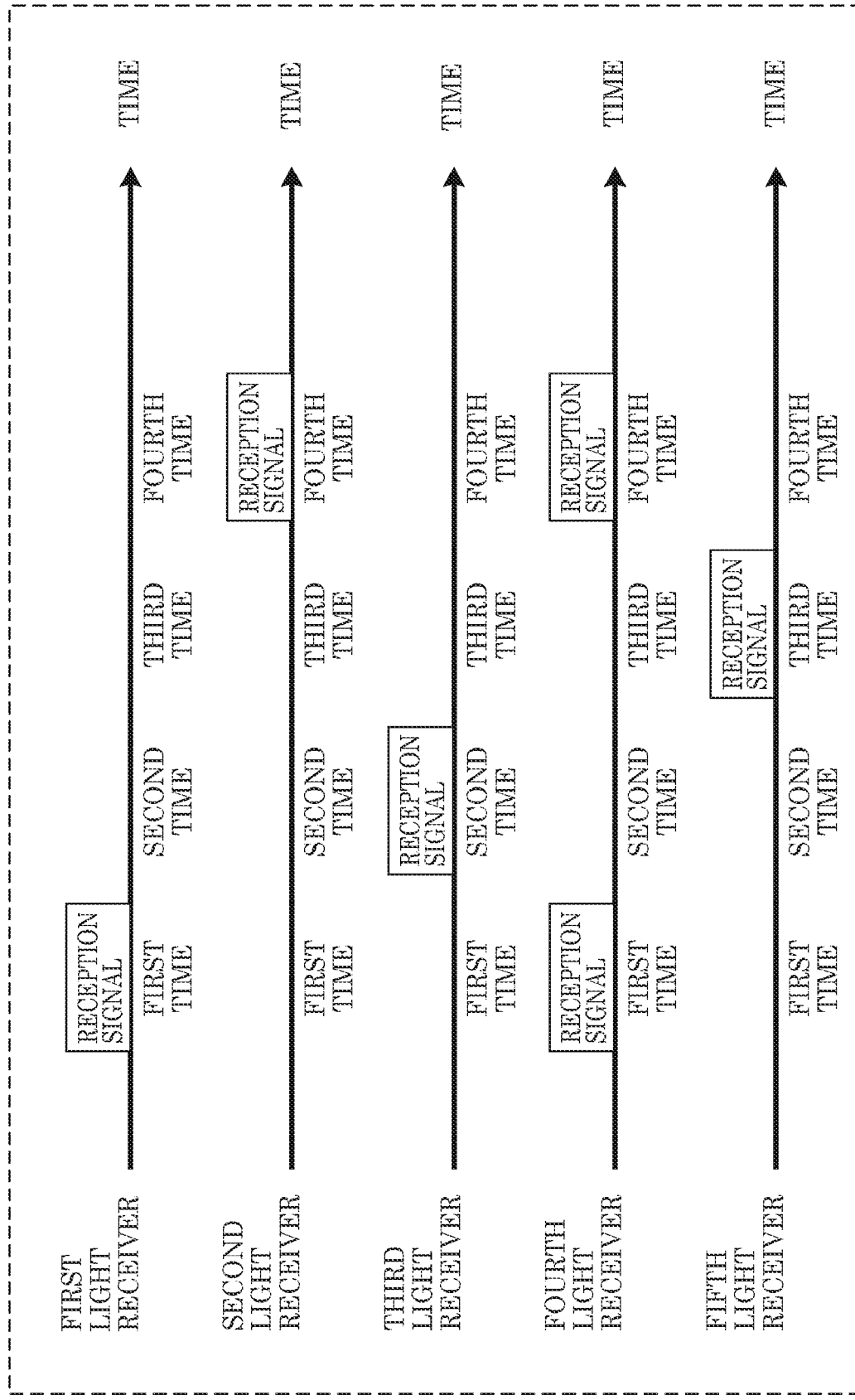
FIG. 85 illustrates one example of the reception timing of each of a plurality of light receivers.

FIG. 85 illustrates one example of the reception tinning of each of a plurality of light receivers. Note that in the following example, M=5.

Second communication device 30_2 receives, via first light receiver 35_1 through fifth light receiver 35_5, reception signals including the training symbols transmitted at the timings indicated in FIG. 84.

More specifically, first light receiver 35_1 receives a reception signal including the first training symbol at the first time. Second light receiver 35_2 receives a reception signal including the fourth training symbol at the fourth time. Third light receiver 35_3 receives a reception signal including the second training symbol at the second time. Fourth light receiver 35_4 receives a reception signal including the first training symbol at the first time, and further receives a reception signal including the fourth training symbol at the fourth time. Fifth light receiver 35_5 receives a reception signal including the third training symbol at the third time.

Accordingly, fourth light receiver 35_4 can receive a modulated optical signal from first light source 34_1 and a modulated optical signal from fourth light source 34_4. Moreover, first light receiver 35_1 can receive only the modulated optical signal from first light source 34_1, and second light receiver 35_2 can receive only the modulated optical signal from fourth light source 34_4. Similarly, third light receiver 35_3 can receive only the modulated optical signal from second light source 34_2, and fifth light receiver 35_5 can receive only the modulated optical signal from third light source 34_3.

Taking such a reception state into account, reception unit 33 included in second communication device 30_2 selects the combination of the light source that first communication device 30_1 transmitted (emitted) the modulated optical signal from, and the light receiver used to receive the modulated optical signal.

More specifically, in cases where first communication device 30_1 transmits a single stream modulated optical signal, when the reception state in second communication device 30_2 is the state illustrated in FIG. 85, second communication device 30_2 searches for a set of a light source and a light receiver that yields the best reception state. For example, second communication device 30_2 selects the set of third light source 34_3 and fifth light receiver 35_5 as a favorable set. Second communication device 30_2 transmits, to first communication device 30_1, request information requesting transmission using third light source 34_3. First communication device 30_1 that receives this request information uses third light source 34_3 to transmit (emit) a modulated optical signal including a data symbol. Second communication device 30_2 receives this modulated optical signal via fifth light receiver 35_5.

Note that first communication device 30_1 may transmit a single stream modulated optical signal. In such cases, second communication device 30_2 selects a set including all of the light sources and all of the light receivers.

On the other hand, in cases where first communication device 30_1 transmits a multi-stream modulated optical signal, when the reception state in second communication device 30_2 is the state illustrated in FIG. 85, second communication device 30_2, for example, searches for a set of a light source and a light receiver that yields a plurality of streams that can be received with little interference. In the reception state illustrated in FIG. 85, fourth light receiver 35_4 can, unfavorably, receive a modulated optical signal from first light source 34_1 and a modulated optical signal from fourth light source 34_4. In other words, in fourth light receiver 35_4, the light from first light source 34_1 interferes with the light from fourth light source 34_4.

In view of this, reception unit 33 included in second communication device 30_2 determines whether there is interference in light from a plurality of light sources, with each of first light receiver 35_1 through fifth light receiver 35_5. The following describes two examples (i.e., a first example and a second example) of this determination.

First Example

When the reception state in second communication device 30_2 is the state illustrated in FIG. 85, for example, reception unit 33 included in second communication device 30_2 determines to use first light receiver 35_1, second light receiver 35_2, third light receiver 35_3, and fifth light receiver 35_5. Then, second communication device 30_2 requests first communication device 30_1 to transmit (emit) a first modulated optical signal from first light source 34_1, transmit (emit) a fourth modulated optical signal from second light source 34_2, transmit (emit) a second modulated optical signal from third light source 34_3, and transmit (emit) a third modulated optical signal from fourth light source 34_4.

In response to this request, first communication device 30_1 transmits (emits) the first modulated optical signal including a data symbol from first light source 34_1, transmits (emits) the second modulated optical signal including a data symbol from second light source 34_2, transmits (emits) the third modulated optical signal including a data symbol from third light source 34_3, and transmits (emits) the fourth modulated optical signal including a data symbol from fourth light source 34_4. Here, there is a time at which the first modulated optical signal, the second modulated optical signal, the third modulated optical signal, and the fourth modulated optical signal are present. Stated differently, there is a time at which a data symbol is present in the first modulated optical signal, a data symbol is present in the second modulated optical signal, a data symbol is present in the third modulated optical signal, and a data symbol is present in the fourth modulated optical signal.

As described above, as a result of the selection of a light receiver to be used and the request of a light source to be used, a set of first light source 34_1 and first light receiver 35_1, a set of second light source 34_2 and third light receiver 35_3, a set of third light source 34_3 and fifth light receiver 35_5, and a set of fourth light source 34_4 and second light receiver 35_2 are selected. Accordingly, first light receiver 35_1 included in second communication device 30_2 receives the first modulated optical signal, second light receiver 35_2 included in second communication device 30_2 receives the fourth modulated optical signal, third light receiver 35_3 included in second communication device 30_2 receives the second modulated optical signal, and fifth light receiver 35_5 included in second communication device 30_2 receives the third modulated optical signal.

Second Example

When the reception state in second communication device 30_2 is the state illustrated in FIG. 85, for example, reception unit 33 included in second communication device 30_2 determines to use third light receiver 35_3 and fifth light receiver 35_5, since the reception states of third light receiver 35_3 and fifth light receiver 35_5 are favorable. As a result, second communication device 30_2 requests first communication device 30_1 to transmit (emit) the second modulated optical signal from second light source 34_2 and transmit (emit) the third modulated optical signal from third light source 34_3.

In response to this request, first communication device 30_1 transmits (emits) the second modulated optical signal including a data symbol from second light source 34_2, and transmits (emits) the third modulated optical signal including a data symbol from third light source 34_3. Here, there is a time at which the fourth modulated optical signal and the second modulated optical signal are present. Stated differently, there is a time at which a data symbol is present in the fourth modulated optical signal and a data symbol is present in the second modulated optical signal. Accordingly, third light receiver 353 included in second communication device 30_2 receives the second modulated optical signal and fifth light receiver 35_5 included in second communication device 30_2 receives the third modulated optical signal.

Here, since the degree of directivity is high when first communication device 30_1 and second communication device 30_2 transmit a modulated optical signal, precoding is not implemented. However, the communication device may implement precoding.

Figure 86:
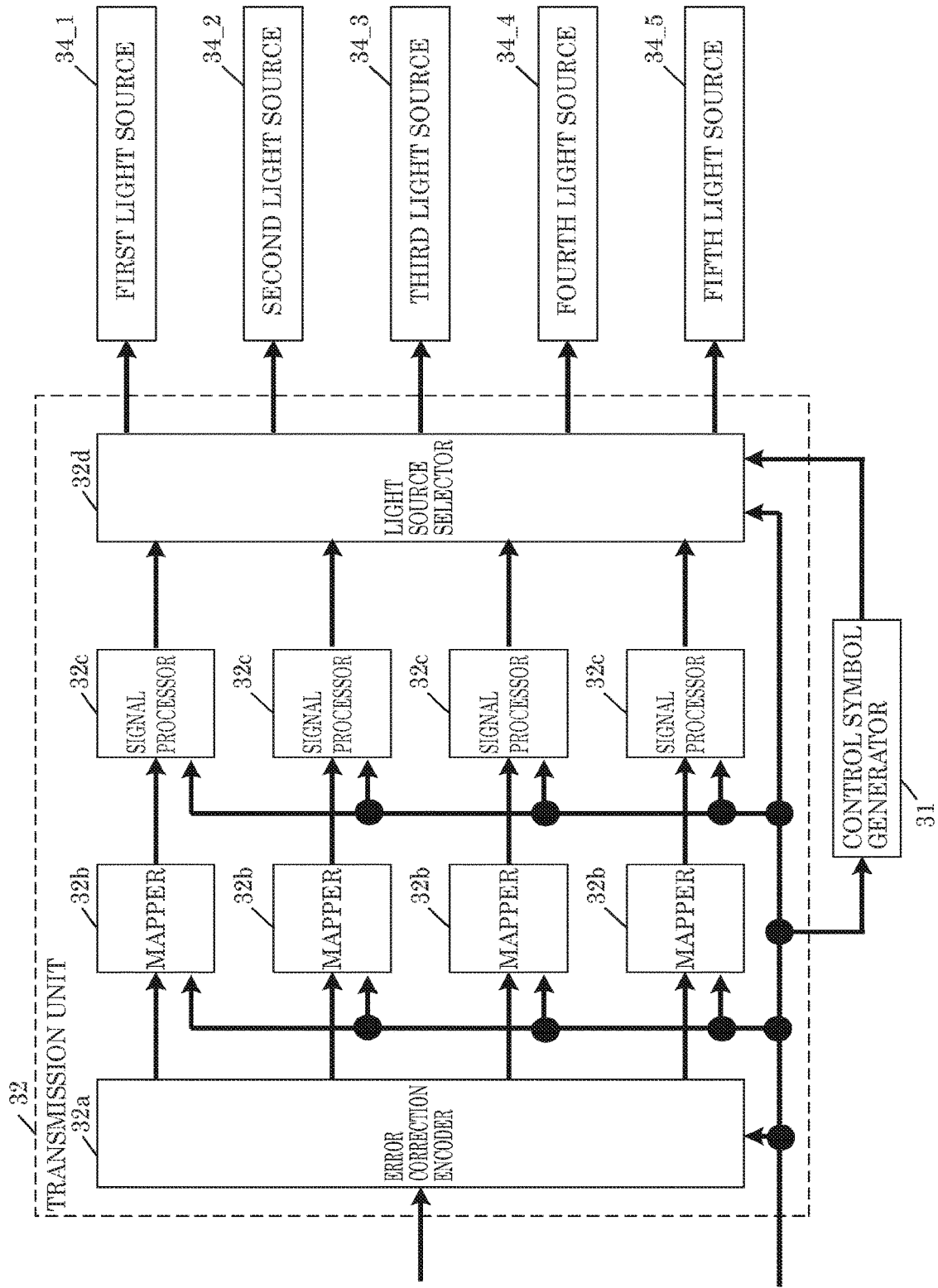
FIG. 86 illustrates a detailed configuration example of a transmission unit that is included in the communication device illustrated in FIG. 83 and does not implement precoding.

FIG. 86 illustrates a detailed configuration example of a transmission unit that is included in the communication device illustrated in FIG. 83 and does not implement precoding.

Transmission unit 32 includes error correction encoder 32a, four mappers 32b, four signal processors 32c, and light source selector 32d.

Error correction encoder 32a receives an input of data and a control signal, performs error correction encoding based on information related to error correction encoding that is included in the control signal (for example, error correction code information, code length (block length), encode rate, etc.), and outputs encoded data.

Mappers 32b each receive an input of the encoded data and a control signal, perform mapping corresponding to the modulation method, based on information on the modulated signal included in the control signal, and output a mapped signal.

Signal processors 32c each receive an input of a mapped signal and the control signal, perform signal processing based on the control signal, and output a signal-processed signal.

Light source selector 32d receives an input of signal-processed signals output from the four signal processors 32c, the control signal, and a control information symbol generated by control symbol generator 31, and generates one or more modulated signals each including the control information symbol, based on the control signal. Light source selector 32d furthermore selects one or more light sources from among first light source 34_1 through fifth light source 34_5, in response to a request from a device (for example, second communication device 30_2) that is a communication partner of the device that includes this transmission unit 32. Light source selector 32d then transmits each of the one or more modulated signals as modulated optical signals from the selected one or more light sources.

Figure 87:
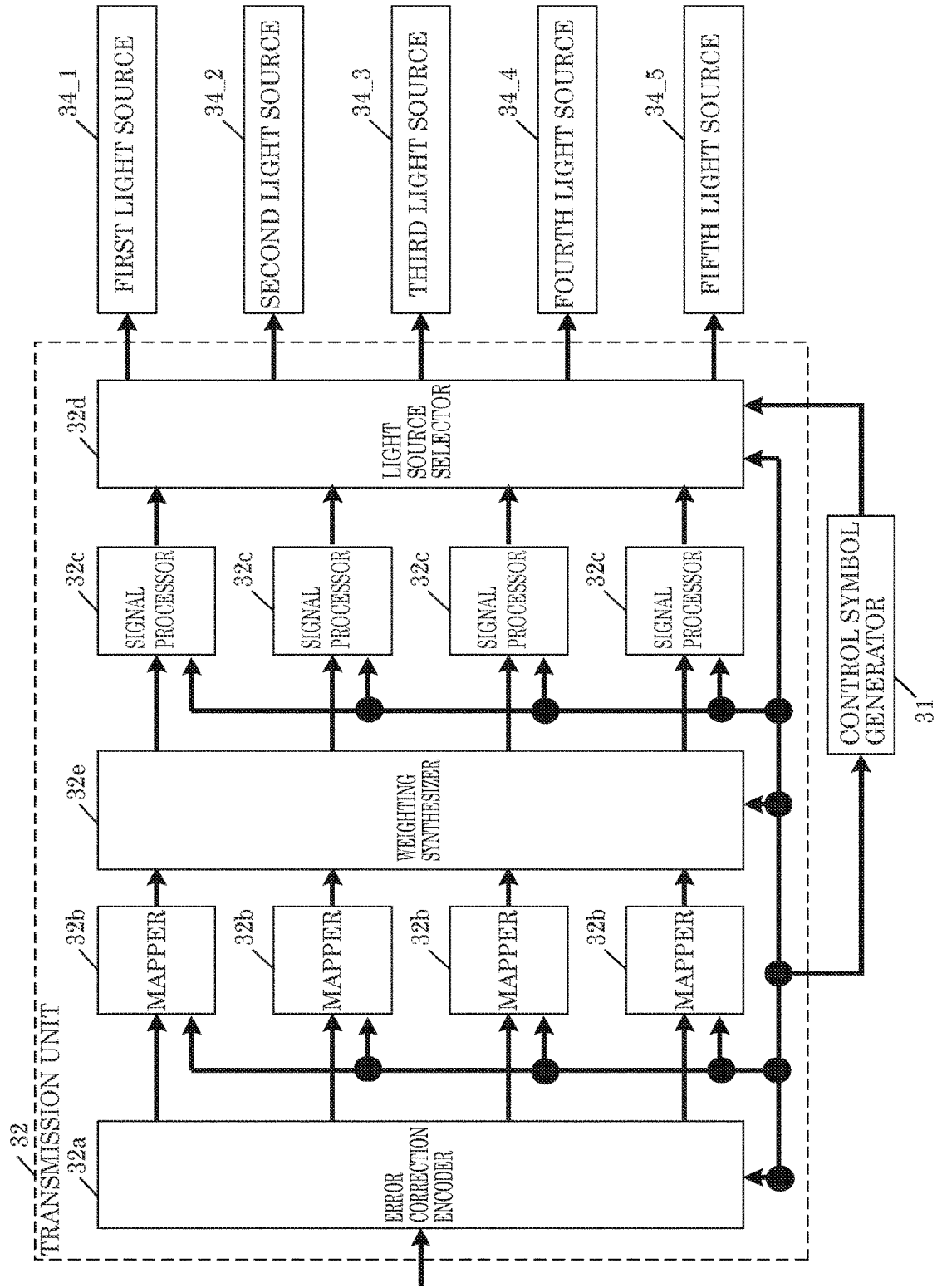
FIG. 87 illustrates a detailed configuration example of a transmission unit that is included in the communication device illustrated in FIG. 83 and implements precoding.

FIG. 87 illustrates a detailed configuration example of a transmission unit that is included in the communication device illustrated in FIG. 83 and implements precoding.

Transmission unit 32 includes error correction encoder 32a, four mappers 32b, four signal processors 32c, and light source selector 32d, and further includes weighting synthesizer 32e.

Weighting synthesizer 32e receives inputs of the mapped signals output from the four mappers 32b and the control signal, and performs weighting synthesis (i.e., precoding) based on the control signal. Weighting synthesizer 32e then outputs the weighted signals to the four signal processors 32c.

Signal processors 32c each receive an input of a weighted signal and the control signal, perform signal processing based on the control signal, and output a signal-processed signal.

Note that in the above example, first communication device 30_1 transmits (emits) a modulated optical signal, and second communication device 30_2 receives the modulated optical signal. Similarly, second communication device 30_2 may transmit (emit) a modulated optical signal, and first communication device 30_1 may receive the modulated optical signal. Training in such cases is carried out in the same manner as when first communication device 30_1 transmits the modulated optical signal. Note that sharing the training may be difficult. This is because the method of arrangement of the light sources included in first communication device 30_1 and the method of arrangement of the light sources in second communication device 30_2 are different, and the method of arrangement of the light receivers included in first communication device 30_1 and the method of arrangement of the light receivers in second communication device 30_2 are different. However, the shared training may be possible depending on the configuration of the devices.

Moreover, when first communication device 30_1 only includes a single light source, second communication device 30_2 selects which light receiver to use. When second communication device 30_2 only includes a single light receiver, first communication device 30_1 selects which light source to use.

<Light Source Configuration>

Figure 88:
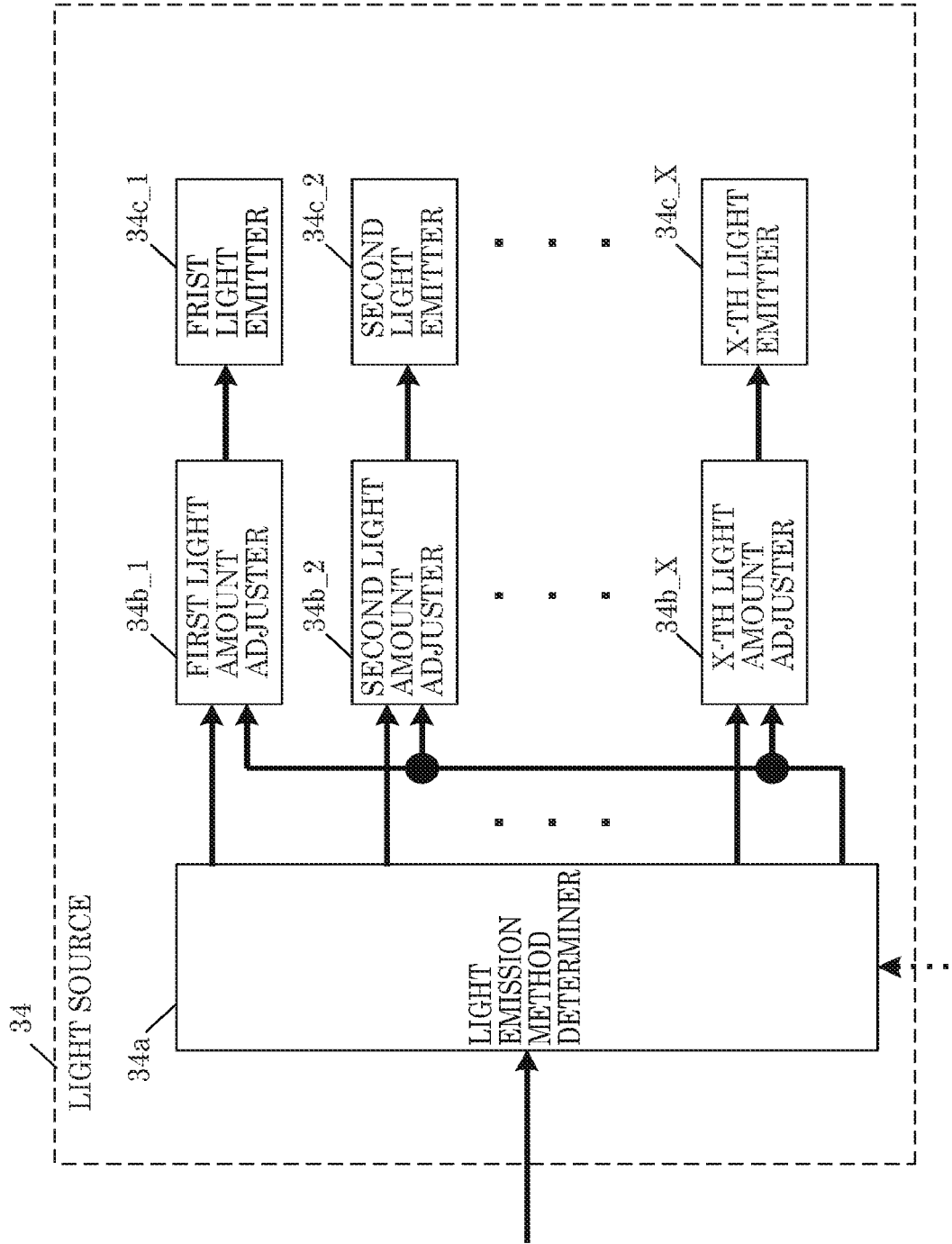
FIG. 88 illustrates an example of a configuration of a light source.

FIG. 88 illustrates an example of a configuration of a light source. Note that light source 34 illustrated in FIG. 88 may be any one of first light source 34_1 through N-th light source 34_N illustrated in FIG. 83.

Light source 34 includes light emission method determiner 34a, first light amount adjuster 34b_1 through X-th light adjuster 34b_X (X is an integer that is greater than or equal to 2), and first light emitter 34c_1 through X-th light emitter 34c_X.

Light emission method determiner 34a determines a light emission method, and outputs a signal in accordance with the determined light emission method to first light amount adjuster 34b_1 through X-th light amount adjuster 34b_X.

First light amount adjuster 34b_1 through X-th light amount adjuster 34b_X each adjust the amount of light based on the signal in accordance with the light emission method that is output from light emission method determiner 34a. More specifically, first light amount adjuster 34b_1 through X-th light amount adjuster 34b_X each change the amplitude (i.e., the intensity of the light) and/or change the phase of the light.

First light emitter 34c_1 through X-th light emitter 34c_X respectively correspond to first light amount adjuster 34b_1 through X-th light amount adjuster 34b_X. First light emitter 34c_1 through X-th light emitter 34c_X each transmit (emit) a modulated optical signal by emitting light in accordance with the amplitude and/or phase adjusted or changed by the light amount adjuster corresponding to the light emitter. This allows light source 34 to adjust the directivity of the modulated optical signal.

In this way, light source 34 is configured of a plurality of light emitters. Each light emitter is configured of an LED or an organic EL element. Note that light source 34 may include a single light emitter. In such cases, the configuration illustrated FIG. 88 can be implemented by dividing the single light emitter into X parts and causing the X parts to selectively emit light.

<MAC Frame>

There are three types of medium access control (MAC) frames of the modulated optical signal transmitted by the communication device that includes light source 34 illustrated in FIG. 88, for example. The three types of frame are a management frame, a control frame, and a data frame.

The management frame includes, for example, the following frames indicated as (A1) through (A9).

(A1) Beacon Frame:

A beacon frame is a frame for informing a surrounding wireless communication device of network information.

(A2) Probe Request Frame:

A probe request frame is a frame for a terminal to inquire whether there is a wireless cell in the surrounding area.

(A3) Probe Response Frame:

A probe response frame is a response to the probe request frame.

(A4) Association Request Frame:

An association request frame is a frame for a terminal to request a connection association from a base station.

(A5) Association Response Frame:

An association response is a response to the association request frame.

(A6) Disassociation Frame:

A disassociation frame is a frame for interrupting communication.

(A7) Authentication Frame:

An authentication frame is a frame for performing authentication between wireless communication devices.

(A8) De-Authentication Frame:

A de-authentication frame is a frame for interrupting (de-authenticating).

(A9) Action Frame:

An action frame is a frame for general added functions.

The control frame includes, for example, the following frames indicated as (B1) through (B5).

(B1) Request to Send (RTS) Frame:

An RTS frame is a frame for requesting data transmission.

(B2) Clear to Send (CTS) Frame:

A CTS frame is a frame for transmitting that the wireless communication device specified in the RTS is clear to send.

(B3) Acknowledgement (ACK) Frame:

An ACK frame is a frame for confirming and responding to successful data reception.

(B4) Block ACK Request Frame:

A block ACK request is a frame for requesting a block ACK.

(B5) Block ACK Frame:

A block ACK frame is a frame for confirming and responding to successful reception of the data of a plurality of MAC frames.

A data frame is a frame for transmitting user data.

Here, when the communication device has the configuration illustrated in FIG. 83, the communication device performs transmission in accordance with, for example, the first method and/or the second method described below.

First Method:

When transmitting part of the management frame (for example, the beacon frame) or part of the control frame (for example, the RTS frame), the communication device transmits (emits) a modulated optical signal using at least a plurality of light sources. For example, the plurality of light sources are all of the light sources included in the communication device.

Second Method:

The communication device includes at least one light source, and each light source has the configuration illustrated in FIG. 88. When transmitting part of the management frame (for example, the beacon frame) or part of the control frame (for example, the RTS frame), the communication device transmits (emits) a modulated optical signal using two or more of the light emitters.

Advantageous Effect

By using the first method and/or the second method, the light including the modulated signal is emitted at a wide angle. Since this allows a plurality of communication devices (terminals) to receive the modulated signal, the system can operate stably (emission of modulated signals that cause interference can be reduced), which improves the data transmission efficiency of the system.

Moreover, when the communication device transmits (emits) a modulated optical signal using the first method and/or the second method, the communication device may satisfy one of the following two conditions (condition 1 or condition 2). Doing so allows for part of the management frame (for example, the beacon frame) or part of the control frame (for example, the RTS frame) to be transmitted with high quality to more communication devices (terminals).

The conditions are as follows.

Condition 1: the amount of light is increased when transmitting part of the management frame (for example, the beacon frame) or part of the control frame (for example, the RTS frame).

Condition 2: repetition or spread-spectrum is used when transmitting part of the management frame (for example, the beacon frame) or part of the control frame (for example, the RTS frame).

When repetition is used, more repetitions are used than when transmitting the data frame. Alternatively, repetition is not used when transmitting the data frame.

When spread-spectrum is used, a spread-spectrum is performed that yields a greater spread gain than when the data frame is transmitted. Alternatively, spread-spectrum is not used when transmitting the data frame.

Moreover, when transmitting the data frame, the communication device transmits (emits) a modulated optical signal using the light source determined in the above section "<Plurality of Light Sources and Plurality of Light Receivers>" (FIG. 82 through FIG. 87). The important point is that the transmission method used for the data frame and the transmission method used for part of the management frame (for example, the beacon frame) or part of the control frame (for example, the RTS frame) are different. For example, the number of light sources used is different. Alternatively, the method used by the light amount adjuster is different.

<Training for Light Source Optimization>

Figure 89:
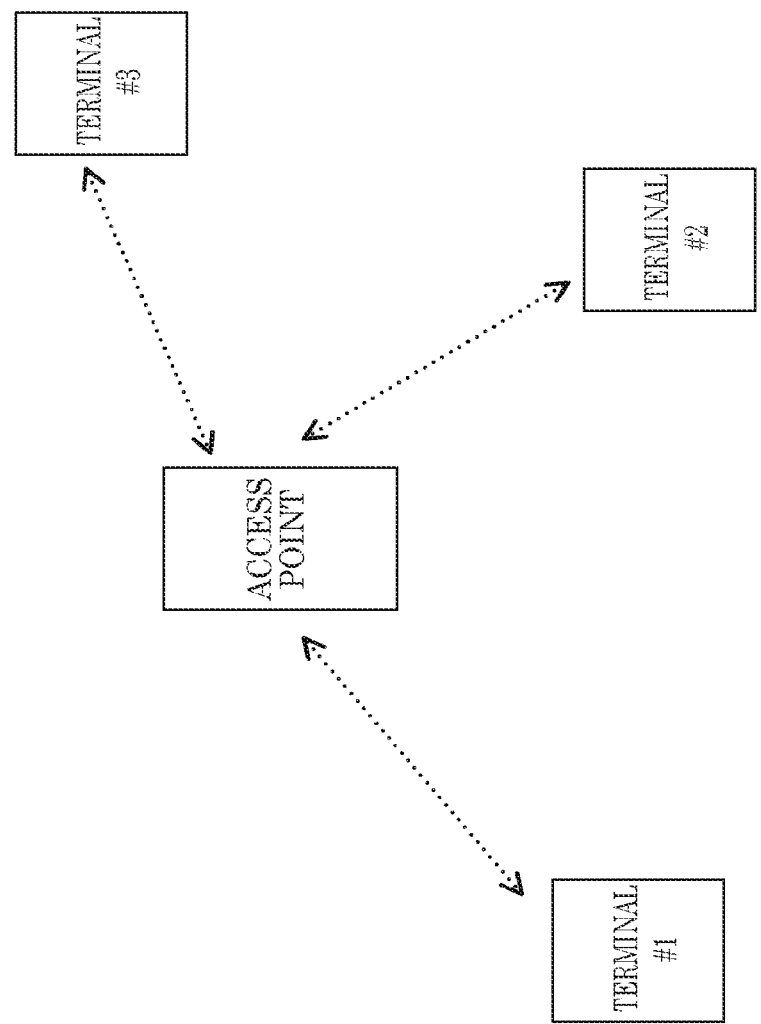
FIG. 89 illustrates a configuration example of a communication system.

FIG. 89 illustrates an example of a configuration of a communication system.

For example, as illustrated in FIG. 89, the communication system includes an access point, terminal #1, terminal #2, and terminal #3. Each of the access point, terminal #1, terminal #2, and terminal #3 is a communication device including light source 34 illustrated in FIG. 88. Moreover, the communication device may have the configuration illustrated in FIG. 83.

When communication is performed between the access point and a terminal, the access point and the terminal perform training for at least one of (i) selecting a light source and a light receiver; and (ii) light source optimization. The method of selecting the light source and the light receiver is as described with reference to FIG. 82 through FIG. 87.

Figure 90:
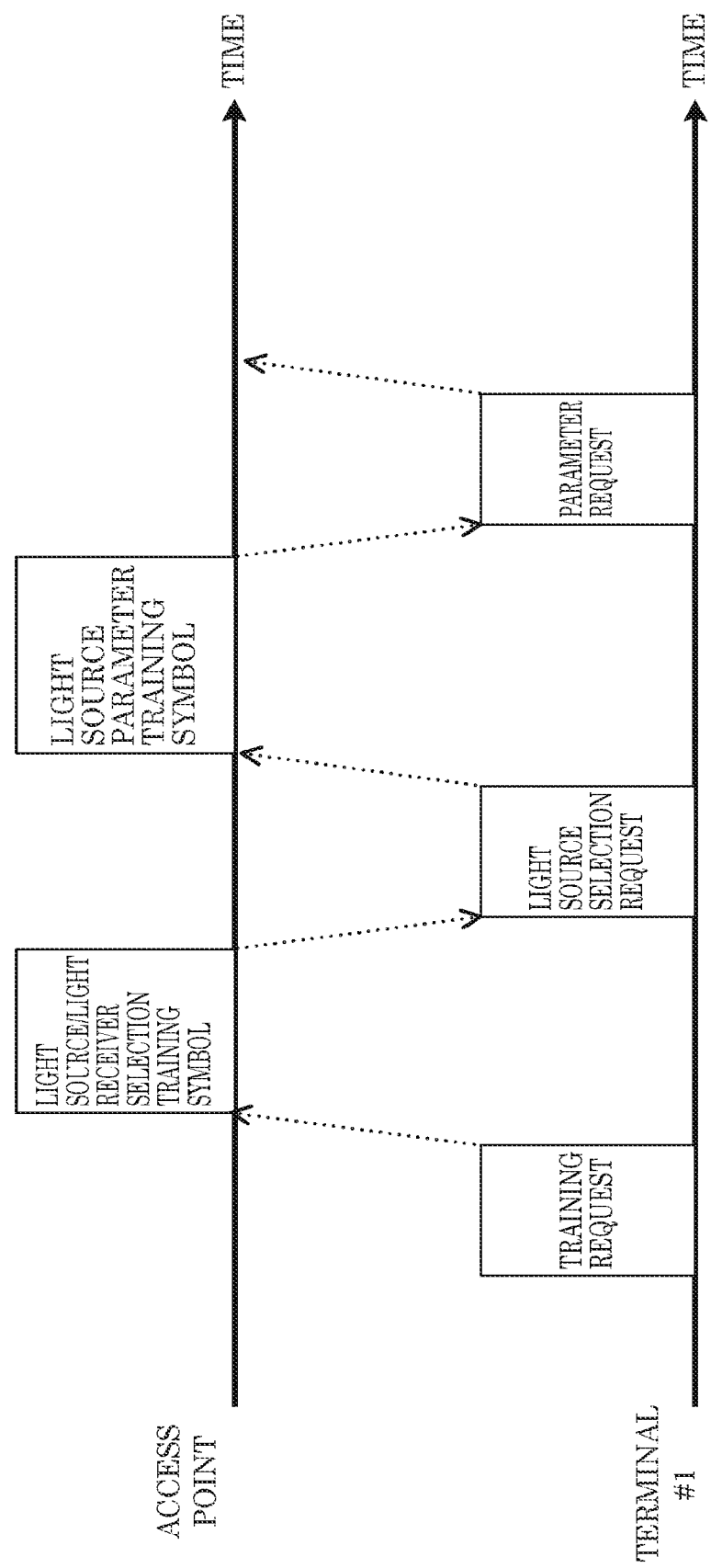
FIG. 90 illustrates one example of an access point selecting a light source and setting a parameter, and a terminal selecting a light receiver.

FIG. 90 illustrates one example of the access point selecting a light source and setting a parameter, and terminal #1 selecting a light receiver.

As illustrated in FIG. 90, for example, terminal #1 transmits a training request symbol. This training request symbol is a symbol for requesting transmission of a training symbol. Moreover, the training symbol is a symbol for selecting a light source and a light receiver, and setting a light source parameter.

For example, the training request symbol may include the MAC address of a communication partner (access point) that receives the symbol. This makes it possible to clarify the partner of the request to transmit a training symbol.

Moreover, the training request symbol may include the MAC address of the device (terminal #1) that transmits the symbol. With this, the communication partner that receives the symbol can identify the device that transmits the symbol, that is to say, the device that requested the training symbol.

Moreover, the training request symbol may include information about whether to transmit the light source/light receiver selection training symbol. For example, when requesting the communication partner (access point) to transmit the light source/light receiver selection training symbol, the device (terminal #1) transmits b0=1. In other words, b0=1 is included in the training request symbol. On the other hand, when the device (terminal #1) does not request the communication partner (access point) to transmit the light source/light receiver selection training symbol, the device (terminal #1) transmits b0=0. In other words, b0=0 is included in the training request symbol.

Moreover, the training request symbol may include information about whether to transmit light source parameter training symbols. For example, when requesting the communication partner (access point) to transmit light source parameter training symbols, the device (terminal #1) transmits b1=1. In other words, b1=1 is included in the training request symbol. On the other hand, when the device (terminal #1) does not request the communication partner (access point) to transmit light source parameter training symbols, the device (terminal #1) transmits b1=0. In other words, b1=0 is included in the training request symbol.

Note that in the example illustrated in FIG. 90, terminal #1 transmits b0=1 and b1=1 to the access point.

Details regarding the transmission method of the light source/light receiver selection training symbol are as described with reference to FIG. 82 through FIG. 87. Moreover, the device (access point) that transmits the light source/light receiver selection training symbol transmits information indicating the MAC address of the device along with information indicating the MAC address of the communication partner (terminal #1) that receives the symbol. This makes it possible to prevent malfunction of another terminal.

Next, terminal #1 receives the light source light receiver selection training symbol transmitted by the access point, and performs signal processing for selecting a light source of the access point and selecting a light receiver of terminal #1. An example of such operations is as described with reference to FIG. 82 through FIG. 87.

Next, terminal #1 transmits a light source selection request symbol. Here, the light source selection request symbol may include the MAC address of the communication partner (access point). This clarifies the destination of the symbol.

Moreover, the light source selection request symbol may include the MAC address of the device (terminal #1). This clarifies which device transmitted the symbol.

Moreover, the light source selection request symbol may include at least one of the following items of information: (i) the identification (ID) of the light receiver used by terminal #1 for reception; (ii) the number of transmission streams that terminal #1 requests of the access point; and (iii) information indicating whether to perform light source parameter training or not.

Next, the access point receives the light source selection request symbol transmitted by terminal #1, and transmits light source parameter training symbols.

Hereinafter, the transmission of light source parameter training symbols will be described. Note that a light source parameter training symbol may include information indicating the MAC address of the device (access point) that transmitted the symbol and information indicating the MAC address of the communication partner (terminal #1) that receives the symbol.

For example, assume the light source selection request symbol transmitted by terminal #1 specifies a first light source (of the access point). Note that the first light source corresponds to first light source 34_1 illustrated in, for example, FIG. 83, and light source 34 illustrated in FIG. 88.

Figure 91:
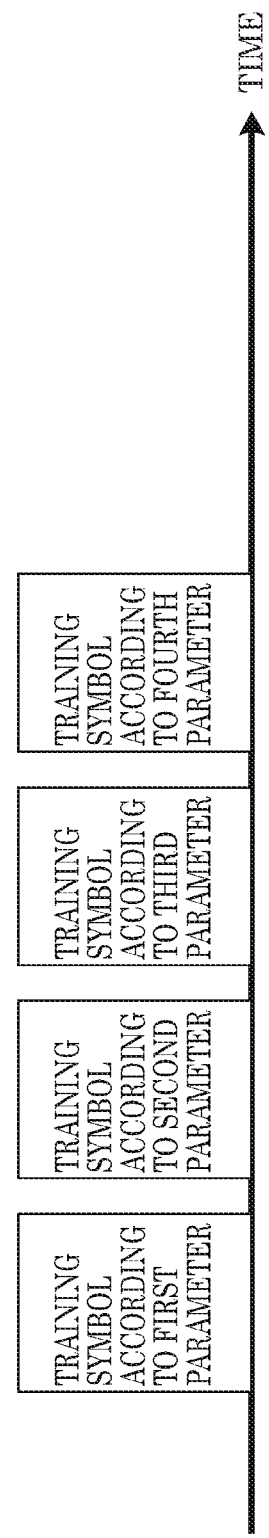
FIG. 91 illustrates an example of an access point transmitting light source parameter training symbols.

FIG. 91 illustrates an example where the access point uses the first light source to transmit (emit) a plurality of training symbols, namely a training symbol according to a first parameter through a training symbol according to a fourth parameter, as light source parameter training symbols.

When the first light source has the configuration illustrated in FIG. 88, the parameter set by light amount adjuster #j with respect to the training symbol according to the i-th parameter is expressed as $Z_{ij}$. Note that i is an integer greater than or equal to one and less than or equal to Y. Note that Y is exemplified as four in the example illustrated in FIG. 91, but Y is an integer that is greater than or equal to 2. Moreover, j is an integer that is greater than or equal to one and less than or equal to X. Here, the following holds true.

In the training symbol according to the a-th parameter and the training symbol according to the b-th parameter, when a≠b holds true, there is a j for which $Z_{aj} \neq Z_{bj}$ holds true.

Terminal #1 then receives the light source parameter training symbols. In the example illustrated in FIG. 91, terminal #1 searches the training symbols according to the first through fourth parameters, that is to say, searches the first through fourth parameters, for a parameter that yields favorable reception quality. Terminal #1 then transmits a parameter request symbol including information indicating the favorable parameter. Note that the parameter request symbol may include information indicating the MAC address of the device (terminal #1) that transmitted the symbol and information indicating the MAC address of the communication partner (access point) that receives the symbol.

The access point receives the parameter request symbol, and based on the information in the symbol, uses the first light source to transmit (emit) a modulated optical signal to terminal #1.

Note that in this example, the first light source of the access point is selected in the selection of the light source, but the same operations are performed when a different light source is selected. In other words, when a different light source is selected, the access point changes a parameter in the light amount adjuster corresponding to the selected light source and transmits light source parameter training symbols. Thereafter, terminal #1 receives this symbol, transmits a parameter request symbol, and the access point transmits (emits) a modulated optical signal based on the parameter request symbol.

As described with reference to FIG. 82 through FIG. 87, terminal #1 may select a plurality of light sources (of an access point). This allows for transmission just like multiple-input multiple-output (MIMO) transmission. In such cases, on a per light source basis, the access point changes a parameter and transmits (emits) light source parameter training symbols in accordance with the changed parameters.

Figure 92:
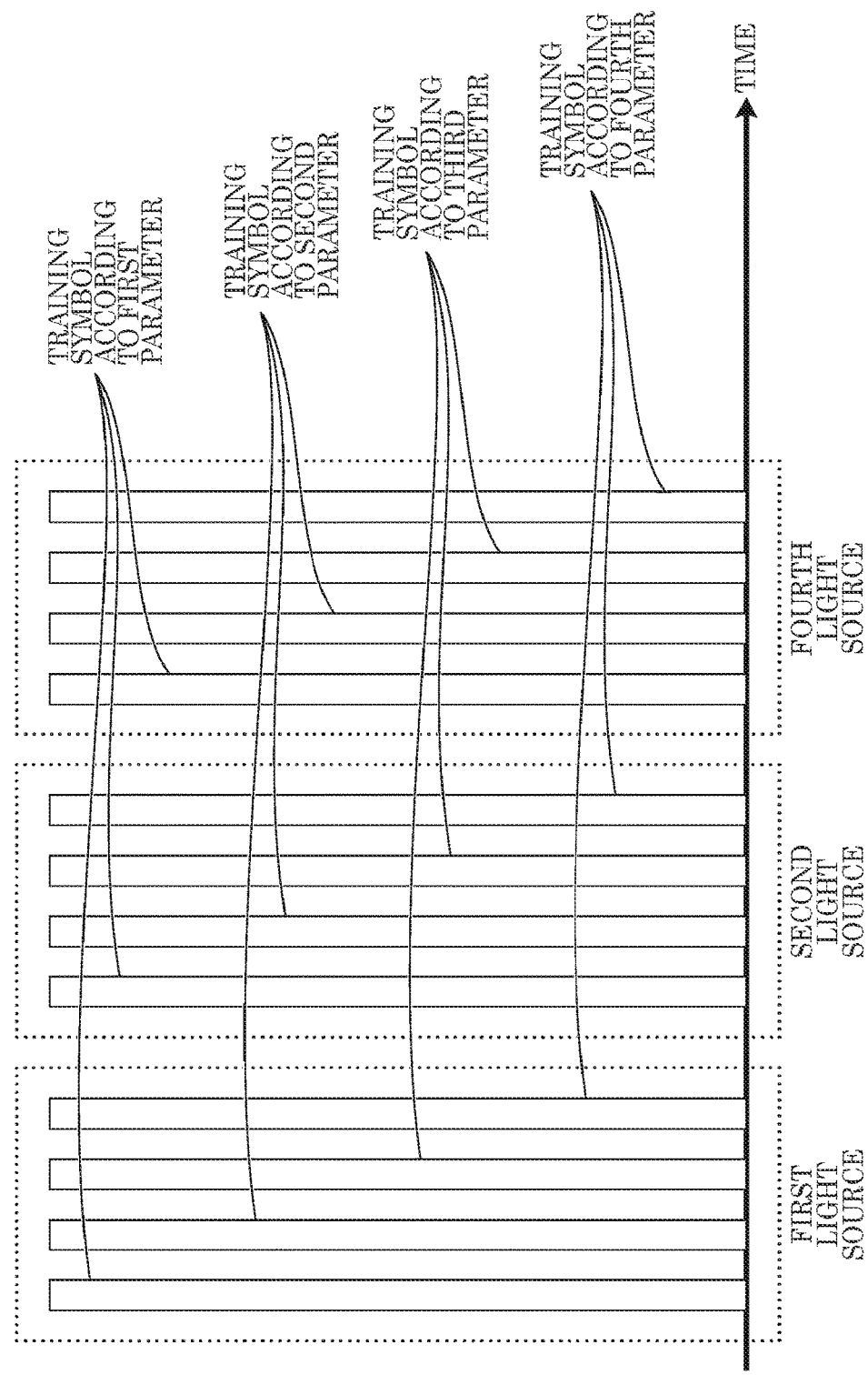
FIG. 92 illustrates an example of an access point transmitting training symbols on a per light source basis.

FIG. 92 illustrates an example of the access point transmitting training symbols on a per light source basis.

For example, using a light source selection request symbol, terminal #1 requests the access point to transmit (emit) a modulated optical signal using the first light source, the second light source, and the fourth light source. The access point then transmits light source parameter training symbols, as illustrated in FIG. 92.

More specifically, as illustrated in FIG. 92, the access point transmits, from the first light source, a training symbol according to a first parameter, a training symbol according to a second parameter, a training symbol according to a third parameter, and a training symbol according to a fourth parameter. Note that the method used to set the parameter has already been described above.

Then, the access point transmits, from the second light source, a training symbol according to a first parameter, a training symbol according to a second parameter, a training symbol according to a third parameter, and a training symbol according to a fourth parameter. Note that the method used to set the parameter has already been described above.

The access point then transmits, from the fourth light source, a training symbol according to a first parameter, a training symbol according to a second parameter, a training symbol according to a third parameter, and a training symbol according to a fourth parameter. Note that the method used to set the parameter has already been described above.

Terminal #1 receives the light source parameter training symbols, and request the favorable parameter for the first light source, the favorable parameter for the second light source, and the favorable parameter for the fourth light source. Terminal #1 then transmits (emits) a parameter request symbol including information indicating the requested parameters to the access point.

The access point then sets the parameters for the first light source, the second light source, and the fourth light source based on the information in the parameter request symbol. Thereafter, the access point transmits (emits) modulated optical signals using the first light source, the second light source, and the fourth light source set with the parameters.

Moreover, the above processing is processing related to, in communication between an access point and terminal #1, (i) selecting a light source to be used by the access point to transmit (emit) a modulated optical signal and (ii) a light source parameter adjustment method. This processing for the light source selection and the light source parameter adjustment method is performed in the same manner even in the following case.

In communication between an access point and terminal #1, the selecting of a light source to be used by terminal #1 to transmit (emit) a modulated optical signal and the light source parameter adjustment method are performed in the same manner as the processing described above. More specifically, in the examples illustrated in FIG. 90 through FIG. 92, by changing the wording so that the operations performed by the access point are performed by terminal #1 and the operations performed by terminal #1 are performed by the access point, the selecting of a light source to be used by terminal #1 to transmit (emit) a modulated optical signal and the light source parameter adjustment method can be implemented.

Moreover, in communication between an access point and a terminal other than terminal #1, the selecting of a light source to be used by the access point to transmit (emit) a modulated optical signal and the light source parameter adjustment method can be implemented in the same manner as in communication between an access point and terminal #1. Moreover, in communication between an access point and a terminal other than terminal #1, the selecting of a light source to be used by the other terminal to transmit (emit) a modulated optical signal and the light source parameter adjustment method can be implemented in the same manner as in communication between an access point and terminal #1.

<Training for Light Source Optimization: Variation>

Next a variation of the training for light source optimization will be described.

Figure 93:
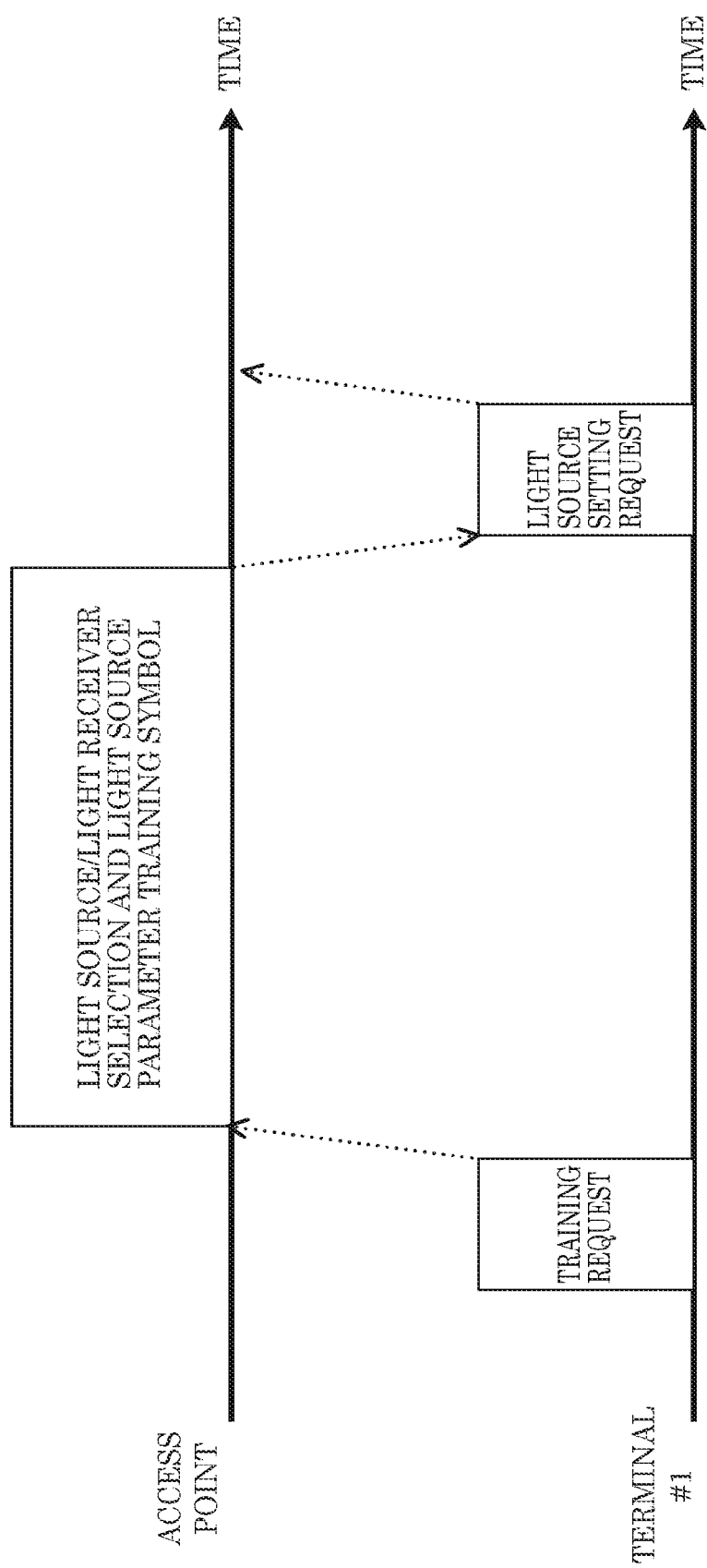
FIG. 93 illustrates a variation of training for light source optimization.

FIG. 93 illustrates a variation of the training for light source optimization. As illustrated in FIG. 93, for example, terminal #1 transmits a training request symbol. This training request symbol is a symbol for requesting transmission of a training symbol. The training symbol is a symbol for selecting a light source and a light receiver, and setting a light source parameter.

For example, the training request symbol may include the MAC address of a communication partner (access point) that receives the symbol. This makes it possible to clarify the partner of the request to transmit a training symbol.

Furthermore, the training request symbol may include the MAC address of the device (terminal #1) that transmits the symbol. With this, the communication partner that receives the symbol can identify the device that transmits the symbol, that is to say, the device that requested the training symbol.

In this way, terminal #1 requests a training symbol for, for example, setting a light source parameter, from the access point. The access point receives the training request symbol transmitted by terminal #1, and transmits (emits) "light source/light receiver selection and light source parameter training symbols". Here, the characterizing feature of the present variation is that the setting of the light source parameter is performed along with the selection of a light source and a light receiver.

The access point transmits light source/light receiver selection and light source parameter training symbols, as described above.

FIG. 94 illustrates an example of the access point transmitting light source/light receiver selection and light source parameter training symbols.

Note that such a symbol may include information indicating the MAC address of the device (access point) that transmitted the symbol and information indicating the MAC address of the communication partner (terminal #1) that receives the symbol.

The light source/light receiver selection and light source parameter training symbols may have the configuration illustrated in FIG. 94, for example. Note that the access point includes four light sources, namely a first light source, a second light source, a third light source, and a fourth light source.

The access point transmits training symbols from light sources capable of transmitting (emitting) modulated optical signals. Accordingly, as illustrated in FIG. 94, the access point transmits (emits) training symbols from the first light source, transmits (emits) training symbols from the second light source, transmits (emits) training symbols from the third light source, and transmits (emits) training symbols from the fourth light source. Moreover, on a per light source basis, the access point changes a parameter and transmits training symbols.

Note that as described above the access point includes a first light source, a second light source, a third light source, and a fourth light source. Accordingly, the access point then transmits, from the first light source, a training symbol according to a first parameter, a training symbol according to a second parameter, a training symbol according to a third parameter, and a training symbol according to a fourth parameter. Note that the method used to set the parameter has already been described above. Next, the access point then transmits, from the second light source, a training symbol according to a first parameter, a training symbol according to a second parameter, a training symbol according to a third parameter, and a training symbol according to a fourth parameter. Note that the method used to set the parameter has already been described above. Next, the access point then transmits, from the third light source, a training symbol according to a first parameter, a training symbol according to a second parameter, a training symbol according to a third parameter, and a training symbol according to a fourth parameter. Note that the method used to set the parameter has already been described above. Next, the access point then transmits, from the fourth light source, a training symbol according to a first parameter, a training symbol according to a second parameter, a training symbol according to a third parameter, and a training symbol according to a fourth parameter. Note that the method used to set the parameter has already been described above. Note that the parameter setting for training symbol generation may or may not differ between different light sources.

Next, terminal #1 receives the light source/light receiver selection and light source parameter training symbols transmitted by the access point. Terminal #1 then determines whether to use the first light source in the transmission of the modulated optical signal, and when terminal #1 determines to use the first light source, determines what parameter to use. Similarly, terminal #1 determines whether to use the second light source in the transmission of the modulated optical signal, and when terminal #1 determines to use the second light source, determines what parameter to use. Terminal #1 also determines whether to use the third light source in the transmission of the modulated optical signal, and when terminal #1 determines to use the third light source, determines what parameter to use. Terminal #1 also determines whether to use the fourth light source in the transmission of the modulated optical signal, and when terminal #1 determines to use the fourth light source, determines what parameter to use.

Terminal #1 transmits a light source setting request symbol including the above determined information to the access point.

Note that in conjunction with the above operations, terminal #1 determines a light receiver for reception of the modulated optical signal transmitted by the access point.

The access point then receives the light source setting request symbol transmitted by terminal #1, and determines the light source(s) to use in the transmission of the modulated optical signal and the parameter(s) to be used by the light source(s), based on the information included in the symbol. The access point also determines the number of modulated optical signals to be transmitted, and transmits (emits) the modulated optical signal(s) from one or more light sources.

Moreover, the above processing is processing related to, in communication between an access point and terminal #1, selecting a light source to be used by the access point to transmit (emit) a modulated optical signal and (ii) a light source parameter adjustment method. This processing for the light source selection and the light source parameter adjustment method is performed in the same manner even in the following case.

In other words, in communication between an access point and terminal #1, the selecting of a light source to be used by terminal #1 to transmit (emit) a modulated optical signal and the light source parameter adjustment method are performed in the same manner as the processing described above. More specifically, in the examples illustrated in FIG. 93 and FIG. 94, by changing the wording so that the operations performed by the access point are performed by terminal #1 and the operations performed by terminal #1 are performed by the access point, the selecting of a light source to be used by terminal #1 to transmit (emit) a modulated optical signal and the light source parameter adjustment method can be implemented.

Moreover, in communication between an access point and a terminal other than terminal #1, the selecting of a light source to be used by the access point to transmit (emit) a modulated optical signal and the light source parameter adjustment method can be implemented in the same manner as in communication between an access point and terminal #1. Moreover, in communication between an access point and a terminal other than terminal #1, the selecting of a light source to be used by the other terminal to transmit (emit) a modulated optical signal and the light source parameter adjustment method can be implemented in the same manner as in communication between an access point and terminal #1.

<Communication Modes>

FIG. 95 illustrates three communication or transmission modes.

The access point can set its mode to any one of (1) a multipoint communication mode, (2) a point-to-point communication mode, and (3) a multicast mode. Here, the access point has the following characteristics. When the access point is in the multicast mode (3), the access point does not specify the MAC address of the communication partner. Accordingly, the access point need not transmit information indicating the MAC address of the communication partner. Moreover, when the access point is in the point-to-point communication mode (2), the access point should emit light having directivity when transmitting a data symbol. Moreover, when the access point is in the multicast mode (3), the access point need not perform emission that controls the directivity of light, and may emit a plurality of beams of light in a plurality of directions.

Note that in the VARIATION OF EMBODIMENTS 1 TO 15 section, the description used the terminology "vehicle", "communication device", "access point", and "terminal", but the naming is not limited to these examples. As already described above, the devices may be referred to be other names.

Although a vehicle is presented as an example of the conveyance in the specification, other applicable examples include an airplane, an airship, watercraft, and a drone (unmanned aircraft).

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

In one aspect, the present disclosure is applicable as an optical communication system.

What is claimed is:

1. A transmission device comprising:
 a liquid crystal panel;
 a reflective panel that reflects light transmitted through the liquid crystal panel; and
 a liquid crystal controller that changes a luminous transmittance of the liquid crystal panel in accordance with a plurality of mutually different modulated signals, wherein
 a liquid crystal screen including the liquid crystal panel and the reflective panel is divided into a plurality of regions, and
 for each of the plurality of mutually different modulated signals, the liquid crystal controller changes the luminous transmittance in a region among the plurality of regions that corresponds to the modulated signal, according to the modulated signal.

2. The transmission device according to claim 1, further comprising:
 a photoelectric converter that converts outside light into power and supplies the power to the liquid crystal controller.

3. The transmission device according to claim 1, further comprising:
 memory that stores the plurality of mutually different modulated signals, wherein
 the liquid crystal controller controls the luminous transmittance of the liquid crystal panel in accordance with the plurality of mutually different modulated signals stored in the memory.

4. The transmission device according to claim 1, further comprising:
 memory that stores transmission data, wherein
 the liquid crystal controller generates the plurality of mutually different modulated signals based on the transmission data stored in the memory.

5. The transmission device according to claim 1, further comprising:
 an interface that obtains transmission data, wherein
 the liquid crystal controller generates the plurality of mutually different modulated signals based on the transmission data obtained by the interface.

* * * * *